(12) United States Patent
Harrises et al.

(10) Patent No.: US 11,244,485 B2
(45) Date of Patent: Feb. 8, 2022

(54) AUGMENTED REALITY SYSTEMS AND METHODS UTILIZING REFLECTIONS

(71) Applicant: Magic Leap, Inc., Plantation, FL (US)

(72) Inventors: Christopher M. Harrises, Nashua, NH (US); Nicole Elizabeth Samec, Fort Lauderdale, FL (US); Nastasja U. Robaina, Coconut Grove, FL (US); Mark Baerenrodt, Millbrae, CA (US); Adam Carl Wright, Fort Lauderdale, FL (US); Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/543,280

(22) Filed: Aug. 16, 2019

(65) Prior Publication Data

US 2019/0371028 A1    Dec. 5, 2019

Related U.S. Application Data

(63) Continuation of application No. 15/409,430, filed on Jan. 18, 2017, now Pat. No. 10,430,985.
(Continued)

(51) Int. Cl.
*G06T 11/60* (2006.01)
*G02B 27/01* (2006.01)

(52) U.S. Cl.
CPC .......... *G06T 11/60* (2013.01); *G02B 27/0172* (2013.01); *G02B 2027/014* (2013.01); *G02B 2027/0178* (2013.01)

(58) Field of Classification Search
None
See application file for complete search history.

(56) References Cited

U.S. PATENT DOCUMENTS

| | | |
|---|---|---|
| 4,007,443 A | 2/1977 | Bromberg et al. |
| 4,287,809 A | 9/1981 | Egil et al. |

(Continued)

FOREIGN PATENT DOCUMENTS

| | | |
|---|---|---|
| CN | 101093586 | 12/2007 |
| CN | 201508788 U | 6/2010 |

(Continued)

OTHER PUBLICATIONS

Big Tree Measuring Methods, in 5 pages, Retrieved May 9, 2019. URL: https://www.nature1st.net/naturens/files/tree_measure.html.
(Continued)

*Primary Examiner* — Saptarshi Mazumder
(74) *Attorney, Agent, or Firm* — Knobbe, Martens, Olson & Bear, LLP

(57) ABSTRACT

A display system comprises a wearable display device for displaying augmented reality content. The display device comprises a display area comprising light redirecting features that are configured to direct light to a user. The display area is at least partially transparent and is configured to provide a view of an ambient environment through the display area. The display device is configured to determine that a reflection of the user is within the user's field of view through the display area. After making this determination, augmented reality content is displayed in the display area with the augmented reality content augmenting the user's view of the reflection. In some embodiments, the augmented reality content may overlie on the user's view of the reflection, thereby allowing all or portions of the reflection to appear to be modified to provide a realistic view of the user with various modifications made to their appearance.

28 Claims, 33 Drawing Sheets

Related U.S. Application Data

(60) Provisional application No. 62/294,147, filed on Feb. 11, 2016, provisional application No. 62/366,533, filed on Jul. 25, 2016, provisional application No. 62/440,336, filed on Dec. 29, 2016, provisional application No. 62/445,630, filed on Jan. 12, 2017, provisional application No. 62/280,519, filed on Jan. 19, 2016, provisional application No. 62/343,583, filed on May 31, 2016, provisional application No. 62/315,456, filed on Mar. 30, 2016, provisional application No. 62/343,636, filed on May 31, 2016.

(56) References Cited

U.S. PATENT DOCUMENTS

| | | | |
|---|---|---|---|
| 4,346,384 | A | 8/1982 | Raab |
| D322,244 | S | 12/1991 | Bishai |
| 5,207,426 | A | 5/1993 | Inoue et al. |
| 5,485,171 | A | 1/1996 | Copper et al. |
| 5,579,026 | A | 11/1996 | Tabata |
| 5,670,988 | A | 9/1997 | Tickle |
| 5,685,776 | A | 11/1997 | Stambolic et al. |
| D387,352 | S | 12/1997 | Kaneko et al. |
| 5,847,976 | A | 12/1998 | Lescourret |
| 5,987,349 | A | 11/1999 | Schulz |
| 6,005,548 | A | 12/1999 | Latypov et al. |
| D424,553 | S | 5/2000 | Larian |
| 6,222,675 | B1 | 4/2001 | Mall et al. |
| 6,377,401 | B1 | 4/2002 | Bartlett |
| 6,383,079 | B1 | 5/2002 | Takeda et al. |
| 6,484,118 | B1 | 11/2002 | Govari |
| 6,774,624 | B2 | 8/2004 | Anderson et al. |
| 6,850,221 | B1 | 2/2005 | Tickle |
| 6,990,453 | B2 | 1/2006 | Wang et al. |
| 7,184,147 | B2 | 2/2007 | Sperling |
| 7,443,154 | B1 | 10/2008 | Merewether et al. |
| 7,542,869 | B2 | 6/2009 | Gandelsman et al. |
| 7,627,477 | B2 | 12/2009 | Wang et al. |
| 8,121,812 | B2 | 2/2012 | Higgins |
| 8,208,719 | B2 | 6/2012 | Gordon et al. |
| 8,571,636 | B2 | 10/2013 | Wu |
| 8,700,376 | B2 | 4/2014 | Ophir et al. |
| 8,743,051 | B1 | 6/2014 | Moy |
| 8,854,798 | B1 | 10/2014 | Mullet et al. |
| 8,950,867 | B2 | 2/2015 | Macnamara |
| 8,958,599 | B1 * | 2/2015 | Starner ............ G06K 9/00604 382/103 |
| 9,081,426 | B2 | 7/2015 | Armstrong |
| 9,215,293 | B2 | 12/2015 | Miller |
| 9,310,559 | B2 | 4/2016 | Macnamara |
| 9,344,673 | B1 | 5/2016 | Buchheit |
| 9,348,143 | B2 | 5/2016 | Gao et al. |
| D758,367 | S | 6/2016 | Natsume |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,261,162 | B2 | 4/2019 | Bucknor et al. |
| 10,430,985 | B2 | 10/2019 | Harrises et al. |
| 10,495,718 | B2 | 12/2019 | Bucknor et al. |
| 10,948,721 | B2 | 3/2021 | Bucknor et al. |
| 2002/0030483 | A1 | 3/2002 | Gilboa |
| 2003/0092448 | A1 | 5/2003 | Forstrom et al. |
| 2004/0201857 | A1 | 10/2004 | Foxlin |
| 2004/0247327 | A1 | 12/2004 | Kamali et al. |
| 2006/0012571 | A1 | 1/2006 | Rodgers et al. |
| 2006/0028436 | A1 | 2/2006 | Armstrong |
| 2007/0018649 | A1 | 1/2007 | Prsha et al. |
| 2007/0081123 | A1 | 4/2007 | Lewis |
| 2008/0159447 | A1 | 7/2008 | Bucknor et al. |
| 2009/0005166 | A1 | 1/2009 | Sato |
| 2009/0024050 | A1 | 1/2009 | Jung et al. |
| 2010/0220867 | A1 | 9/2010 | Frerking et al. |
| 2011/0199088 | A1 | 8/2011 | Bittar et al. |
| 2011/0227820 | A1 | 9/2011 | Haddick et al. |
| 2011/0238399 | A1 | 9/2011 | Ophir et al. |
| 2011/0241976 | A1 | 10/2011 | Boger et al. |
| 2012/0127062 | A1 | 5/2012 | Bar-Zeev et al. |
| 2012/0162549 | A1 | 6/2012 | Gao et al. |
| 2012/0218301 | A1 | 8/2012 | Miller |
| 2013/0064328 | A1 | 3/2013 | Adnani et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0128230 | A1 | 5/2013 | Macnamara |
| 2013/0194389 | A1 | 8/2013 | Vaught et al. |
| 2013/0208234 | A1 | 8/2013 | Lewis |
| 2013/0242262 | A1 | 9/2013 | Lewis |
| 2014/0003762 | A1 | 1/2014 | Macnamara |
| 2014/0052401 | A1 | 2/2014 | Riley et al. |
| 2014/0071539 | A1 | 3/2014 | Gao |
| 2014/0078283 | A1 | 3/2014 | Nistico et al. |
| 2014/0177023 | A1 | 6/2014 | Gao et al. |
| 2014/0207570 | A1 | 7/2014 | Cancro et al. |
| 2014/0218468 | A1 | 8/2014 | Gao et al. |
| 2014/0267004 | A1 | 9/2014 | Brickner |
| 2014/0267420 | A1 | 9/2014 | Schowengerdt |
| 2014/0306866 | A1 | 10/2014 | Miller et al. |
| 2015/0002507 | A1 | 1/2015 | Ambrus et al. |
| 2015/0016777 | A1 | 1/2015 | Abovitz et al. |
| 2015/0058319 | A1 | 2/2015 | Miyajima |
| 2015/0077336 | A1 | 3/2015 | Elangovan |
| 2015/0103306 | A1 | 4/2015 | Kaji et al. |
| 2015/0123991 | A1 | 5/2015 | Yarosh et al. |
| 2015/0177831 | A1 | 6/2015 | Chan et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0235435 | A1 | 8/2015 | Miller et al. |
| 2015/0248169 | A1 | 9/2015 | Abovitz et al. |
| 2015/0248170 | A1 | 9/2015 | Abovitz et al. |
| 2015/0248788 | A1 | 9/2015 | Abovitz et al. |
| 2015/0248793 | A1 | 9/2015 | Abovitz et al. |
| 2015/0258431 | A1 | 9/2015 | Stafford et al. |
| 2015/0268415 | A1 | 9/2015 | Schowengerdt et al. |
| 2015/0301797 | A1 | 10/2015 | Miller |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2015/0356781 | A1 | 12/2015 | Miller |
| 2016/0005233 | A1 | 1/2016 | Fraccaroli et al. |
| 2016/0011419 | A1 | 1/2016 | Gao |
| 2016/0026253 | A1 | 1/2016 | Bradski et al. |
| 2016/0041391 | A1 | 2/2016 | Van Curen et al. |
| 2016/0091920 | A1 | 3/2016 | Belogolovy |
| 2016/0259404 | A1 | 9/2016 | Woods |
| 2016/0353078 | A1 | 12/2016 | Zhou et al. |
| 2017/0024885 | A1 | 1/2017 | Miyazaki |
| 2017/0098139 | A1 * | 4/2017 | Protter ................ G06T 7/0004 |
| 2017/0184846 | A1 * | 6/2017 | Lu ........................ G06F 1/163 |
| 2017/0307891 | A1 | 10/2017 | Bucknor et al. |
| 2019/0195979 | A1 | 6/2019 | Bucknor |
| 2020/0064431 | A1 | 2/2020 | Bucknor et al. |
| 2021/0165217 | A1 | 6/2021 | Bucknor |

FOREIGN PATENT DOCUMENTS

| | | |
|---|---|---|
| CN | 102194254 | 9/2011 |
| CN | 102567617 | 7/2012 |
| CN | 102656474 | 9/2012 |
| CN | 102893236 | 1/2013 |
| CN | 103792661 | 5/2014 |
| CN | 104407700 | 3/2015 |
| EP | 2 338 286 | 6/2017 |
| JP | H11-110114 A | 4/1999 |
| JP | 2004-56272 | 2/2004 |

(56) References Cited

FOREIGN PATENT DOCUMENTS

| | | |
|---|---|---|
| JP | 2007-272067 | 10/2007 |
| JP | 2008-009646 | 1/2008 |
| JP | 2011-41872 | 3/2011 |
| JP | 2011-085868 | 4/2011 |
| JP | 2012-221186 | 11/2012 |
| JP | 2013-521576 A | 6/2013 |
| JP | 2015-204033 | 11/2015 |
| JP | 2015-210797 | 11/2015 |
| WO | WO 2014/160342 | 10/2014 |
| WO | WO 2014/164901 | 10/2014 |
| WO | WO 2015/159533 | 10/2015 |
| WO | WO 2016/141373 | 9/2016 |
| WO | WO 2017/127571 | 7/2017 |
| WO | WO 2017/189450 | 11/2017 |

OTHER PUBLICATIONS

Fotopoulou, A et al., "Mirror-view reverses somatoparaphrenia: dissociation between first- and third-person perspectives on body ownership", Neuropsychologia, vol. 49, Dec. 2011, in 10 pages. URL: http://www.ncbi.nlm.nih.gov/pubmed/22023911.

Intel: "Retail Solution Configuration: Memory Mirror Solution", Intel, printed Sep. 25, 2015, in 3 pages. URL: http://www.intel.com/content/www/US/en/retail/nrf-2014/memory.html?wapkw=mi.

Milde, C. et al., "Do Mirror Glasses Have the Same Effect on Brain Activity as a Mirror Bo ? Evidence from a Functional Magnetic Resonance Imaging Study with Healthy Subjects", PLoS One, vol. 10, Issue. 5, published online May 27, 2015, in 13 pages. URL: http://www.ncbi.nih.gov/pmc/articles/PMC4446290/.

MillenniumDroid, "True Mirror-Android Apps on Google Play", Google Play Store, retrieved Jun. 30, 2016, in 2 pages. URL: https://play.google.com/store/apps/details?id=com.blogspot.mdroid.mymirror&hl=en.

Newcombe, R. et al., "KinectFusion: Real-Team Dense Surface Mapping and Tracking," IEEE ISMAR, Oct. 2011, in 10 pages.

Plataforma SINC, "Through the looking glass: Research into brain's ability to understand mirror-image words sheds light on dysle ia," ScienceDaily, Mar. 31, 2011, in 3 pages. URL: https://www.sciencedaily.com/releases/2011/03/110331080037.htm.

Preston, C. et al., "Owning the body in the mirror: The effect of visual perspective and mirror view on the full-body illusion", Scientific Reports, vol. 5, published online Dec. 17, 2015, in 13 pages. URL: http://www.ncbi.nlm.nih.gov/pmc/articles/PMC4683587/.

Rutkin, A., "Digital mirror reveals what lies under your skin", New Scientist, Apr. 15, 2014, in 3 pages. URL: https://www.newscientist.com/article/mg22229653-800-digital-mirror-reveals-what-lies-under-your-skin/.

Searle, R., "10 Crazy Facts About Mirrors," ListVerse, Dec. 30, 2013, in 11 pages. URL: http://listverse.com/2013/12/30/10-crazy-facts-about-mirrors/.

WIKIPEDIA: "Atomic Mirror", Wikipedia, printed Dec. 13, 2016, in 2 pages. URL: http/en.wikipedia.org/wiki/Atomic_mirror.

WIKIPEDIA: "Atomic Mirror", Wikipedia, printed Dec. 13, 2016, in 4 pages. URL: http/en.wikipedia.org/wiki/Atomic_mirror.

WIKIPEDIA: "Mirror Neuron", Wikipedia, printed Jun. 30, 2016, in 17 pages. URL: https://en.wikipedia.org/wiki/Mirror_neuron.

WIKIPEDIA: "Non-reversing mirror," Wikipedia, printed Jun. 30, 2016, in 2 pages. URL: https://en.wikipedia.org/wiki/Non-reversing_mirror.

WIKIPEDIA: "Simultaneous localization and mapping", Wikipedia, accessed Oct. 22, 2015, in 7 pages. URL: https://en.wikipedia.org/wiki/Simultaneous_localization_and_mapping.

Zult, T et al., "Mirror illusion reduces motor cortical inhibition in the ipsilateral primary motor corte during forceful unilateral muscle contractions", Journal of Neurophysiology, vol. 113, Issue 7, Apr. 2015, published online Jan. 28, 2015, in 14 pages. URL: http://www.ncbi.nlm.nih.gov/pmc/articles/PMC4416555/.

"Eye Chromatism", Telescope-Optics.net, retrieved Sep. 6, 2016, in 6 pages. URL: http://www.telescopeoptics.net/eye_chromatism.htm.

"Digital mirror reveals what lies under your skin", NewScientist, Apr. 19, 2014, in 3 pages. URL: https://www.newscientist.com/article/mg22229653-800-digital-mirror-reveals-what-lies-under-your-skin/.

Big Tree Measuring Methods, in 5 pages, Retrieved May 9, 2019. URL: http://www.nature1st.net/naturens/files/tree_measure.html.

Wikipedia: "Forced perspective," in 10 pages, Retrieved May 9, 2019. URL: https://en.wikipedia.org/wiki/Forced_perspective. 2015.

"Magic Mirror" (homepage), Magic Mirror, accessed Apr. 17, 2018, in 4 pages. URL: http://magicmirror.me/.

"Overview" (homepage), Memomi—Memory Mirror, accessed Apr. 17, 2018, in 6 pages. URL: http://memorymirror.com.

Tracking Systems for VR—SGN-5406 Virtual Reality Autumn 2010, power point 80 pages.

"Core Technology", Mantis Vision, printed Feb. 24, 2017, in 4 pages. URL: http://www.mantisvision.com/technology.php.

"DepthSense Sensors", SoftKinetic, printed Feb. 24, 2017, in 1 page. URL: https://www.softkinetic.com/Products/DepthSenseSensors.

"Products Overview", Advanced Scientific Concepts, Inc., printed Feb. 24, 2017, in 4 pages. URL: http://www.advancedscientificconcepts.com/products/products.html.

"G4 Brochure", Polhemus, Sep. 2015, in 2 pages. URL: http://polhemus.com/_assets/img/G4_Brochure.pdf.

"Market ready 3D sensors—completed with pmd intelligence", PMD Technologies, printed Feb. 24, 2017, in 2 pages. URL: http://www.pmdtec.com/company/realized_visions.php.

"The Virtual Reality Locomotion Simulator—Virtusphere", Polhemus, printed Feb. 10, 2017, in 3 pages. URL: http://polhemus.com/_assets/img/Virtusphere_Case_Study.pdf.

ARToolKit: https://web.archive.Org/web/20051013062315/http://www.hitl.washington.edu:80/artoolkit/documentation/hardware.htm, archived Oct. 13, 2005.

Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.

Azuma, "Predictive Tracking for Augmented Realty," TR95-007, Department of Computer Science, UNC-Chapel Hill, NC, Feb. 1995.

Bimber, et al., "Spatial Augmented Reality - Merging Real and Virtual Worlds," 2005 https://web.media.mit.edu/~raskar/book/BimberRaskarAugmentedRealityBook.pdf.

Biosense Webster: "CARTO 3 System", printed Feb. 10, 2017, in 3 pages. URL: https://www.biosensewebster.com/documents/carto3-fact-sheet.pdf?Cache=1 %2F19%2F2015+3%3A56%3A28+PM.

Jacob, "Eye Tracking in Advanced Interface Design," Human-Computer Interaction Lab Naval Research Laboratory, Washington, D.C./paper/ in Virtual Environments and Advanced Interface Design, ed. by W. Barfield and T.A. Furness, pp. 258-288, Oxford University Press, New York (1995).

Kindratenko, V., "Calibration of electromagnetic tracking devices", Virtual Reality, vol. 4, Jun. 1999, in 19 pages.

Li, M et al., "FPGA based electromagnetic tracking system for fast catheter navigation", International Journal of Scientific & Engineering Research, vol. 4, Iss. 9, Sep. 2013, in 5 pages.

NDI: "Aurora", NDI Measurement Sciences, printed Feb. 10, 2017, in 3 pages. URL:https://www. ndigital.com/msci/products/aurora/.

Strickland, J., "How Virtual Reality Gear Works", HowStuffWorks, printed Apr. 19, 2017, in 18 pages. URL: http://electronics.howstuffworks.com/gadgets/other-gadgets/VR-gear.htm/printable.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

AUGMENTED REALITY SYSTEMS AND METHODS UTILIZING REFLECTIONS

CROSS-REFERENCE TO RELATED APPLICATIONS

This application is a continuation of, and claims priority to, U.S. patent application Ser. No. 15/409,430 filed on Jan. 18, 2017, entitled "AUGMENTED REALITY SYSTEMS AND METHODS UTILIZING REFLECTIONS". U.S. patent application Ser. No. 15/409,430 claims the benefit of priority under 35 U.S.C. § 119(e) of U.S. Provisional Application No. 62/294,147, filed on Feb. 11, 2016, entitled "AUGMENTED REALITY SYSTEMS AND METHODS UTILIZING VIEWER REFLECTIONS"; U.S. Provisional Application No. 62/366,533, filed on Jul. 25, 2016, entitled "AUGMENTED REALITY SYSTEMS AND METHODS UTILIZING REFLECTIONS"; U.S. Provisional Application No. 62/440,336, filed on Dec. 29, 2016, entitled "AUGMENTED REALITY SYSTEMS AND METHODS UTILIZING REFLECTIONS"; U.S. Provisional Application No. 62/445,630, filed on Jan. 12, 2017, entitled "AUGMENTED REALITY SYSTEMS AND METHODS UTILIZING REFLECTIONS"; U.S. Provisional Application No. 62/280,519, filed on Jan. 19, 2016, entitled "AUGMENTED REALITY TELEPRESENCE"; U.S. Provisional Application No. 62/343,583, filed on May 31, 2016, entitled "MIRROR DETECTION USING IMAGE-BASED CUES"; U.S. Provisional Application No. 62/315,456, filed on Mar. 30, 2016, entitled "AUGMENTED REALITY WORLD MAPS IN THE PRESENCE OF REFLECTIVE SURFACES"; U.S. Provisional Application No. 62/343,636, filed on May 31, 2016, entitled "MIRROR DETECTION USING SENSOR-BASED CUES". The disclosures of which are hereby incorporated by reference herein in their entirety.

This application also incorporates by reference the entirety of each of the following patent applications and publications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; U.S. application Ser. No. 14/331,218 filed on Jul. 14, 2014; and U.S. Application Publication No. 2015/0235435, published Aug. 20, 2015.

BACKGROUND

Field

The present disclosure relates to augmented reality imaging and visualization systems.

Description of the Related Art

So-called "smart mirrors" are mirrors that appear to be normal mirrors until activated. Once activated, the mirror uses display technology to graphically overlay a user interface and possibly other display information onto the mirror surface. Systems and methods disclosed herein address various challenges related to smart mirror technology.

SUMMARY

In some embodiments, a display system is provided. The display system comprises a wearable display device, which comprises a display area comprising light redirecting features configured to direct light to a user. The display area is at least partially transparent and is configured to provide a view of an ambient environment through the display area. The display device also comprises one or more hardware processors and a non-transitory computer-readable storage medium including computer-executable instructions. The instructions, when executed by the one or more hardware processors, cause the one or more hardware processors to perform operations comprising: determining that a reflection of the user is within the user's field of view through the display area; and subsequently displaying augmented reality content in the display area, the augmented reality content augmenting the reflection.

In some other embodiments, a method for displaying images is provided. The method comprises providing a wearable display device, which comprises a display area comprising light redirecting features configured to direct light to a user. The display area is at least partially transparent, thereby providing a view of an ambient environment through the display area. The method further comprises determining that a reflection of the user is within the user's field of view through the display area; and subsequently displaying augmented reality content in the display area. The augmented reality content augments the reflection.

In yet some other embodiments, a display system is provided. The display system comprises a wearable display device, which comprises a display area comprising light redirecting features configured to direct light to a user. The display area is at least partially transparent and is configured to provide a view of an ambient environment through the display area. The display device also comprises one or more hardware processors and a non-transitory computer-readable storage medium including computer-executable instructions. The instructions, when executed by the one or more hardware processors, cause the one or more hardware processors to perform operations comprising: determining that a reflection is within the user's field of view through the display area.

In some embodiments, a method for displaying images is provided. The method comprises providing a wearable display device, which comprises a display area comprising light redirecting features configured to direct light to a user. The display area is at least partially transparent and is configured to provide a view of an ambient environment through the display area. The method further comprises determining that a reflection is within the user's field of view through the display area.

In yet other embodiments, a display system comprises a wearable display device comprising a display area comprising light redirecting features configured to direct light to a user. The display area is at least partially transparent and is configured to provide a view of an ambient environment through the display area. The display device also comprises an outward facing camera; one or more hardware processors; and a non-transitory computer-readable storage medium including computer-executable instructions that, when executed by the one or more hardware processors, cause the one or more hardware processors to perform various operations. The operations comprise passively collecting image information using the outward facing camera; determining whether the image information contains a reflection; determining whether the image information contains data relevant for a health analysis of the user; and performing the health analysis.

In some embodiments, a method for displaying images is provided. The method comprises providing a wearable display device comprising a display area comprising light redirecting features configured to direct light to a user, wherein the display area is at least partially transparent and is configured to provide a view of an ambient environment through the display area. The display device also comprises an outward facing camera. The method further comprises passively collecting image information using the outward facing camera; determining whether the image information contains a reflection; determining whether the image information contains data relevant for a health analysis of the user; and performing the health analysis.

Additional example embodiments are provided below.

The following are example embodiments relating to augmented reality systems and methods utilizing reflections.

1. A method for displaying images, the method comprising: providing a wearable display device comprising: a display area comprising light redirecting features configured to direct light to a user, wherein the display area is at least partially transparent, thereby providing a view of an ambient environment through the display area; determining that a reflection of the user is within the user's field of view through the display area; and subsequently displaying augmented reality content in the display area, the augmented reality content augmenting the reflection.

2. The method of embodiment 1, wherein the display area is configured to output light to form a plurality of images set on a plurality of depth planes, wherein one or more of the images comprise the augmented reality content.

3. The method of embodiment 2, wherein the display device comprises a stack of waveguides, at least some of the waveguides comprising the light redirecting features, wherein the waveguides are configured to in-couple light from a light source and to out-couple light to output the light to form the plurality of images.

4. The method of embodiment 3, wherein each waveguide is configured to output images for a single corresponding depth plane.

5. The method of embodiment 1, wherein the wearable display device further comprises a camera configured to capture images of the user's ambient environment.

6. The method of embodiment 5, wherein determining that the reflection of the user is within the user's field of view comprises: comparing an image captured by the camera with stored image information to determine whether there is a match between the captured image and the stored image information.

7. The method of embodiment 6, wherein the stored image information comprises unique features of the user's appearance.

8. The method of embodiment 6, wherein the stored image information comprises unique features of the wearable display device.

9. The method of embodiment 5, wherein determining that the reflection of the user is within the user's field of view further comprises performing an iris recognition of the user.

10. The method of embodiment 1, further comprising attracting the user to a reflective surface by providing one or both of optical or auditory signals to the user.

11. The method of embodiment 1, wherein determining that the reflection of the user is within the user's field of view comprises detecting a unique identifier indicative of a reflective surface.

12. The method of embodiment 11, wherein the unique identifier is a visual indicator on or proximate the reflective surface, wherein detecting the unique identifier comprises capturing an image of the unique identifier with the camera.

13. The method of embodiment 11, wherein detecting a unique identifier comprises detecting a beacon broadcasting electromagnetic radiation, wherein the wearable display device comprises a receiver configured to receive the electromagnetic radiation, wherein detecting the beacon comprises detecting the electromagnetic radiation.

14. The method of embodiment 1, further comprising, before subsequently displaying augmented reality content: detecting that the user is stationary, wherein subsequently displaying augmented reality content is not performed until the user is determined to be stationary.

15. The method of embodiment 1, wherein subsequently displaying augmented reality content comprises displaying a virtual menu with user-selectable options.

16. The method of embodiment 15, wherein the display device comprises a camera configured to detect user gestures or expressions to select the user-selectable options.

17. The method of embodiment 1, wherein the display device comprises a camera configured to detect one or both of user stare duration or pupil area, wherein subsequently displaying augmented reality content comprises modifying one or both of a type and timing of the augmented reality content depending on one of both of user stare duration or pupil area.

18. The method of embodiment 1, wherein the display device comprises a camera configured for detecting emotional states of the user, wherein subsequently displaying augmented reality content comprises displaying augmented reality content based on the emotional state of the user.

19. The method of embodiment 1, further comprising: determining an identity of the user.

20. The method of embodiment 19, wherein determining an identity of the user is performed after determining that a reflection of the user is within the user's field of view.

21. The method of embodiment 19, wherein subsequently displaying augmented reality content comprises displaying information unique to the user.

22. The method of embodiment 19, further comprising collecting information regarding the user's activities.

23. The method of embodiment 1, further comprising transmitting information regarding the user's activities to a receiving station associated with a reflective surface providing the user's reflection.

24. The method of embodiment 1, further comprising determining a location of the user before subsequently displaying augmented reality content, wherein subsequently displaying augmented reality content comprises: displaying augmented reality content specific to the location of the user.

25. The method of embodiment 24, wherein displaying augmented reality content comprises displaying sales offers from a store or a portion of a store in which the user is situated.

26. The method of embodiment 25, further comprising: determining an identity of the user; accessing a purchase or browsing history of the user; and generating sales offers based upon the purchase or browsing history.

27. The method of embodiment 1, wherein the augmented reality content comprises images of clothing overlaying the user's reflection.

28. The method of embodiment 1, wherein the augmented reality content comprises images overlying the user's reflection and modifying a property of the user's clothing.

29. The method of embodiment 28, wherein the property comprises one or more of: a color, a texture, and a pattern.

30. The method of embodiment 1, further comprising distributing one or both of the augmented reality content and the user's reflection to one or more other users.

31. The method of embodiment 1, further comprising sharing the augmented reality content by uploading the augmented reality content to a remote server accessible by individuals other than the user.

32. The method of embodiment 1, wherein the augmented reality content comprises an alert to replenish recurring-use products.

33. The method of embodiment 32, wherein the alert is a beauty alert comprising a reminder to replenish beauty products.

34. The method of embodiment 1, further comprising: capturing one or more images of the user across an extended time interval; storing the images or data derived from the images; and performing a comparison between a current image with the stored images or data, wherein subsequently displaying augmented reality content comprises displaying results of the comparison.

35. The method of embodiment 34, wherein displaying results of the comparison comprises displaying one or more earlier images of the user.

36. The method of embodiment 34, wherein displaying results of the comparison comprises displaying recommendations for health or beauty products, or health or beauty treatments.

37. The method of embodiment 36, wherein displaying recommendations comprises: displaying options for the health or beauty products, or health or beauty treatments; and displaying expected results of the health or beauty products, or health or beauty treatments by overlaying images of the expected results with the user's reflection.

38. The method of embodiment 34, wherein the extended time interval comprises a plurality of months or years.

39. The method of embodiment 34, wherein capturing one or more images is performed daily.

40. The method of embodiment 34, wherein performing a comparison comprises performing a health analysis.

41. The method of embodiment 40, wherein performing a health analysis comprises detecting changes in body shape, skin pallor, skin features.

42. The method of embodiment 40, wherein performing a health analysis comprises interacting with a medical personnel in real time.

43. The method of embodiment 1, wherein the augmented reality content comprises an alert to perform a task.

44. The method of embodiment 43, wherein the task is a recurring task.

45. The method of embodiment 43, wherein the recurring task includes one or more of flossing teeth, taking medications, and ordering medications.

46. The method of embodiment 1, wherein the augmented reality content comprises medical information of the user.

47. The method of embodiment 46, wherein the medical information includes one or more of weight, height, and body mass index.

48. The method of embodiment 1, further comprising accessing data from one or more of a scale, a thermometer, a sphygmomanometer, and a heart rate monitor, wherein subsequently displaying augmented reality content comprises displaying one or both of the accessed data or information derived from the accessed data.

49. The method of embodiment 1, further comprising: capturing a plurality of images of the user from different angles; detecting differences between a current image and a reference image or reference data; wherein subsequently displaying augmented reality content comprises displaying results of detecting differences.

50. The method of embodiment 1, wherein subsequently displaying augmented reality content comprises overlying medical imaging onto the reflection of the user.

51. The method of embodiment 1, wherein subsequently displaying augmented reality content comprises overlying sports images onto the reflection of the user, the sports images comprising line diagrams or images of a person, wherein the line diagrams or images of a person showing particular sports-related motions and body postures.

52. The method of embodiment 1, wherein subsequently displaying augmented reality content comprises displaying a virtual scale for determining dimensions of reflections of the user.

53. A display system, comprising: a wearable display device comprising: a display area comprising light redirecting features configured to direct light to a user, wherein the display area is at least partially transparent, thereby providing a view of an ambient environment through the display area; a hardware processor; and a non-transitory computer-readable storage medium including computer-executable instructions that, when executed by the hardware processor, configure the hardware processor to perform operations comprising: determining that a reflection of the user is within the user's field of view through the display area; and subsequently displaying augmented reality content in the display area, the augmented reality content augmenting the reflection.

54. The system of embodiment 53, wherein the display area comprises a plurality of sets of light redirecting features configured to output a plurality of images on a plurality of depth planes, each set of light directing features configured to output light to form an image on one of the plurality of depth planes.

55. The system of embodiment 54, wherein the display device comprises a stack of waveguides, at least some of the waveguides comprising the light redirecting features, wherein the waveguides are configured to in-couple light from a light source and to out-couple light to output the light to form the plurality of images.

56. The system of embodiment 55, wherein each waveguide is configured to output images for a single corresponding depth plane.

57. The system of embodiment 53, wherein the wearable display device further comprises a camera configured to capture images of the user's ambient environment.

58. The system of embodiment 53, wherein determining that the reflection of the user is within the user's field of view comprises: comparing an image captured by the camera with stored image information to determine whether there is a match between the captured image and the stored image information.

59. The system of embodiment 58, wherein the stored image information comprises unique features of the user's appearance.

60. The system of embodiment 59, wherein the stored image information comprises unique, optically observable features of the wearable display device.

61. The system of embodiment 58, wherein determining that the reflection of the user is within the user's field of view further comprises performing an iris recognition of the user.

62. The system of embodiment 53, wherein determining that the reflection of the user is within the user's field of view comprises detecting a presence of a unique identifier indicative of a reflective surface.

63. The system of embodiment 53, wherein the operations further comprise, before subsequently displaying augmented reality content: detecting that the user is stationary, wherein subsequently displaying augmented reality content is not performed until the user is determined to be stationary.

64. The system of embodiment 53, wherein subsequently displaying augmented reality content comprises displaying a virtual menu with user-selectable options.

65. The system of embodiment 64, wherein the display device comprises a camera configured to detect user gestures or expressions to select the user-selectable options.

66. The system of embodiment 64, wherein the display device comprises a camera configured to detect one or both of user stare duration or pupil area, wherein subsequently displaying augmented reality content comprises modifying one or both of a type and timing of the augmented reality content depending on one of both of user stare duration or pupil area.

67. The system of embodiment 53, wherein the display device comprises a camera configured for detecting emotional states of the user, wherein subsequently displaying augmented reality content comprises displaying augmented reality content based on the emotional state of the user.

68. The system of embodiment 53, wherein the operations further comprise: determining an identity of the user.

69. The system of embodiment 68, wherein determining an identity of the user is performed after determining that a reflection of the user is within the user's field of view.

70. The system of embodiment 68, wherein subsequently displaying augmented reality content comprises displaying information unique to the user.

71. The system of embodiment 68, wherein the operations further comprise collecting information regarding the user's activities.

72. The system of embodiment 53, wherein the operations further comprise transmitting information regarding the user's activities to a receiving station associated with a reflective surface providing the user's reflection.

73. The system of embodiment 53, wherein the operations further comprise determining a location of the user before subsequently displaying augmented reality content, wherein subsequently displaying augmented reality content comprises: displaying augmented reality content specific to the location of the user.

74. The system of embodiment 74, wherein displaying augmented reality content comprises displaying sales offers from a store or a portion of a store in which the user is situated.

75. The system of embodiment 74, wherein the operations further comprise: determining an identity of the user; accessing a purchase or browsing history of the user; and generating sales offers based upon the purchase or browsing history.

76. The system of embodiment 53, wherein the augmented reality content comprises images of clothing overlaying the user's reflection.

77. The system of embodiment 53, wherein the augmented reality content comprises images overlying the user's reflection and modifying a property of the user's clothing.

78. The system of embodiment 77, wherein the property comprises one or more of: a color, a texture, and a pattern.

79. The system of embodiment 53, wherein the operations further comprise distributing one or both of the augmented reality content and the user's reflection to one or more other users.

80. The system of embodiment 53, wherein the operations further comprise sharing the augmented reality content by uploading the augmented reality content to a remote server accessible by individuals other than the user.

81. The system of embodiment 53, wherein the augmented reality content comprises an alert to replenish recurring-use products.

82. The system of embodiment 81, wherein the alert is a beauty alert comprising a reminder to replenish beauty products.

83. The system of embodiment 53, wherein the operations further comprise: capturing one or more images of the user across an extended time interval; storing the images or data derived from the images; and performing a comparison between a current image with the stored images or data, wherein subsequently displaying augmented reality content comprises displaying results of the comparison.

84. The system of embodiment 83, wherein displaying results of the comparison comprises displaying one or more earlier images of the user.

85. The system of embodiment 83, wherein displaying results of the comparison comprises displaying recommendations for health or beauty products, or health or beauty treatments.

86. The system of embodiment 85, wherein displaying recommendations comprises: displaying options for the health or beauty products, or health or beauty treatments; and displaying expected results of the health or beauty products, or health or beauty treatments by overlaying images of the expected results with the user's reflection.

87. The system of embodiment 83, wherein the extended time interval comprises a plurality of months or years.

88. The system of embodiment 83, wherein capturing one or more images is performed daily.

89. The system of embodiment 83, wherein performing a comparison comprises performing a health analysis.

90. The system of embodiment 89, wherein performing a health analysis comprises detecting changes in body shape, skin pallor, skin features.

91. The method of embodiment 90, wherein performing a health analysis comprises interacting with a medical personnel in real time.

92. The system of embodiment 53, wherein the augmented reality content comprises an alert to perform a task.

93. The system of embodiment 92, wherein the task is a recurring task.

94. The system of embodiment 93, wherein the recurring task includes one or more of flossing teeth, taking medications, and ordering medications.

95. The system of embodiment 53, wherein the augmented reality content comprises medical information of the user.

96. The system of embodiment 95, wherein the medical information includes one or more of weight, height, and body mass index.

97. The system of embodiment 96, wherein the operations further comprise accessing data from one or more of a scale, a thermometer, a sphygmomanometer, and a heart rate monitor, wherein subsequently displaying augmented reality content comprises displaying one or both of the accessed data or information derived from the accessed data.

98. The system of embodiment 53, wherein the operations further comprise: capturing a plurality of images of the user from different angles; detecting differences between a current image and a reference image or reference data; wherein subsequently displaying augmented reality content comprises displaying results of detecting differences.

99. The system of embodiment 53, wherein subsequently displaying augmented reality content comprises overlying medical imaging onto the reflection of the user.

100. The system of embodiment 53, wherein subsequently displaying augmented reality content comprises overlying sports images onto the reflection of the user, the sports images comprising line diagrams or images of a person, wherein the line diagrams or images of a person showing particular sports-related motions and body postures.

101. The system of embodiment 53, wherein subsequently displaying augmented reality content comprises displaying a virtual scale for determining dimensions of reflections of the user.

102. A display system, comprising: a wearable display device comprising: a display area comprising light redirecting features configured to direct light to a user, wherein the display area is at least partially transparent, thereby providing a view of an ambient environment through the display area; a hardware processor; and a non-transitory computer-readable storage medium including computer-executable instructions that, when executed by the hardware processor, configure the hardware processor to perform operations comprising: determining that a reflection is within the user's field of view through the display area.

103. The display system of embodiment 102, wherein determining that the reflection is within the user's field of view comprises analyzing an image of the reflection and determining whether directional features in the reflection are reversed.

104. The display system of embodiment 102, wherein the user is in the reflection and wherein the operations further comprise: capturing an image of a reflection of the user; and performing a health analysis based upon the captured image of the user.

105. The display system of embodiment 104, wherein the health analysis comprises a neurological test.

106. The display system of embodiment 104, wherein the health analysis comprises one or more of: a cranial nerve test, a motor examination, an examination of observable body abnormalities, an inspection of muscle tone and bulk, functional testing of muscles, a test of a strength of individual muscle groups, a reflex test, a coordination test, and a gait test.

107. The display system of embodiment 102, wherein the operations further comprise sharing information regarding the reflection with other display systems.

108. The display system of embodiment 107, wherein the operations further comprise receiving shared information from another display system and displaying augmented reality content corresponding to a view experienced by a user of the other display system.

109. The display system of embodiment 102, wherein the display system is configured to determine a magnification provided by a curved mirror.

110. The display system of embodiment 109, wherein the display system is configured to correct for the magnification while displaying an image of features in the reflection.

111. The display system of embodiment 109, wherein the display system is configured to correct for the magnification while determining a size of features in the reflection.

112. A method for displaying images, the method comprising: providing a wearable display device comprising: a display area comprising light redirecting features configured to direct light to a user, wherein the display area is at least partially transparent, thereby providing a view of an ambient environment through the display area; determining that a reflection is within the user's field of view through the display area.

113. The method of embodiment 111, wherein determining that the reflection is within the user's field of view comprises analyzing an image of the reflection and determining whether directional features in the reflection are reversed.

114. The method of embodiment 111, wherein the user is in the reflection and further comprising: capturing an image of a reflection of the user; and performing a health analysis based upon the captured image of the user.

115. The method of embodiment 113, wherein the health analysis comprises a neurological test.

116. The method of embodiment 113, wherein performing the health analysis comprises performing one or more of: a cranial nerve test, a motor examination, an examination of observable body abnormalities, an inspection of muscle tone and bulk, functional testing of muscles, a test of a strength of individual muscle groups, a reflex test, a coordination test, and a gait test.

117. The method of embodiment 113, further comprising sharing information regarding the reflection with other display systems.

118. The method of embodiment 113, further comprising receiving shared information from another display system and displaying augmented reality content corresponding to a view experienced by a user of the other display system.

119. The method of embodiment 111, further comprising determining a magnification provided by a curved mirror.

120. The method of embodiment 118, further comprising correcting for the magnification while displaying an image of features in the reflection.

121. The method of embodiment 118, further comprising determining a size of features in the reflection while correcting for the magnification.

122. A display system, comprising: a wearable display device comprising: a display area comprising light redirecting features configured to direct light to a user, wherein the display area is at least partially transparent, thereby providing a view of an ambient environment through the display area; an outward facing camera; a hardware processor; and a non-transitory computer-readable storage medium including computer-executable instructions that, when executed by the hardware processor, configure the hardware processor to perform operations comprising: passively collect image information using the outward facing camera; determine whether the image information contains a reflection; determine whether the image information contains data relevant for a health analysis of the user; and perform the health analysis.

123. The display system of embodiment 120, wherein the hardware processor is configured to substantially continuously passively collect the image information while the user is wearing the wearable display device and to intermittently determine that the image information contains data relevant for the health analysis.

124. The display system of embodiment 120, wherein the hardware processor is configured to perform the health analysis repeatedly over a duration of multiple weeks.

125. The display system of embodiment 120, wherein the image information comprises still images.

126. The display system of embodiment 120, wherein the image information comprises videos.

127. A method for displaying images, the method comprising: providing a wearable display device comprising: a display area comprising light redirecting features configured to direct light to a user, wherein the display area is at least partially transparent, thereby providing a view of an ambient environment through the display area; and an outward facing camera; passively collecting image information using the outward facing camera; determining whether the image information contains a reflection determining whether the image information contains data relevant for a health analysis of the user; and performing the health analysis.

128. The method of embodiment 125, wherein passively collecting the image information is performed substantially continuously while the user is wearing the wearable display device, and wherein determining whether the image information contains data relevant for a health analysis is performed intermittently while the user is wearing the wearable display device.

129. The method of embodiment 125, further comprising repeating, over a duration of multiple weeks: determining whether the image information contains a reflection; determining whether the image information contains data relevant for a health analysis of the user; and performing the health analysis.

130. The method of embodiment 125, wherein passively collecting image information comprises collecting still images.

131. The method of embodiment 125, wherein passively collecting image information comprises collecting videos.

The following are example embodiments relating to mirror detection using image-based cues.

1. A method for detecting a mirror in an environment, the method comprising: under control of an augmented reality device (ARD) comprising computer hardware, the ARD comprising an outward-facing imaging system configured to image an environment around a user: obtaining an image of the environment using the outward-facing imaging system, the image including a target object, wherein the target object may comprise a frame at least partially surround the mirror; identifying a cue indicative of the mirror based at least partly on an analysis of the image; confirming a presence of the mirror based at least in part on the identified cue; and performing an action based at least in part on the confirmed presence of the mirror in the environment.

2. The method of embodiment 1, wherein identifying the cue comprises: identifying a first plurality of keypoints in the image; accessing a world map of the environment, wherein the world map comprises information about physical objects in the environment; identifying a second plurality of keypoints in the world map; and comparing the first plurality of keypoints with the second plurality of keypoints to determine whether the first plurality of keypoints is a reflection of the second plurality of keypoints in the mirror.

3. The method of embodiment 2, wherein comparing the first plurality of keypoints with the second plurality of keypoints comprises determining a geometric relationship between a first geometry formed by the first plurality of keypoints with a second geometry formed by the second plurality of keypoints.

4. The method of embodiment 2 or embodiment 3, wherein the first plurality of keypoints comprises a first triplet of neighboring keypoints and wherein the second plurality of keypoints comprises a second triplet of neighboring keypoints.

5. The method of embodiment 4, wherein determining whether the first plurality of keypoints is the reflection of the second plurality of keypoints in the mirror comprises: determining open angles among the first triplet of neighboring keypoints and open angles among the second triplet of neighboring keypoints.

6. The method of any one of the embodiments 3-5, wherein determining the geometric relationship between the first geometry formed by the first plurality of keypoints with the second geometry formed by the second plurality of keypoints comprises axially transforming the first geometry or the second geometry, respectively.

7. The method of any one of the embodiments 2-6, wherein the cue comprises one or more of the following: a match between the first plurality of keypoints and the second plurality of keypoints; or a match between the first geometry and the second geometry.

8. The method of any one of the embodiments 1-7, wherein identifying the cue comprises identifying, in the image of the environment, a reflected object in the target object.

9. The method of embodiment 8, wherein the reflected object comprises a mirror image of a head of the user, a mirror image of the ARD, a mirror image of a physical object in the environment, or a mirror image of a text in the environment.

10. The method of any one of the embodiments 1-9, wherein identifying the cue comprises: identifying a boundary of the target object; measuring a first depth at the boundary of the target object; measuring a second depth of an object appearing within the boundary of the target object; and comparing the first depth and the second depth to determine whether the first depth matches the second depth.

11. The method of embodiment 10, wherein the cue comprises a mismatch between the first depth and the second depth.

12. The method of any one of the embodiments 1-11, wherein identifying the cue comprises identifying a feature of the target object in the image of the environment.

13. The method of embodiment 12, wherein the feature comprises one or more of the following: size, location, surface normal, frame, shape, or a label associated with the target object.

14. The method of embodiment 13, wherein the label comprises an optical label which contains information indicative of the presence of the mirror.

15. The method of any one of the embodiments 1-14, wherein confirming the presence of the mirror comprises transmitting, by the ARD, a signal to a label associated with the target object and receiving a response from the label, wherein the response includes information indicative of the presence of the mirror.

16. The method of any one of the embodiments 1-14 wherein confirming the presence of the mirror comprises receiving a signal from a label associated with target object, wherein the signal includes information indicative of the presence of the mirror.

17. The method of embodiment 15 or 16, wherein the signal comprises an electromagnetic signal or an acoustic signal.

18. The method of any one of the embodiments 1-17, wherein performing an action comprises: accessing a world map of the environment; and updating the world map of the environment based at least in part on the confirmed presence of the mirror.

19. The method of any one of the embodiments 1-18, wherein performing an action comprises conducting a telepresence session using the mirror in response to a confirmation of the presence of the mirror.

20. The method of any one of the embodiments 1-19, wherein the target object comprises one or more of the following: a doorway, a window, or a mirror.

21. A method for detecting a reflective surface in an environment, the method comprising: under control of an augmented reality device (ARD) comprising computer hardware, the ARD comprising an outward-facing imaging system configured to image an environment around a user:

obtaining an image of the environment using the outward-facing imaging system, the image including a target object, wherein the target object may comprise a reflective surface; identifying a cue indicative of the reflective surface based at least partly on an analysis of the image; and confirming the presence of the reflective surface based at least in part on the identified cue.

22. The method of embodiment 21, wherein identifying the cue comprises: identifying a first geometry formed by a first plurality of keypoints in the image; accessing a world map of the environment, wherein the world map comprises information about physical objects in the environment; identifying a second geometry formed by a second plurality of keypoints in the world map; and calculating a geometric relationship between the first geometry and the second geometry to determine whether the first geometry is a reflected image of the second geometry.

23. The method of embodiment 22, wherein the first plurality of keypoints comprises a first triplet of keypoints and wherein the second plurality of keypoints comprises a second triplet of keypoints.

24. The method of embodiment 23, wherein calculating the geometric relationship comprises: determining open angles among the first triplet of keypoints and open angles among the second triplet of keypoints.

25. The method of any one of the embodiments 22-24, wherein calculating the geometric relationship comprises axially transforming the first geometry or the second geometry, respectively.

26. The method of any one of the embodiments 22-25, wherein calculating the geometric relationship comprises determining an amount of magnification between a first size of the first geometry and a second size of the second geometry.

27. The method of any one of the embodiments 22-26, wherein the cue comprises a match between the first geometry and the second geometry.

28. The method of any one of the embodiments 21-27, wherein identifying the cue comprises identifying, in the image of the environment, a reflected object in the target object.

29. The method of embodiment 28, wherein the reflected object comprises a mirror image of a head of the user, a mirror image of the ARD, a mirror image of a physical object in the environment, or a mirror image of a text in the environment.

30. The method of any one of the embodiments 21-29, wherein identifying the cue comprises: identifying a boundary of the target object; measuring a first depth at the boundary of the target object; measuring a second depth of an object appearing within the boundary of the target object; and comparing the first depth and the second depth to determine whether the first depth matches the second depth.

31. The method of embodiment 30, wherein the cue comprises a mismatch between the first depth and the second depth.

32. The method of any one of the embodiments 21-31, wherein identifying the cue comprises identifying a feature of the target object in the image of the environment.

33. The method of embodiment 32, wherein the feature comprises one or more of the following: size, location, surface normal, frame, shape, or a label associated with the target object.

34. The method of embodiment 33, wherein the label comprises an optical label which contains information indicative of the presence of the reflective surface.

35. The method of any one of the embodiments 21-34, wherein confirming the presence of the reflective surface comprises transmitting, by the ARD, a signal to a label associated with the target object and receiving a response from the label, wherein the response includes information indicative of the presence of the reflective surface.

36. The method of any one of the embodiments 21-34 wherein confirming the presence of the reflective surface comprises receiving a signal from a label associated with target object, wherein the signal includes information indicative of the presence of the reflective surface.

37. The method of embodiment 35 or 36, wherein the signal comprises an electromagnetic signal or an acoustic signal.

38. The method of any one of the embodiments 21-37, wherein performing an action comprises: accessing a world map of the environment; and updating the world map of the environment based at least in part on the confirmed presence of the reflective surface.

39. The method of any one of the embodiments 21-38, wherein performing an action comprises conducting a telepresence session using the reflective surface in response to a confirmation of the presence of the reflective surface.

40. The method of any one of the embodiments 21-39, wherein the target object comprises one or more of the following: a doorway, a window, or a mirror.

41. An augmented reality device (ARD) comprising computer hardware and an outward-facing imaging system configured to image an environment around a user, the augmented reality system programed to perform any one of the methods of embodiments 1-40.

The following are example embodiments relating to mirror detection using sensor-based cues.

1. A method for detecting a mirror in an environment, the method comprising: under control of an augmented reality device (ARD) comprising computer hardware, the ARD comprising an outward-facing camera configured to image an environment around a user and an inertial measurement unit (IMU) configured to determine movements of a physical object in the environment: detecting a reflected image of the physical object in a target object, wherein the target object may be a mirror; collecting first movement data associated with the reflected image; collecting second movement data associated with the physical object; comparing the first movement data with the second movement data to identify a cue indicative of a presence of the mirror; and confirming the presence of the mirror based at least in part on the identified cue.

2. The method of embodiment 1, wherein the physical object comprises at least a portion of a body of the user.

3. The method of embodiment 2, wherein the physical object comprises a head or a hand of the user.

4. The method of any one of the embodiments 1-3, wherein collecting the first movement data and collecting the second movement data are performed by the outward-facing camera.

5. The method of embodiment 4, wherein the first movement data comprises images indicating position change of the reflected image over a period of time and wherein the second movement data comprises images indicating position change of the physical object over the period of time.

6. The method of any one of embodiments 1-30, wherein collecting the first movement data is performed by the outward-facing camera and collecting the second movement data is performed by the IMU.

7. The method of embodiment 6, wherein the first movement data comprises images indicating position change of the reflected image over a period of time and wherein the second movement data comprises position change of the physical object over the period of time.

8. The method of embodiment 5 or embodiment 7, wherein comparing the first movement data with the second movement data to identify the cue comprises: generating a first trajectory associated with the reflected image, the first trajectory based at least partly on the first movement data; generating a second trajectory associated with the reflected image, the second trajectory based at least partly on the second movement data; and calculating a covariance of the first trajectory and the second trajectory.

9. The method of embodiment 8, wherein the cue comprises determining that the covariance is less than a threshold.

10. The method of any one of the embodiments 1-9, wherein confirming the presence of the mirror comprises transmitting, by the ARD, a signal to a label associated with the target object and receiving a response from the label, wherein the response includes information indicative of the presence of the mirror.

11. The method of any one of the embodiments 1-10, wherein confirming the presence of the mirror comprises receiving a signal from a label associated with target object, wherein the signal includes information indicative of the presence of the mirror.

12. The method of embodiment 10 or embodiment 11, wherein the signal comprises an electromagnetic signal or an acoustic signal.

13. A method for detecting a reflective surface in an environment, the method comprising: under control of an augmented reality device (ARD) comprising computer hardware, the ARD comprising an outward-facing camera configured to image an environment around a user and an inertial measurement unit (IMU) configured to track movements of a physical object in the environment: detecting a reflected image of a physical object in a target object, wherein the target object may comprise a reflective surface; collecting first movement data associated with the reflected image; collecting second movement data associated with the physical object; and comparing the first movement data with the second movement data to identify a cue indicative of a presence of the reflective surface.

14. The method of embodiment 13, wherein the physical object comprises at least a portion of a body of the user.

15. The method of embodiment 14, wherein the physical object comprises a head or a hand of the user.

16. The method of any one of the embodiments 13-15, wherein collecting the first movement data and collecting the second movement data comprise: obtaining images, by the outward-facing camera, over a period of time; identifying respective positions of the reflected image in the images; calculating a first trajectory based on the identified respective positions of the reflected image; identifying respective positions of the physical object in the images; and calculating a second trajectory based on the identified respective positions of the physical object.

17. The method of any one of embodiments 13-15, wherein collecting the first movement data comprises is performed by the outward-facing camera and collecting the second movement data is performed by the IMU.

18. The method of any one of embodiments 13-17, wherein identifying the cue comprises: calculating a covariance between the first movement data and the second movement data; and determining whether the covariance is less than a threshold.

19. The method of embodiment 18, wherein the cue is identified in response to a determination that the covariance is less than the threshold.

20. An augmented reality (AR) system for detecting a reflective surface in an environment, the AR system comprising: an outward-facing camera configured to image an environment around a user; an inertial measurement unit configured to measure the movement of an object; and hardware processors configured to perform any one of the methods in embodiments 1-19.

21. A method for detecting a reflective surface in an environment, the method comprising: under control of an augmented reality device (ARD) comprising computer hardware, the ARD comprising a plurality of sensors configured to transmit or receive a signal for an object external to the ARD: identifying a target object, wherein the target object may comprise a reflective surface; transmitting a signal to an area near the target object; receiving a feedback of the signal from an object associated with the target object; and analyzing the feedback to confirm the target object comprises a reflective surface.

22. The method of embodiment 21, wherein the signal comprises an electromagnetic signal or an acoustic signal.

23. The method of embodiment 22, wherein the electromagnetic signal comprises an optical signal.

24. The method of embodiment 23, wherein transmitting the signal comprises flashing a beam of light towards the target object.

25. The method of embodiment 21, wherein the feedback comprises a portion of the signal reflected by the target object.

26. The method of any one of embodiments 21-25, wherein the target object comprises a mirror.

27. The method of any one of embodiments 21-26, wherein analyzing the feedback comprises: determining a strength of the feedback; and confirming the target object comprises a reflective surface if the strength of the feedback passes a threshold.

28. A method for detecting a reflective surface in an environment of a user, the method comprising: under control of an augmented reality device (ARD) comprising computer hardware, the ARD comprising a plurality of sensors configured to transmit and receive a signal from a target object external to the ARD: receiving a signal indicating a presence of a reflective surface in the environment; identifying the target object that may be associated with the received signal; and confirming the target object is associated with the reflective surface.

29. The method of embodiment 28, wherein the signal comprises an electromagnetic signal or an acoustic signal.

30. The method of embodiment 28 or embodiment 29, wherein the target object comprises a radio frequency identification tag configured to emit the signal.

31. The method embodiment 28, wherein confirming the target object is associated with the reflective surface comprises: obtaining an image of the environment using an imaging system of the ARD, the image including the target object; and identifying a cue based at least partly on an analysis of the image.

32. The method of embodiment 31, wherein identifying the cue comprises: identifying a first plurality of keypoints in the image; accessing a world map of the environment, wherein the world map comprises information about physical objects in the environment; identifying a second plurality of keypoints in the world map; and comparing the first plurality of keypoints with the second plurality of keypoints to determine whether the first plurality of keypoints is a reflection of the second plurality of keypoints in the reflective surface.

33. The method of embodiment 32, wherein comparing the first plurality of keypoints with the second plurality of keypoints comprises determining a geometric relationship between a first geometry formed by the first plurality of keypoints with a second geometry formed by the second plurality of keypoints.

34. The method of embodiment 32 or embodiment 33, wherein the first plurality of keypoints comprises a first triplet of neighboring keypoints and wherein the second plurality of keypoints comprises a second triplet of neighboring keypoints.

35. The method of embodiment 34, wherein determining whether the first plurality of keypoints is a reflection of the second plurality of keypoints in the mirror comprises: determining open angles among the first triplet of neighboring keypoints and open angles among the second triplet of neighboring keypoints.

36. The method of any one of the embodiments 33-35, wherein determining the geometric relationship between the first geometry formed by the first plurality of keypoints with the second geometry formed by the second plurality of keypoints comprises axially transforming the first geometry or the second geometry, respectively.

37. The method of any one of the embodiments 32-36, wherein the cue comprises one or more of the following: a match between the first plurality of keypoints and the second plurality of keypoints; or a match between the first geometry and the second geometry.

38. The method of any one of the embodiments 31-37, wherein identifying the cue comprises identifying, in the image of the environment, a reflected object in the target object.

39. The method of embodiment 38, wherein the reflected object comprises a mirror image of a head of the user, a mirror image of the ARD, a mirror image of a physical object in the environment, or a mirror image of a text in the environment of the user.

40. The method of any one of the embodiments 31-39, wherein identifying the cue comprises: identifying a boundary of the target object; measuring a first depth at the boundary of the target object; measuring a second depth of an object appearing within the boundary of the target object; and comparing the first depth and the second depth to determine whether the first depth matches the second depth.

41. The method of embodiment 40, wherein the cue comprises a mismatch between the first depth and the second depth.

42. The method of any one of the embodiments 31-41, wherein identifying the cue comprises identifying a feature of the target object in the image of the environment.

43. The method of embodiment 42, wherein the feature comprises one or more of the following: size, location, surface normal, frame, shape, or a label associated with the target object.

44. The method of embodiment 43, wherein the label comprises an optical label which contains information indicative of the presence of the mirror.

45. The method embodiment 28, wherein confirming the target object is associated with the reflective surface comprises: detecting a reflected image of a physical object in the target object; collecting first movement data associated with the reflected image; collecting second movement data associated with the target object; and comparing the first movement data with the second movement data to identify a cue indicative of the presence of the reflective surface.

46. The method of embodiment 45, wherein the physical object comprises at least a portion of a body of the user.

47. The method of embodiment 46, wherein the physical object comprises a head or a hand of the user.

48. The method of any one of the embodiments 45-47, wherein collecting the first movement data and collecting the second movement data comprise: obtaining images, by an outward-facing camera, over a period of time; identifying respective positions of the reflected image in the images; calculating a first trajectory based on the identified respective positions of the reflected image; identifying respective positions of the physical object in the images; and calculating a second trajectory based on the identified respective positions of the physical object.

49. The method of any one of embodiments 45-47, wherein collecting the first movement data comprises is performed by an outward-facing imaging system of the AR system and collecting the second movement data is performed by an inertial measurement unit of the AR system.

50. The method of any one of embodiments 45-49, wherein identifying the cue comprises: calculating a covariance between the first movement data and the second movement data; and determining whether the covariance is less than a threshold.

51. The method of embodiment 50, wherein the cue is identified in response to a determination that the covariance is less than the threshold.

52. An augmented reality system comprising one or more sensors and is configured to perform any one of the methods in embodiments 21-51.

The following are example embodiments relating to augmented reality world maps in the presence of reflective surfaces.

1. A method for correcting a three-dimensional (3D) world map, the method comprising: under the control of an augmented reality (AR) system comprising computer hardware, the AR system comprising an outward-facing camera configured to image an environment around a user, the AR system in communication with a data storage that stores the 3D world map: detecting, by the outward-facing camera, presence of a reflective surface in the environment around the user; determining information associated with the reflective surface; accessing from the data storage the 3D visual map associated with the environment; and updating the 3D world map based at least in part on the determined information associated with the reflective surface.

2. The method of embodiment 1, wherein the reflective surface comprises a reflective surface of a mirror.

3. The method of embodiment 1, wherein the detecting presence of the reflective surface comprises one or more of the following: detecting, by the outward-facing camera, a reflected image of the user on the reflective surface; detecting an optical label associated with the reflective surface; determining a depth discontinuity between the reflective surface and a wall supporting the reflective surface; or receiving a signal associated with presence of the reflective surface.

4. The method of any one of embodiments 1-3, wherein determining information associated with the reflective surface comprises determining presence of reflected images of objects in the environment.

5. The method of any one of embodiments 1-3, wherein determining information associated with the reflective surface comprises determining one or more of the following: size, shape, location, or semantics information of the mirror.

6. The method of any one of embodiments 1-5, wherein updating the 3D world map comprises removing, from the 3D visual map, artifacts caused by the reflected images of objects in the environment.

7. The method of embodiment 6, wherein the artifacts comprise reflected images of the objects in the environment.

8. A method for generating a three-dimensional (3D) world map, the method comprising: under the control of an augmented reality (AR) system comprising computer hardware, the AR system comprising an outward-facing camera configured to image an environment around a user, the AR system in communication with a data storage that stores the 3D world map: detecting, by the outward-facing camera, presence of a reflective surface in the environment around the user; determining information associated with the reflective surface; determining presence of reflected images of objects in the environment; and generating a 3D world map based at least in part on the determined information associated with the reflective surface, wherein the 3D world map correctly identifies reflected images of objects as non-physical objects.

9. The method of embodiment 8, wherein generating the 3D world map comprises not interpreting reflected images of the objects as actual objects in the environment.

10. The method of embodiment 8 or 9, wherein generating the 3D world map comprises including the reflected images of objects in the world map and tagging the reflected images of objects as reflected images.

11. The method of any one of embodiments 8-10, wherein generating the 3D world map comprises excluding the reflected images of the objects in the world map.

12. An augmented reality (AR) system for correcting a three-dimensional (3D) world map, the augmented reality system comprising: an outward-facing camera configured to acquire an image of an environment around a user; a data storage that stores the 3D world map and the image; and computer hardware in communication with the data storage, the computer hardware programmed to: detect, using the image acquired by the outward-facing camera, presence of a reflective surface in the environment around the user; determine information associated with the reflective surface; access from the data storage the 3D world map associated with the environment; and update the 3D world map based at least in part on the determined information associated with the reflective surface.

13. The system of embodiment 12, wherein the reflective surface comprises a reflective surface of a mirror.

14. The system of embodiment 12 or 13, wherein to detect presence of the reflective surface, the computer hardware is programmed to perform one or more of the following: detect, by the outward-facing camera, a reflected image of the user on the reflective surface; detect an optical label associated with the reflective surface; determine a depth discontinuity between the reflective surface and a wall supporting the reflective surface; or receive a signal associated with presence of the reflective surface.

15. The system of any one of embodiments 12-14, wherein to determine information associated with the reflective surface, the computer hardware is programmed to determine presence of reflected images of objects in the environment.

16. The system of any one of embodiments 12-15, wherein to update the 3D world map, the computer hardware is programmed to remove, from the 3D world map, artifacts caused by the reflected images of objects in the environment.

17. The system of embodiment 16, wherein the artifacts comprise reflected images of the objects in the environment.

18. The system of any one of embodiments 12-17, wherein to determine information associated with the reflective surface, the computer hardware is programmed to determine one or more of the following: size, shape, location, or semantics information of the reflective surface.

19. An augmented reality (AR) system for generating a three-dimensional (3D) world map, the augmented reality system comprising: an outward-facing camera configured to acquire an image of an environment around a user; a data storage that stores the 3D world map and the image; and computer hardware in communication with the data storage, the computer hardware programmed to: detect, using the image acquired by the outward-facing camera, presence of a reflective surface in the environment around the user; determine information associated with the reflective surface; determine presence of reflected images of objects in the environment; and generate a 3D world map based at least in part on the determined information associated with the reflective surface, wherein the 3D world map correctly identifies reflected images of objects as non-physical objects.

20. The system of embodiment 19, wherein to generate the 3D world map, the computer hardware is programmed to not interpret reflected images of the objects as actual objects in the environment.

21. The system of embodiment 19 or 20, wherein to generate the 3D world map, the computer hardware is programmed to exclude the reflected images of the objects in the world map.

22. The system of embodiment 19, wherein to generate the 3D world map, the computer hardware is programmed to include the reflected images of objects in the world map and tagging the reflected images of objects as reflected images.

23. A method for processing a three-dimensional (3D) world map, the method comprising: under control of an augmented reality (AR) system comprising computer hardware, the AR system comprising an outward-facing camera configured to image an environment around a user, the AR system in communication with a data storage that stores the 3D world map: imaging, with the outward-facing camera, the environment of the user; detecting presence of a reflective surface in the environment of the user; and processing the 3D world map based at least in part on the presence of the reflective surface.

24. The method of embodiment 23, wherein processing the 3D world map comprises: identifying an artifact in the 3D world map caused by previously undetected presence of the reflective surface; and removing the artifact from the 3D world map.

25. The method of embodiment 23 or embodiment 24, wherein processing the 3D world map comprises updating the world map so that the 3D world map does not include artifacts caused by the presence of the reflective surface.

26. An AR system configured to perform the method of any one of embodiments 8-11 or embodiments 23-25.

The following are example embodiments relating to augmented reality telepresence.

1. A method for sharing an image in an augmented reality telepresence session, the method comprising: establishing, during a telepresence session, a bidirectional communication connection between a first augmented reality device associated with a first caller and a second augmented reality device associated with a second caller, the first augmented reality device comprising a first outward facing camera configured to image a region in front of the first augmented reality device; detecting, with the first outward facing camera, presence of a mirror in the region in front of the first augmented reality device; detecting, with the first outward facing camera, a first image of the first caller in the mirror; communicating, to the second augmented reality device via the communication connection, a portion of the first image of the first caller; and displaying, by the second augmented reality device to the second caller, the portion of the first image of the first caller during the telepresence session.

2. The method of embodiment 1, wherein establishing the bidirectional communication connection is performed in response to detecting the presence of the mirror.

3. The method of embodiment 1 or embodiment 2, further comprising: identifying a region of the first image that includes an image of the first augmented reality device that occludes the face of the first user; substituting an image of an unoccluded portion of the face of the first user in the identified region to provide an unoccluded face image, wherein communicating the portion of the first image comprises communicating the unoccluded face image.

4. The method of embodiment 3, wherein the first augmented reality device comprises an eye-tracking camera configured to image an eye of the first user, and wherein substituting an image of an unoccluded portion of the face of the first user comprises inserting an image of the eye of the first user in the identified region.

5. The method of any one of embodiments 1 to 4, further comprising: receiving, from the second augmented reality device via the communication connection, a second image of the second caller; and displaying, by the first augmented reality device to the first caller, the second image of the second caller during the telepresence session.

6. The method of embodiment 5, wherein displaying the second image of the second caller comprises displaying the second image so that it occludes the first image of the first caller in the mirror.

7. The method of embodiment 5 or embodiment 6, wherein displaying the second image of the second caller comprises displaying additional virtual content to the first caller.

8. The method of any one of embodiments 1 to 7, wherein displaying the portion of the first image of the first caller comprises displaying additional virtual content to the second caller.

9. The method of embodiment 7 or embodiment 8, wherein the additional virtual content that is displayed comprises blending effects, feathering effects, glow effects, or special features effects.

10. The method of any of embodiments 1 to 9, wherein the first augmented reality device, the second augmented reality device, or both the first and the second augmented reality devices comprise a head mounted display.

11. The method of any of embodiments 1 to 10, wherein the first augmented reality device, the second augmented reality device, or both the first and the second augmented reality devices comprise a light field display configured to present images at multiple depth planes.

12. A method for sharing an image in an augmented reality telepresence session, the method comprising: establishing a bidirectional communication between a first augmented reality device associated with a first caller and a second augmented reality device associated with a second caller, the first augmented reality device comprising a first outward facing camera configured to image a region in front of the first augmented reality device; detecting presence of a reflective surface in a region in front of the first augmented reality device; capturing, with the first outward facing camera, a first image of the first caller reflected from the reflective surface; and transmitting at least a portion of the first image of the first caller to the second augmented reality device.

13. The method of embodiment 12, further comprising: receiving, by the first augmented reality device, a second image of the second caller; and displaying at least a portion of the second image of the second caller by the first augmented reality device.

14. The method of embodiment 13, wherein displaying at least a portion of the second image of the second caller comprises displaying the second image so that it occludes the first image of the first caller in the mirror.

15. The method of embodiment 13, further comprising processing the second image of the second caller by the first augmented reality device.

16. The method of embodiment 12, further comprising processing the first image of the first caller by the first augmented reality device.

17. The method of embodiment 12, wherein transmitting the first image of the first caller to the second augment reality device comprising: transmitting the first image of the first caller to a server computer system; processing the first image of the first caller by the server computer system; and transmitting the first image of the first caller to the second augmented reality device.

18. The method of any one of embodiments 12-17, wherein the processing of the first image of the first caller comprises at least one of the following: applying virtual contents to the first image of the first caller; cropping a portion of the first image of the first caller; applying a background to the first image of the first caller; resizing the first image of the first caller; identifying a region of the first image of the first caller that includes an image of the first augmented reality device that occludes the face of the first caller and substituting an image of an unoccluded portion of the face of the first user in the identified region to provide an unoccluded image of the first caller's face; or identifying a region of the first caller's body that is not captured by the first augmented reality device and adding the identified region to the first image of the first caller.

19. The method of embodiment 18, wherein the virtual content comprising blending effects, feathering effects, glow effects, or special features effects.

20. The method of embodiment 18, wherein the background contains elements associated with games, movies, books, art, music, existing physical elements, or virtual objects.

21. The method of any one of embodiment 18-20, wherein the background is an animation.

22. An augmented reality system for conducting a teleconference between a first caller and a second caller, the system comprising: a first augmented reality device associated with a first caller, the first augmented reality device comprising a first outward facing camera configured to image a region in front of the first augmented reality device, and a computer processor configured to communicate with a network and programmed to: establish a bidirectional communication between the first augmented reality device and a second augmented reality device associated with a second caller; detect presence of a reflective surface in a region in front of the first augmented reality device; detect, with the first outward facing camera, a first image of the first caller reflected from the reflective surface; transmit at least a portion of the first image of the first caller to the second augmented reality device; receive, by the first augmented reality device, a second image of the second caller; and display at least a portion of the second image of the second caller by the first augmented reality device.

23. The system of embodiment 22, wherein the computer processor is further programmed to the display at least a portion of the second image of the second caller by the first augmented reality device so that it occludes the first image of the first caller in the mirror.

24. The system of embodiment 22, wherein the computer processor is further programmed to process the second image of the second caller by the first augmented reality device.

25. The system of embodiment 22, wherein the computer processor is further programmed to process the first image of the first caller by the first augmented reality device.

26. The system of embodiment 22, wherein transmit at least a portion of the first image of the first caller to the second augmented reality device comprises: transmit the first image of the first caller to a server computer system; process the first image of the first caller by the server computer system; and transmit the first image of the first caller to the second augmented reality device.

27. The system of any one of embodiments 24-26, wherein process of the first image of the first caller comprises at least one of the following: apply virtual contents to the first image of the first caller; crop a portion of the first image of the first caller; apply a background to the first image of the first caller; resize the first image of the first caller; identify a region of the first image of the first caller that includes an image of the first augmented reality device that occludes the face of the first caller and substituting an image of an unoccluded portion of the face of the first user in the identified region to provide an unoccluded image of the first caller's face; or identify a region of the first caller's body that is not captured by the first augmented reality device and adding the identified region to the first image of the first caller.

28. The system of embodiment 27, wherein the virtual content comprising blending effects, feathering effects, glow effects, or special features effects.

29. The system of embodiment 27, wherein the background contains elements associated with games, movies, books, art, music, existing physical elements, or virtual objects.

30. The system of any one of embodiment 22-29, wherein the background is an animation.

31. An augmented reality system for conducting a teleconference between a first caller and a second caller, the system comprising: a first augmented reality device associated with a first caller and a second augmented reality device associated with a second caller, the first augmented reality device comprising a first outward facing camera configured to image a region in front of the first augmented reality device and a computer processor configured to communicate with a network and programmed to: establish a bidirectional communication connection between the first augmented reality device and the second augmented reality device; detect, with the first outward facing camera, presence of a mirror in the region in front of the first augmented reality device; detect, with the first outward facing camera, a first image of the first caller in the mirror; communicate, to the second augmented reality device via the communication connection, a portion of the first image of the first caller; and display, by the second augmented reality device to the second caller, the portion of the first image of the first caller during the telepresence session.

32. The system of embodiment 31, wherein establish the bidirectional communication connection is performed in response to detecting the presence of the mirror.

33. The system of embodiment 31 or embodiment 32, the computer processor is further programmed to: identify a region of the first image that includes an image of the first augmented reality device that occludes the face of the first user; substitute an image of an unoccluded portion of the face of the first user in the identified region to provide an unoccluded face image, wherein communicate the portion of the first image comprises communicate the unoccluded face image.

34. The system of embodiment 33, wherein the first augmented reality device comprises an eye-tracking camera configured to image an eye of the first user, and wherein substitute an image of an unoccluded portion of the face of the first user comprises inserting an image of the eye of the first user in the identified region.

35. The system of any one of embodiments 31 to 34, the computer processor is further programmed to: receive, from the second augmented reality device via the communication connection, a second image of the second caller; and display, by the first augmented reality device to the first caller, the second image of the second caller during the telepresence session.

36. The system of embodiment 35, wherein display the second image of the second caller comprises display the second image so that it occludes the first image of the first caller in the mirror.

37. The system of embodiment 35 or embodiment 36, wherein display the second image of the second caller comprises display additional virtual content to the first caller.

38. The system of any one of embodiments 31 to 37, wherein display the portion of the first image of the first caller comprises display additional virtual content to the second caller.

39. The system of embodiment 37 or embodiment 38, wherein the additional virtual content that is displayed comprises blending effects, feathering effects, glow effects, or special features effects.

40. The system of any of embodiments 31 to 39, wherein the first augmented reality device, the second augmented reality device, or both the first and the second augmented reality devices comprise a head mounted display.

41. The method of any of embodiments 31 to 40, wherein the first augmented reality device, the second augmented reality device, or both the first and the second augmented reality devices comprise a light field display configured to present images at multiple depth planes.

42. An augmented reality system for conducting a teleconference, the system comprising: a computer system configured to communicate with a first augmented reality device associated with a first user and a second augmented reality device associated with a second user, the computer system comprising: a network interface; a non-transitory data storage; and a hardware processor configured to communicate with the network interface and the non-transitory data storage, the processor programmed to: receive a first message from the first augmented reality device, the first message comprising a request to establish a bidirectional communication with the second augmented reality device; establish the bidirectional communication between the first and the second augmented reality device; receive a second message from the first augmented reality device, the second message comprising an image of the first caller captured by the first augmented reality device from a reflective surface in front of the first augmented reality device; transmit the second message to the second augmented reality device; receive a third message from the second augmented reality device, the third message comprising an image of the second caller captured by the second augmented reality device from a reflective surface in front of the second augmented reality device; and transmit the third message to the first augmented reality device.

43. A method of generating a self-portrait, the method comprising: under control of a head-mounted device comprising an outward-facing camera configured to image a region in front of the head-mounted device: detecting presence of a reflective surface in an environment of a wearer of the head-mounted device; detecting, with the outward-facing camera, a reflected image of the wearer reflected from the reflective surface; acquiring, with the outward-facing camera, an image of a portion of the reflective surface that comprises the reflected image of the wearer; and identifying a region of the image that includes an image of the head-mounted device that at least partly occludes the face of the wearer and substituting an image of an unoccluded portion of the face of the wearer in the identified region to provide an unoccluded image of the wearer's face.

44. The method of embodiment 43, further comprising at least one of the following: applying virtual contents to the unoccluded image of the wearer; cropping a portion of the unoccluded image of the wearer; applying a background to the unoccluded image of the wearer; resizing the unoccluded image of the wearer; or identifying a region of the wearer's body that is not captured by the image acquired by the outward-facing camera, and adding the identified region to the unoccluded image of the wearer.

45. An augmented reality system for conducting a telepresence session between a first augmented reality device and a second augmented reality device, the augmented reality system comprising: a head-mounted display of a first augmented reality device associated with a first caller, wherein the first head-mounted display is configured to present virtual content at a plurality of depth planes, at least a portion of the display being transparent such that the transparent portion transmits light from a portion of the environment of the first caller; an outward-facing imaging system configured to image a region in front of the head-mounted display; and a computer processor programmed to communicate with a network and to: detect a presence of a reflective surface near the first augmented reality device based at least in part on an image acquired by the outward-facing imaging system; establish a bidirectional communication between the first augmented reality device and a second augmented reality device associated with a second caller; detect, with the outward-facing imaging system, a first image of a first caller reflected by the reflective surface; transmit at least a portion of the first image of the first caller to the second augmented reality device; receive, by the first augmented reality device, a second image of the second caller; and display at least a portion of the second image of the second caller by the head-mounted display of the first augmented reality device.

46. The augmented reality system of embodiment 45, wherein the computer processor is programmed to process at least one of: the first image of the first caller or the second image of the second caller.

47. The augmented reality system of embodiment 46, wherein to process at least the first image or the second image, the computer processor is programmed to perform at least one of: applying virtual content to the first image or the second image, wherein the virtual content comprises at least one of: a blending effect, a feathering effect, a glowing effect, or another special feature effect; cropping a portion of the first image or the second image; applying a background to the first image or the second image; resizing the first image or the second image; identifying a region of the first image that includes an image of the first augmented reality device which occludes the face of the first caller and substituting an image of an unoccluded portion of the face of the first caller in the identified region to provide an unoccluded image of the face of the first caller; identifying a region of the second image that includes an image of the second augmented reality device which occludes the face of the second caller and substituting an image of an unoccluded portion of the face of the second caller in the identified region to provide an unoccluded image of the face of the second caller; identifying a region of the first caller's body that is not captured by the first augmented reality device and adding the identified region to the first image of the first caller; or identifying a region of the second caller's body that is not captured by the second augmented reality device and adding the identified region to the second image of the second caller.

48. The augmented reality system of embodiment 45, wherein the reflective surface is detected using at least one of: facial recognition, key-points recognition, recognition of a portion of the first augmented reality device, depth discontinuity, a shape of the mirror, or recognition of an optical label associated with the reflective surface.

49. The augmented reality system of embodiment 45, wherein to display at least a portion of the second image, the computer processor is programmed to: project the portion of the second image such that the portion of the second image occludes the first image of the first caller reflected by the reflective surface.

50. The augmented reality system of embodiment 45, wherein the first augmented reality device comprises an eye-tracking camera configured to track eye movements of the first caller, and the computer processor is further programmed to transmit the eye movements of the first caller to the second augmented reality device.

51. A method for conducting a telepresence session between a first augmented reality device and a second augmented reality device, the method comprising: receiving a message from a first augmented reality device, the message comprising a request to establish a bidirectional communication with the second augmented reality device; establishing the bidirectional communication between the first and the second augmented reality device; receiving a first image from the first augmented reality device, the first image comprising a reflected image of the first caller as captured by the first augmented reality device from a reflective surface near the first augmented reality device; transmitting the first image to the second augmented reality device; receiving a second image from the second augmented reality device, the second image comprising a portion of the second caller captured by the second augmented reality device from a reflective surface near the second augmented reality device; generating an image of the second caller based at least partly on the second image; and transmitting the image of the second caller to the first augmented reality device for display in a three-dimensional environment.

52. The method of embodiment 51, wherein at least one of the first augmented reality device or the second augmented reality device comprises a light field display configured to present images at multiple depth planes.

53. The method of embodiment 51, wherein the image of the second caller comprises a plurality of patches and the second image comprises a portion of the second caller's face unoccluded by the second augmented reality device.

54. The method of embodiment 51, further comprising: receiving a patch of an eye region of the second caller which is occluded by the second augmented reality device, and wherein generating the image of the second caller comprises synthesizing the image of the second caller based on the portion of the second caller's face unoccluded by the second augmented reality device and the patch of the eye region occluded by the second augmented reality device.

55. The method of embodiment 51, further comprising: receiving a movement of an eye region of the second caller; accessing a face model of the second caller; and updating the image of the second caller based on the movement of the eye region and the face model.

56. The method of embodiment 51, wherein generating an image of the second caller based at least partly on the second image comprises at least one of: cropping a portion of the second image, resizing the second image, or applying a background to the second image.

57. The method of embodiment 51, wherein generating the image of the second caller comprises: identifying a region of the second caller's body that is not captured by the first augmented reality device; retrieving a third image which comprises the region of the second caller's body; and generating the image of the second caller based at least partly on the second image received from the second augmented reality device and the third image.

58. A augmented reality system for conducting a telepresence session between a first augmented reality device and a second augmented reality device, the augmented reality system comprising: a computer system configured to communicate with a first augmented reality device associated with a first user and a second augmented reality device associated with a second user, the computer system comprising: a network interface; non-transitory data storage; and a computer processor programmed to communicate with the network interface and the non-transitory data storage and to: receive a message from a first augmented reality device, the message comprising a request to establish a bidirectional communication with the second augmented reality device; establish the bidirectional communication between the first and the second augmented reality device; receive a first image from the first augmented reality device, the first image comprising a reflected image of the first caller as captured by the first augmented reality device from a reflective surface near the first augmented reality device; transmit the first image to the second augmented reality device; receive a second image from the second augmented reality device, the second image comprising a portion of the second caller captured by the second augmented reality device from a reflective surface near the second augmented reality device; generate an image of the second caller based at least partly on the second image; and transmit the image of the second caller to the first augmented reality device for display in a three-dimensional environment.

59. The system of embodiment 58, wherein at least one of the first augmented reality device or the second augmented reality device comprises a light field display configured to present images at multiple depth planes.

60. The system of embodiment 58, wherein the image of the second caller comprises a plurality of patches and the second image comprises a portion of the second caller's face unoccluded by the second augmented reality device.

61. The system of embodiment 60, the computer processor is further programmed to: receive a patch of an eye region of the second caller which is occluded by the second augmented reality device, and wherein to generate the image of the second caller, the computer processor is programmed to synthesize the image of the second caller based on the portion of the second caller's face unoccluded by the second augmented reality device and the patch of the eye region occluded by the second augmented reality device.

62. The system of embodiment 58, the computer processor is further programmed to: receive a movement of an eye region of the second caller; access a face model of the second caller; and update the image of the second caller based on the movement of the eye region and the face model.

63. The system of embodiment 58, wherein to generate the image of the second caller based at least partly on the second image, the computer processor is programmed to perform at least one of: cropping a portion of the second image, resizing the second image, or applying a background to the second image.

64. The system of embodiment 58, wherein to generate the image of the second caller, the computer processor is programmed to: identify a region of the second caller's body that is not captured by the first augmented reality device; retrieve a third image which comprises the region of the second caller's body; and generate the image of the second caller based at least partly on the second image received from the second augmented reality device and the third image.

Figure 1A:
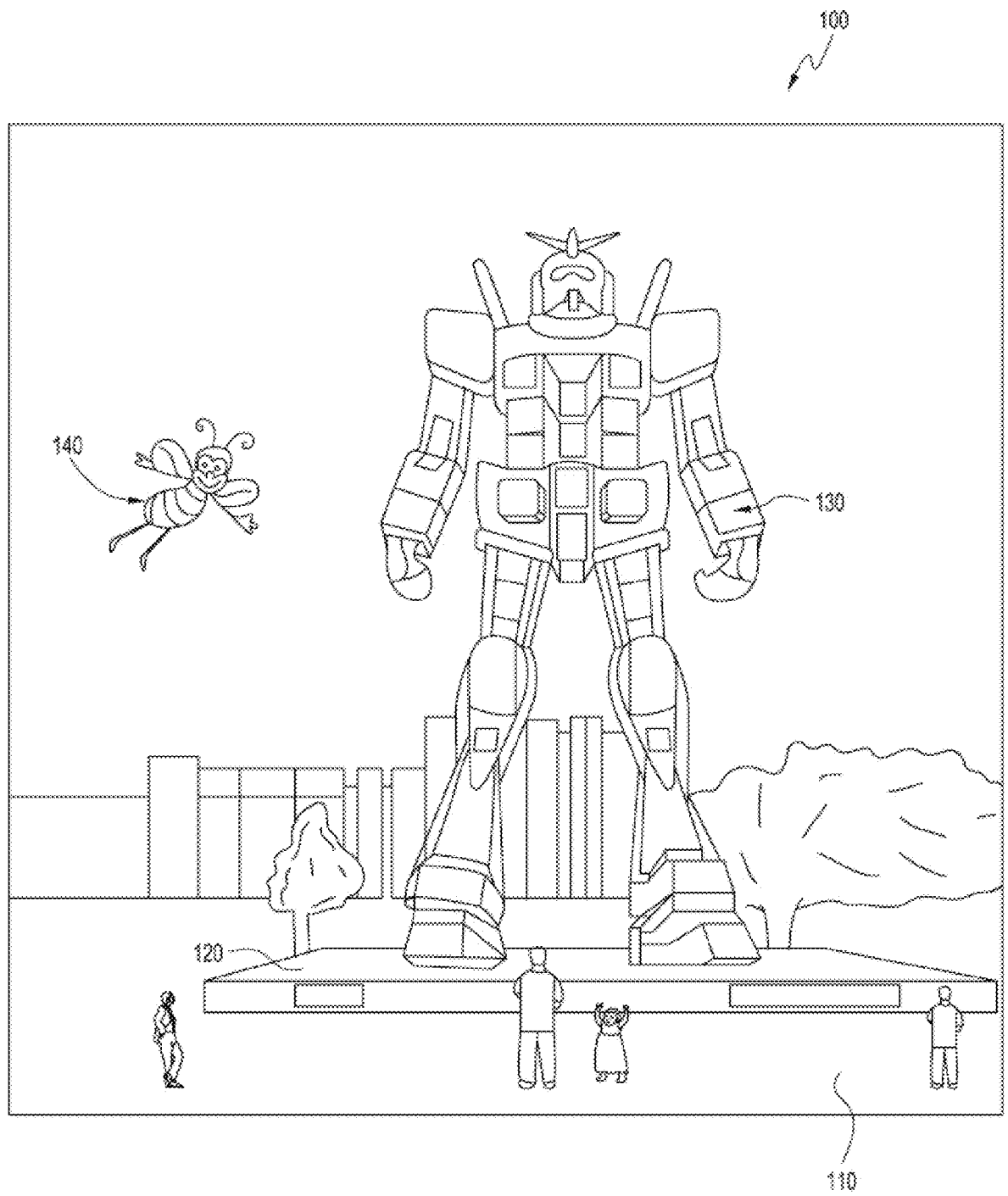
FIG. 1A depicts an illustration of a mixed reality scenario with certain virtual reality objects, and certain physical objects viewed by a user.

The drawings are provided to illustrate example embodiments described herein and are not intended to limit the scope of the disclosure.

DETAILED DESCRIPTION

Smart mirrors have various drawbacks that may reduce their utility and broad application. For example, they are typically large, stationary devices and may only present two-dimensional content to a user situated in front of the device. In addition, because the smart mirrors may be the property of a third party (e.g., a store), the type of information and depth of personalization of the displayed content may be limited, given the limited information that the third party may possess regarding a particular user. As a result, the visual experience may be not realistic and the content may not be rich or highly personalized, which may diminish the utility of the smart mirror.

Advantageously, various embodiments disclosed herein may provide an immersive, realistic visual experience, with the ability to provide a high degree of personalized content. In some embodiments, a display system comprises a wearable display device for displaying augmented reality content. The display device comprises a display area comprising light redirecting features that are configured to direct light to a user. The display area is at least partially transparent, thereby providing a view of an ambient environment through the display area. As a result, the display area allows the user to see their reflection in a mirror or other reflective structure. In some embodiments, the display system is configured to determine that a reflection of the user is within the user's field of view through the display area. After making this determination, augmented reality content is displayed in the display area such that the augmented reality content augments the reflection of the user. It will be appreciated that the augmented reality content may also be referred to as virtual content.

In some embodiments, the augmented reality content is a virtual menu that allows the user to select various functions or applications, which generate further augmented reality content. In some other embodiments, certain types of content may be automatically generated without user selection, depending upon preselected criteria (e.g., location, time, etc.), as discussed herein. In some embodiments, the augmented reality content may overlie the reflection, thereby allowing all or portions of the reflection to appear to be modified. This may provide a realistic view of the user with various modifications made to their appearance. In some embodiments, the augmented reality content may include various notifications, which may be tailored to a particular user. In yet other embodiments, the display system includes a camera that may be configured to capture images or other information relating to the user over time. The images or information may beneficially be analyzed to provide health and/or beauty diagnoses and monitoring.

In some embodiments, the display system may display augmented reality content that overlies reflections of a scene (which may include, e.g., objects such as people) even where the user is not in the reflection. In such embodiments, the display system may be configured to determine that the scene is a reflection. Once the determination is made, the display system may be configured to display the augmented reality content in the display area. In some embodiments, the augmented reality content may include notifications or other visual content that conveys information about objects in the reflection and/or modifies the appearance of those objects. As used herein, an "object" may refer to any visual feature in the ambient environment (e.g., including landscapes, people, or parts of landscapes and people) and/or any visual feature generated by the display system. It will be appreciated that the information about the objects may be stored locally in the display system. More preferably, the information is derived from a database shared with other users. Due to the sharing, different users may supply different data regarding the ambient environment, thereby providing a more complete set of data about that ambient environment than may be available with locally stored data. In some other embodiments, the display system may be configured to conduct health analyses by evaluating various parameters of the user as seen in the reflection. In some embodiments, the display system may be configured to passively collect image information, and selected data from that image information may be used in conducting the various health analyses disclosed.

In some embodiments, the display system may be configured to present a three-dimensional (3D) image of another caller with which a user may interact during a telepresence session. The wearable system may be part of a wearable device that may present a virtual reality (VR), augmented reality (AR), or mixed reality (MR) environment, alone or in combination, for user interaction.

Various embodiments disclosed herein may be applied to single depth plane display systems, which may realize various advantages disclosed herein. It will be appreciated, however, that users may situate themselves at different distances to a mirror and some augmented reality content may be representative of three-dimensional objects. Simply providing content on a single plane may result in a "paper cutout" appearance to the content, with the content not necessarily placed in the same depth plane as the user's reflection, or parts of the reflection. This may decrease the realism of the content. It may also be uncomfortable for a user to view this content, since a user's eyes may need to switch between different accommodated states to view the augmented reality content and their reflection, while the eye/brain expects the content and reflection, or parts of the content and reflection, to be on matching depth planes.

Preferably, the display system displaying the augmented reality content includes a display device capable of providing image content across a plurality of depth planes, as discussed herein. Advantageously, displays capable of providing content on multiple depth planes may avoid one or more of the drawbacks noted herein by better matching the depth planes on which the content and the reflection of the user are situated. Such systems may provide highly realistic and immersive content, which may be more compelling to a user and, consequently, may be more likely to spur the user to act in some applications.

Reference will now be made to the Figures, in which like reference numbers refer to like features throughout.

Example Wearable Display Systems

FIG. 1A depicts an illustration of a mixed reality (MR) scenario that includes both certain virtual reality objects, and certain physical objects viewed by a user. In FIG. 1A, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it is desirable for each point in the displays visual field to generate the accommodative response corresponding to its virtual depth, as described further herein. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences may be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Figure 1B:
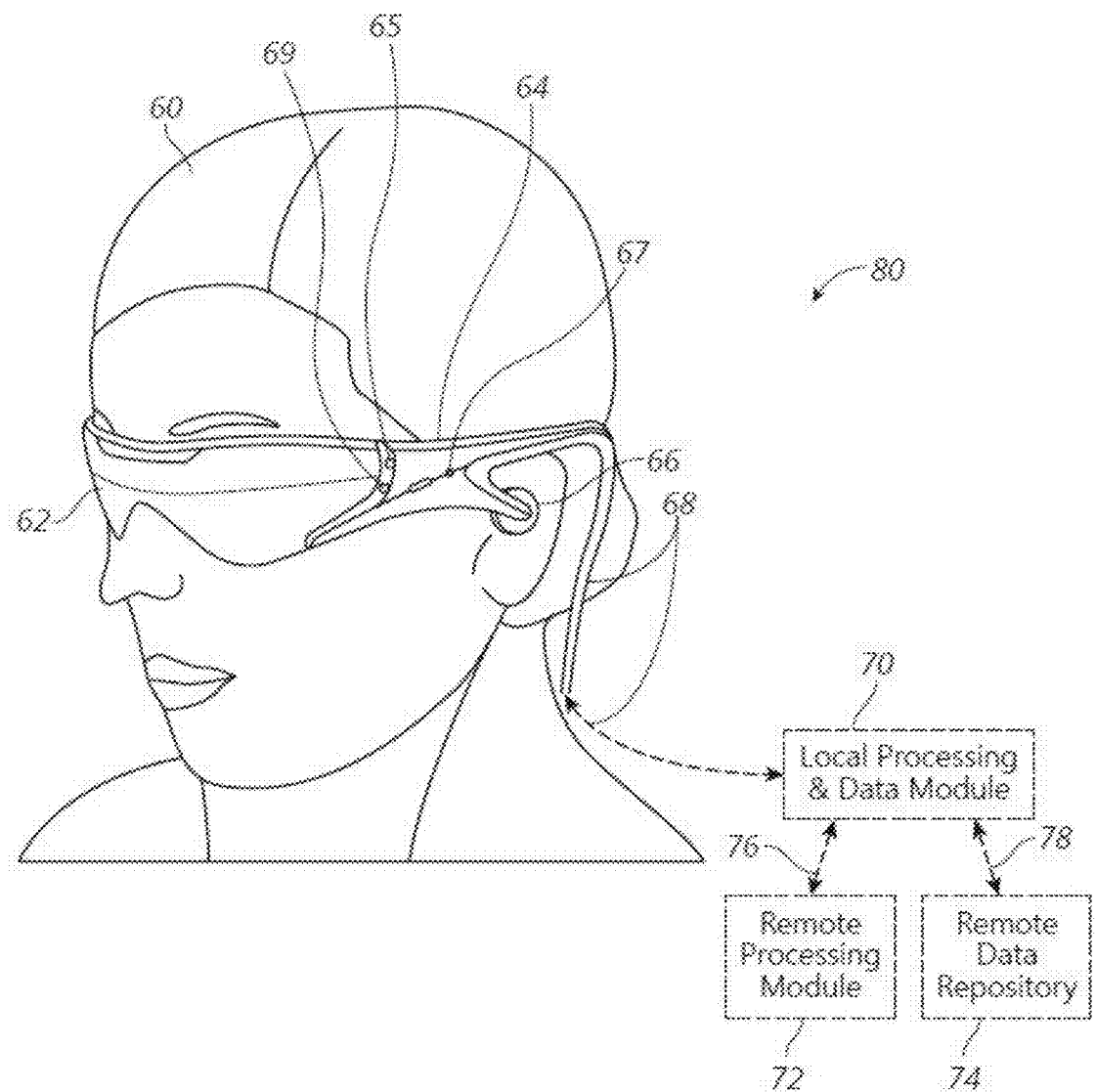
FIG. 1B illustrates an example of a wearable display system.

FIG. 1B illustrates an example of wearable display system 80. The display system 80 includes a display 62, and various mechanical and electronic modules and systems to support the functioning of that display 62. The display 62 may be coupled to a frame 64, which is wearable by a display system user or viewer 60 and which is configured to position the display 62 in front of the eyes of the user 60. The wearable display system 80 may be part of a wearable device such as, e.g., head-mounted device (HMD) or an augmented reality device (ARD). A portion of the wearable display system (such as the display 62) may be worn on the head of the user.

In some embodiments, a speaker 66 is coupled to the frame 64 and positioned adjacent the ear canal of the user 60 (in some embodiments, another speaker, not shown, is positioned adjacent the other ear canal of the user to provide for stereo/shapeable sound control). In some embodiments, the display system may also include one or more microphones 67 or other devices to detect sound. In some embodiments, the microphone is configured to allow the user to provide inputs or commands to the system 80 (e.g., the selection of voice menu commands, natural language questions, etc.) and/or may allow audio communication with other persons (e.g., with other users of similar display systems). As further described herein, in some embodiments, the wearable display system 80 may present 3D visualizations of another user in a telepresence session using the display 62, receive audio input of a user via the microphone(s) 67, and play a sound associated with the other user using the speaker 66.

The display system includes one or more cameras 65 (one or more imaging devices), which may be attached to the frame 64, or otherwise attached to the user 60. The camera 65 may be positioned and oriented to capture images of an ambient environment in which the user 60 is located. The camera 65 is preferably oriented such that it faces forward to track the line of sight of the user as they are facing forward. In some embodiments, the camera is fixed and immobile, and the system assumes that the user's eyes are directed in the same direction as the camera (e.g., straight ahead). In some other embodiments, the camera 65 is movable, and configured to track the movements of the user's eyes, to match the line of sight of the user 60. In yet other embodiments, the camera 65 may be configured to image parts of the ambient environment that are not in the line of sight of the user 60. In certain embodiments, the wearable display system 80 may include an outward-facing imaging system 502 (shown in FIG. 5) which observes the world in the environment around the user. The outward-facing imaging system 502 may include the camera 65.

The wearable display system 80 may also include an inward-facing imaging system 500 (shown in FIG. 4) which may track the eye movements of the user. The inward-facing imaging system may track either one eye's movements or both eyes' movements. The inward-facing imaging system 500 may be attached to the frame 64 and may be in electrical communication with the processing modules 70 and/or 72, which may process image information acquired by the inward-facing imaging system to determine, e.g., the pupil diameters and/or orientations of the eyes or eye pose of the user 60.

In some embodiments, one or more inward facing cameras (e.g., camera 500, FIG. 5) may be used track the user's eyes, and the outwardly facing camera 65 is configured to move such that the line of sight of the camera 65 matches the line of sight of the user's eyes. As discussed herein, the camera 65 may be used to sense, measure or collect information about the user 60 and/or the environment. It will be appreciated that the display system may include multiple outwardly-facing cameras, which may be directed in a plurality of directions (e.g., in direction behind or to the sides of the user) to detect features of interest in the environment. In some embodiments, the display system 80 may also include a distance sensor 69 configured to measure the distances of objects from the user 60. In some embodiments, the distance sensor 69 may emit and receive electromagnetic radiation and/or acoustical signals to determine the distance of objects from the sensor 69. For example, in some embodiments, the distance sensor 69 may be a time-of-flight camera, which includes a light emitter and a light detector. The time-of-flight camera detects the distance to an object based on the time required for a light signal to travel from the camera to the object and back to a photoreceptor on or associated with the camera. In some other embodiments, the distance sensor 69 may include two spaced-apart cameras (e.g., on different sides of the frame 64), which may be configured to determine distance using the parallax effect. In some embodiments, the distance sensor may be configured to map objects in the real world and/or detect the shape or form characteristics of the objects.

As an example of imaging the user's environment and the user, the wearable display system 80 may use the outward-facing imaging system 502 and/or the inward-facing imaging system 500 to acquire images of a pose of the user. The images may be still images, frames of a video, or a video, in combination or the like. The pose may be used to determine a user's motion or synthesize an image of the user. The images acquired by the outward-facing imaging system 502 and/or the inward-facing imaging system 500 may be communicated to a second user in a telepresence session to create a tangible sense of the user's presence in the second user environment.

With continued reference to FIG. 1B, the display 62 is operatively coupled 68, such as by a wired lead or wireless connectivity, to a local data processing module 70 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration). The local processing and data module 70 may comprise one or more hardware processors, as well as digital memory, such as non-volatile memory (e.g., flash memory or hard disk drives), both of which may be utilized to assist in the processing, caching, and storage of data. The data include data a) captured from sensors (which may be, e.g., operatively coupled to the frame 64 or otherwise attached to the user 60), such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display 62 after such processing or retrieval. The local processing and data module 70 may be operatively coupled by communication links 76, 78, such as via a wired or wireless communication links, to the remote processing module 72 and remote data repository 74 such that these remote modules 72, 74 are operatively coupled to each other and available as resources to the local processing and data module 70. The local processing & data module 70, the remote processing module 72, and the remote data repository 74 may each include a network interface to provide the communication over the communication links 76, 78. The communication links 76, 78 may be over the network 1290 described with reference to FIG. 12. In some embodiments, the location processing and data module 70 may include one or more of the image capture devices, microphones, inertial measurement units, accelerometers, compasses, GPS units, radio devices, and/or gyros. In some other embodiments, one or more of these sensors may be attached to the frame 64, or may be standalone structures that communicate with the location processing and data module 70 by wired or wireless communication pathways.

With continued reference to FIG. 1B, in some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, the remote data repository 74 may include one or more remote servers, which provide information, e.g., information for generating augmented reality content, to the local processing and data module 70 and/or the remote processing module 72. In some embodiments, all data is stored and all computations are performed in the local processing and data module, allowing fully autonomous use from a remote module.

In some embodiments, the remote data repository 74 may be configured to store a world map of a user's environment, a user's avatar, or a user's face model. The local processing module 70 and/or the remote processing module 72 may identify a mirror in a user's environment and detect a user's pose (such as, e.g., a head pose or a body gesture). The processing modules 70 and 72 may communicate with the remote data repository 74 to create an animation of the user's avatar or to synthesize a user's image based on the information of the user stored in the remote data repository and the detected pose. The processing modules 70 and 72 may further communicate with the display 62 and present the visualizations of another user or the same user in the user's environment (such as overlaying the user's image over a mirror in the user's environment).

Figure 2:
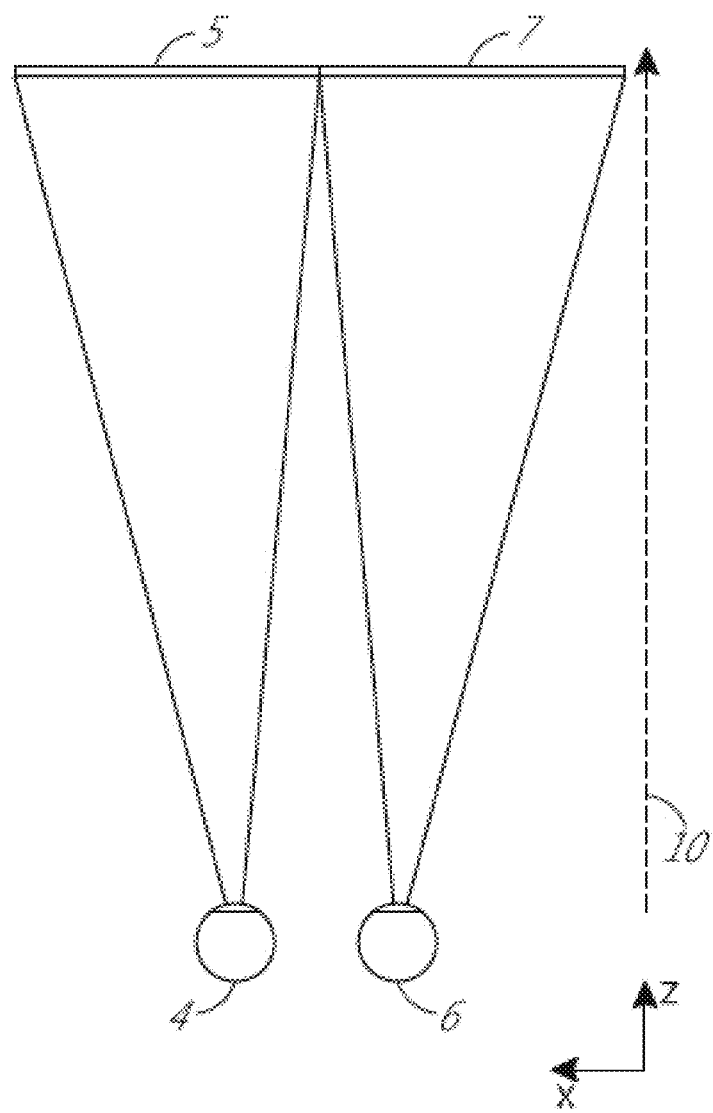
FIG. 2 illustrates a conventional display system for simulating three-dimensional imagery for a user.

The perception of an image as being "three-dimensional" or "3-D" may be achieved by providing slightly different presentations of the image to each eye of the viewer. FIG. 2 illustrates a conventional display system for simulating three-dimensional imagery for a user. Two distinct images 5, 7—one for each eye 4, 6—are outputted to the user. The images 5, 7 are spaced from the eyes 4, 6 by a distance 10 along an optical or z-axis parallel to the line of sight of the viewer. The images 5, 7 are flat and the eyes 4, 6 may focus on the images by assuming a single accommodated state. Such systems rely on the human visual system to combine the images 5, 7 to provide a perception of depth for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rolling movements of the eyeballs to orient the pupils toward or away from each other to converge the lines of sight of the eyes to fixate upon an object) of the two eyes relative to each other are closely associated with focusing (or "accommodation") of the lenses of the eyes. Under normal conditions, a change in vergence of the eyes when shifting attention from one object to another object at a different distance will automatically cause a matching change in the focus of the lenses of the eyes, or accommodation of the eyes, under a relationship known as the "accommodation-vergence reflex." Likewise, a change in accommodation will trigger a matching change in vergence, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 3:
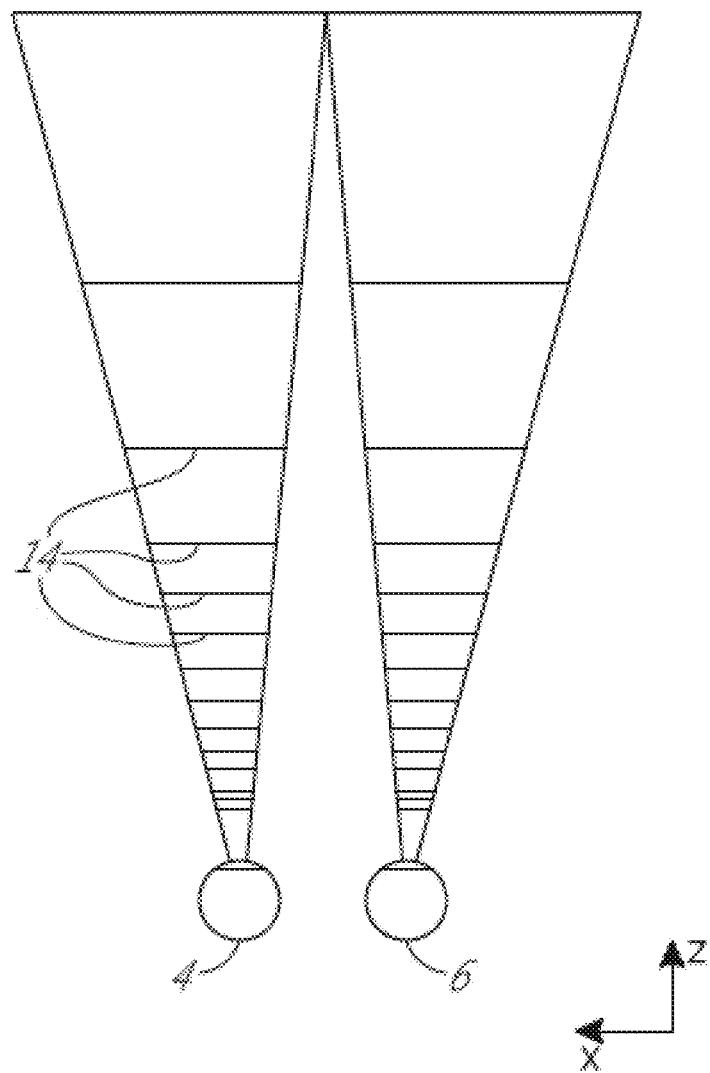
FIG. 3 illustrates aspects of an approach for simulating three-dimensional imagery using multiple depth planes.

FIG. 3 illustrates aspects of an approach for simulating three-dimensional imagery using multiple depth planes. Objects at various distances from eyes 4, 6 on the z-axis are accommodated by the eyes 4, 6 so that those objects are in focus. The eyes (4 and 6) assume particular accommodated states to bring into focus objects at different distances along the z-axis. Consequently, a particular accommodated state may be said to be associated with a particular one of depth planes 14, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 4, 6, and also by providing different presentations of the image corresponding to each of the depth planes. While shown as being separate for clarity of illustration, it will be appreciated that the fields of view of the eyes 4, 6 may overlap, for example, as distance along the z-axis increases. It will addition, while shown as flat for ease of illustration, it will be appreciated that the contours of a depth plane may be curved in physical space, such that all features in a depth plane are in focus with the eye in a particular accommodated state.

Figure 4A:
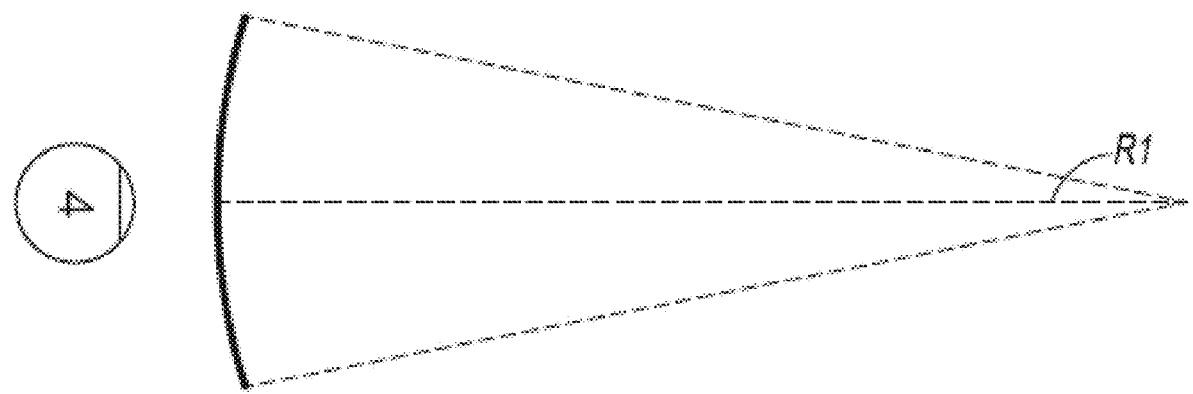
FIGS. 4A-4C illustrate relationships between radius of curvature and focal radius.
Figure 4B:
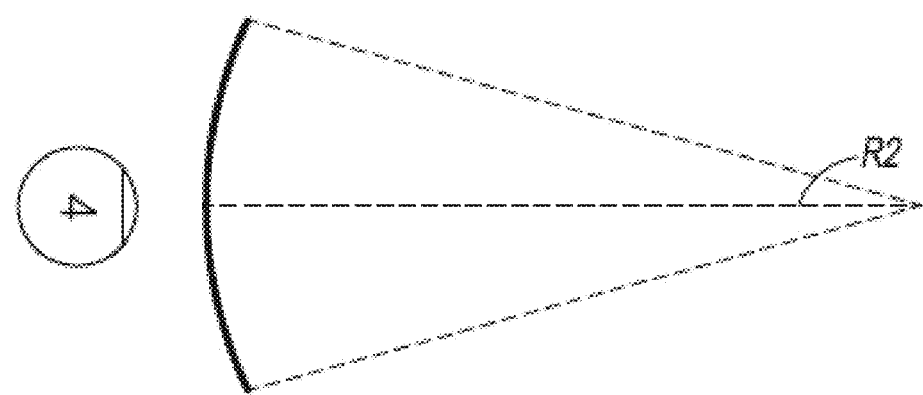
Figure 4C:
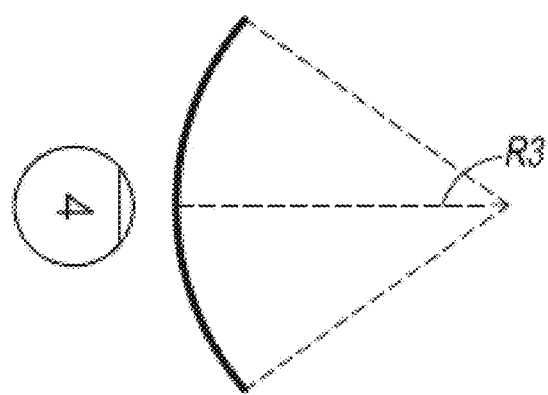

The distance between an object and the eye 4 or 6 may also change the amount of divergence of light from that object, as viewed by that eye. FIGS. 4A-4C illustrates relationships between distance and the divergence of light rays. The distance between the object and the eye 4 is represented by, in order of decreasing distance, R1, R2, and R3. As shown in FIGS. 4A-4C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 4. Consequently, at different depth planes, the degree of divergence of light rays is also different, with the degree of divergence increasing with decreasing distance between depth planes and the viewer's eye 4. While only a single eye 4 is illustrated for clarity of illustration in FIGS. 4A-4C and other figures herein, it will be appreciated that the discussions regarding eye 4 may be applied to both eyes 4 and 6 of a viewer.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth plane and/or based on observing different image features on different depth planes being out of focus.

Figure 5:
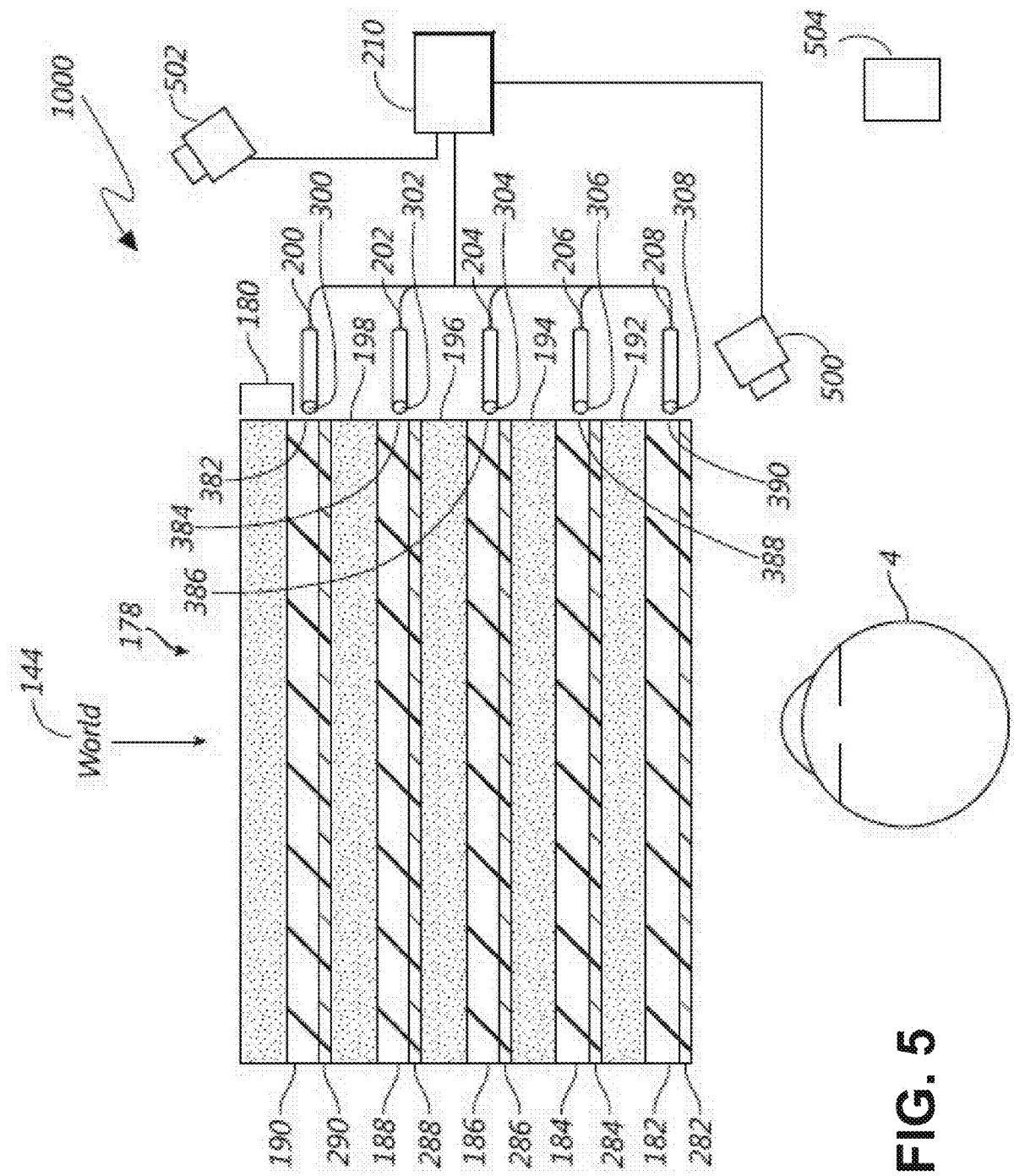
FIG. 5 illustrates an example of a waveguide stack for outputting image information to a user.

FIG. 5 illustrates an example of a waveguide stack for outputting image information to a user. A display system 1000 includes a stack of waveguides, or stacked waveguide assembly, 178 that may be utilized to provide three-dimensional perception to the eye/brain using a plurality of waveguides 182, 184, 186, 188, 190. In some embodiments, the display system 1000 is the system 80 of FIG. 1B, with FIG. 5 schematically showing some parts of that system 80 in greater detail. For example, the waveguide assembly 178 may be integrated into the display 62 of FIG. 1B.

With continued reference to FIG. 5, the waveguide assembly 178 may also include a plurality of features 198, 196, 194, 192 between the waveguides. In some embodiments, the features 198, 196, 194, 192 may be lens. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may function as a source of light for the waveguides and may be utilized to inject image information into the waveguides 182, 184, 186, 188, 190, each of which may be configured, as described herein, to distribute incoming light across each respective waveguide, for output toward the eye 4. Light exits an output surface 300, 302, 304, 306, 308 of the image injection devices 200, 202, 204, 206, 208 and is injected into a corresponding input edge 382, 384, 386, 388, 390 of the waveguides 182, 184, 186, 188, 190. In some embodiments, a single beam of light (e.g. a collimated beam) may be injected into each waveguide to output an entire field of cloned collimated beams that are directed toward the eye 4 at particular angles (and amounts of divergence) corresponding to the depth plane associated with a particular waveguide.

In some embodiments, the image injection devices 200, 202, 204, 206, 208 are discrete light modulating devices (e.g., a LCD display and/or DLP projector) that each produce image information for injection into a corresponding waveguide 182, 184, 186, 188, 190, respectively. In some other embodiments, the image injection devices 200, 202, 204, 206, 208 are the output ends of a single multiplexed light modulating device (e.g., a LCD display and/or DLP projector) which may, e.g., pipe image information via one or more optical conduits (such as fiber optic cables) to each of the image injection devices 200, 202, 204, 206, 208.

In some embodiments, the image injection devices 200, 202, 204, 206, 208 may be the output ends of a scanning fiber display system, in which the image injection devices 200, 202, 204, 206, 208 move or scan over the surface of the corresponding input edge 382, 384, 386, 388, 390 of the waveguides 182, 184, 186, 188, 190 to inject image information into those waveguides. An example of such a scanning fiber system is disclosed in U.S. patent application Ser. No. 14/555,585, filed Nov. 27, 2014, entitled VIRTUAL AND AUGMENTED REALITY SYSTEMS AND METHODS, which is incorporated by reference herein.

A controller 210 controls the operation of the stacked waveguide assembly 178 and the image injection devices 200, 202, 204, 206, 208. In some embodiments, the controller 210 is part of the local data processing module 70. The controller 210 includes programming (e.g., instructions in a non-transitory medium) that regulates the timing and provision of image information to the waveguides 182, 184, 186, 188, 190 according to, e.g., any of the various schemes disclosed herein. In some embodiments, the controller may be a single integral device, or a distributed system connected by wired or wireless communication channels. The controller 210 may be part of the processing modules 70 or 72 (FIG. 1B) in some embodiments. In some embodiments, the display system 80 may also include an inward facing camera 500 that faces the viewer's eye 4. Such a camera may be used to detect eye movement, including the direction of the line of sight of the eye 4, and/or to allow the user 60 to interact with the display system 80 by capturing eye or facial gestures that may be used as display system commands. It will be appreciated that the interactions may include triggering various actions by the display system 80, as disclosed herein. For example, detecting that the line of sight of the eye 4 is directed towards a reflection of the user 60 may trigger the display of a virtual menu, as disclosed herein.

The display system 1000 may include an outward-facing imaging system 502 (e.g., a digital camera) that images a portion of the world 144. This portion of the world 144 may be referred to as the field of view (FOV) and the imaging system 502 may be referred to as an FOV camera, and may correspond to the camera 65 (FIG. 1A). The entire region available for viewing or imaging by a viewer may be referred to as the field of regard (FOR). The FOR may include 4π steradians of solid angle surrounding the display system 1000. In some embodiments of the display system 1000, the FOR may include substantially all of the solid angle around a user of the display system 1000, because the user may move their head and eyes to look at objects surrounding the user (in front, in back, above, below, or on the sides of the user). Images obtained from the outward-facing imaging system 502 may be used to track gestures made by the user (e.g., hand or finger gestures), detect objects in the world 144 in front of the user, and so forth.

The wearable system 400 may also include an inward-facing imaging system 500 (also referred to as inward facing camera 500), which observes the movements of the user, such as the eye movements and the facial movements. The inward-facing imaging system 500 may be used to capture images of the eye 4 to determine the size and/or orientation of the pupil of the eye 4. The inward-facing imaging system 500 may be used to obtain images for use in determining the direction the user is looking (e.g., eye pose) or for biometric identification of the user (e.g., via iris identification). In some embodiments, at least one camera may be utilized for each eye, to separately determine the pupil size and/or eye pose of each eye independently, thereby allowing the presentation of image information to each eye to be dynamically tailored to that eye. In some other embodiments, the pupil diameter and/or orientation of only a single eye 4 (e.g., using only a single camera per pair of eyes) is determined and assumed to be similar for both eyes of the user. The images obtained by the inward-facing imaging system 500 may be analyzed to determine the user's eye pose and/or mood, which may be used by the display system 1000 to decide which audio or visual content should be presented to the user. The display system 1000 may also determine head pose (e.g., head position or head orientation) using sensors such as IMUs, accelerometers, gyroscopes, etc.

In some embodiments, the inward facing camera 500 may also be configured to detect the accommodative response, or accommodation state, of the viewer eyes, to display content to the viewer without requiring the viewer to change that accommodative response. For example, the content may include alerts, menu items, or other content that may be beneficial for the viewer to clearly see irrespective of the depth at which their eyes are focused. In some embodiments, the display system 80 may be configured to detect shape change of the lens in the viewer's eyes to determine what the viewer's eyes are focused on and, in turn, the display system 80 may render displayed images on the appropriate depth plane with corresponding and appropriate depth cues (e.g., with appropriate resolution, detail, color saturation, contrast, etc. for particular depth planes).

With continued reference to FIG. 5, the waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include light extracting optical elements 282, 284, 286, 288, 290 that are configured to extract light out of a waveguide by redirecting the light, propagating within each respective waveguide, out of the waveguide to output image information to the eye 4. Extracted light may also be referred to as outcoupled light and light extracting optical elements may also be referred to as outcoupling optical elements. An extracted beam of light is outputted by the waveguide at locations at which the light propagating in the waveguide strikes a light redirecting element. The light extracting optical elements 282, 284, 286, 288, 290 may, for example, be reflective and/or diffractive optical features. While illustrated disposed at the bottom major surfaces of the waveguides 182, 184, 186, 188, 190 for ease of description and drawing clarity, in some embodiments, the light extracting optical elements 282, 284, 286, 288, 290 may be disposed at the top and/or bottom major surfaces, and/or may be disposed directly in the volume of the waveguides 182, 184, 186, 188, 190. In some embodiments, the light extracting optical elements 282, 284, 286, 288, 290 may be formed in a layer of material that is attached to a transparent substrate to form the waveguides 182, 184, 186, 188, 190. In some other embodiments, the waveguides 182, 184, 186, 188, 190 may be a monolithic piece of material and the light extracting optical elements 282, 284, 286, 288, 290 may be formed on a surface and/or in the interior of that piece of material.

With continued reference to FIG. 5, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 4. The collimated light may be representative of the optical infinity focal plane. The next waveguide up 184 may be configured to send out collimated light which passes through the first lens 192 (e.g., a negative lens) before it may reach the eye 4; such first lens 192 may be configured to create a slight convex wavefront curvature so that the eye/brain interprets light coming from that next waveguide up 184 as coming from a first focal plane closer inward toward the eye 4 from optical infinity. Similarly, the third up waveguide 186 passes its output light through both the first 192 and second 194 lenses before reaching the eye 4; the combined optical power of the first 192 and second 194 lenses may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers 188, 190 and lenses 196, 198 are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the light extracting optical elements of the waveguides and the focusing aspects of the lenses may be static (i.e., not dynamic or electro-active). In some alternative embodiments, either or both may be dynamic using electro-active features.

In some embodiments, two or more of the waveguides 182, 184, 186, 188, 190 may have the same associated depth plane. For example, multiple waveguides 182, 184, 186, 188, 190 may be configured to output images set to the same depth plane, or multiple subsets of the waveguides 182, 184, 186, 188, 190 may be configured to output images set to the same plurality of depth planes, with one set for each depth plane. This may provide advantages for forming a tiled image to provide an expanded field of view at those depth planes.

With continued reference to FIG. 5, the light extracting optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of light extracting optical elements 282, 284, 286, 288, 290, which output light with a different amount of divergence depending on the associated depth plane. In some embodiments, as discussed herein, the light extracting optical elements 282, 284, 286, 288, 290 may be volumetric or surface features, which may be configured to output light at specific angles. For example, the light extracting optical elements 282, 284, 286, 288, 290 may be volume holograms, surface holograms, and/or diffraction gratings. Light extracting optical elements, such as diffraction gratings, are described in U.S. patent application Ser. No. 14/641,376, filed Mar. 7, 2015, which is incorporated by reference herein in its entirety. In some embodiments, the features 198, 196, 194, 192 may not be lenses; rather, they may simply be spacers (e.g., cladding layers and/or structures for forming air gaps).

In some embodiments, the light extracting optical elements 282, 284, 286, 288, 290 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 4 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 4 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

The display system 1000 may include a user input device 504 by which the user may input commands to the controller 210 to interact with the display system 1000. For example, the user input device 504 may include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. In some cases, the user may use a finger (e.g., a thumb) to press or swipe on a touch-sensitive input device to provide input to the display system 1000 (e.g., to provide user input to a user interface provided by the display system 1000). The user input device 504 may be held by the user's hand during the use of the display system 1000. The user input device 504 may be in wired or wireless communication with the display system 1000.

Figure 6A:
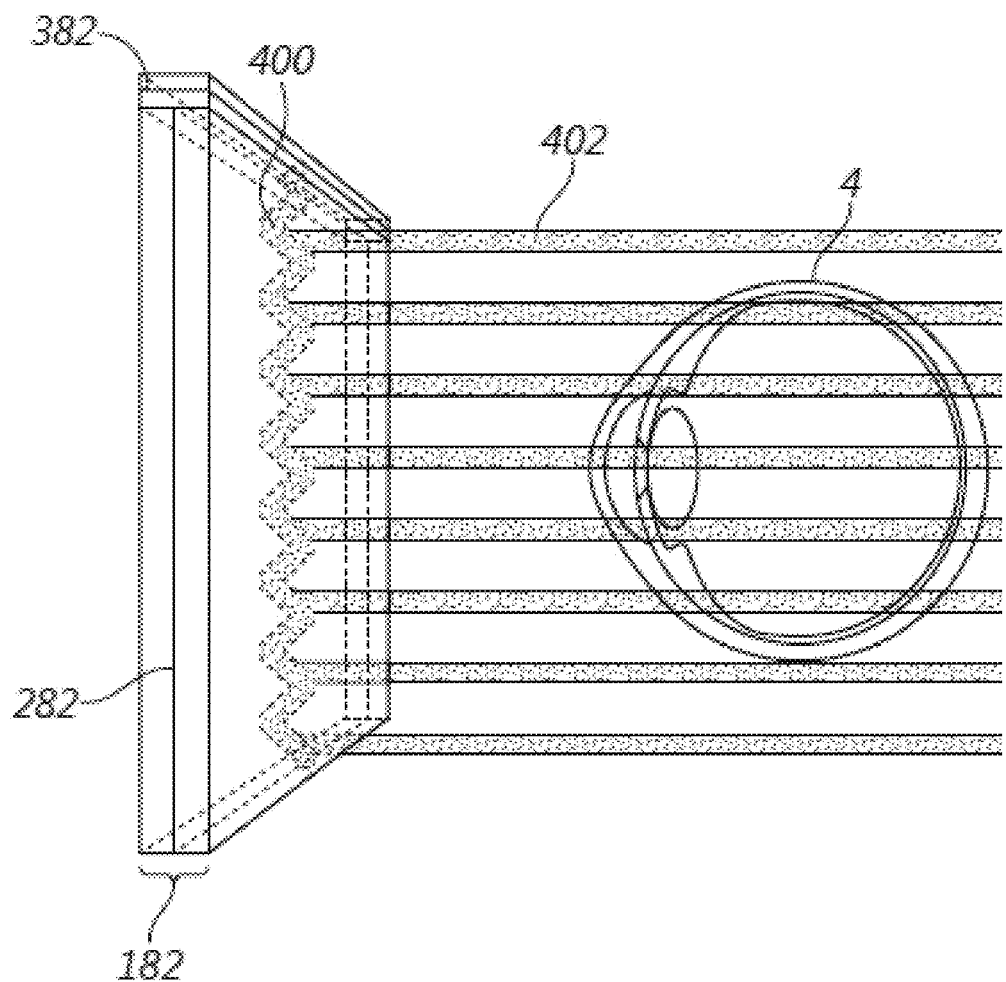
FIG. 6A shows an example of exit beams outputted by a waveguide.

FIG. 6A shows an example of exit beams outputted by a waveguide. One waveguide is illustrated, but it will be appreciated that other waveguides in the waveguide assembly 178 may function similarly, where the waveguide assembly 178 includes multiple waveguides. Light 400 is injected into the waveguide 182 at the input edge 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but, as discussed herein, they may also be redirected to propagate to the eye 4 at an angle (e.g., forming divergent exit beams), depending on the depth plane associated with the waveguide 182. It will be appreciated that substantially parallel exit beams may be indicative of a waveguide with light extracting optical elements that outcouple light to form images that appear to be set on a depth plane at a large distance (e.g., optical infinity) from the eye 4. Other waveguides or other sets of light extracting optical elements may output an exit beam pattern that is more divergent, which would require the eye 4 to accommodate to a closer distance to bring it into focus on the retina and would be interpreted by the brain as light from a distance closer to the eye 4 than optical infinity.

With reference again to FIG. 1B, the local processing and data module 70 and/or the remote processing module 72 may be programmed to perform embodiments of generating augmented reality content as described herein, with the content outputted as light 400 out of one or more of the waveguides 182, 184, 186, 188, 190. For example, the local processing and data module 70 and/or the remote processing module 72 may be programmed to analyze data collected from the camera 65 or other sensor to detect the presence of a reflection of the user 60. This detection may then trigger the generation of augmented reality content, which is displayed by the display 62 using one or more of the waveguides 182, 184, 186, 188, 190. The local processing and data module 70 and/or the remote processing module 72 may be programmed to select the augmented reality content based upon various criteria, including, without limitation, the location of the user 60, the physical appearance of the user 60, the time of day, day of the week, the date, the user's environment and combinations thereof. In some cases, offloading at least some of the augmented reality content generation to a remote processing module (e.g., in the "cloud") may improve efficiency or speed of the computations. In some embodiments, various parameters for detecting the presence of the user 60 and/or for augmented reality content generation (e.g., biometric identifiers, user preferences for augmented reality content, etc.) may be stored in data modules 70 and/or 72. In some embodiments, the generated content may be stored in remote data repository 74. It will be appreciated that the programming noted herein may be performed by hardware processors in the modules 70 and/or 72. Some details of programming for providing augmented reality content are discussed below.

Figure 6B:
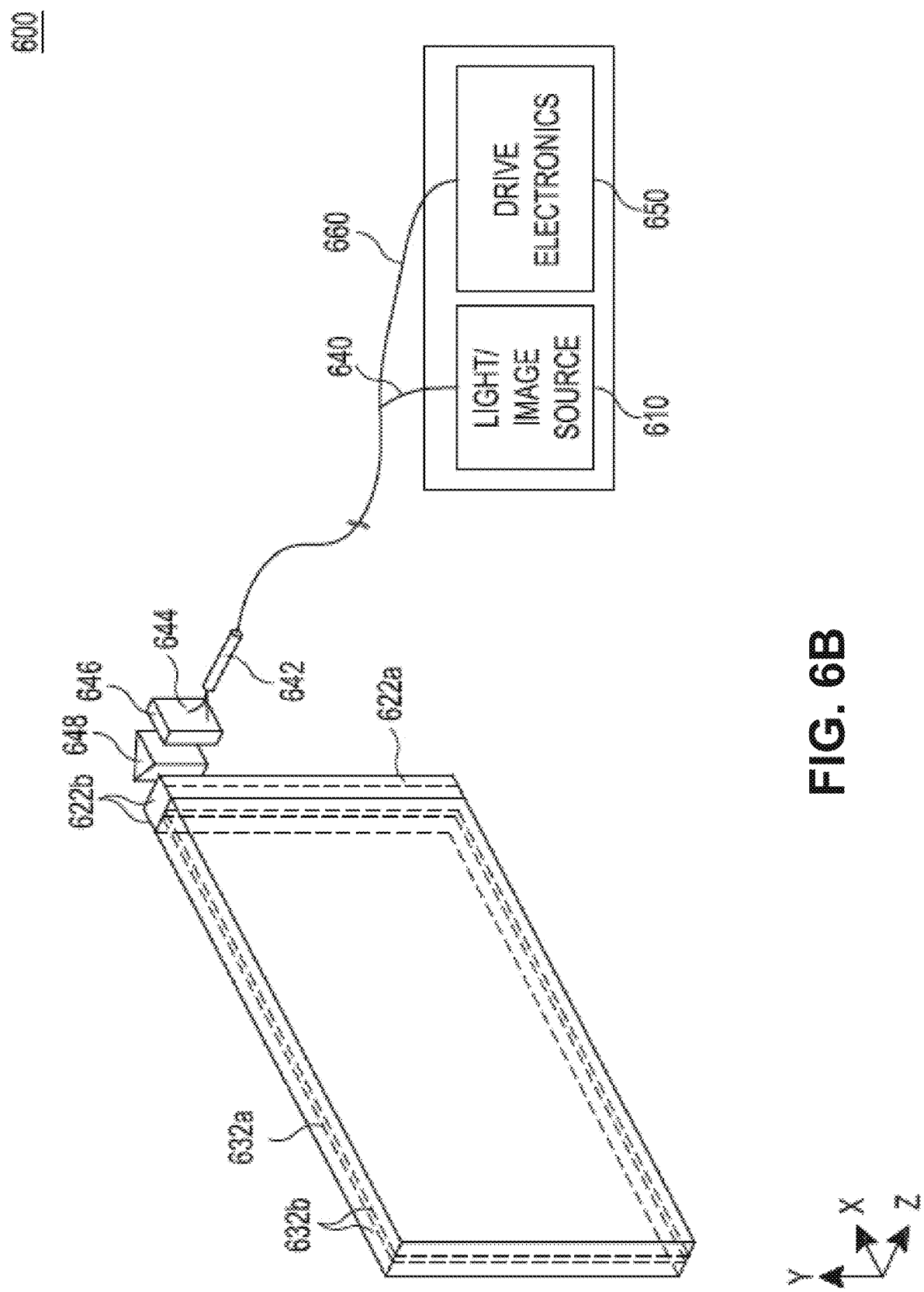
FIG. 6B is a schematic diagram showing a display system including a waveguide apparatus, an optical coupler subsystem to optically couple light to or from the waveguide apparatus, and a control subsystem, used in the generation of a multi-focal volumetric display, image, or light field.

FIG. 6B is a schematic diagram showing a display system including a waveguide apparatus, an optical coupler subsystem to optically couple light to or from the waveguide apparatus, and a control subsystem, used in the generation of a multi-focal volumetric display, image, or light field. The display system may include a waveguide apparatus, an optical coupler subsystem to optically couple light to or from the waveguide apparatus, and a control subsystem. The display system may be used to generate a multi-focal, volumetric image, or light field. The display system may include one or more primary planar waveguides 632a (only one is shown in FIG. 6B) and one or more DOEs 632b associated with each of at least some of the primary waveguides 632a. The planar waveguides 632b may be similar to the waveguides 182, 184, 186, 188, 190 discussed with reference to FIG. 5, and the DOEs 632b may be similar to the optical elements 282, 284, 286, 288, 290. The display system may employ a distribution waveguide apparatus to relay light along a first axis (vertical or Y-axis in view of FIG. 6B), and expand the light's effective exit pupil along the first axis (e.g., Y-axis). The distribution waveguide apparatus, may, for example include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar or identical in at least some respects to the DOE 632a. For example, the distribution planar waveguide 622b and/or DOE 622a may be comprised of the same materials as the primary planar waveguide 632b and/or DOE 632a, respectively. Embodiments of the optical display system 600 shown in FIG. 6B may be integrated into the wearable display system 80 shown in FIG. 1B.

The relayed and exit-pupil expanded light is optically coupled from the distribution waveguide apparatus into the one or more primary planar waveguides 632b. The primary planar waveguide 632b relays light along a second axis, preferably orthogonal to first axis, (e.g., horizontal or X-axis in view of FIG. 6B). Notably, the second axis may be a non-orthogonal axis to the first axis. The primary planar waveguide 632b expands the light's effective exit pupil along that second axis (e.g., X-axis). For example, the distribution planar waveguide 622b may relay and expand light along the vertical or Y-axis, and pass that light to the primary planar waveguide 632b which relays and expands light along the horizontal or X-axis.

The display system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 may be associated with four quadrant electrodes (not illustrated). The electrodes may, for example, be plated on the outside, outer surface or outer periphery or diameter of the tube 642. A core electrode (not illustrated) is also located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance may depend upon a diameter, length, and material properties of the optical fiber 644. By vibrating the piezoelectric tube 642 near a first mode of mechanical resonance of the fiber cantilever 644, the fiber cantilever 644 is caused to vibrate, and may sweep through large deflections.

By stimulating resonant vibration in two axes, the tip of the fiber cantilever 644 is scanned biaxially in an area filling two dimensional (2-D) scan. By modulating an intensity of light source(s) 610 in synchrony with the scan of the fiber cantilever 644, light emerging from the fiber cantilever 644 forms an image. Descriptions of such a set up are provided in U.S. Patent Publication No. 2014/0003762, which is incorporated by reference herein in its entirety.

A component of an optical coupler subsystem collimates the light emerging from the scanning fiber cantilever 644. The collimated light is reflected by mirrored surface 648 into the narrow distribution planar waveguide 622b which contains the at least one diffractive optical element (DOE) 622a. The collimated light propagates vertically (relative to the view of FIG. 6B) along the distribution planar waveguide 622b by total internal reflection (TIR), and in doing so repeatedly intersects with the DOE 622a. The DOE 622a preferably has a low diffraction efficiency. This causes a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light is diffracted toward the entrance of the primary waveguide 632b. By dividing the incoming light into multiple outcoupled sets, the exit pupil of the light is expanded vertically by the DOE 4 in the distribution planar waveguide 622b. This vertically expanded light coupled out of distribution planar waveguide 622b enters the edge of the primary planar waveguide 632b.

Light entering primary waveguide 632b propagates horizontally (relative to the view shown in FIG. 6B) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways may cause the light to be coupled out of the primary planar waveguide 632b by a multiplicity of DOEs 632a at different angles, focus levels, and/or yielding different fill patterns at the exit pupil. Different fill patterns at the exit pupil may be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable Display System

In many embodiments, the wearable system (e.g., the wearable display system 80) may include other components in addition or as an alternative to the components of the wearable system described above. The wearable system may, for example, include one or more haptic devices or components. The haptic device(s) or component(s) may be operable to provide a tactile sensation to a user. For example, the haptic device(s) or component(s) may provide a tactile sensation of pressure and/or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some embodiments, haptic devices or components may be worn by the user (e.g., a user wearable glove). In some embodiments, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain embodiments, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For instance, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard and/or virtual trackpad. The user input device 504 (shown in FIG. 5) may be an embodiment of a totem may, which may include a trackpad, a touchpad, a trigger, a joystick, a trackball, a rocker switch, a mouse, a keyboard, a multi-degree-of-freedom controller, or another physical input device. A user may use the totem, alone or in combination with poses, to interact with the wearable system and/or other users.

Examples of haptic devices and totems usable with the wearable devices, HMD, ARD, and display systems of the present disclosure are described in U.S. Patent Publication No. 2015/0016777, which is incorporated by reference herein in its entirety.

Example Wearable Display Systems, Environments, and Interfaces

A wearable display system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system may be added to a world model by including new pictures that convey information about various points and features of the real world. For example, the wearable system may collect a set of map points (such as 2D points or 3D points) and find new map points to render a more accurate version of the world model. The world model of a first user may be communicated (e.g., over a network such as a cloud network) to a second user so that the second user may experience the world surrounding the first user.

Figure 7:
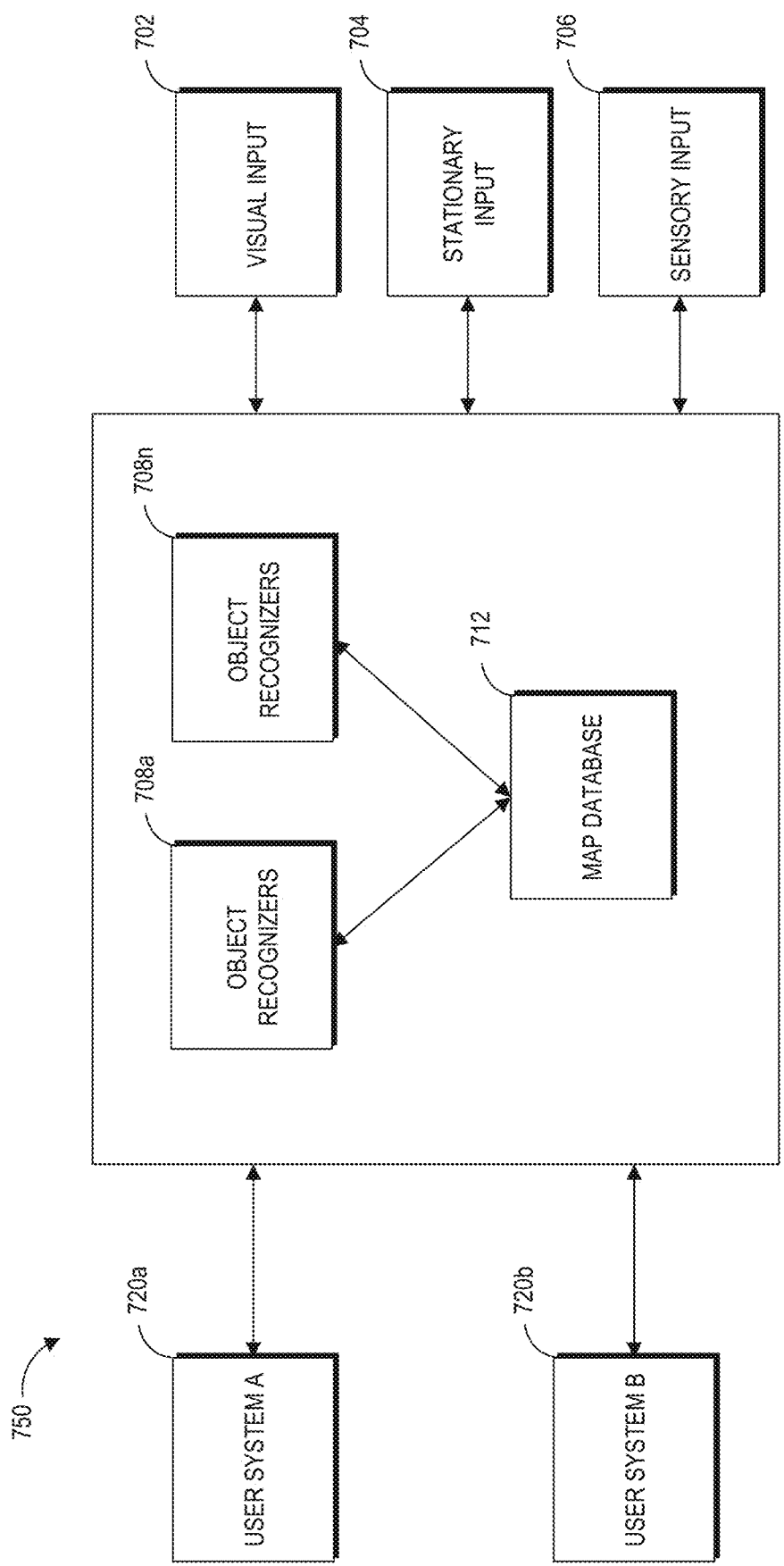
FIG. 7 is a block diagram of an example of an MR environment.

FIG. 7 is a block diagram of an example of an MR environment 750. The MR environment 750 may be configured to receive input (e.g., visual input 702 from the user's wearable system, stationary input 704 such as room cameras, sensory input 706 from various sensors, gestures, totems, eye tracking, user input from the user input device 504, etc.) from various user systems 720a, 720b. The user systems 720a, 720b may comprise one or more user wearable systems (e.g., wearable system 80, FIG. 1B; wearable system 1000, FIG. 5) and/or stationary room systems (e.g., room cameras, etc.). The wearable systems may use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images and/or various cues from a different point of view. The image data acquired by the cameras (such as the room cameras and/or the cameras of the outward-facing imaging system) may be reduced to a set of mapping points.

One or more object recognizers 708 may crawl through the received data (e.g., the collection of points) and recognize and/or map points, tag images, attach semantic information to objects with the help of a map database 712. The map database 712 may comprise various points collected over time and their corresponding objects. The various devices and the map database may be connected to each other through a network (e.g., LAN, WAN, etc.) to access the cloud.

Based on this information and collection of points in the map database, the object recognizers 708a to 708n may recognize objects in an environment. For example, the object recognizers may recognize faces, mirrors, reflected images (of a person or an HMD, etc.), windows, walls, etc. One or more object recognizers may be specialized for object with certain characteristics. For example, the object recognizer 708a may be used to recognizer faces, while another object recognizer may be used recognize mirrors.

The object recognitions may be performed using a variety of computer vision techniques. For example, the wearable system may analyze the images acquired by the outward-facing imaging system 502 (shown in FIG. 5) to perform scene reconstruction, event detection, video tracking, object recognition, object pose estimation, learning, indexing, motion estimation, or image restoration, etc. One or more computer vision algorithms described herein may be used to perform these tasks. The object recognitions may additionally or alternatively be performed by a variety of machine learning algorithms described herein. Once trained, the machine learning algorithm may be stored by the HMD.

The wearable system may also supplement recognized objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that may reflect images of objects in the room. Over time the map database grows as the system (which may reside locally or may be accessible through a wireless network) accumulates more data from the world. Once the objects are recognized, the information may be transmitted to one or more wearable systems. For example, the MR environment 750 may include information about a scene happening in California. The environment 750 may be transmitted to one or more users in New York. Based on data received from an FOV camera and other inputs, the object recognizers and other software components may map the points collected from the various images, recognize objects etc., such that the scene may be accurately "passed over" to a second user, who may be in a different part of the world. The environment 750 may also use a topological map for localization purposes.

Figure 8:
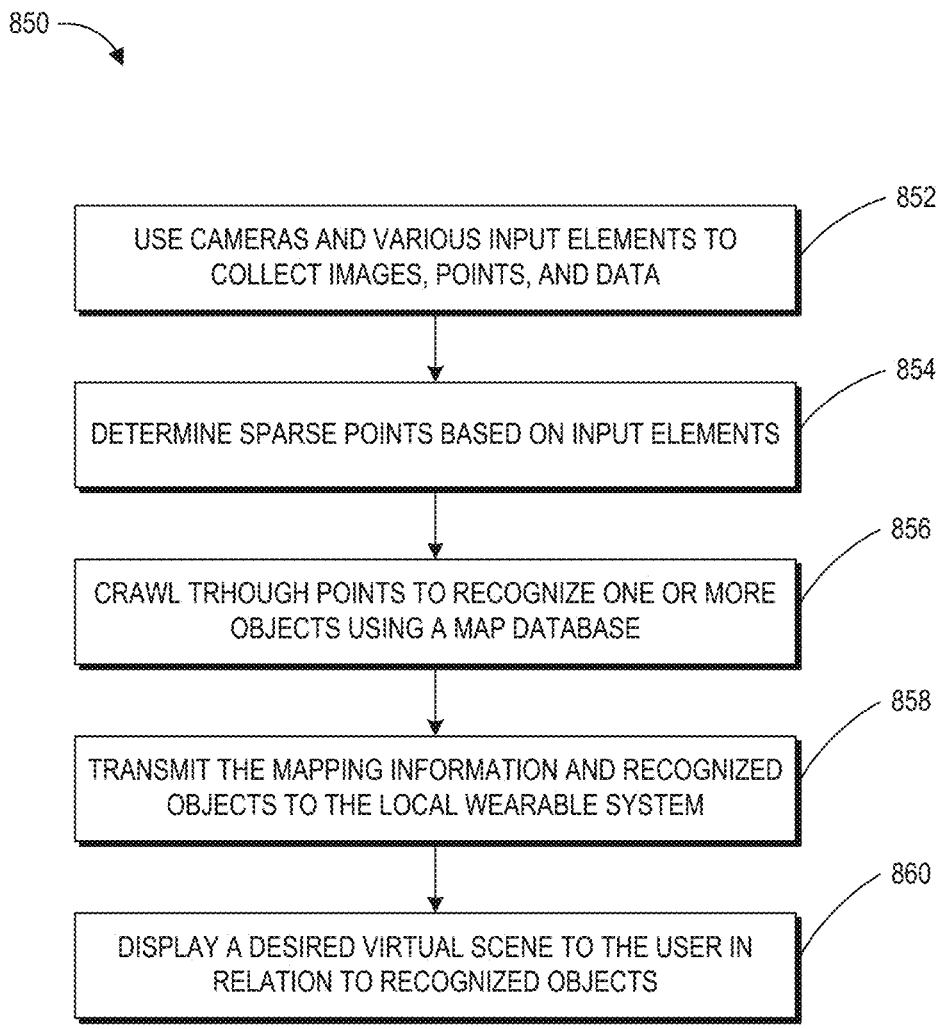
FIG. 8 is a process flow diagram of an example of a method of rendering virtual content in relation to recognized objects.

FIG. 8 is a process flow diagram of an example of a method 850 of rendering virtual content in relation to recognized objects. The method 850 describes how a virtual scene may be represented to a user of the MR system (e.g., a wearable system). The user may be geographically remote from the scene. For example, the user may be New York, but may want to view a scene that is presently going on in California, or may want to go on a walk with a friend who resides in California.

At block 852, the AR system may receive input from the user and other users regarding the environment of the user. This may be achieved through various input devices, and knowledge already possessed in the map database. The user's FOV camera, sensors, GPS, eye tracking, etc., convey information to the system at block 852. The system may determine sparse points based on this information at block 854. The sparse points may be used in determining pose data (e.g., head pose, eye pose, body pose, and/or hand gestures) that may be used in displaying and understanding the orientation and position of various objects in the user's surroundings. The object recognizers 708a, 708n may crawl through these collected points and recognize one or more objects using a map database at block 856. This information may then be conveyed to the user's individual wearable system at block 858, and the desired virtual scene may be accordingly displayed to the user at block 860. For example, the desired virtual scene (e.g., user in CA) may be displayed at the appropriate orientation, position, etc., in relation to the various objects and other surroundings of the user in New York.

Figure 9:
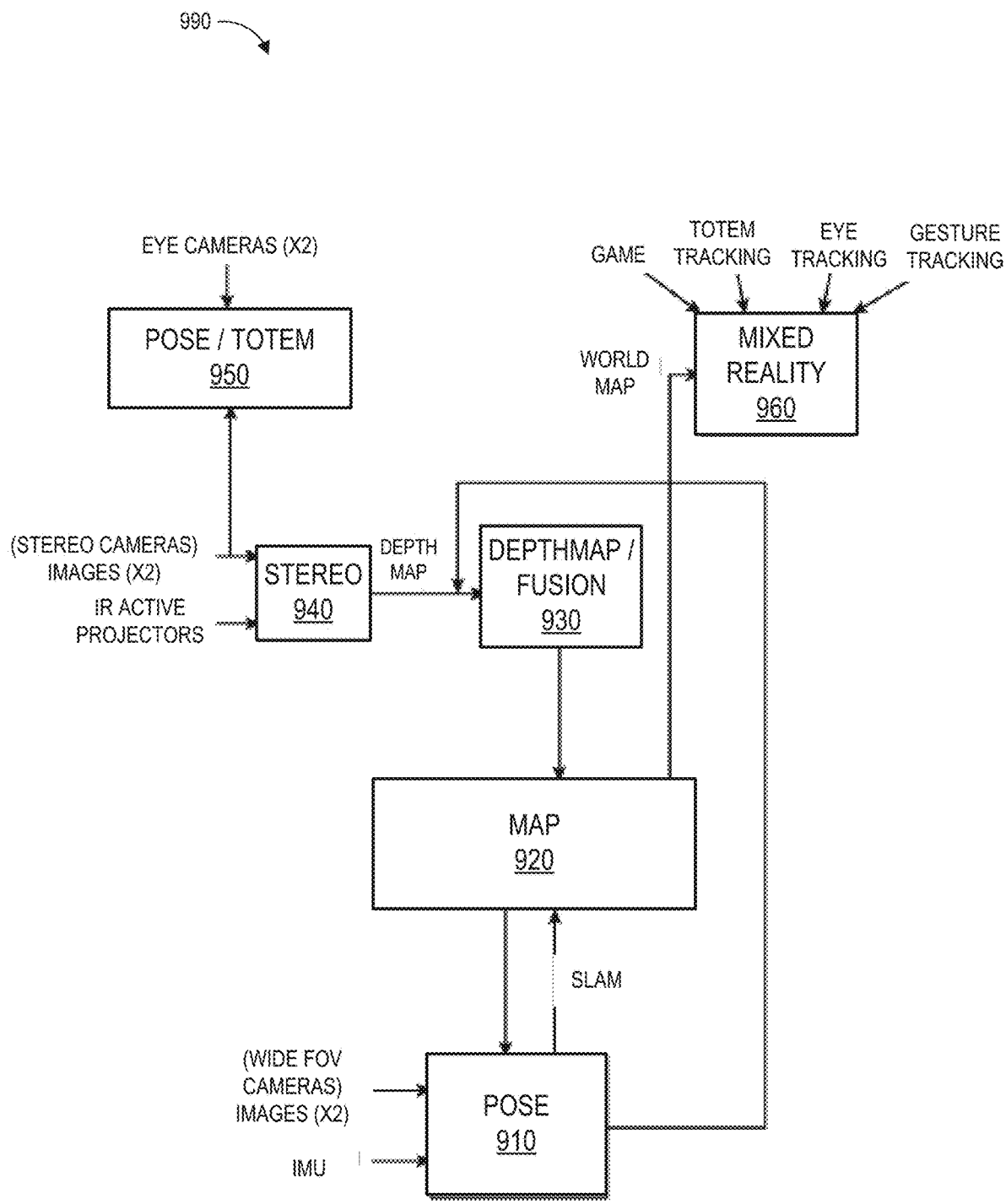
FIG. 9 is a block diagram of another example of a wearable system.

FIG. 9 is a block diagram of another example of a wearable system. In this example, the wearable system 990 comprises a map, which may include map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map to determine position and orientation of the wearable computing hardware or user. Pose data may be computed from data collected on the fly as the user is experiencing the system and operating in the world. The data may comprise images, data from sensors (such as inertial measurement devices, which generally comprise accelerometer and gyroscope components) and surface information pertinent to objects in the real or virtual environment.

A sparse point representation may be the output of a simultaneous localization and mapping (SLAM or V-SLAM, referring to a configuration wherein the input is images/visual only) process. The system may be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors) may serve as input to the Stereo process 940. A significant amount of depth map information may be fused together, and some of this may be summarized with a surface representation. For example, mathematically definable surfaces are efficient (e.g., relative to a large point cloud) and digestible inputs to other processing devices like game engines. Thus, the output of the Stereo process (e.g., a depth map) 940 may be combined in the Fusion process 930. Pose may be an input to this Fusion process 930 as well, and the output of Fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding where such objects are relative to each other, to be another valuable input to mixed reality. Pose relative to the world becomes an input as well and plays a key role to almost any interactive system.

Controls or inputs from the user are another input to the wearable system 990. As described herein, user inputs may include visual input, gestures, totems, audio input, sensory input, etc. In order to move around or play a game, for example, the user may need to instruct the wearable system 990 regarding what he or she wants to do. Beyond just moving oneself in space, there are various forms of user controls that may be utilized. In one embodiment, a totem, user input device, or object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 990 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 990 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined.

With regard to the camera systems, the example wearable system 990 shown in FIG. 9 may include three pairs of cameras: a relative wide FOV or passive SLAM pair of cameras arranged to the sides of the user's face, a different pair of cameras oriented in front of the user to handle the Stereo imaging process 940 and also to capture hand gestures and totem/object tracking in front of the user's face. The cameras in the three pairs of cameras may be a part of the outward-facing imaging system 502 (shown in FIG. 5). The wearable system 990 may include eye tracking cameras (which may be a part of an inward-facing imaging system 500 shown in FIG. 5) oriented toward the eyes of the user in order to triangulate eye vectors and other information. The wearable system 990 may also comprise one or more textured light projectors (such as infrared (IR) projectors) to inject texture into a scene.

Figure 10:
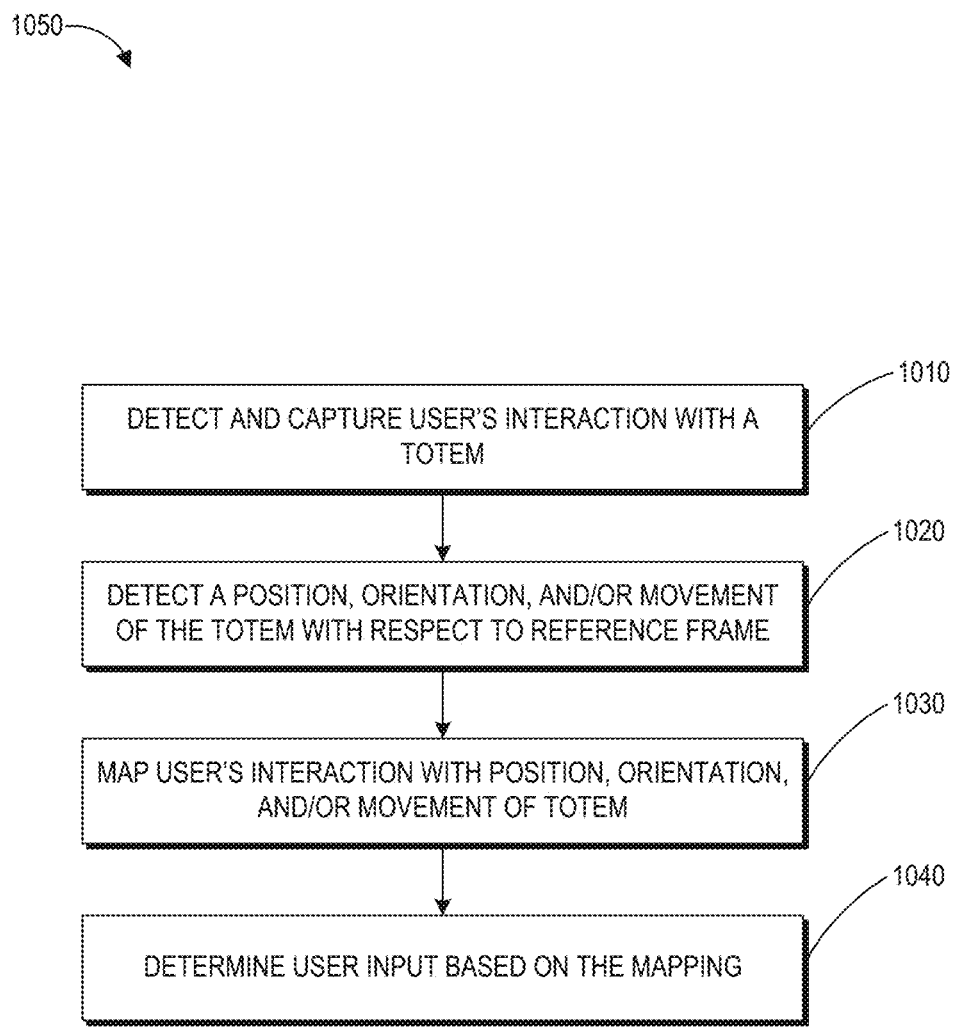
FIG. 10 is a process flow diagram of an example of a method for determining user input to a wearable system.

FIG. 10 is a process flow diagram of an example of a method 1050 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the user's FOV camera or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, and/or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some embodiments, the vergence of the user's eyes may be tracked and an accommodation/vergence model may be used to determine the accommodation state of the user's eyes, which provides information on a depth plane on which the user is focusing. In some embodiments, the wearable system may use raycasting techniques to determine which real or virtual objects are along the direction of the user's head pose or eye pose. In various embodiments, the ray casting techniques may include casting thin, pencil rays with substantially little transverse width or casting rays with substantial transverse width (e.g., cones or frustums).

The user interface may be projected by the display system as described herein (such as the display 62 in FIG. 1B). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 500 or the outward-facing imaging system 502).

Figure 11:
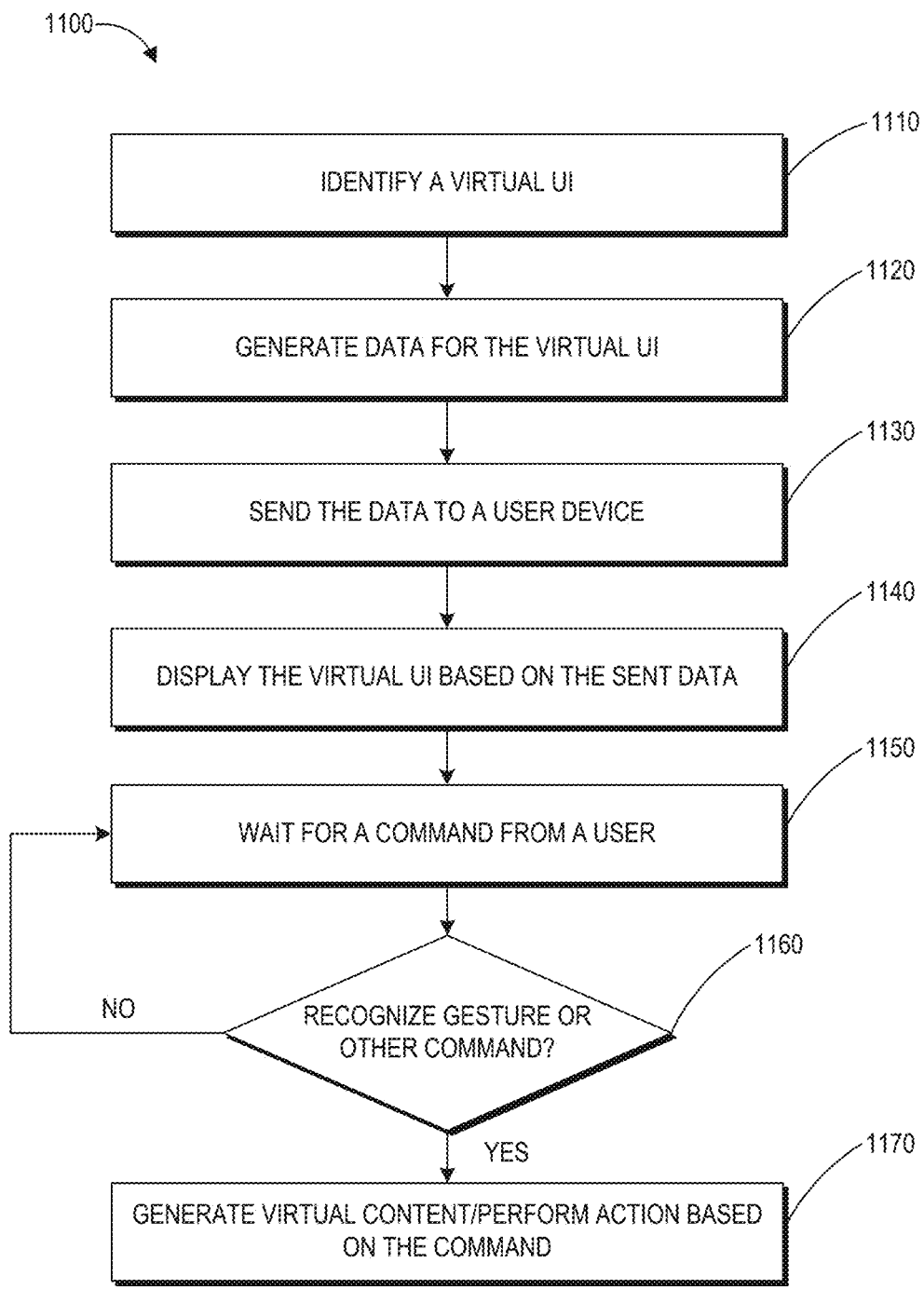
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). At block 1120, the wearable system may generate data for the virtual UI. For example, data associated with the confines, general structure, shape of the UI etc., may be generated. In addition, the wearable system may determine map coordinates of the user's physical location so that the wearable system may display the UI in relation to the user's physical location. For example, if the UI is body centric, the wearable system may determine the coordinates of the user's physical stance, head pose, or eye pose such that a ring UI may be displayed around the user or a planar UI may be displayed on a wall or in front of the user. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display may project the virtual UI into one or both of the user's eyes. Once the virtual UI has been created, the wearable system may simply wait for a command from the user to generate more virtual content on the virtual UI at block 1150. For example, the UI may be a body centric ring around the user's body. The wearable system may then wait for the command (a gesture, a head or eye movement, input from a user input device, etc.), and if it is recognized (block 1160), virtual content associated with the command may be displayed to the user (block 1170).

Additional examples of AR systems, UI, and user experiences (UX) are described in U.S. Patent Publication No. 2015/0016777, which is incorporated by reference herein in its entirety.

Examples of Augmented Reality Content Generation

Figure 12:
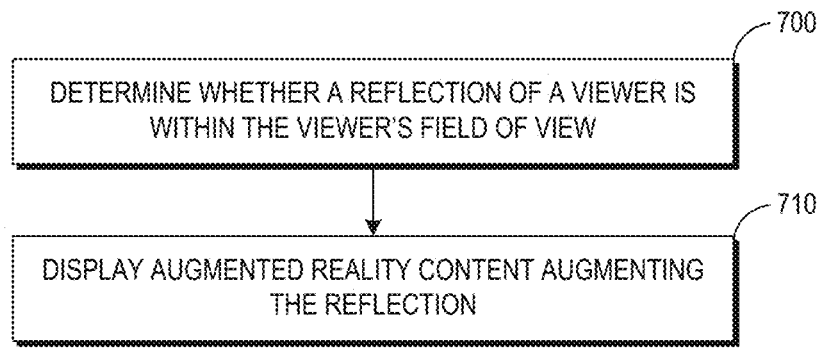
FIG. 12 illustrates an example of a flow diagram of a routine for generating augmented reality content to augment a user's view of their reflection.

FIG. 12 illustrates an example of a flow diagram of a routine for generating augmented reality content to augment a user's view of their reflection. Preferably, the routine is implemented in a display system, such as the system 80 (FIG. 1B) having a wearable display device that comprises a display area comprising light redirecting features configured to direct light to a user. The display area may be at least partially transparent, and sufficiently transparent to provide a view of an ambient environment through the display area. In some embodiments, the routine, including any of the actions and functions described herein, may be stored as programming in non-transitory memory in the local processing and data module 70, or the remote processing module 72. The programming, and routine, may be implemented by a hardware processor module 70 and/or module 72 (FIG. 1B).

With continued reference to FIG. 12, at block 700 a determination is made as to whether a reflection of the viewer is within the viewer's field of view. If the determination is positive (i.e., a reflection is determined to be within the viewer's field of view), then the routine proceeds to block 710. At block 710, augmented reality content is displayed. As disclosed herein, in some embodiments, augmented reality content may be displayed by providing light encoded with image content to the wearable display, which outputs the light to a user to form images perceived by the user. The images preferably occupy less than an entirety of the display area, thereby allowing a view of the ambient environment. As result, virtual content may blend with the user's view of real objects. In some embodiments, the virtual content may block out the user's view of part or all of one or more of the real objects. Such a blocking out allows the system to modify the perceived appearance of those objects, as disclosed herein. It will be appreciated that the augmented reality content may include real-time information and/or historical data for viewing and analysis.

In some embodiments, spatial synchronization of the images with the reflection of the user may be achieved by analyzing real-time images captured by the display system's camera (both forward-facing cameras for imaging the world and inward-facing cameras for imaging the user's eyes and configured to determine the gaze direction of the user), and positioning the images within the display area such that the images block out and replace, in real time, the reflection of the portion of the user's reflection or ambient environment being modified by augmented reality content. Image information used to construct the images may be stored in the display system 80 (e.g., locally in the local processing and data module 70 (FIG. 1B)), and/or may be received from a third party source (e.g., through wireless or wired communication links with a retail or health establishment and/or through content downloaded to the remote data repository 74 (FIG. 1B), which may be established, e.g., by the display system upon detecting that the user is in a particular physical establishment, or is viewing a particular on-line site). It will be appreciated that a real object in a reflection may be seen by a user along a corresponding line of sight. Preferably, the display system is configured to position an image such that the location of that image in the user's field of view coincides with the line of sight of the real object that the image is intended to replace, to effectively block the user's view of that real object. In addition, the image may be placed on a depth plane matching the depth plane of the real object as would be seen in the reflection (e.g., on a depth plane corresponding to a distance from the user equal to the distance traversed by a ray of light from the real object to the mirror and then the mirror to the user).

In some embodiments, the display system may display a virtual object on a depth plane between the user and the reflective surface. It will be appreciated that the user's visual system may expect to see both a front side view (facing the user) and a backside view (facing the reflective surface) of such virtual objects. To increase the realism of the displayed virtual object, a reflection of the backside of the virtual object may be displayed. Preferably, the display system locally stores or has access to image information for both views of the front and the back sides of virtual objects. This image information may then be displayed by the display system as two separate images: one corresponding to the front side of the virtual object and one corresponding to the backside of the virtual object. It will be appreciated that the display system may be configured to place the backside image on a depth plane different from the front side image and farther from the user than the front side image. In addition, the display system may be configured to provide a mirror image of the backside view of the virtual object (e.g., provide mirror images of text), to more realistically mimic an actual reflection.

As an example of a virtual object, a reflection of the backside of a virtual menu may be displayed as a reflection in the mirror; that is, an image of the backside of the virtual menu may be displayed in a location overlying the mirror, with the location of the image of the backside corresponding to the location where a reflection would be present if the virtual object were a real object. It will be appreciated that ray tracing may be utilized to determine the relative positions of the front side and backside images. It will also be appreciated that as a virtual object moves, the positions of the front side and backside images may also move. In some embodiments, the display system may be configured to determine whether to display backside images selectively, e.g., based on context. For example, both front and back sides of virtual content representing three-dimensional objects (e.g., objects intended to mimic or take the place of objects in and/or interacting with the world) may be displayed, while virtual objects used to specifically provide inputs to and/or information from the display system may not have backside images displayed as reflections. In some embodiments, a virtual menu may not have a backside reflection, to signal to the user that the menu is not a real object and/or to conserve computational resources.

Referring again to block 700, determining that the reflection of the user is within the user's field of view may be accomplished automatically by the display system using various inputs and criteria. For example, an image of the ambient environment is captured with a camera on the user's display device and stored image information is compared to the captured image to determine whether there is a match between the captured image and the stored image information. In some embodiments, the stored image information comprises biometric information, such as unique features of the user's appearance. Such unique features may include, without limitation, the presence of one or more unique physical attributes on the user, or the relationship (e.g., spatial or size relationship) between the user's physical features (e.g., features on the face). In some embodiments, performing block 700 comprises running a facial recognition subroutine.

In some embodiments, the stored image information comprises unique features of the wearable display device. For example, the frame of the display device may have a unique identifier (e.g., a barcode, or a unique electromagnetic emission) that is captured by the display device's camera or other sensor. The unique identifier is compared to a set of allowable identifiers stored in the display system and a positive match is interpreted to indicate that a reflection is present. In some embodiments, the reflective surface (e.g., a mirror) may itself include a unique identifier. For example, the reflective surface may include a barcode or other visible identifier. In some embodiments, the reflective surface includes a beacon that broadcasts an electromagnetic signal. The display device has a receiver to receive the signal, which is compared with a stored set of allowable signals. If a match is made, receipt of the signal is interpreted to indicate that the user is proximate the reflective surface. In some embodiments, the signal may be radio signals, which may be implemented using Bluetooth or Radio-frequency identification (RFID) technology standards. In some other embodiments, the proximity of the user to a reflective surface may be determined using a location sensor on the user and access to a database that contains the location of known reflective surfaces. A match between the location of the user and the location of a known reflective surface may be interpreted to indicate that the user is proximate the reflective surface, and confirmation that the reflective surface is in the user's line of sight may be made by analyzing images captured by the display system's camera. It will be appreciated that in addition to possible use in determining that the reflection of the user is within the user's field of view, the unique geometry of the frame or other components of the display device may be recognized by computer vision software and treated as a "totem" for interaction with the display system, in some embodiments.

In some embodiments, the display system may be configured to detect the presence of a reflection by analyzing images, captured by an outwardly-facing camera, for various indicia of reflected images. These various indicia may include the reversing of left and right features by the mirror. For example, the display system (e.g., the frame of the display system) may include visible markings on its surface that have a specific left-to-right orientation, which is known by the display system. Such visible markings may include letters such as the letter "L" on the left side of the frame of the display system and/or the letter "R" on the right of the frame of the display system. As disclosed herein, the display system may be configured to actively scan the ambient environment using its outwardly-facing camera and to identify objects (including landscapes, such as the inside of a store, and/or people) imaged by the camera. Consequently, the display system may be configured to recognize an image of the frame captured by the camera and to also determine that the orientations of the letters "L" and/or "R" are reversed. Such a reversal may be interpreted as an indication that the camera has imaged a reflection of the display or camera frame. Other options for markings that may be utilized to indicate a reflection include any markings with a left-to-right orientation that differs from its right-to-left orientation, including symbols, colors (e.g. strips of color having a particular order), etc.

In some embodiments, the display system may be configured to determine the presence of reversed facial/body markings on the user. Preferably, the markings have particular left-to-right orientations. Examples of such facial/body markings include scars, birthmarks, combinations of freckles, the direction of the parting of the user's hair, etc. Such markings may be stored and accessible by the display system, which may be configured to detect a reversed image of the markings. In addition, the display system may also be configured to recognize the presence of reversed images of markings/symbols on the user's clothing. For example, the display system may be configured to recognize the user's clothing and to detect that markings/symbols (e.g., words) on the user's clothing are reversed. In some embodiments, the display system may be configured to form mirror-image versions of images captured by an outward facing camera and to compare those mirror-image versions to non-mirrored images represented in stored data. If there is a match, then the display system may be configured to determine that a reflection is present. In some other embodiments, the display system may be configured to form mirror images (or electronic data equivalents) of objects stored in its database and to compare these mirror images with what is captured by the outward facing camera. If there is a match, then the display system may determine that a reflection is present.

In some embodiments, the reversal of left-to-right by a reflective surface may be detected using movement. For example, the display system may include an accelerometer and/or location device, and may be configured to determine that the user is moving in a particular direction (e.g., left) while images captured by the outward-facing camera are processed to determine the user is moving in the same direction.

In some other embodiments, the display system may be configured to emit electromagnetic radiation and/or sound waves (or acoustical waves of other wavelengths), and to detect the reflection of the electromagnetic radiation and/or sound waves (or acoustical waves of other wavelengths) to determine the presence of a reflective surface. It will be appreciated that reflective surfaces, particularly specular reflectors, may provide reflections that are less diffused than reflections from nonreflective surfaces. In some embodiments, data from the sensor receiving the reflection (e.g., an outward facing camera or receiver) may be analyzed to determine the amount of diffusion implied by the received reflection. Diffusion below a predetermined threshold may be interpreted by the display system to indicate that the reflection was provided by a specular reflector. As noted herein, this method of detecting reflections may be combined with one or more other methods in order to increase the accuracy of the reflection detection.

In some embodiments, the display system may be configured to determine the presence of reflections even where the user is not in the reflection. For example, the display system may be configured to detect images of known symbols (e.g., letters and/or words) and to determine that the symbols are reversed. As disclosed herein, the display system may also be configured to receive an input from the user indicating the presence of a reflection. Such inputs may be provided in the reflection and may be identified whether or not the user is in the reflection. In some other embodiments, the display system may use gaze detection to determine the object that is being viewed by the user, and the display system may also be provided with a real or virtual selector (or button) for the user to provide an input regarding whether or not the object being viewed is part of a reflection.

It will be appreciated that reflective surfaces may be located at fixed locations. In addition, as described herein, the display system may be configured to share or pass information to other users, and this information may include the location and orientation of reflective surfaces previously determined to be present by other users. Consequently, in some embodiments, the location of the user may be tracked and the direction that the user is facing may be determined. Based upon this location and line of sight information, the display system may be configured to determine whether a reflective surface is present at that location, due to an earlier identification of the reflective surface by other users or other display systems that have shared this information.

In some embodiments, multiple ones of the inputs and/or criteria discussed herein are analyzed and are required to be detected before one or more hardware processors generate a signal that the routine may proceed to block 710. Advantageously, use of multiple inputs and/or criteria may improve the accuracy of the determination made in block 700. In some embodiments, at least one criterion for determining the presence of a reflection includes features unique to the user (e.g., biometric features on the user's face). This may have the benefit of making the later-displayed content secure, since the content will only be displayed if the user is present to supply the unique user features. Such security may be desirable in applications in which personal information is displayed as augmented reality content.

In some embodiments, where an inward facing camera 500 (FIG. 5) is present, the camera 500 may be utilized as an iris scanner for iris recognition of one or more eyes of the user 60 (FIG. 1B). It will be appreciated that the iris contains unique sets of features that are stable over time and that are unique to each individual. As a result, the sets of features, which may define unique patterns, may be used to identify individuals, often with a greater precision than fingerprints. These sets of features may be captured by the camera 500, e.g., as part of a captured image of the iris, and the local processing and data module 70 may analyze the image to detect whether a unique set of features matching that of the set of iris features of the user are present. If the user's unique set of iris features is found to be present, then the local processing and data module 70 provides a signal indicating a match and the user is determined to be wearing the display system 80.

In some other embodiments, the camera 500 may be used as a retina scanner for one or more eyes of the user 60 (FIG. 1B). Such a retina scan may include an infrared light emitter (e.g., as part of the camera 500) configured to direct light into the user 60's eye. It will be appreciated that the pattern of blood vessels in a user's retina is unique and typically does not change over time, and that the blood vessels reflect different amounts of infrared light than surrounding tissue. The unique pattern formed by this differential light absorption may be detected by the camera 500. If the retinal pattern is found to match the user's retinal pattern, then the local processing and data module 70 provides a signal indicating a match and the user is determined to be wearing the display system 80. It will be appreciated that the camera 500 may be used as both an iris scanner and a retina scanner in some embodiments.

With reference again to FIG. 12, in some embodiments, block 700 comprises both: 1) obtaining a positive result for a reflection of the user being present (e.g., using facial recognition, an identifier on or emitted by the system 80, the receipt of a signal from a reflective surface, etc.); and 2) determining that the user is indeed wearing the display system 80. Once both conditions are met in these embodiments, the display system may proceed from block 700 to a subsequent block.

In some embodiments, an optional step of detecting that the user is stationary may be performed at part of block 700 or between blocks 700 and 710. The display system may be programmed to perform an analysis of whether the user is stationary before proceeding to block 710. For example, an accelerometer, inertial measurement unit, or GPS unit may be provided in the display system and inputs from the accelerometer, inertial measurement unit or GPS unit may be received by one or more hardware processors, which is programmed with instructions to not proceed to block 710 until the user is determined to be stationary for a specific amount of time (e.g., 2 seconds or more, 3 seconds or more, 4 seconds or more, or 5 seconds or more).

In some other embodiments, block 700 may comprise a manual operation. The user may make the determination that a reflection is present by providing an input to the display system. For example, the display system may have, e.g., a manual or virtual switch that may be activated to provide a signal, receivable by the display system, that a reflection is present, thereby allowing the routine to proceed to block 710. As another example, user voice commands may be utilized to provide an input to the display system to alert the system that a reflection is present. In yet other examples, movements by the user, e.g., in the form of gestures, may be detected in a reflection of the user using the outward-facing camera. The display system may be configured to recognize particular movements as particular types of input. For example, a gesture in which a person points to their head in a reflection may be recognized by the display system as a signal that the user is acknowledging that a reflection of the user is present. In addition, or alternatively, the gesture of pointing to one's head may be interpreted by the display system as an input directing the display system to perform facial recognition on the face being pointed at, to determine the presence of the user.

In some embodiments, before block 700, the display system and/or beacon on or proximate the reflective surface may be configured to actively attract the user to the reflective surface. For example, detection of the beacon by the display system may cause the system to display optical indicators (e.g., an arrow, a compass, or a map) and/or auditory signals (e.g., voice prompts or alarms) for directing the user to the reflective surface. In some other embodiments, in addition to or as an alternative to the guidance provided by the display system, the reflective surface may include or be proximate to a sensing device (e.g., a camera or a proximity sensor) that detects the presence of a user and provides a signal to attract the user to the reflective surface. For example, the signal may be an optical signal (e.g., a flash, flashing light, or signage) or an audible alert.

In some embodiments, the display system may have or may be connected to a database that has the locations of reflective surfaces. A user may have a location sensor (e.g., as part of the display system) that tracks their location, and the display system may be configured to actively guide the user to a reflective surface. The guidance may be initiated by the user (e.g., as part of a request by the user to find a nearby reflective surface) or may be automatically generated based on preset criteria in the system.

The display system and/or beacon and/or sensing device may also be configured to be selective in attracting particular users to particular reflective surfaces. For example, the attraction of particular users to a particular reflective surface may be governed by various rules programmed in the display system and/or beacon and/or sensing device. In some embodiments, the active attraction of users to reflective surfaces may depend on user gender, user sales history, user income, etc. For example, in a department store, the programmed rules may cause a user to be directed only to reflective surfaces in clothing departments that match the gender of the user.

It will be appreciated that, in some embodiments, the identity of the user and detailed information about the user may be known. For example, iris and/or retina recognition may be used to identify the user, and the display system 80 may then be configured to load a profile for the user. The profile may contain various identifiers, including various demographic criteria, including age and gender, and relationships of the user to others seen in the reflective surface. These identifiers may be utilized to more specifically tailor the active attraction of users to a reflective surface. For example, the display system may be configured to direct users to reflective surfaces based on one or more of the identifiers noted above.

With reference again to FIG. 12, once a reflection of the user is found to be in the user's field of view according to block 700, proceeding to block 710, displaying augmented reality content may include displaying a virtual menu with user-selectable options. The virtual menu may be formed by overlaying one or more images of the menu, containing text and/or symbols, onto the user's view of the reflective surface or their view the ambient environment, thereby allowing the viewer to interact with the display system. For example, the menu may include options that allow the user to choose further augmented reality content to be displayed. In some embodiments, this may involve selecting particular applications that have been programmed into the display system. The applications may contain programming to generate content for various purposes (e.g., fashion, shopping, health, beauty, education, etc.). The selection of menu items may be made via a "virtual touchscreen," voice commands, eye tracking, gestures, or other means. Peripherals, such as inward facing camera 500 (FIG. 5), may be utilized to capture gestures and track eyes.

In some embodiments, the outward facing camera 65 (FIG. 1B) may be utilized to detect user inputs, which are captured by the camera 65 in the user's reflection. The camera 65 may be configured to capture various body gestures and/or eye movements, and the display system may be configured to interpret these gestures and eye movements as inputs. For example, particular body gestures, hand gestures, head pose, and/or facial expressions may be programmed into the system as being particular inputs, which cause particular actions by the display system. As an example, a frown by the user may be programmed to correspond to an answer of "no" to a yes or no question. Similarly, an eye twitch or particular hand gesture may be programmed to signal another input to the display system. In some embodiments, the camera 65 and/or 500 may be used for eye tracking to select menu items.

In some embodiments, as disclosed herein, the camera 65 and/or 500 may be used to capture images (including video) of the user's face and/or body to determine the user's emotional state, including the user's emotional reaction to augmented reality content. It will be appreciated that the augmented reality content generated by a particular determination of emotional state may be context sensitive. As noted above, in the context of a yes or no question, a detection of a frown on the user's face may be interpreted as a "no" input signal. In some other contexts, such as when a frown occurs during exercise routines, physical therapy, or other activities in which a goal is to continue the activity, the display system may be programmed to detect the activity (e.g., based on location, user inputs regarding engaging in the activity, etc.) and to provide augmented reality content that provides positive reinforcement based on the activity. For example, the display system may be configured to generate images and/or audio designed to motivate the user or to increase the user's confidence. As an example, the positive reinforcement may include displaying augmented reality content that shows how close the user is to achieving a goal (e.g., how much more time is remaining, etc.) and/or how much the user has improved their performance (e.g., graphically displaying measures of their speed, strength, etc.) relative to a baseline. In some other contexts, such as when the system detects that the user is in a particular setting (e.g., a commercial, industrial, military, or clinical setting) or in front of a home mirror, the system may be configured to provide motivational cues to the user related to that setting. In some embodiments, in response to a frown, the augmented reality content may include positive reinforcement regarding the user's appearance. For example, the display system may provide a signal indicating that the colors of a user's outfit and/or makeup fall within a range that may be considered complementary. It will be appreciated that the outfit and/or makeup may include augmented reality content generated by the display system.

With continued reference to FIG. 12, in some embodiments, eye tracking by the camera 500 (FIG. 5) and/or the camera 65 (FIG. 1B) may be utilized over the course of generating augmented reality content to modify the content that is generated. For example, the length of time that a user's eye remains focused on an object (the "time of stare") and/or the change in a user's pupil area may be interpreted by the display system as a sign of the level of interest in that object. A long length of time and/or an increase in pupil area may indicate a high level of interest in the object. In a retail setting, this may cause more items, of the same type as the object, to be displayed. For example, a user looking at a shoe, for a duration beyond a programmed threshold duration, may be provided with menu options for additional shoes that could be displayed overlaid a reflection of their feet. In some embodiments, the time of stare may be utilized to vary the speed at which options, displayed as augmented reality content, are presented to the user. For example, if the display system detects that the user's eye is fixated on a particular menu choice for a duration exceeding a programmed threshold duration, the system may slow or stop the display of other choices.

In some embodiments, a personalized menu and/or the types of content displayed may be started automatically based upon recognition of the user, through facial recognition, biometric data, or the detection of unique identifiers, e.g., using technology such as RFID or Bluetooth, on a device associated exclusively with the user. In some embodiments, the system 80 may be programmed to recognize the user by analyzing the user's reflection and/or detecting the unique identifier. A positive match results in the display of personalize augmented reality content. An example of an automatically initiated menu may include a "custom desktop" with the user's preselected content applications and customized content such as calendar, email, social media, news feeds, weather, traffic, etc. Advantageously, recognition protocols requiring the detection of identifiers unique to a user may allow greater security of the user's personalized content, in addition to allowing a single display system to be shared between multiple users while provided a personalized experience for each user. As noted herein, in some embodiments, the inward facing camera 500 may be utilized to provide an additional layer of security by, e.g., performing iris and/or retina recognition to confirm that the user is indeed the person wearing the display system 80 (FIG. 1B) before displaying personal or personalized augmented reality content.

It will be appreciated that the type of content displayed may be consistent every time block 710 is performed, or may be dynamic and vary depending upon various triggers. For example, a user's personalized menu may be initially displayed every time block 710 is performed. In some embodiments, the type of augmented reality content displayed may vary depending on various criteria (e.g., location, time/day/date, user appearance, external ambient cues, real time events received through news fees, social media feeds, etc.). These criteria may be ranked or assigned particular weights to determine the type of content to display in cases where more than one criterion is met. In some embodiments, augmented reality content may be automatically displayed, e.g., without requiring a virtual menu selection by the user. The content displayed may be determined by whether various preselected criteria (e.g., location, time/day/date, user appearance, external ambient cues, real time events received through news fees, social media feeds, etc.) are met. It will be appreciated that the display system may be programmed such that any, all, or a combination of the functions and types of augmented content disclosed herein may be accessed via menu selection, or started automatically without user input.

As discussed herein, in some embodiments, the types of content displayed, whether generated due to selection of a menu item or automatically generated after passing block 700, may be determined based upon time of day, day of week, and/or date. For example, the display system may be programmed to determine the date and/or time of date as part of blocks 700 or 710. Different results for the time of day may result in the display of different reminders regarding personal grooming activities, flossing teeth, the intake of medicine, ordering medications, etc. In some cases, alerts or reminders for recurring actions may be provided. For example, certain reminders may be associated with certain dates or days of the week; these reminders may be displayed once the actual date or day matches the trigger date or day for the reminder.

In some embodiments, the augmented reality content may be location specific and/or environment specific. The location of the user may be determined by receiving an input regarding location from the user. In some embodiments, the display system may include a GPS devices and/or accelerometer/compass device, which the system is programmed to access to determine location. In some embodiments, images captured by the camera may be analyzed by the local data processing module 70 or the remote processing module 72 (FIG. 1B) to determine the location of the user by comparing the images with features (e.g., signs, unique identifiers, landmarks and/or structures) stored in the display system. In some embodiments, the system is programmed to determine location by receiving a wireless identifier broadcasted particular locations (e.g., stores, restaurants, etc.). As an example, determination of location may identify a reflective surface as the mirror in the viewer's bathroom or a mirror in a commercial retail establishment, e.g., a department store, or in another establishment (e.g., a commercial, industrial, military, or clinical setting). The information displayed may be tailored to each location. For example, as disclosed herein, personal grooming information or reminders may be provided in the user's bathroom, while store advertisements may be provided in the department store.

In some embodiments, in addition to, or instead of being dependent on location, the augmented reality content may be dependent on features or properties of the user's environment (e.g., people, objects, or environmental conditions). For example, the camera 65 (FIG. 1B) or other cameras in communication with the display system may image the user's environment and the display system may be configured to identify features (people or objects) in that environment, or other sensors (e.g., temperature sensors) may be utilized to obtain data regarding the environment. The augmented reality content may subsequently be selected based on that identification of environmental features or data regarding the environment. For example, the identity of another individual in a reflection may be made using face recognition software, and the display system may generate augmented reality content that identifies that other individual. Such identification may be utilized, for example, to aid dementia patients identify caregivers or loved ones. As another example, the camera and environment sensor may identify a warm and sunny day, which may trigger other augmented reality content, such as an alert regarding a sale for hats or other merchandise appropriate for such a day.

In some embodiments, in some settings (e.g., in a physical store, or while viewing an on-line, virtual store), the augmented reality content may comprise sales offers or other alerts from the store in general, or the particular portion or department of a store in which the user is situated. In some embodiments, determining that the user is in a retail setting may initiate a subroutine as part of block 710. For example, the subroutine may include:

determining an identity of the user;
accessing a purchase or browsing history of the user; and
generating sales offers based upon the purchase or browsing history.

It will be appreciated that the display system includes a camera that may capture and catalogue items viewed by the user in the retail location or virtual store. Consequently, the system may "learn" from this browsing history, analyzing the items for a pattern or common features or category, and then displaying information, including sales information for likely items of interest to the user on that shopping session. In some embodiments, as additional browsing and purchasing information is gathered over the course of the shopping session, the sales offers that are displayed may be refined based on the additional information, which may increase the relevance of those offers. The items browsed or purchased on a shopping session may be stored in, e.g., the remote data depository 74 (FIG. 1B). This information may be accessed in future shopping excursions to provide content of relevance to the user.

In some embodiments, the identity of the user may be determined before block 710. In some embodiments, information regarding the identified user may be collected, e.g., by receiving stations in a retail location or in another establishment (e.g., a commercial, industrial, military, or clinical setting). In some embodiments, the receiving stations may be disposed on or proximate to the reflective surfaces (e.g., as part of the beacons on or proximate the reflective surfaces) and may include a process in connection with a memory device. The collection of information may include, for example, the user's activities, including transaction history, and previous whereabouts may be collected. In some embodiments, this information may be utilized to provide personalized content and/or may simply be collected for further use and analysis. For example, the information may be analyzed and augment reality content may be generated to direct the user to a particular location within a store based upon the collected information.

With continued reference to FIG. 12, in some embodiments, block 710 may include displaying augmented reality content that comprises images of clothing, clothing accessories, jewelry, or other articles that may be worn by a user. The images may be overlaid on the user's reflection, thereby simulating the user "trying on" one or more articles. It will be appreciated that this "trying on" may be performed in a retail setting (e.g., in front of a mirror in a brick and mortar store) or may be performed virtually (e.g., while the user is browsing items online, he or she may select an item to "try on" virtually).

In some embodiments, the augmented reality content may comprise images that overlay the user's reflection and modify a visually-observed property of the user's clothing or other article worn by the user. For example, one or more of the color, texture, and pattern of the article may be modified by displaying a image blocking out the reflection of the physical article and replacing that reflection with the augmented reality content. In some embodiments, the display system may be configured to change the appearance of the ambient environment around the user. For example, the display system may be configured to change the perceived lighting of the ambient environment. Lowlight conditions may be achieved by blocking light from reaching the user, while bright conditions may be achieved by augmenting the light reaching the user. Such changes in apparent lighting conditions may be used to, e.g., determine how an evening gown looks in low light or to determine how a bathing suit looks in bright light, respectively. In addition, the display system may be configured to change the appearance of the ambient environment itself. For example, the augmented reality content provided by the display system may include background scenery around the reflection of the user. As an example, the augmented reality content may include scenery corresponding to a ballroom setting to allow the user to see how an evening gown looks in that setting, or the augmented reality content may include a beach to allow the user to see how a bathing suit looks in a beach setting.

In some embodiments, the augmented reality content may comprise images that modify the user's view of a reflection of their body. For example, the augmented reality content may overlay the user's reflection to show the possible results of cosmetic surgeries, weight loss, teeth whitening, new haircuts, tattoos, permanent cosmetics, etc.

In some embodiments, the display system may include sensors to detect motion and/or changes in body position, as discussed herein. Information regarding motion or changes in body position may be used to enhance the augmented reality content. For example, after a virtual dress is displayed to overlie the user's reflection, accelerometers and gyroscopes attached to the display system (and thus to the user) may detect tilt and twirl of the user, and apply appropriate views of the virtual dress and/or perceptions of motion by the virtual dress. Similarly, movement of the user closer or farther away from the reflective surface may be tracked by motion or location sensors, or by distance sensors directed at the reflective surface, to determine the appropriate scaling for the augmented reality content. In some other embodiments, motion, changes in body position by the user, and/or the appropriate scaling for the augmented reality content may be accomplished by analyzing the reflection of the user, as captured by a camera (e.g., the camera 65, FIG. 1B).

As discussed herein, the display system may include wired or wireless communication channels, which may allow communications with remote servers (e.g., "cloud-based" servers), or with other display systems. In some embodiments, the display systems may be configured to share content by sending the content between display systems, through interconnections provided by these communication channels. The connections between display systems may be direct system-to-system connections, or may be provided through a network including one or more other computer systems. For example, a user may be able to view modifications to their own appearance, including changes in clothing, and may also be able to transmit this information to one or more other users. For example, the transmitted information may include images of the user's actual reflection and any augmented reality content overlaid on the reflection. The other users may see this information as augmented reality content in their display systems. Those other display systems may also be configured to transmit and share reflections of their users, including images of reflections having overlaid augmented reality content. The users may be in the same physical location, or may be remote from one another, with the shared content thereby providing an interactive, group experience. In some embodiments, microphones 67 and speakers 66 (FIG. 1B) on the display device allow the users to communicate with one another.

In some embodiments, the remote servers may be accessed by other individuals whether or not those individuals are users of a display system such as the display system 80. In some embodiments, the remote servers may be part of the remote data repository 74. The remote servers may be part of or accessible to various "social media" services or applications, which may provide access to a user's content under terms set by the services or applications. For example, the augmented reality content seen by a user may be shared by the user by uploading the content to a server managed by a third party service, which provides access to the content.

In some embodiments, the display system may be configured to transmit a portion of its data (e.g., the reflection of the user and/or augmented reality content generated for the user) to one or more other users, so that those users may experience the shared data (e.g., by viewing the user's reflection and/or augmented reality content). Thus, portions of one user's virtual world may be passed to a second user. For example, the display system may be configured to provide augmented reality content corresponding to an overlay for the first user to the second user. The augmented reality content may be clothing, such as a dress. Thus, the display system may be configured to allow both the first and the second users to virtually try on a dress by allowing augmented reality content corresponding to a dress to be overlaid reflections of both the first and the second users, or only a reflection of the second user after the first user has passed information regarding the dress to the second user. It will be appreciated that this information may include data other than image data of an object. For example, the information may include annotations or notes about the object, so that, e.g., the second user may receive comments from the first user about the object. These comments may be displayed as, e.g., augmented reality content in the form of, e.g., images, text, and/or sound. Examples of a system for passing and identifying content between users may be found in U.S. 2015/0235435, entitled Recognizing Objects in a Passable World Model in Augmented or Virtual Reality Systems, published Aug. 20, 2015, the entire disclosure of which is incorporated herein by reference.

In some embodiments, images and videos showing the augmented reality content displayed to a viewer and/or the user's view of the content along with their own reflection may be uploaded to the remote server. The upload may be initiated by an upload signal in the system 80 generated by, e.g., the selection of a virtual menu item by the user, by the use of voice commands, and/or by the use of body gestures or movements separate from voice commands or menu selections. Prior to, or after, generating the upload signal, the user may be provided with a menu option to upload one or more captured images or videos of the augment reality content only, or of the user's reflection in addition to the augmented reality information. For example, the user's reflection may be captured by the camera 65 and the augmented reality content may be the content provided to the display 62. The camera 65 may electronically communicate captured images or videos to the local processing and data module 70, which then communicates those images or videos to the remote servers. It will be appreciated that, in some embodiments, the augmented reality content may be temporarily stored in the local processing and data module 70 and uploaded to the remote servers, or may simply be routed by the local processing and data module 70 from other servers to the remote servers used for sharing content.

In one example, augmented reality content showing an item of clothing may be presented with a virtual button allowing the user to share an image of them "trying on" the item of clothing (e.g., a image of their reflection along with the item of clothing overlaying the reflection). Selection of the virtual button causes a virtual sub-menu to be displayed, with the option of capturing an image or a video. In some other embodiments, the sub-menu is obviated by using multiple content-sharing virtual buttons displayed simultaneously, one button to select for images to be shared and one button to select for videos to be shared. Once a selection is made, a camera on the display system captures an image or video of the user's reflection and causes the image or video and the associated augmented reality content to be uploaded by the local processing and data module 70 to a remote server accessible by others. Those others may then view the image or video on various other display devices, e.g., phones, personal computers, tablets, etc.

It will be appreciated that the collection of user information by a receiving station proximate to a reflective surface may effectively allow different reflective surfaces having receiving stations to share data via the user's wearable display system 80, even where the different reflective surfaces are not networked or otherwise do not communicate with one another (e.g., where the different reflective surfaces are in different departments within a store, or in different stores). Moreover, in some embodiments, the information need not be permanently stored in a particular user's wearable display system 80. Rather, in some embodiments, a portion or all of the information is simply transferred to the receiving station, where it may be analyzed and modified to possibly generate augmented reality content. The modified content may then be transferred back to the user's wearable display system 80, for later transfer to another receiving station on another reflective surface. In some embodiments, upon each transfer of the information (whether from the user's wearable display system 80 to a receiving station, or vice versa) the information is not retained in the device that transferred the information. In some other embodiments, all or a portion of the information is retained by the receiving station and/or wearable display system 80.

In some embodiments, some information is retained by the receiving station to enhance the subsequent interactions of the receiving station's associated reflective surface with users, e.g., other users. For example, the information may include augment reality content for specific other users. As the other user comes proximate to the reflective surface and is identified by the receiving station, the receiving station also compares the other user's identity against a list of users to receive content left by an earlier user. Once a positive match of user and content is made, the other user is shown the content left for them by the earlier user. Such content may include, e.g., images of the earlier user wearing particular merchandise near that receiving station's associated reflective surface.

In some embodiments, because the display system includes one or more cameras (e.g., outward and inward facing cameras), images of the user may be captured and analyzed to provide a health and/or beauty screening. The augmented reality content may be generated and then displayed based upon the results of the health and/or beauty screening. It will be appreciated that the health screening may be a physical and/or mental health screening. In some embodiments, the camera may include a sensor that may detect light of wavelengths outside of the visible spectrum (e.g., infrared or ultraviolet light) and may also include a light source to emit such light outside of the optical spectrum. The emitted light may illuminate the user and provide a basis for detecting conditions that are not apparent using visible spectrum light. In some other embodiments, the camera may be replaced by or may include a sound transducer and receiver for generating and receiving sound waves, respectively, (e.g., ultrasonic sound waves) for various detection purposes (e.g., mapping, depth sensing, and 3-D scanning, including scanning inside the user's body).

In some embodiments, the need for beauty products may be determined and an alert, suggesting products or procedures, may be displayed. For example, a visual analysis of the face may determine that high levels of facial hair are present. The detection of this facial hair may result in a suggestion for a shave, and/or the ordering of shaving cream.

In some embodiments, one or more images of reflections of the user are captured across an extended time interval. For examples, the images may be reflections of the user captured in block 700. The images may be stored, or data derived from the images (e.g., measures of facial features, color, etc.) may be stored, e.g., locally in the local processing and data module 70, or remotely in the remote data repository 74 (FIG. 1B). The local processing and data module 70 or the remote processing module 72 may be configured to perform a comparison between a current image of the user and the stored images or data.

The time interval over which images are captured and stored may be days, months, years, or possibly the entire span of time that the user utilizes the display system, which may include most of the lifetime of the user. In some embodiments, the frequency of the image capture may be set arbitrarily. Preferably, the frequency of image capture is at least weekly and, more preferably, daily, to allow a wide range of conditions and changes to the user to be evaluated.

Preferably, the images may be stored with or otherwise linked to stored data obtained contemporaneously with the images. For example, a given image may have associated information such as readings regarding the ambient light (e.g., the intensity of ambient light, the proportions of light of different wavelengths in the ambient light, etc.), the distance of the user from the mirror, the time of day, etc. Such data may help to aid in providing accurate comparisons between images taken at different times under different conditions. For example, the data may be utilized to normalize the captured images to aid in filtering out abnormalities caused by environmental conditions such as differences in the amount or wavelength distribution of the ambient light.

At block 710 (FIG. 12), the displayed augmented reality content may comprise results of the comparison. The results may include a notification that changes were found in, for example, hair color, hair length, skin color or tone, pore size, number and extent of wrinkles, muscle size and tone, etc. In some other embodiments, where the display system includes sensors for detecting non-visual parameters, or where the display system has access to other parameters (e.g., user body fat levels, body mass index, etc.), the displayed augmented reality content may include results of comparisons of these other parameters over time. Upon determining that notable changes are present, the display system may be configured to provide recommendations for treatments or products to address any conditions found. For example, the system may determine that one of the above noted parameters has deviated by a threshold amount (e.g., 5%, 10%, or 15%) from a previously captured baseline level. Once it is determined that the threshold for change has been exceeded, the system may display a suggestion for corrective action (e.g., make up, scheduling a haircut, etc.). The display system may also be configured to retrieve and display an older image of the user, to provide the user with a visual comparison between current and past versions of themselves. In addition, or alternatively, the system may be configured to display the expected results of the suggested treatments or products as augmented reality content. For example, as discussed herein, an image showing a new haircut and/or hair color may be displayed and overlaid the reflection of the user. In some embodiments, the display system may be configured to display images showing the expected results of the continuation of a particular trend. For example, to highlight changes in the user's body due to continual weight gain, the display system may be configured to overlay images on the user's reflection showing increases in the user's size due to the weight gain. As another example, images showing wrinkles or lines on the user's skin may be overlaid a reflection of the user to illustrate the wrinkles caused by long term smoking. It will be appreciated that the images showing the results of these trends may be displayed due to an input from the user indicating a request to display the images, may be displayed due to an input from a third party (e.g., a clinician), and/or may be displayed automatically as an output for a program after performing an analysis.

In some embodiments, the display system may be configured to provide fashion critiques to the user. For example, the display system may be configured to recognize and alert the user that the fly on the user's pants is open, that a shirt is unbuttoned (or is missing a button), that the user's clothes do not match, etc.

In some embodiments, a health analysis may be conducted by performing a comparison between the older images or older data and a recently captured image or data. For example, the comparison may detect changes in body shape, skin pallor, and skin features (e.g., discolorations). In some embodiments, the result of the comparison may be for the display system to display an alert that indicates that a change has been detected in a particular area and, optionally, that follow-up with a health care professional may be desirable. Similarly, a mental health analysis may be conducted. For example, images of the user may be analyzed for indicators of particular emotional states, including changes in emotional state over time and/or extended durations in an emotional state that may be considered out of the norm. The display system may be configured to provide an alert (to the user and/or a medical professional such as a doctor) regarding emotional states that may be cause for concern (e.g., extended periods of sadness).

In some embodiments, the comparison may be conducted based upon simply imaging the user's reflection and performing comparisons based upon that image without modifications to the image. In some other embodiments, the captured image of the user's reflection may be modified to amplify particular properties of the reflection. For example, minute variations in the reflection may be amplified by image processing in order to detect changes in the user. For example, colors in the reflection may be amplified, which may allow detection of, e.g., the pulsing of blood through visible parts of the user's body. In some other embodiments, the display system may be configured to amplify or magnify motion in order to detect minute (e.g., involuntary) motions of the user's body. The amplified image may be presented to the user to allow the user to make comparisons and/or may be presented to a third-party, such as a clinician, for diagnostic purposes. In some embodiments, the image modification and amplification of particular properties of a reflection may be performed on features in a reflection other than the user (e.g., features such as other people and/or objects).

In some embodiments, the comparison may detect changes in the visual symmetry of the user's body, and may provide an alert (to the user and/or a medical professional such as a doctor) regarding the lack of symmetry. For example, the lack of symmetry may be evident when a user only shaves half of their face or puts lipstick on half of their lips. It will be appreciated such a lack of symmetry may be the result of certain medical conditions, such as hemispatial neglect (in which patients, e.g., stroke patients only acknowledge half of the world). The user alert regarding the lack of symmetry may be accompanied with a request by the display system for the user to confirm whether the lack of symmetry is intentional or unintentional and/or the alert may simply include a reminder to the user to perform various actions on a side of their body that they may unintentionally not have performed. In some embodiments, an unintentional lack of symmetry may be indicative of an underlying medical condition and may be followed with a suggestion for further medical follow-up, and/or a direct alert to a medical professional.

In some embodiments, the health analysis may utilize images of the user captured from multiple different angles. For example, the user may be situated in front of a plurality of reflective surfaces, which are aligned with the user at different angles. The display system may be configured to capture views of the user from each of these different reflective surfaces, to provide a more complete view of the user.

In some embodiments, a single reflective surface may be used to provide different views of the user. For example, as part of the health analysis, the display system may capture one view of the user (e.g. of the user's front), and then prompt the user to position themselves (e.g., by turning) in one or more other orientations to capture other views of the user (e.g., left and right sides of the user). These other views may be captured using multiple cameras on the display system, which capture these other views as the user turns and their reflection comes into the line of sight of the different cameras. In some other embodiments, these other views may be captured by a single camera, by instructing the user to turn their heads towards the reflective surface as their body turns.

In some embodiments, a distance sensor may be utilized to determine the distance between the user and the mirror. The display system may then use this distance determination to ask the user to position themselves to provide a desired view of the user's reflection. For example, historical comparisons of the user's reflection may be more accurate when the user is at a consistent distance from the mirror. The display system may signal to the user to move closer or farther from the mirror, as appropriate, in order to provide this consistent distance. The display system may also be programmed to analyze, in real time, the orientation of the user's body in the reflection and may also prompt the user to orient their body in a desired position for image capture. For example, the display system may be configured to display an image of a virtual outline, halo, or other overlay to the user, showing the correct orientation, and the user may then move their body to fit into or follow the virtual outline, halo, or other overlay.

It will be appreciated that the various body position analyses and/or the capture of different views of the user's body, as noted above, may be applied to health analyses or to other analyses for generating augmented reality content. For example, different views of the user's body and/or prompting the user to orient their body in a particular position may be applied generally as part of providing augmented reality content on the user. For example, overlying different clothes on the user's reflection may include prompting the user to turn their body, to provide views of the clothes from different perspectives.

In conjunction with the health analysis, or as augmented reality content that may simply be selected for display by a user, the augmented reality content displayed at block 710 may comprise medical information of the user. For example, the medical information may include, without limitation, one or more of weight, height, and body mass index. In some embodiments, the display system may be configured to access data, through wired or wireless communication channels, from sensing devices configured to measure various properties of the user's body. For example, devices may be one or more of a scale, a thermometer, a sphygmomanometer, pulse oximeter, glucometer, capnography system, heart rate monitor, and neural monitors, and readings from these devices may be displayed to the user as augmented reality content. In some embodiments, the readings may be stored, e.g., in the remote data repository 74 (FIG. 1B).

In some embodiments, the display system may be utilized for remote medical diagnosis (e.g., health analyses) and/or treatment. For example, one or more of the various readings noted above may be transmitted to remote medical personnel, optionally along with one or more images of the user's reflection (as seen by the camera 65 (FIG. 1B)). The readings and/or images may be viewed by the medical personnel in real time and real time communication (auditory and/or visual) with the user may be utilized to diagnose medical conditions and/or provide treatment. In some embodiments, the augmented reality content may include suggested movements, postures, and/or positions for the user's body to address various conditions (e.g., wrist alignments to address carpal tunnel syndrome from typing, head maneuvers to address vertigo, etc.). The augmented reality content may display the suggested movements, postures, and/or positions in sequence, so that the user may attempt to match their reflection with the suggested movements, postures, and/or positions. For example, a semi-transparent animation may be overlaid the user's reflection, to allow the user to follow along with a particular movement. Examples of additional health analyses are discussed below in the section entitled "Example Health Analyses."

In some embodiments, the remote diagnosis or treatment may take advantage of retinal or iris scan and detection, as discussed herein, to facilitate secure HIPAA compliant transactions. For example, a retinal or iris scan may be conducted and the identity of the user may be confirmed before starting a remote diagnosis or treatment session, which may be conducted using encrypted communications.

In some embodiments, as part of the health analysis, or as an educational or novelty feature, the display system may be configured to display augmented reality content that includes medical imagery. For example, images of bones and/or organs may be overlaid on the reflection of the user.

As discussed herein, the outward and/or inward facing cameras 65, 500 may be used to capture images of the user to look for indications of the user's emotional or mental state. For example, the cameras 65, 500 may be configured to capture images of the user and the local processing and data module 70 may be configured to detect the presence of indications of particular emotions in the user. In some embodiments, as discussed herein, these indications of emotional or mental state may be used to as inputs to determine the type of augmented reality content to be displayed.

In some embodiments, the display system 80 may be configured to "read" body language, and/or facial movements and expressions to provide a mental health analysis. For example, the display system may be configured to detect both facial expressions and body language to detect the presence of an emotion in the user. As an example, the detection of the presence of a frown on the user's face (determined based, e.g., on the orientation of the user's lips and month in comparison to the typical orientation of the user's lips and month, as determined over time) along with a slouched posture (based, e.g., on a comparison of the user's posture in the present, relative to the posture over time) may indicate sadness. As another example, gaze aversion by the user (particularly where gaze aversion was not observed previously) may indicate feelings of guilt, or may indicate another behavioral issues outside of the norm (e.g., shyness, Autism Spectrum Disorder, etc.). The display system 80 may be configured to use these observed indicators as a trigger to display certain types of augmented reality content. For example, a determination that the user has sadness may trigger the display of augment reality content, or recommended products or services, to address this emotional state and support the user's emotional health. As an example, the augmented reality content may include visual affirmations and/or audio affirmations to provide encouragement to the user. If the user does not respond to the affirmations, the display system may optionally be configured to alert a health professional of the user's condition, to provide options for further treatment.

In some embodiments, the displayed augmented reality content may include instruction or training for activities in which particular movements of the user's body (including their face) are desired. Examples of such other activities include sports, acting, giving speeches, therapy, etc. These activities may be performed in front of reflective surface to, e.g., provide a view of the user from the standpoint of an audience member. In addition, the display system may be configured to provide augmented reality content in real time, and the augmented reality content may be used to aid the user in assuming various postures, performing various movements, pronouncing words, making various facial expressions, etc.

In some embodiments, the displayed augmented reality content includes instructional aids. For example, line diagrams or an image of a person may be generated by the display system and overlaid the user's reflection, so that the user may attempt to align themselves with the lines or the corresponding parts of the image, which may be static or may change dynamically to show a particular motion. In some embodiments, the instructional aids are used as part of a training, physical therapy, or occupational therapy program. For example, images of the user in certain positions or performing certain motions may be captured, saved, and compared over time (e.g., the difference in position or motion of the user may be plotted and/or shown by being displayed to the user, and the comparison may be saved and tracked over time to gauge the progress of the therapy). As another example, speech therapy may be performed by overlaying augmented reality content that includes an animation or other moving image showing the correct position of the mouth for making certain sounds. Advantageously, these various types of content may provide real time feedback regarding whether the user is correctly assuming a posture or performing a motion. For example, many sports utilize particular motions or postures that participants seek to emulate. Sports such as weight lifting, yoga, martial arts, dance, etc. may require that the participant's body assume various postures or motions to increase effectiveness and/or reduce the likelihood of injury. The display system may be configured to display images showing these various postures or motions, as discussed above.

Figure 13:
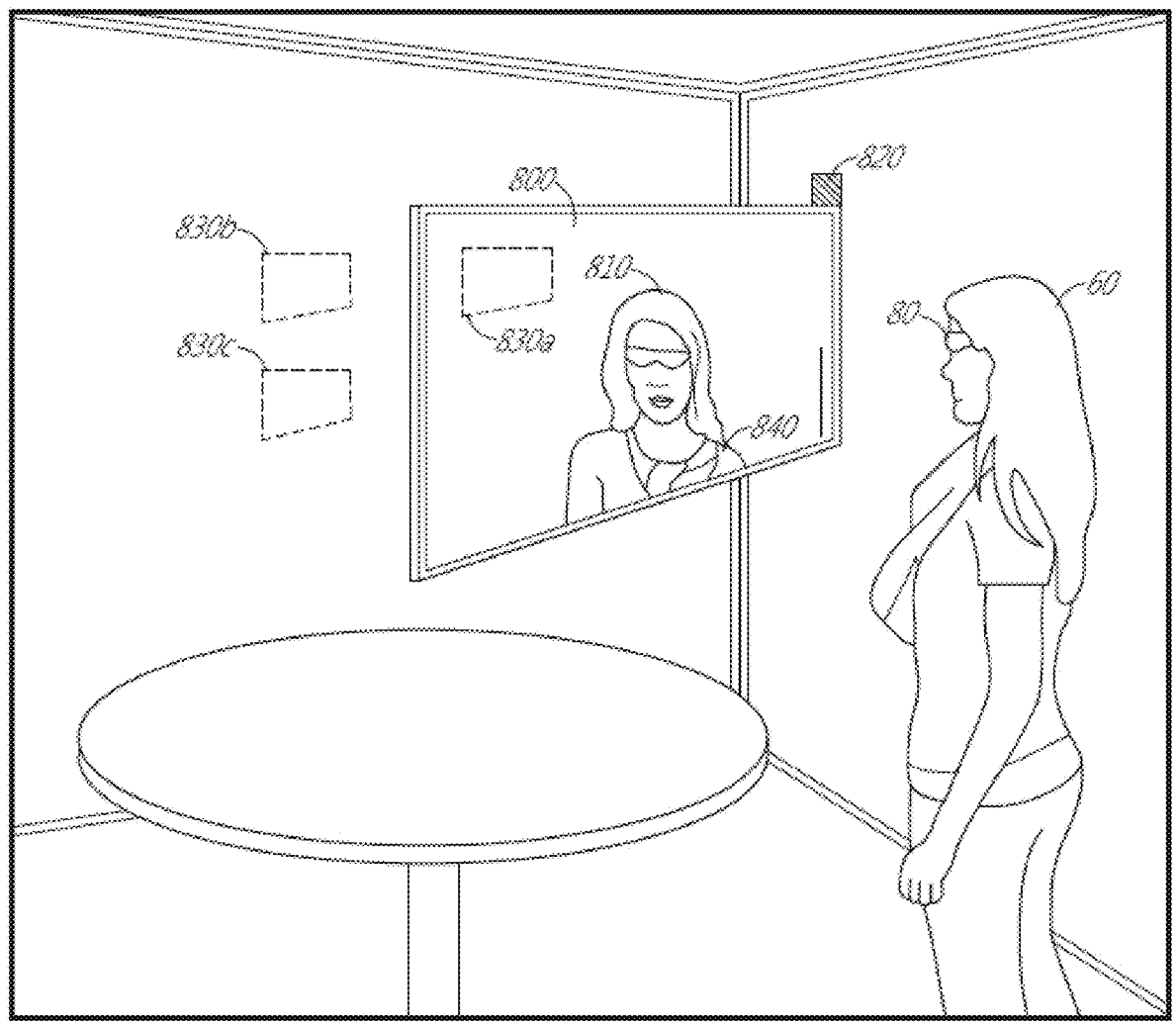
FIG. 13 illustrates an example of a user interacting with an AR display system.

With reference now to FIG. 13, a user 60 interacting with an AR display system 80 is illustrated. The user 60 is situated in front of a reflective surface 800 (e.g., a specular reflector, such as a mirror), which provides a reflection 810 of the user. In some embodiments, the reflective surface 800 includes a beacon or unique identifier 820 that provides a signal to indicate that the user is in front of the reflective surface 800. As disclosed herein, the display system 80 is configured to detect that the user's reflection is within the field of view of the user 60. Once the reflection is detected, augmented reality content is displayed to augment the user's view of the ambient environment. For example, virtual menu items 830a-830b may be displayed. The items 830a-830b may be displayed so that they appear to be disposed on the reflective surface, or may be anywhere else in the field of view of the user 60. As described herein, the user may interact with the menu and make various selections to display further content. In some other embodiments, the content may automatically be generated, e.g., based on the user's location as determined by a location-determining device (e.g., GPS unit) on the display device 80.

As described herein, the augmented reality content may include modifications to the user 60's appearance. For example, a property of the user's clothing may be changed. As illustrated, a striped pattern may be overlaid the reflection of the user's clothing. As also described herein, notifications 830c may be displayed to, e.g., provide reminders or other information to the user. In some embodiments, as described herein, the display device 80 may capture images of the reflection 810 to perform analyses and generate information to be displayed to the viewer, such as notifications 830c. It will be appreciated that the augmented reality content is typically only visible to the user 60, since it is generated by the display system 80 and directed specifically to the user's eyes. Consequently, the illustrated content will be understood to be representative of what is seen by the user 60 and not necessarily what would be seen by a third party. In addition, multiple types of content (notification, menu items, and modifications to user appearance) are illustrated. However, in various embodiments, only one or only a combination of the various types of content disclosed herein may be displayed simultaneously.

The various types of content may be displayed as appropriate for the viewer to view them at block 710 (FIG. 12). Because mirror-imaged objects may be reversed from how they appear when directly seen by a viewer (rather than when seen in a reflection), the display system may be configured to display mirror image versions of objects. For example, the display system may display a virtual object in one orientation when the viewer is directly viewing that object, and then reverse that orientation (to form the mirror image of that object) when the viewer is viewing that object in a detected reflection (e.g., when showing front side and backside views of a virtual object). In some embodiments, however, such a reversal is not made; for example, the display system may be configured to display words, such as for menu items, without reversing the words whether the words overlap the reflection or not. As a result, in some embodiments, content that is part of a scene may be reversed when seen in the reflection, and notifications or other content that is not part of a scene are displayed without being reversed, such that the content has the same orientation and appears the same whether or not that content overlies and displayed as part of a reflection.

In some embodiments, the display system may be configured to display an image that replaces and reverses a reflection of real world content at block 710 (FIG. 12). For example, the display system may be configured to recognize the mirror images of letters (which may not be readable to the user due to being reversed), and upon detecting such mirror imaged letters, the display system may be configured to display an image in which those letters are reversed (thereby providing letters that are easily read by the user). For example, the display system may include or have access to a database containing letters having different fonts and the reverse mirror image versions of each of the letters, with a one-to-one correspondence between a normal letter and a mirror image version of the letter. The display system may be configured to use image recognition to detect a mirror image version of a letter in images detected by an outward facing camera and, upon detecting such a mirror image letter, the display system may be configured to display the normal version of the letter for that mirror image version as augmented reality content. This augmented reality content may overly and effectively replace the mirror image letter.

Figure 14:
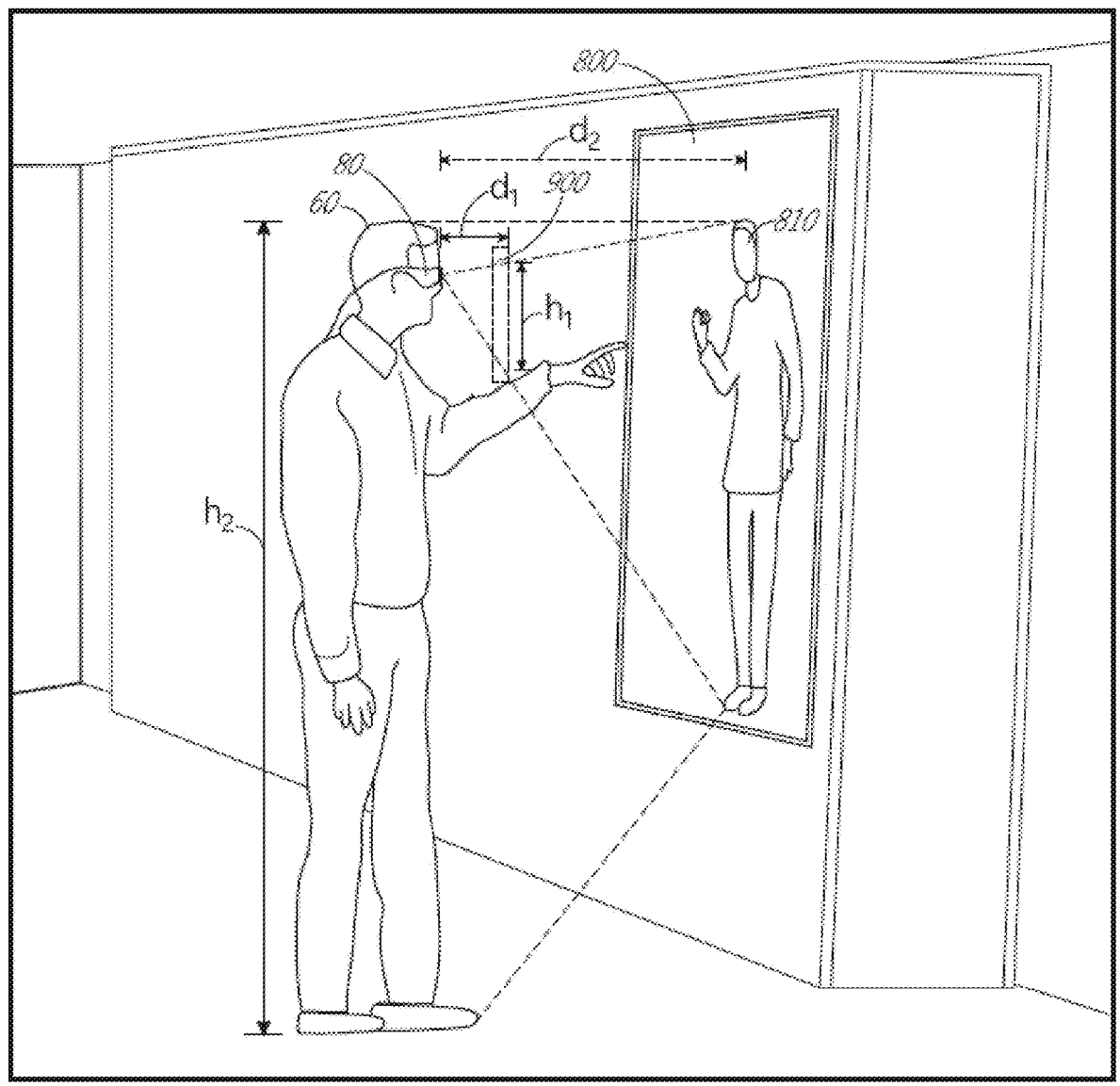
FIG. 14 illustrates an example of the use of a virtual scale for determining dimensions of features of the user using the user's reflection.

With reference now to FIG. 14, the displayed augmented reality content of block 710 (FIG. 12) may include a virtual scale to determine the dimensions of objects in the user's environment. FIG. 14 illustrates an example of the use of a virtual scale 900 for determining dimensions of features of the user 60 (e.g., the user's height) using the reflection 810. It will be appreciated that the virtual scale 900, having a known size $h_1$, may be placed on an arbitrarily selected depth plane that is set at a known virtual distance $d_1$ from the user 60. For example, the virtual scale 900 may be a virtual measuring stick which allows the user 60 to easily determine $h_1$, by visual inspection. Thus, the quantities $h_1$ and $d_1$ are known. Also known is the quantity $d_2$, the distance from the user 60 to the reflective surface 800. The quantity $d_2$ may be determined using the distance sensor 69. Because $d_2$ is the distance from the user 60 to the mirror 800, rather than the distance traversed by light rays from the user 60 to the reflective surface 800 and then back to the user 60, $d_2$ may need to be multiplied by 2 in some embodiments. Consequently, the sizes $h_2$ of features of the user 60, seen in the reflection 810 may be determined using the following equation:

$$h_2 = 2d_2 \times \frac{h_1}{d_1}$$

In the illustrated drawing, $h_2$ is the height of the user 60. In some other embodiments, $h_2$ may be the width or length of other features, including different parts of the user's body, such as the width of their waist, the width of an arm or bicep, etc.

In some embodiments, where the entire distance from the user 60 to the mirror 800 and back again to the user 60 may be measured directly (e.g., where the distance sensor 69 is an optical distance sensor, which emits and receives light that may be reflected by the mirror 800), the following equation may be used to determine $h_2$:

$$h_2 = d_2 \times \frac{h_1}{d_1}$$

In some embodiments, the virtual scale 900 may include markings, e.g., for height, that are calibrated based on the distance of the reflection 810 such that the user may determine $h_2$ simply by a visual determination of where the reflection 810 is located on the virtual scale 900 and/or how much of the scale is occupied by the reflection 810. Advantageously, in some embodiments, whether $h_2$ is determined using the equations above or using another method, the virtual scale 900 may be displayed on a depth plane having a similar accommodation state to the depth plane of the reflection 810, so that both the virtual scale 900 and the reflection 810 are in focus, thereby facilitating the user's visual determination of $h_2$.

In some embodiments, $h_2$ may be calculated and displayed to the user 60. For example, measurements of the user's body may be displayed as augmented reality content, e.g., in order to provide feedback to the user 60 as part of an exercise regimen. In yet other embodiments, the measurement may not be displayed to the user 60. In some embodiments, the measurement may be stored for historical analysis.

In some embodiments, the display system may be configured to modify reflected images to address distortions in the reflective surface. It will be appreciated that the reflection of an object off of a curved reflective surface may be distorted relative to the actual object. For example, at certain distances (e.g., beyond the focal length of the mirror) concave mirrors will provide reflections in which the object is seen as being upside down and larger than the actual object, while convex mirrors may provide reflections in which the object is smaller than the actual object. The display system may be configured to correct for distortions in reflections caused by curvatures in the reflective surface.

In some embodiments, correction for the distortions caused by the curvature of the reflective surface includes:
determining a curvature of the mirror;
determining a distance between the mirror and the user;
imaging a reflection of the user in the mirror;
modifying the imaged reflection to reverse distortions caused by the mirror: and
displaying the modified reflection to the user and/or correcting for optical measurements taken of the user based on captured images of the user.

In some embodiments, determining the curvature of a concave mirror includes solving for the focal length of the mirror using the following equation:

$$\frac{1}{f} = \frac{1}{u} + \frac{1}{v}$$

It will be appreciated that f is the focal length of the concave mirror, u is the distance from an object (which is outside of the focal length of the mirror) to the mirror, and v is the distance from an in-focus image of the object to the mirror.

In some embodiments, u may be a known quantity which may be accessed by the display system or provided by the user. In some other embodiments, u may be measured. For example, the user may stand by the object and utilize a distance sensor that is part of the display system to measure the distance between the user and the mirror, which would be understood by the display system to be approximately equal to the distance between the object and the mirror. In some embodiments, the display system may prompt the user to move to the object and to provide an input to the display system to trigger detection of the distance to the mirror.

To determine the quantity v, the user may move with a screen relative to the mirror to determine where an image of the object is clearly focused by the mirror onto the screen (e.g., a piece a paper). In some embodiments, the display system may be configured to prompt the user to move relative to the mirror (e.g., by providing audible instructions and/or by providing visual instructions as augmented reality content at block 710 (FIG. 12) and to signal to the display system when an image of the object is clearly focused onto the screen. In some embodiments, once a focused image of the object is achieved, the display system may be configured to determine a distance between the user and the mirror. This distance may be understood by the display system to be the quantity v. Once v and u are known, the display system may be configured to solve for f. It will be appreciated that the radius of curvature R of the concave mirror is equal to 2f.

In some embodiments, the distance ($d_o$) between the user and the mirror may be determined using various sensors of the display system (e.g., acoustical distance sensors), as disclosed herein. In addition, the reflection may be imaged using an outward facing camera, as disclosed herein. The apparent size of the user or other object ($h_o$) in the reflection may subsequently be determined (e.g., by analysis of the captured image of the user). In some other embodiments, a sensor such as a downward facing depth sensor attached to the frame 64 (FIG. 1B) of the display system may be configured to measure the distance from the frame 64 to the ground, thereby providing a reference distance $h_i$ for the determination of M. Having determined R, $d_o$, and $h_o$, the true object height ($h_i$) and the magnification (M) of the curved surface may be calculated. For example, $$h_i = \frac{R h_o}{R - 2d_o} \text{ and } M = \frac{h_i}{h_o} = \frac{R}{R - 2d_o}.$$

In some embodiments, M is calculated directly by determining the quantities $h_i$ and $h_o$. As discussed herein, $h_o$ is the apparent size of an object in the reflection and may be determined using image analysis of images captured of the reflection. $h_i$ is the true size of the object and may be a known value, e.g., a value stored in a database accessible by the display system and/or measured using a sensor. The display system may be configured to determine $h_i$ by accessing the database. The display system may subsequently be configured to determine the magnification using the equation $$M = \frac{h_i}{h_o}.$$

In some embodiments, the true object height and the magnification may be utilized to scale the sizes of objects reflected in the mirror (e.g., the user). It will be appreciated that the size of the reflected objects will further depend upon the distance of the user from the reflective surface. Preferably, scaling the true object height and the magnification is adjusted based upon the distance between the object and the mirror. For example, a larger distance between the user reflective surface would cause a reduction in the size of the image displayed by the presented by the display system at block 710 (FIG. 12). In some embodiments, where the display system may perform image analysis to determine the sizes of features in a reflection, knowledge of the magnification may be utilized to correct for distortions in the sizes of reflected objects or the user due to the mirror, e.g., by solving of the true height of an object.

With reference again to FIG. 12 it will be appreciated that augmented reality content may be generated by the display system for reflections whether or not the user of the display system is in the reflection. At block 700, a determination is made as to whether a reflection is within the viewer's field of view. In some embodiments, the determination regarding the presence of the reflection may be a determination regarding whether a reflection of the user is within the user's field of view. In some other embodiments, the determination regarding whether a reflection is within the viewer's field of view may be a determination regarding whether a reflection is present even if a reflection of the viewer is not present, as disclosed herein. For example, the display system may be configured to determine the presence of indicia of reflections, such as the reversing of the left-to-right orientations of symbols or other markings in objects in the viewer's field of view. In some embodiments, rather than detecting reversals in features of a user caused by reflective surfaces, the display system may be configured to detect reversals of features on an object or scene and/or other indicia of reflections in a scene rather than on the face of the user.

With continued reference to FIG. 12, once a reflection is determined to be present in the viewer's field of view, the routine may proceed to block 710. In some embodiments, block 710 may include providing augmented reality content with information regarding objects in the viewer's field of view. This information may include an indication that an object is unknown to a viewer.

It will be appreciated that the display system may be configured to continuously image the ambient environment and to identify objects in that environment. Preferably, this imaging and identification is performed automatically, without requiring user-intervention. Identification of these objects may be conducted by accessing various stores of knowledge, including remote or local data repositories such as databases. In some embodiments, the display system may be connected to other display systems, directly and/or through intermediary computer systems that share a common data repository. The display systems may each be configured to share information with other display systems, e.g., by adding content to the common data repository. As a result, multiple display systems may be configured to augment the information contained in the common data repository, thereby providing a more complete store of information that otherwise might be available. For example, different display systems may view a scene from a different perspective, thereby providing views and knowledge of objects that are not available to all users.

It will be appreciated that image recognition by the display system may be configured to detect objects that are not mirror-imaged. In some embodiments, once a reflection has been found, the display system may be configured to reverse the reflected image, and to perform object recognition using the reversed image. For example, the display system may be configured to process the captured image and to digitally reverse the image to obtain an image file corresponding to a mirror image of the mirror image. It will be appreciated that an image file for the object may include multiple views of the object (e.g., the image file may be a three-dimensional image file that contains visual information about the object from multiple perspectives).

Image recognition by the display system may include facial recognition in which people are identified based upon features in the reflection of their face. In some embodiments, the display system may be configured to recognize people in the reflection and to display information regarding those people. The display system may display information regarding the status of the reflected person relative to the user. For example, the status information may include an indication of whether the person is a friend, an enemy, someone that the system and/or the user has identified as being a desirable person to encounter, and/or someone that the display system and/or the user has identified as someone to be avoided. It will be appreciated that the image recognition of people may include identifying features other than those on the person's face. For example, hair and/or body features may be utilized to facilitate the recognition of people by the display system. It will be appreciated that image recognition may compensate for the orientation of the person or object, for example, such that image recognition may be performed whether a person is standing vertically or horizontally.

In addition to determining the identity of a person based upon their reflection, the display system may also be configured to determine various other characteristics of the person based upon the reflection. For example, the display system may be configured to identify the person's body language and therefore to infer the person's emotions, social interactions, responses to situations, etc. based upon their appearance and/or actions in the reflection.

Image recognition by the display system may also include the recognition of objects generally. Examples of such objects include shoes, sale signs, smoke, fire, and animals (e.g., dogs, skunks, etc.), and the user's personal items (e.g., the user's hat, purse, laptop, etc.).

Once an object is recognized by the display system, the display system may be configured to proceed to block 710 (FIG. 12) and provide augmented reality content that alerts the user to information regarding the identified object. For example, the display system may be configured to remind a user that one of their possessions is on a table, an item such as shoes are on a display or on sale, smoke or fire is present, etc. As discussed herein, it will be appreciated that the alerts may take various forms, including, e.g., audio or visual notifications, and vibrations transmitted to the user.

In some embodiments, alerts about an identified object may be generated based upon the identification of that object as being desired by the user. The desirability of the object may be determined based upon, e.g., a historical analysis of indicators of the user's level of interest in the object. For instance, the display system may have access to the user's internet search history and may be configured to access the search history. A match between the identified object and frequent internet searches by the user for the object (e.g. a determination that the user has searched for a particular object more than a pre-determined threshold number of times) may indicate that the user desires that object (e.g., new shoes). In some embodiments, gaze time on an object may be utilized to determine whether the user has a high level of interest in that object. Longer gaze times are understood to correspond to higher levels of interest. In some embodiments, when the gaze time exceeds a predetermined threshold level, the display system may be configured to provide an alert that indicates that the objects may be highly desired by the user. It will be appreciated that other physical or behavioral signs by the user may also be utilized to determine the presence of interest in the objects. For example, pointing to the object and/or a widening of the eyes or pupils in response to seeing the object may be interpreted by the display system as signs of interest. In some embodiments, multiple signs of interest are evaluated and determined to be positive before making a determination that the user is indeed interested in the object.

It is possible that the user may encounter objects in reflections that are not known to the display system. For example, image recognition by the display system may fail to identify objects in the reflection, with facial recognition failing to recognize individuals in the reflection.

With continued reference to FIG. 10, at block 710, the display system may be configured to display augmented reality content that overlies objects that are not recognized by the system. In some embodiments, unrecognized objects may be optically highlighted. For example, the unrecognized objects may be overlaid with an indicator (e.g., a particular color) that the user understands is associated with unrecognized objects. In some embodiments, recognition of an object by the display system, or the degree of confidence of the display system in recognizing the object, may also be indicated. As an example, the system may be configured to provide a green highlight over and/or around known items, a yellow highlight over and/or around partially-known items, and a red over and/or around unknown items. In some embodiments, the indicator of the unrecognized object may include text, audible signals, flashing boxes, and/or haptic feedback.

It will be appreciated that the inability to identify an object may sometimes be caused by the object being disposed in an orientation that makes recognition by the display system difficult. In some embodiments, the display system may be configured to reorient the captured image of the object such that the object is provided in one or more other orientations, and the display system may be configured to perform its object recognition protocol on an image with each of these orientations. For example, text on the object may not be recognizable upside down, but may become recognizable if the captured image of the object is rotated 180°.

In some embodiments, once an object is signaled to the user as being unrecognized, the display system may be configured to allow user-assisted identification of the unrecognized object. For example, the user may be presented with text/voice messages, virtual user menus, etc. that provide the user with an opportunity to identify the unrecognized object. The user may then provide the identity of the unrecognized object via, e.g., text/voice messages and/or selections on the virtual user menu. The display system may be configured to update its data repository to store the identity of the object. The display system may also be configured to update the data repository that is shared between multiple users.

In some embodiments, to aid the user in identifying an object, the display system may be configured to present augmented reality content, as part of block 710 (FIG. 12), that includes the object displayed as a virtual object, which may be reoriented (automatically by the display system and/or based upon instructions provided by the user) in order to facilitate user identification of the object. For example, as noted above, upside down text on an object may become understandable by having the display system re-render the object as a virtual object that is rotated 180°.

In some other embodiments, the display system may be configured to identify objects based on "learned behavior" and/or "network-assisted identification." For example, the system may be configured to make a "guess" regarding the identity of an object based upon historical data regarding a particular context for the object, such as the location of the object in a store. As an example, the display system may recognize that the user is in a candy store, but is unable to recognize an object for sale in that store due to variations in color, size, shape, etc. Nevertheless, the display system may be configured to provide a preliminary identification of an unknown object for sale as being candy, due to the identity of the store and possibly other indicia such as the location of the object in a row of other objects known to be candy. In some embodiments, the display system may be configured to prompt the user for a confirmation regarding the identity of the object.

In some embodiments, network-assisted identification may be conducted. For example, if the display system is unable to identify an object based on its local database, the system may be configured to access a network that may include information provided by other users to attempt to identify the unrecognized object. In some embodiments, the display system may be configured to simply access the network as part of identifying objects in the first instance, and to flag the object as being unrecognized after attempting to identify the object by accessing the network.

With continued reference to FIG. 10, at block 710, the display system may be configured to display augmented reality content that identifies objects that were previously identified in the user's field of view but are no longer in that field of view. For example, the display system may be configured to notify the user that an object belonging to the user is no longer in the reflection (e.g., due to the user walking away from the reflective surface), that a child is no longer in the reflection, and/or that a stranger or friend is no longer in the reflection. The notification may take various forms, including augmented reality content such as text or flashing boxes, audible signals, and/or haptic feedback.

It will be appreciated that many objects may be identified by the display system and subsequently fall out of the reflection due to, e.g., movement of the user and/or the object. In some embodiments, the display system may be configured to auto-identify or identify through user selection a subset of objects that will cause a notification to be presented to the user. The display system may also be configured to provide notification of the disappearance of an object from the reflection, with the notification being provided based upon "dwell time." For example, the display system may be configured to monitor the amount of time that a user is spending looking at a particular object. If the dwell time exceeds a preset threshold, then the display system may be configured to provide a notification of the disappearance of the object from the reflection.

In some embodiments, the display system may be configured to alert the user regarding the timed occurrence and/or reoccurrence of objects in a reflection. For example, the display system may be configured to alert the user that a person has appeared in a reflection for a duration that exceeds a pre-selected threshold duration. As another example, the display system may be configured to alert the user that the same person has reappeared in a reflection for a number of times that exceeds a pre-selected threshold number of times. The display system may also be configured to determine whether the user is observing similar reflections in multiple instances of the user coming upon a reflective surface. In such a scenario, the display system may be configured to determine that the user is lost and/or that the user has been to the same location before due to the reoccurrence of similar reflections.

Example Communications Among Multiple Wearable Systems

Figure 15:
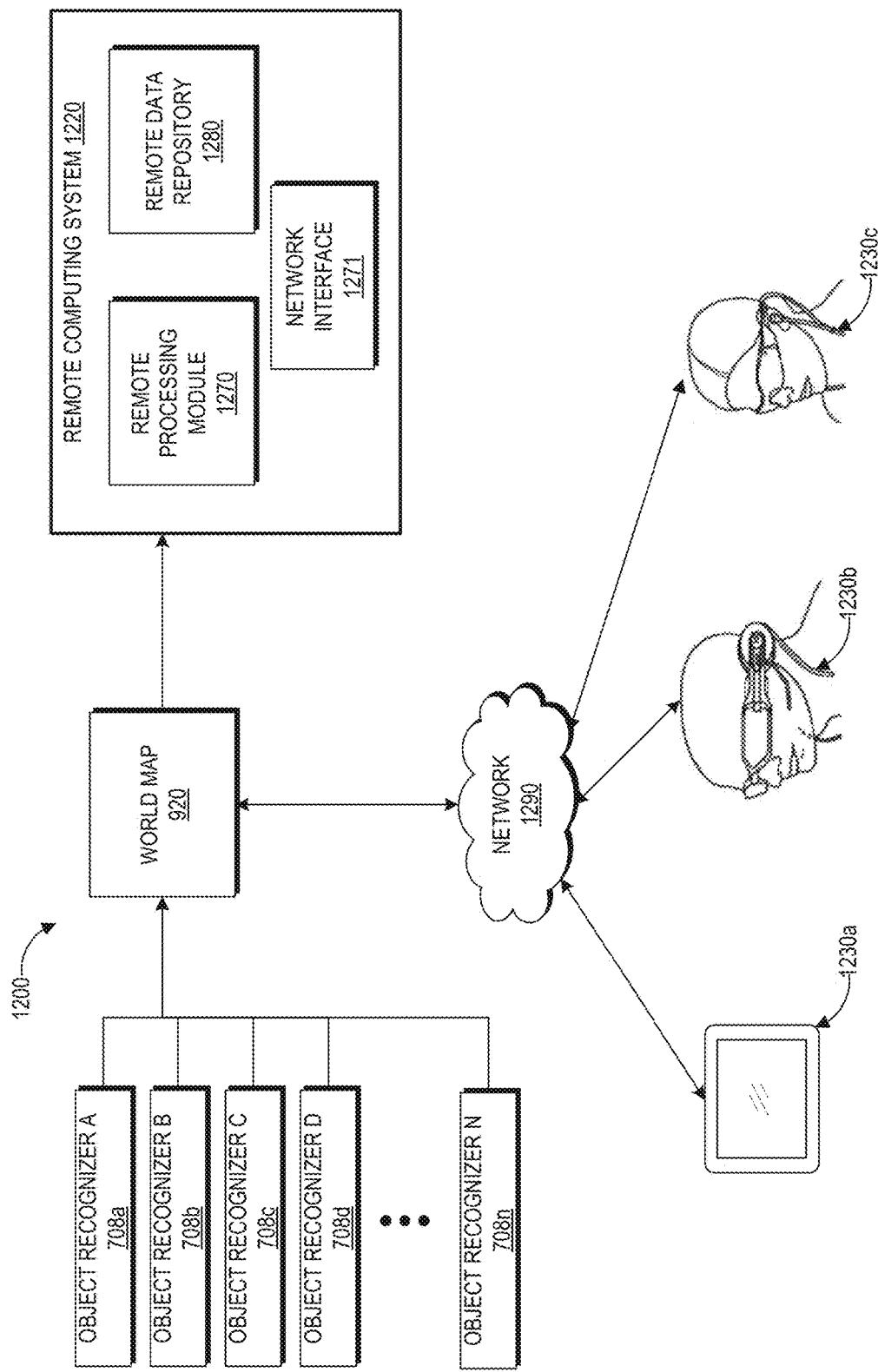
FIG. 15 schematically illustrates an overall system view depicting multiple user devices interacting with each other.

FIG. 15 schematically illustrates an overall system view depicting multiple user devices interacting with each other. The computing environment 1200 includes user devices 1230a, 1230b, 1230c. The user devices 1230a, 1230b, and 1230c may communicate with each other through a network 1290. The user devices 1230a-1230c may each include a network interface to communicate via the network 1290 with a remote computing system 1220 (which may also include a network interface 1271). The network 1290 may be a LAN, a WAN, a peer-to-peer network, radio, Bluetooth, or any other network. The computing environment 1200 may also include one or more remote computing systems 1220. The remote computing system 1220 may include server computer systems that are clustered and located at different geographic locations. The user devices 1230a, 1230b, and 1230c may communicate with the remote computing system 1220 via the network 1290.

The remote computing system 1220 may include a remote data repository 1280 which may maintain information about a specific user's physical and/or virtual worlds. The remote data repository may be an embodiment of the remote data repository 74 shown in FIG. 1B. The remote computing system 1220 may also include a remote processing module 1270. The remote processing module 1270 may be an embodiment of the remote processing module 72 shown in FIG. 1B. The remote processing module 1270 may include one or more processors which may communicate with the user devices (1230a, 1230b, 1230c) and the remote data repository 1280. The processors may process information obtained from user devices and other sources. In some embodiments, at least a portion of the processing or storage may be provided by the local processing and data module 70 (as shown in FIG. 1B). The remote computing system 1220 may enable a given user to share information about the specific user's own physical and/or virtual worlds with another user.

The user device may be a wearable device (such as an HMD or an ARD), a computer, a mobile device, or any other devices alone or in combination. For example, the user devices 1230b and 1230c may be an embodiment of the wearable display system 80 shown in FIG. 1B (or the display system 1000 shown in FIG. 5) which may be configured to present AR/VR/MR content.

One or more of the user devices (e.g., 1230a-1230c) may be used with the user input device 504 shown in FIG. 5. A user input device may obtain information about the user and the user's environment (e.g., using the outward-facing imaging system 502 shown in FIG. 5). The user device and/or remote computing system 1220 may construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models will sometimes be referred to herein as a world map or a world model. As described with reference to FIGS. 7 and 9, information acquired by the user devices may be used to construct a world map 1210. The world may include the map 920 described in FIG. 9. Various object recognizers (e.g. 708a, 708b, 708c . . . 708n) may be used to recognize objects and tag images, as well as to attach semantic information to the objects. These object recognizers may include the object recognizers 708a and 708n shown in FIG. 7.

The remote data repository 1280 may be used to store data and to facilitate the construction of the world map 1210. The user device may constantly update information about the user's environment and receive information about the world map 1210. The world map 1210 may be created by the user or by someone else. As discussed herein, user devices (e.g. 1230a, 1230b, 1230c) and remote computing system 1220, alone or in combination, may construct and/or update the world map 1210. For example, a user device may be in communication with the remote processing module 1270 and the remote data repository 1280. The user device may acquire and/or process information about the user and the user's environment. The remote processing module 1270 may be in communication with the remote data repository 1280 and user devices (e.g. 1230a, 1230b, 1230c) to process information about the user and the user's environment. The remote computing system 1220 may modify the information acquired by the user devices (e.g. 1230a, 1230b, 1230c), such as, e.g. selectively cropping a user's image, modifying the user's background, attaching semantic information to the objects in the user's environment, and adding virtual objects to the user's environment. The remote computing system 1220 may send the processed information to the same and/or different user devices.

Mirror Detection Using Cues

An HMD may use an outward-facing camera to image an environment around the user of the HMD. The environment may include a mirror.

The wearable system may use one or more cues to detect the presence of the mirror. For example, the cues may be based on recognition of keypoints in the mirror image of the environment, analysis of co-motions between the mirror image and the physical object, detecting a depth discontinuity around the edge of the mirror, identifying the presence of the user's head in the mirror, recognition of the wearable device as a reflected image in the mirror, identifying features of the mirror (such as shape and location), or providing an active query from the wearable device (such as an infrared pulse, radio frequency (RF) interrogation signal, or a flash light), etc. The cues may be used individually or in combination to determine the presence of the mirror in the user's environment. Once detected, the mirror may properly be accounted for in the 3D map as a mirror rather than an opening into another room.

Although the examples are described in terms of a mirror, the present disclosure is not intended to be limited to mirrors. The techniques described herein may be used for any type of reflective surface such as, e.g., a window. For example, particularly at night, a window in a lighted room may appear substantially reflective, because the environment outside the room is dark.

Example Cues in Images of the User's Environment

Figure 16:
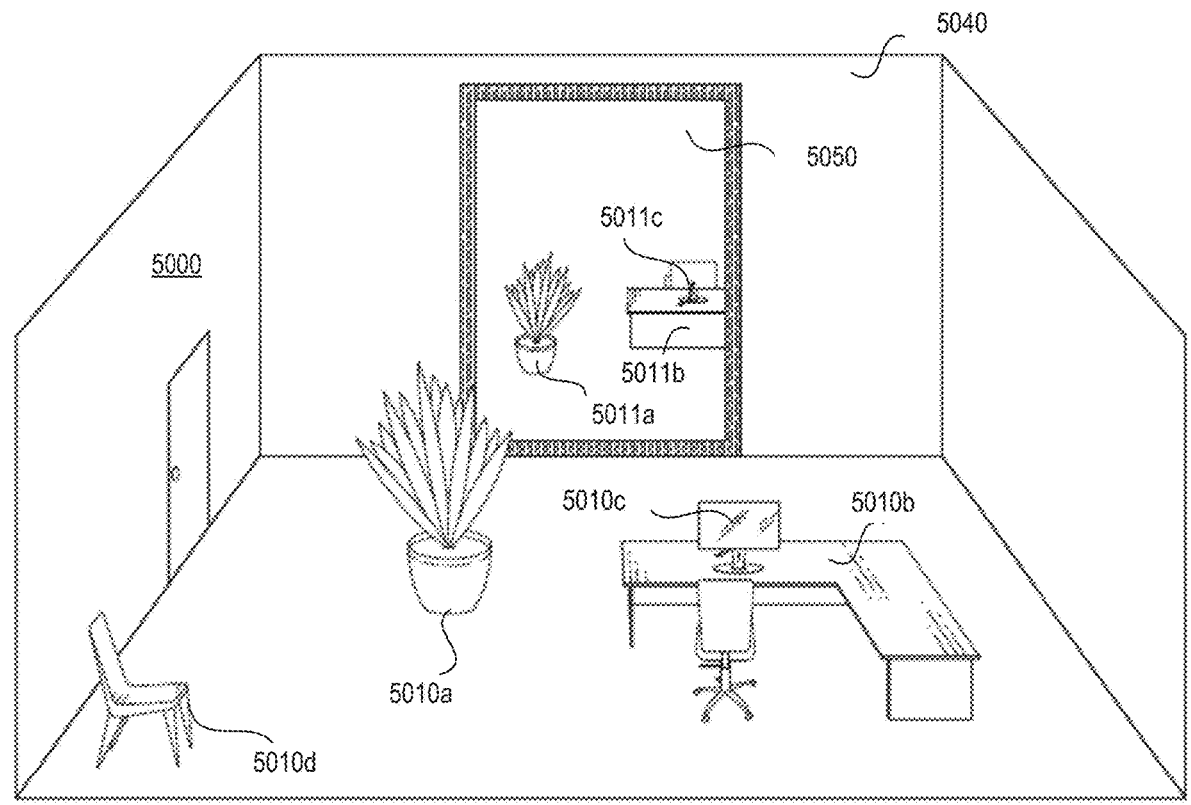
FIG. 16 illustrates examples of detecting the presence of a mirror using one or more cues.

FIG. 16 illustrates an example of a single room including a mirror that reflects objects in the room. The room 5000 in FIG. 16 has a variety of physical objects 5010 (such as, e.g., a plant 5010a, a desk 5010b, a computer monitor 5010c, and a chair 5010d). The mirror 5050 in the room 5000 may reflect ambient light in the room 5000. As a result, there may be reflected images 5011 of the physical objects 5010 in the room 5000. For example, in FIG. 16, the reflected images 5011 may include a reflected plant 5011a, a reflected desk 5011b, and a reflected monitor 5011c).

A user wearing an HMD may stand near the mirror 5050 in the room 5000. The user may perceive the mirror 5050 and reflected images 5011 associated with the mirror through the HMD. The HMD may image the user's environment using the outward-facing imaging system 502 (e.g., shown in FIG. 5). For example, the HMD may obtain images of the mirror 5050, the reflected physical objects 5011, the wall 5040, as well as images of physical objects 5010.

However, because the wearable system may not know whether an object imaged by the HMD is a reflected object or a physical object, the wearable system may analyze the images to identify one or more cues indicative of the presence of a mirror. For example, as further described below, the cues may be based on keypoints recognition, a co-motion test, a depth discontinuity, the presence of the user's head, explicit recognition of the wearable device, features of the mirror, active query from the wearable device (such as an infrared pulse or a flash light, etc.). The cues may be used individually or in combination to determine the presence of the mirror in the user's environment. These cues may also be used to track the mirror as the user moves around in his environment.

These cues may also be used to distinguish whether an observed object is a mirror or an aperture. An aperture may be physically passable, such as an open doorway through which physical objects may pass. The aperture may additionally or alternatively be visually passable, such as a window, through which the user may see beyond the structural components (such as a wall) to which the aperture is attached. The classification of an object as an aperture or as a reflective mirror surface is not meant to be mutually exclusive. In some situations, an object may have properties of both a mirror and an aperture. For example, a window may be classified as an aperture when it is open or when it is sufficiently transparent to allow the user to see through the window. The window may be classified as a mirror if it is sufficiently reflective (like a mirror) at night, when the environment outside the window is dark. Further details of the cues are described below.

Cues Using Keypoints Recognition

The wearable system may compare keypoints (or any other type of feature used in computer vision) of a portion of the image with the maps of the user's environment to determine whether the image contains reflected images of the objects in the environment. If the keypoints in the two maps match, the wearable system may consider the match as a cue indicating the presence of a mirror. In some embodiments, the keypoints comparison techniques may be implemented by simultaneous location and mapping techniques (e.g., SLAM, visual SLAM, or similar algorithms).

With reference to FIG. 16, the wearable system may compare one or more keypoints in the acquired image with the keypoints in the map of the room 5000 to determine whether the acquired image includes a mirror. For example, the wearable system may use leaf tips of the plant 5010a in room 5000 as keypoints. The HMD may acquire an image with the mirror 5050 and the leaf tips of the reflected plant 5011a. The wearable system may compare the leaf tips of the reflected plant 5011 with the map of the room 5000 (which includes leaf tips of the actual plant 5010a) and determine whether there is a match between the 2 sets of keypoints. The wearable system may make such comparison based on the location of the keypoints and/or relative positions among the keypoints.

Additionally or alternatively, the wearable system may compare geometries of the keypoints in the image acquired by the HMD with the geometries formed by keypoints in the map. A geometry may include a determination of a geometric relationship among features of the object such as, e.g., distances between features, open angles formed between features, etc. For example, in FIG. 16, the wearable system may compare the shape of the reflected plant 5011a in the acquired image with the shape of the plant 5010a in the room 5000 (as stored in the world map). The wearable system may determine if the shape of the reflected plant 5011a matches the shape of the physical plant 5010a. The wearable system may also compare the open angles formed by a set of keypoints in the acquired image with the open angles formed by another set of keypoints in the map. If the open angles in the two set of keypoints match, the wearable system may use it as a cue for the presence of the mirror. The wearable system may implement such geometric comparison in 3D capable systems.

In certain embodiments, triplet neighboring keypoints may be used to search for matching geometry in the environment. For example, the wearable system may determine a set of neighboring keypoint triplets in the image acquired by the outward-facing imaging system 502. The wearable system may calculate open angles among the neighboring triplets and match the calculated open angles with the open angles in a known map of the environment. The wearable system may use the Shazam algorithm or other similar algorithms to detect matches.

Some keypoints may have one or more particular behaviors under the reflection and the wearable system may use such behaviors to identify the presence of a mirror. For example, a set of keypoints may be positioned reversely in the mirror (such as reversed text). The wearable system may axially transform the positions of one or more keypoints in the image to determine matches. The wearable system may also axially transform the geometries formed by the keypoints (e.g., geometric shapes formed by the keypoints). Similarly, the Wearable system may axially transform the image of an object (such as, e.g., the reflected plant 5011a) and compare the transformed image with the image of a known object (such as, e.g., the actual plant 5010a) in the room 5000. The wearable system may compare the transformed image with the image of the physical environment and determine whether these two images match. In some embodiments, the wearable system may axially transform keypoints, objects, geometries formed by the keypoints in the map of the environment. The wearable system may compare these transformed images with images acquired by HMD and determine whether a match exists.

The wearable system may set a threshold for the amount of matches. If the amount of matches reaches this threshold, the wearable system may identify the images as reflected images and the mirror 5050 as having a reflective surface. Otherwise, the images are considered to be images of physical objects. The wearable system may also set a threshold for an amount of mismatches. If the amount of mismatches reaches the threshold, the wearable system may mark the objects associated with those images as physical objects; otherwise, those images are considered as reflected images.

Sometimes, when the user of the HMD is positioned sufficiently far away from the mirror, the HMD may observe the physical object and the mirror object in the same image. For example, in FIG. 16, if the user stands behind the plant 5010a and faces the mirror 5050, the wearable system may acquire an image with both the physical plant 5010a and the reflected plant 5011a. The keypoints recognition techniques and other techniques described herein (such as object recognition techniques) may also be applied to disambiguate the physical objects and the reflected objects in the same image.

Advantageously, the keypoints recognition techniques may be combined with other cues for checking whether a geometric region may potentially be a mirror. For example, the wearable system may recognize an image of the HMD 1320a (shown in FIG. 17A) in the mirror. The wearable system may identify a region around the reflected image 1320b (shown in FIG. 17A) of the HMD and apply one or more keypoints recognition techniques to verify or falsify whether the identified region is a mirror. For example, the wearable system may axially transform the keypoints in the identified region around the reflected image 1320b and calculate open angles among a set of neighboring keypoints triplets. The wearable system may compare the calculated open angles with the open angles in the map of the environment and determine whether the open angles match.

Cues Using Object Recognition

In addition or in alternative to keypoints recognition, the wearable system may recognize a reflected image of an object. This reflected image may be used as a cue for mirror detection. The HMD may acquire images of objects in the user's environment using the outward-facing imaging system 502 or cameras external to the HMD. The wearable system may compare known image of a physical object with the acquired image of the physical object to determine whether the acquired image includes a reflected image.

For example, in FIG. 16, the wearable system may have stored the images of the computer monitor 5010c in the room 5000. The wearable system may obtain a reflected image 5011c of the computer monitor using the outward-facing imaging system 502 and compare the reflected image 5011c with the image 5010c of the computer monitor. In some embodiments, the reflected image of the object may not have the same characteristics as the image of the physical object. As shown in FIG. 16, the reflected image 5011c of the monitor includes the back side of the monitor 5010c while the image of monitor as captured by the outward-facing imaging system 502 may include the front side of the monitor. The backside of the monitor 5010c may include characteristics that the front side of the monitor 5010c doesn't have. The wearable system may use this difference in characteristics to determine whether the image includes a reflected image.

The wearable system may recognize the HMD itself for mirror detection. For example, with respect to FIG. 17A, the user 1360a, wearing the HMD 1320a, may be standing in front of the mirror 1330, and the HMD 1320a may detect a reflected image 1320b of the HMD in the mirror 1330. If the wearable system determines that the reflected image 1320b matches the image of the HMD 1320a, the wearable system may tag the regions around the reflected image 1320b as a mirror.

In certain embodiments, because the image may be reversed under reflection, the wearable system may axially transform either the stored image or the reflected image and analyze whether the two images are for the same object. For example, the HMD may detect an image 1360b of a person and an image 1320b of an HMD. The HMD may determine that the image 1360b is a reflected image of the user 1360a while the image 1320b is a reflected image of the HMD 1320a, and therefore the region around the images 1320b and 1360b is a mirror.

Cues Using Features of the Mirror

The wearable system may also use features of an object as cues. For example, the wearable system may use an object recognizer 708a (e.g., described with reference to FIG. 7) to identify features (such as a frame or a shape of the object, position of the object on a vertical wall) that may be associated with the object being a mirror. The wearable system may also apply deductive reasoning to further distinguish features of the object as a mirror from features of other objects that are not mirrors.

For example, in some situations, the image of a mirror frame (surrounding the mirror) and the image of a picture frame (surrounding a picture or painting) may look similar. The wearable system may assume the frame is a mirror frame and use deductive reasoning (such as to look for a reflected image) to verify (or falsify) this assumption. Alternatively, the wearable system may assume the frame is a picture frame and use deductive reasoning to verify or falsify this assumption (e.g., no reflected images are identified).

In some embodiments, the wearable system may use distance recognition techniques (for example, with a stereoscopic system or a depth camera) to analyze whether an object is a mirror or a picture frame. This is possible because the image of the object in the picture frame (e.g., the picture or painting) is within the same plane as the picture frame (e.g., substantially coplanar with the picture frame) while the image of an object in a mirror (e.g., a reflected image of the user or an object in the user's environment) typically has a depth that is behind the plane of the mirror and is not coplanar with the mirror. Accordingly, by determining the depth of objects appearing within the frame, the HMD system may distinguish whether the frame is associated with a mirror.

The shape of the mirror may be a cue. Typically, a mirror has a rectangular or oval shape, although other shapes are possible. The wearable system may detect a rectangular object or oval object in the user's environment. The wearable system may tentatively designate such object as a mirror and use other cues described herein to further verify (or falsify) whether the object is a mirror. Conversely, the wearable system may tentatively designate such object as a non-mirror aperture (e.g., window or doorway) and use other cues described herein to further verify (of falsify) whether the object is a non-mirror aperture.

The wearable system may also use other features of the mirror such as size, location, surface normal, etc. to determine the presence of the mirror. For example, mirrors in many cases are hung on vertical walls and do not extend entirely from floor to ceiling. Other objects hanging on vertical walls may not be a mirror, for example, paintings, flat screen displays, etc. Detection of a rectangular object on a vertical wall, which occupies only a portion of the vertical wall, may indicate to the wearable system that the object may (or may not) be a mirror. Further, if the surface normal of the object is perpendicular to the wall (or parallel to a surface normal of the wall), then the object is likely to be hanging relatively flat against the wall and is more likely to be a mirror or picture. The wearable system, after detection of a possible mirror object, may use other cues described herein to determine whether the object is a mirror (or not).

Example Cues Using Distance Recognition

In some embodiments, the wearable system is capable of measuring depth. The depth may be measured using optical techniques (e.g., stereoscopic imaging using an outward-facing imaging system) or using active electromagnetic or acoustic signals (such as using a lidar system or an acoustic depth sensor). The wearable system may identify a boundary of an object that may be a mirror. The wearable system may make depth measurements near an edge of the object. Detection of a discontinuity in depth measurements arising from the edge of the object (e.g., a frame of a mirror) may be a cue that the object is a mirror.

However, in some situations (such as when the depth is measured stereoscopically), the wearable system may obtain similar depth discontinuity information when the object is in fact an aperture (e.g., a window or doorway). To distinguish an aperture from a mirror, the wearable system may use other cues such as facial recognition, keypoints recognition, or other techniques described herein to further verify the presence of a mirror.

Example Cues Based on Query from the HMD

The wearable system may verify the presence of a mirror by sending a query from the HMD. The query may comprise one or more signals. The signal may be an electromagnetic signal (e.g., an optical signal), an acoustic signal (e.g., ultrasound), etc. For example, the HMD 1360a (shown in FIG. 17) may cast a light onto an object (e.g., infrared light). If the wearable system detects that the light flashes back, then the wearable system may use it as a cue to determine the object has a reflective surface. In certain embodiments, the wearable system may set a threshold for the strength of the signal received when determining whether a surface is a reflective surface. For example, although multiple objects (such as a polished stone table top) in the user's room may reflect light, the mirror typically will reflect more light than the other objects. As a result, the wearable system may set the threshold for reflection to be sufficiently high so that the wearable system may reduce the likelihood of falsely identifying an object as a mirror. Likewise, the acoustic reflective signature of a mirror may be higher than the acoustic reflective signature of a wall.

The HMD may also passively receive a signal from a device associated with the mirror. For example, the mirror may have one or more labels attached to it. For example, a label 5340 shown in FIG. 18 may be attached to a mirror surface or a frame or be placed nearby the mirror. The label may be an optical label comprising information (e.g., a bar code, a quick response (QR) code, or sticker with patterns) that may be read by an optical sensor (e.g., the outward-facing camera of the HMD). The information may include identifying information (e.g, that the object is a mirror) or other information about the mirror (e.g., its size, etc). The label 5340 may include a radio-frequency identification (RFID) tag (active or passive) that may be interrogated (or which may broadcast its presence) to determine identifying information about the object (e.g., that it is a mirror). As another example, the label 5340 may comprise an acoustic emitter that outputs an acoustic signal (e.g., at ultrasonic frequencies) that is detected by an acoustic sensor on the HMD. The acoustic signal may include information identifying the object as a mirror, similar to the RF information.

These query techniques may be used in conjunction with other cues. For example, the wearable system may apply keypoints recognition techniques and tentatively identify an object as a mirror. The wearable system may then send a query to the identified object to verify whether the object is indeed a mirror. This may be advantageous because the query from the HMD may use substantial energy, and applying the query technique as a final verification (as opposed to constant queries from the HMD) may reduce the energy required by the HMD.

Example Cues Associated with the User

Figure 17A:
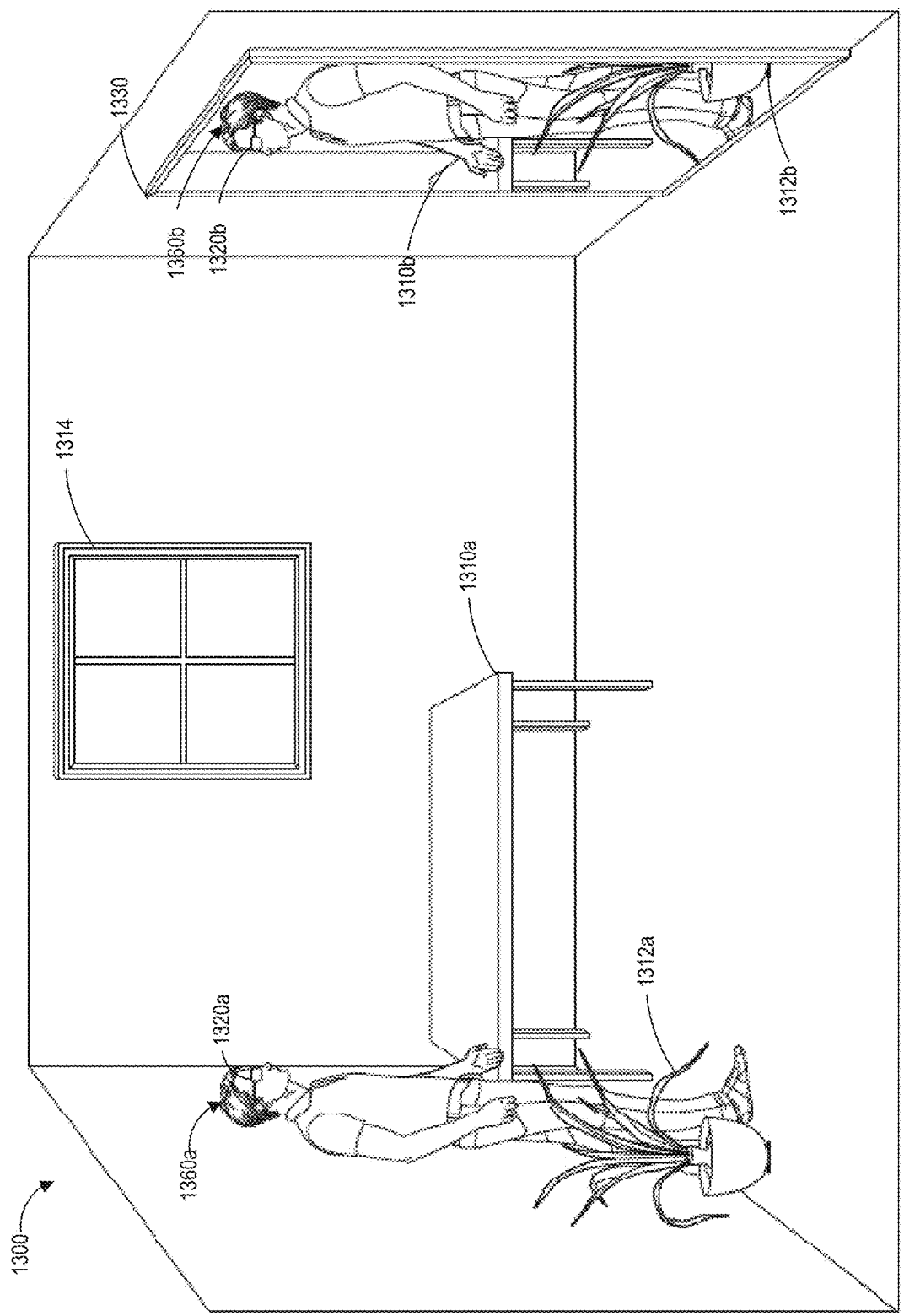
FIG. 17A illustrates examples of mirror detection using cues associated with the user.

The mirror may be detected using cues associated with the user. With reference to FIG. 17A, the user 1360a is standing in a room 1300. The user is wearing an HMD 1320a. The room 5300 has a variety of objects (e.g. objects 1310a, 1312a, 1314) including a mirror 1330. The mirror 1330 may reflect ambient light in the room 1300. As a result, the HMD may capture a reflected image 1360b of the user, a reflected image 1320b of the HMD, and reflected images (e.g., 1310b, 1312b) of the objects in the room 1300.

Cues Using Facial Recognition

The wearable system may be configured to detect a user's face by the outward-facing imaging system. The presence of the user's face in the image acquired by the outward-facing imaging system may be a cue for the presence of a reflective surface (such as mirror). This is possible because a user usually won't be able to see his own face unless there is a reflective surface providing a reflected image of his face.

The wearable system may recognize the face of the user 1360a (as opposed to another person in the room 1300) by comparing the reflected image of the user with a known image of the user's face. The image of the user's face may be obtained using a variety of techniques. For example, the HMD 1320a may use the inward-facing imaging system 500 (also referred to as camera 500 in FIG. 5) to obtain an image of the user's face while the user is putting on the HMD 1320a. The HMD 1320a may also obtain the user's facial image by turning the outward-facing imaging system 502 toward the user and imaging the user's face using the outward-facing imaging system 502. The wearable system may obtain the user's image through other channels, such as by taking a photo of the user 1360a using a camera external to the HMD 1320a.

When the HMD 1320a is imaging the room 1300, the outward-facing imaging system 502 may capture a reflected image of the user's face in the mirror. The wearable system may compare the reflected image with a known image of the user face and determine whether these two images of the face belong to the same person. If the wearable system determines there is a match between the user's face and the reflected face, the wearable system may tag the region around the reflected image of the user's face as a mirror.

In certain embodiments, the wearable system may process the known image of the user or the reflected image of the user to determine a match. For example, when the user is not directly facing the mirror, the wearable system may rotate the model of the user's face to compare the side of the user's face with the acquired image of the user's face. In another example, the wearable system may "remove" the HMD 1320b in the reflected image of the user's face and optionally patch in the portion occluded by the HMD. The wearable system may compare this processed image with an unoccluded image of the face of the user to determine whether the images identify the same person. Similarly, the wearable system may "add" an image of the HMD to the known image of the face and compare this processed image with the acquired image of the user.

The wearable system may also use other techniques to identify the face. For example, the wearable system may recognize certain features of human face such as nose, mouth, ears, etc. The wearable system may use any facial recognition algorithms to implement this technique.

Cues Based on User's Indication

The wearable system may use the user's previous or current indication on whether an object is a mirror as a cue for mirror detection. For example, when the wearable system identifies an object that may be a mirror using the techniques described herein, the wearable system may provide a user-selectable element (e.g., a menu, button, toggle, etc.) allowing the user to input that this is indeed a mirror). If the user responds affirmatively, the wearable system may designate the object as the mirror. As another example, the wearable system may be trained to recognize mirrors. For example, a user may indicate an object as a mirror. Based on this indication, wearable system may acquire the properties of the object such as shape, size, location, optical characteristics, etc., and associate these properties with the mirror. The wearable system may use these properties later on to detect the presence of a mirror.

Cues Based on Movements of the User

The wearable system may also detect the presence of a mirror by acquiring the user's movement data. The movements may include: speed, acceleration, or position change (such as rotation, movement from one location to the other, etc.). The wearable system may include an inertial measurement unit (IMU) to determine the position or orientation of the user or a portion of the user's body (e.g., the user's head). The IMU may include one or more of: accelerometers, gyroscopes, magnetometers, etc. The wearable system may additionally or alternatively use an outward-facing imaging system 502 to determine the user's pose or movement of a portion of the user's body (e.g., a user's hand making a gesture). Additional details are described with reference to FIGS. 1B, 5, and 9 to acquire such movement data. The wearable system may use the comparison between the movement data and visual data acquired by the outward-facing imaging system as a cue for presence of a mirror. If a comparison between movement data and visual data suggests that the user's movement is consistent with the visual data observed by HMD, the wearable system may tag the region of the image associated with the visual data as a mirror.

Figure 17B:
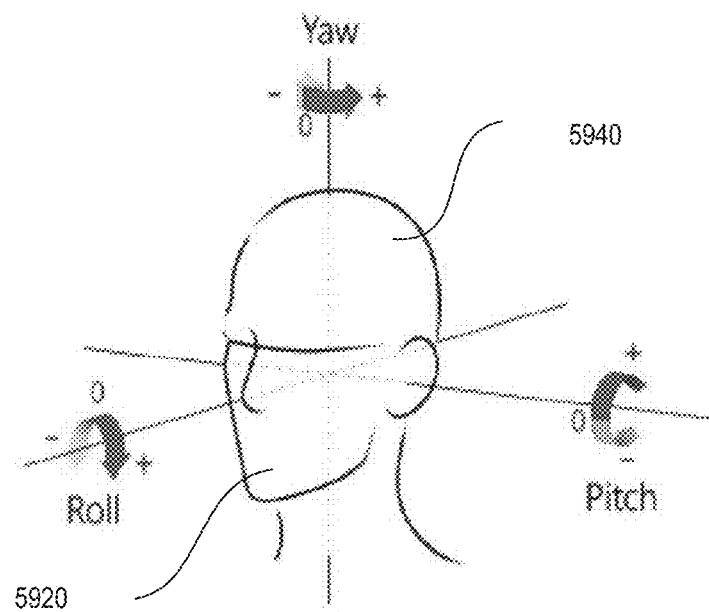
FIG. 17B illustrates an example of a 3D angular coordinate system that may be used to define head pose of a user.

In certain embodiments, the wearable system may detect changes in head pose. FIG. 17B illustrates an example of a 3D angular coordinate system that may be used to define head pose of a user. For example, as shown in FIG. 17B, the user's head 5940 may have multiple degrees of freedom. As the head 5940 moves toward different directions, the head pose will change relative to the natural resting direction 5920. The coordinate system in FIG. 17B shows three angular degrees of freedom (e.g. yaw, pitch, and roll) that may be used for measuring the head pose relative to the natural resting state 5920 of the head. As illustrated in FIG. 17B, the head 5940 may tilt forward and backward (e.g. pitching), turning left and right (e.g. yawing), and tilting side to side (e.g. rolling). In some other embodiments, other techniques or angular representations for measuring head pose may be used, for example, any other type of Euler angle system. These changes in head pose may be recorded and compared with reflected images of the user's head obtained over a certain time period. If the wearable system determines discrepancies between the movement data of the head and the observed visual data of the head, the wearable system may detect the presence of the mirror.

Advantageously, this technique may be combined with other cues such as facial recognition. For example, the wearable system may initially recognize a face in an object that may be a mirror using facial recognition. To further distinguish whether the observed face is the reflected image of the user's face or another person's face, the wearable system may observe the movements of the face and compare such movements with movement data of the user. If these two movements correlate with each other, the wearable system may determine the observed face is a reflected image of the user's face and thereby detect the presence of the mirror.

Figure 18:
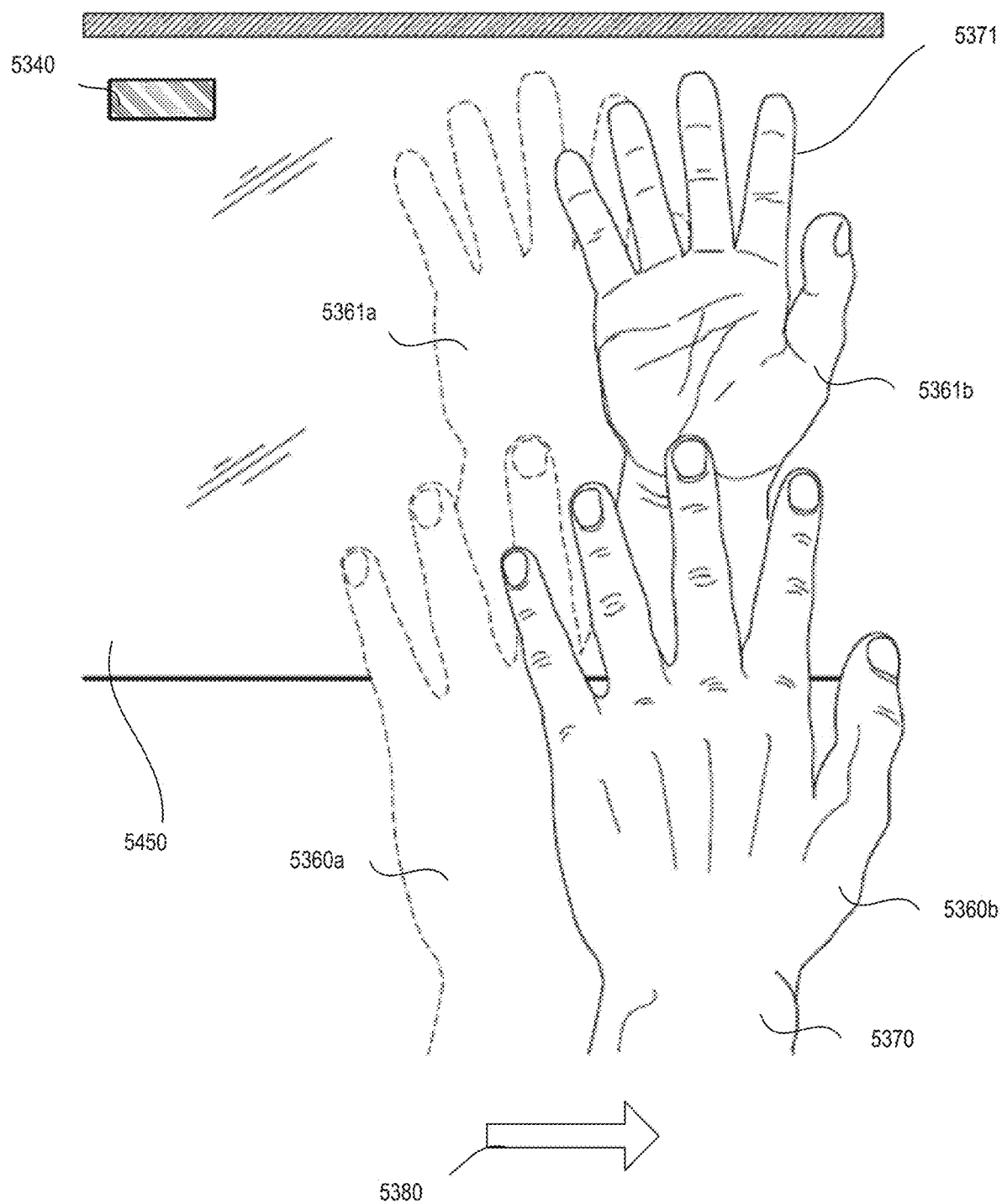
FIG. 18 illustrates another example of mirror detection using cues associated with the user.

FIG. 18 illustrates another example of mirror detection using cues associated with the user. FIG. 18 shows a user's hand 5370 in front of a mirror 5450. Because the mirror 5450 may reflect ambient light, the user may see a reflected image 5371 of his hand. The user may move his hand from position 5360a to position 5360b along the trajectory 5380. Accordingly, the mirror image 5361 of the user's hand may also move from position 5361a to 5361b.

The wearable system may observe (e.g., using the outward-facing imaging system) the changes in position of the user's hand 5370 and the reflected image 5371 of the user's hand. The wearable system may use the comparisons between the changes in position of the hand 5370 and the reflected image 5371 as a cue in mirror detection. For example, the HMD may use the outward-facing imaging system 502 to obtain multiple images over time (e.g., as multiple still frames or as frames from a video). The images may include the user's hand 5370 and the reflected image 5371 of the user's hand. The wearable system may compare the position change of the user's hand 5370 with the position change of the reflected image 5371 of the user's hand. For example, the wearable system may calculate a trajectory of the user's hand movement and another trajectory of the reflected image 5371 of the user's hand.

The wearable system may compare the trajectory of the user's hand movements with the trajectory of reflected image's movements. If the wearable system determines that these two trajectories correlate with each other, the wearable system may determine that the object in front of the user's hand 5370 is a mirror. The wearable system may also calculate an estimated trajectory of mirror image of the hand based on the trajectory 5380 of the user's hand, and compare the estimated trajectory with observed trajectory of the reflected hand. Similarly, the wearable system may estimate a trajectory of the movements of the hand based on the trajectory of the reflected image of the hand. If the estimated trajectory correlates the observed trajectory of the hand, the wearable system may tag the object in front of the hand as a mirror.

Although the examples here are described with reference to observing user's movements, these examples are not intended to be limiting. The wearable system may observe the movements of any objects in the environment of the user and movements of objects that may be a reflection of such movements. For example, the wearable system may use the outward-facing imaging system to track the movements of a relatively slowly rotating ceiling fan and compare it with the movements of the reflected ceiling fan. The wearable system may also observe the movements of more than two objects. For example, the wearable system may observe the movements of the user's head, the reflected image of the user's head, and the reflected image of the ceiling fan. Based on the observed movements, the wearable system may determine the user's head corresponds to the reflected image of user's head (instead of the reflected image of the ceiling fan).

Figure 19:
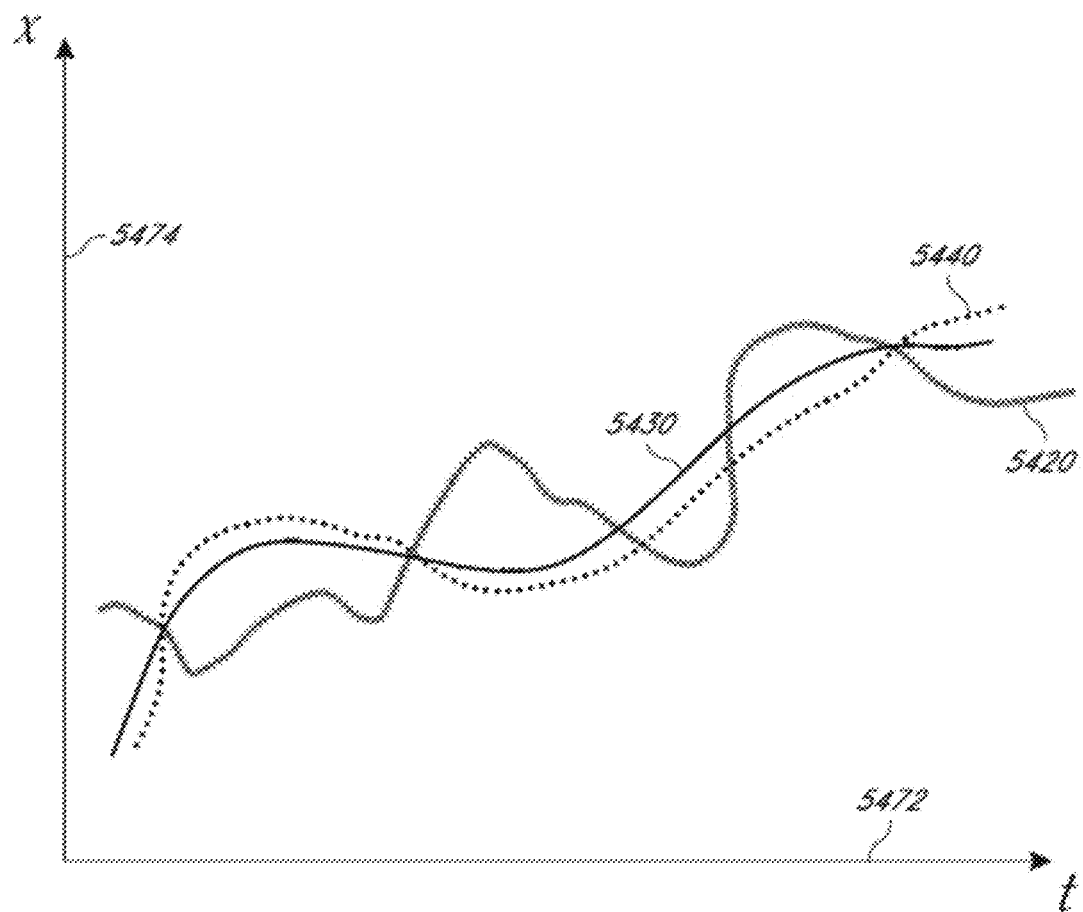
FIG. 19 shows an example of trajectories of three moving objects.

FIG. 19 shows an example of trajectories of three moving objects. The axis 5474 represents the position of the object in one dimension (x) of the 3D space, although this is for illustration and not limitation. The axis 5472 represents time. The wearable system may monitor the movements of objects (such as the user's head, user's body pose, mirror image of the user's head, etc.) over time and determine the trajectories of such objects. For example in FIG. 19, a first object moves along the trajectory 5430. A second object moves along trajectory 5440. The wearable system may calculate covariance of the trajectory 5430 and the trajectory 5440. If the covariance is small enough to meet a certain threshold, the wearable system may consider the first object as the mirror image of the second object, or vice versa. On the other hand, as shown in FIG. 19, the trajectory 5420 does not correlate with the trajectory 5430 (e.g., correlation greater than the threshold). Accordingly, the object associated with the trajectory 5420 is unlikely the mirror image of the object associated with the trajectory 5430.

The wearable system may put various movement data or visual data of the two objects into a filter (such as, e.g., a Kalman filter) and determine stability of uncertainties. The uncertainties may be represented by a covariance between the two objects' movements. For example, the wearable system may gather data such as position, speed, acceleration, etc., of a user's head and use that data to generate an estimate of the movements for the mirror image of the user's head. If the outward-facing imaging system consistently observes an object in the user's environment that tracks the estimated movement of the mirror image, the wearable system may determine that object is likely the mirror image of the user's head. On the other hand, if the wearable system observes another object in the user's environment that does not track the estimated movement of the mirror image, then the wearable system may determine that the object is not the mirror image of the user's head.

Examples of Using a Combination of Cues for Mirror Detection

Sometimes a cue may not be conclusive as to whether the object is a mirror. As a result, the wearable system may use a combination of cues to further examine the possibilities that the object is a mirror. For example, a mirror may be attached to one or more structural components (such as a wall, doorway, window, or frame). The wearable system may identify a set of keypoints in the observed image. The set of keypoints may include keypoints on a structural component. The wearable system may identify the structural component as a wall (e.g., a vertical planar structure) if, for example, there is a large enough number of coplanar features. The following description will be in terms of a wall as an example of the structural component, but this is for illustration and is not a limitation.

The wearable system may identify keypoints that are located laterally within the dimensions of the wall but, from the user's perspective, appear to be at greater distances than the distance to the wall. This set of keypoints defines an object that may be an aperture (e.g., an open doorway) or may be a mirror. The keypoints observed may depend on the user's point of view. Because the user may observe different sets of keypoints based on the user's pose or physical location, the wearable system may attach one or more directional vectors to the keypoints so that the keypoints in the world maps may be associated with the user's position or his direction of gaze. With reference to FIG. 16, a user may observe a portion of the desk 5010*b* in the mirror 5050 if the user stands in front of the mirror 5050. However, if the user moves closer to the door in the room 5000 and looks at the mirror, the user may observe a larger portion of the desk 5010*b*.

A set of projected points identified may include keypoints lying on rays connecting the user (at the user's current physical location) and objects that appear to be on the other side of the wall. The object may potentially include a mirror that is no smaller than the convex hull of the projected points, which may define a polygonal boundary of the object. Further, the mirror may be as large as the interior hull of the keypoints located on the wall. In some embodiments, when the wearable system attaches directional vectors to the keypoints, the wearable system may use these directional vectors to determine the boundary of the mirror.

However, the observation of keypoints appearing on the other side of the wall is not conclusive on whether the object is a mirror (e.g., the keypoints represent reflected images of physical objects in front of the mirror) or an aperture (e.g., the keypoints represent physical objects in another room beyond the wall through a doorway). As a result, the wearable system may tentatively designate the object as a mirror and use other cues (described herein) to verify (or falsify) whether the object is indeed a mirror. Conversely, the wearable system may tentatively designate the object as an aperture and use other cues to further determine whether the object is a mirror. In some embodiments, the wearable system may assign a probability for whether the object is a mirror. The probability may be calculated based on the type of cues, previous models of the environment, the user's behavior, etc. The wearable system may use machine learning techniques (e.g., a naïve Bayes model) together with the cues described herein to determine likelihood that the object is a mirror (or an aperture).

Example Processes for Mirror Detection

Figure 20:
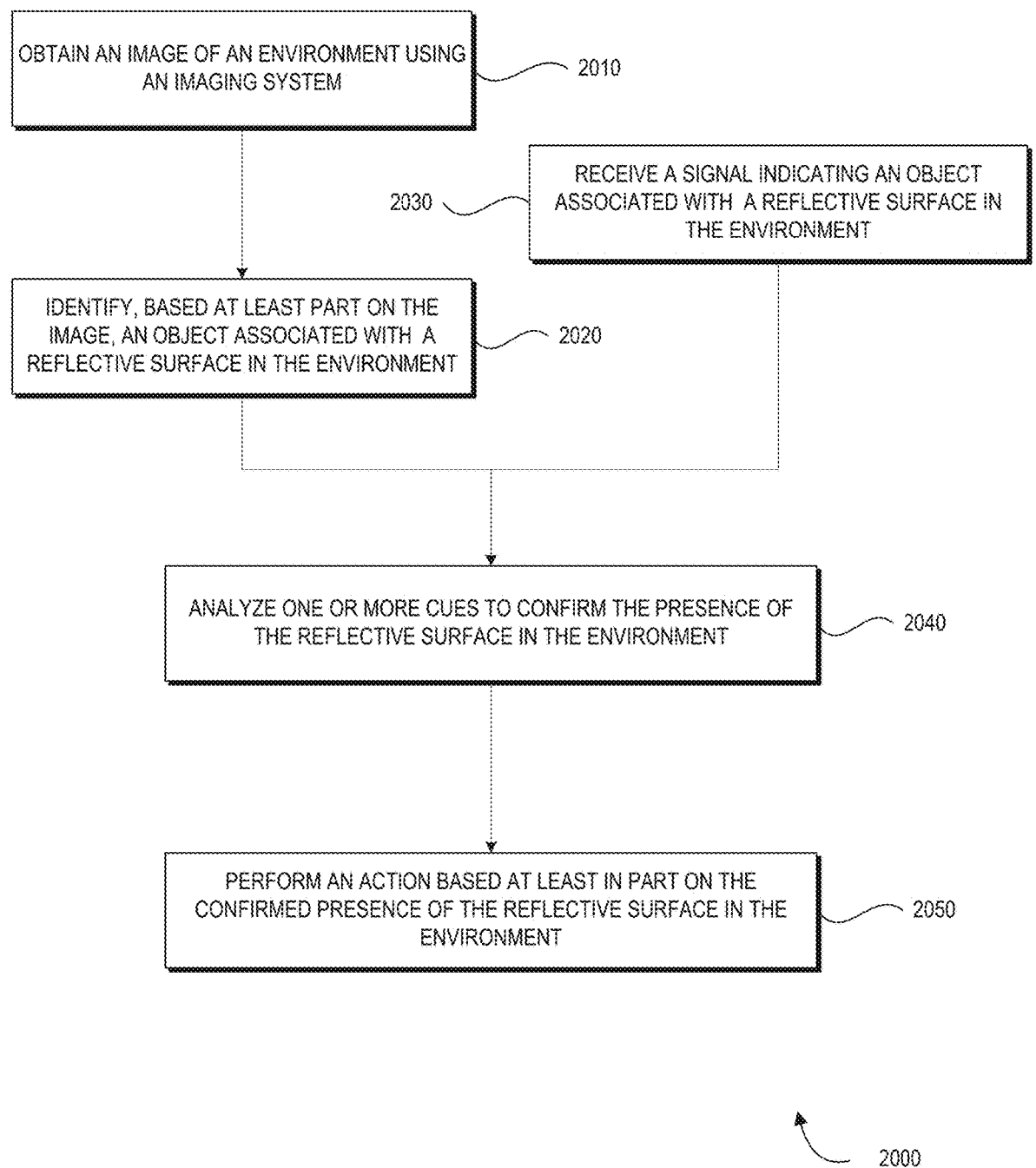
FIGS. 20 and 21 illustrate flowcharts of example methods for mirror detection using cues.
Figure 21:
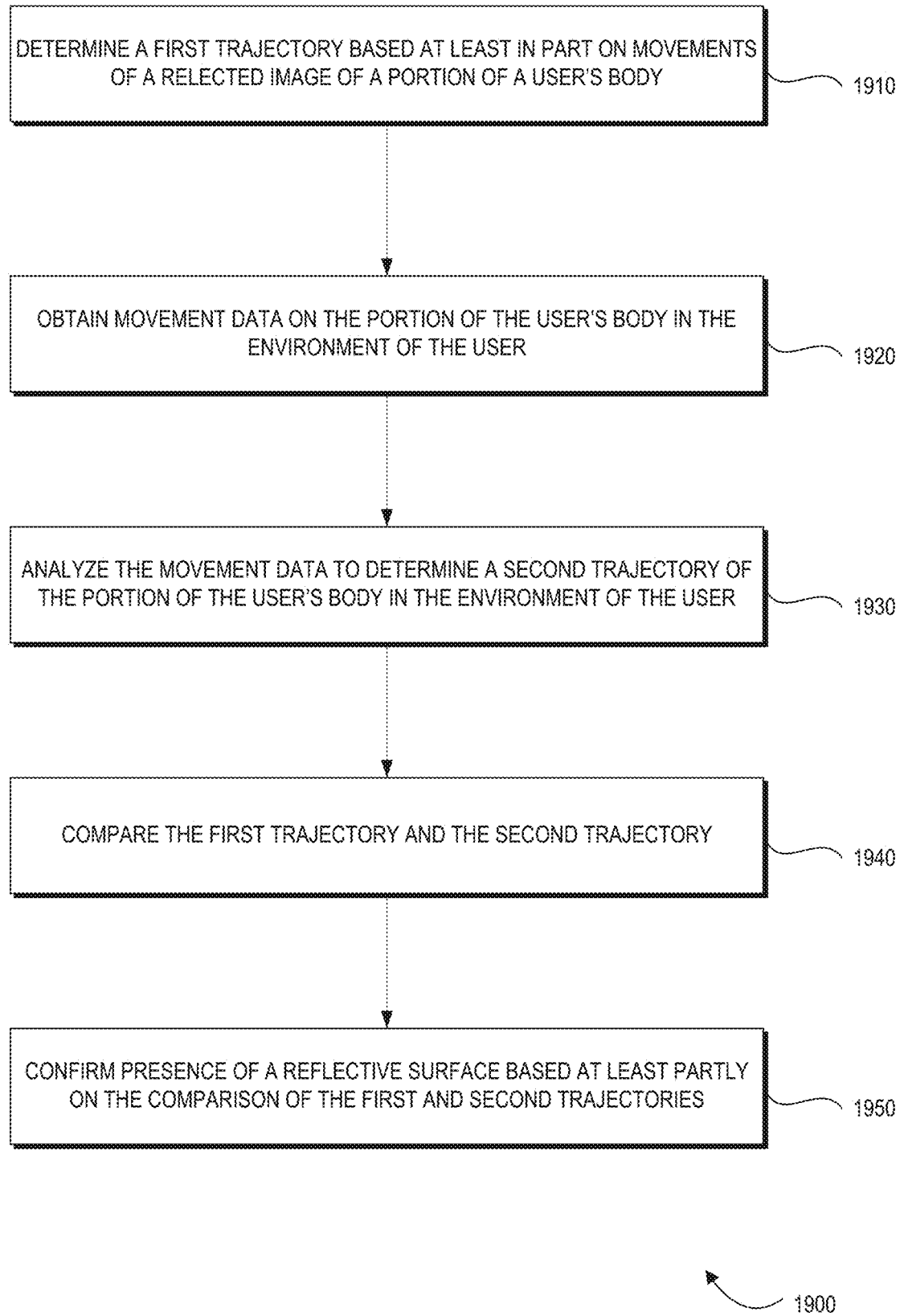

FIGS. 20 and 21 illustrate flowcharts of example methods for mirror detection using cues. The process 2000 (shown in FIG. 20) and the process 1900 (shown in FIG. 21) may be performed by the wearable system (see e.g., the wearable display system 80 described in FIG. 1B).

In FIG. 20, at block 2010 the wearable system may obtain an image of an environment using an imaging system. The imaging system may include an outward-facing imaging system 502 (shown in FIG. 5). At block 2020, the wearable system may analyze the image acquired by the imaging system and identify, in the image, an object which potentially could have a reflective surface. The wearable system may use one or more cues described herein to identify such object. For example, the wearable system may identify a user's face, certain behaviors of objects under reflection (such as e.g. reversed text), and/or certain keypoints in the image. If the wearable system determines these cues may be associated with the presence of a mirror, the wearable system may tentatively designate the region around these cues as reflective surface.

Additionally or alternatively to blocks 2010 and 2020, at block 2030 the wearable system may receive a signal indicating a cue associated with the presence of a reflective surface in the environment. As described with reference to FIG. 16, the wearable system may send an active query (such as a flash, infrared pulse, and/or electromagnetic signal) to the object and determine whether the object has a reflective surface based on the feedback received. The wearable system may also receive a signal from the object indicating the object is a mirror. For example, the mirror may be associated an RFID tag which has certain frequencies. The wearable system may be able to pick up the signal from the RFID and thereby recognize the object associated with the RFID may be a mirror.

At block 2040, the wearable system may further analyze one or more cues to verify (or falsify) whether the identified object has a reflective surface. For example, the wearable system may determine the presence of the reflective surface based on acquired images, movement data, query from HMD, etc. In certain embodiments, block 2040 is optional if the wearable system is able to determine the reflective surface at block 2020 or block 2030.

At block 2050, once a reflective surface is recognized, the wearable system may perform one or more actions. For example, the wearable system may communicate with the data storage and obtain information associated with the mirror. The wearable system may display a virtual word "mirror" on top of the reflective surface. The wearable system may also provide a virtual menu associated with the mirror. For example, the user may initiate a telepresence session with another user by selecting the option on the virtual menu. The process 1900 illustrates a method of identifying the presence of a reflective surface by analyzing the movement data observed by the wearable system. At block 1910, the wearable system determines a first trajectory based at least in part on movements of a reflected image of a user's body. For example, the reflected image may include a reflected image of the user's head.

At block 1920, the wearable system obtains movement data on the portion of the user's body observed in the reflected image. For example, the wearable system may use various sensors described herein to obtain the movements of the user's head.

At block 1930, the wearable system may analyze the movement data of the user's body to determine a second trajectory. The wearable system may compare the first trajectory and the second trajectory at block 1940 to determine whether these two trajectories correlate. At block 1950, if the wearable system determines these two trajectories correlate with each other, the wearable system may determine that the visual data and the movement data describe the movement of the same object (e.g. user's body). At least based partly on this analysis, the wearable system may detect the presence of the reflective surface.

World Maps in the Presence of Reflective Surfaces

An HMD may use an outward-facing camera to image the environment around the user of the HMD. The images may include still images, individual frames from a video, or a video. The HMD may build up a three dimensional (3D) map (which may be an embodiment of the world map 920) of the environment so that the HMD may appropriately place virtual objects in the environment for the user to interact with. For example, if a user of the HMD is in a room, the map may include information about size and shape of the room, presence of doors or windows (including their size and shape), location, size, and characteristics of physical objects in the room.

The presence of one or more mirrors in the environment may cause the HMD to generate artifacts in the 3D map of the environment. For example, since the mirror reflects ambient light from physical objects in the environment, an image of the mirror taken by the HMD camera will show reflected versions of the physical objects. If the HMD does not recognize the presence of the mirror, the HMD may attempt to interpret the reflected versions of these objects as actual, physical objects that appear in a reflected version of the room. In essence, the HMD may improperly interpret the mirror as a door or window into a room (the reflected version of the actual room) that does not exist and which is filled with objects (the reflected versions of actual objects) that also do not exist. The HMD may improperly update the 3D map to include the presence and properties of such a "reflected room" that does not exist in the physical world. In some embodiments, the environment may include two rooms that share a common wall, with the mirror hanging on the wall in the first of the two rooms. However, because the wearable system may improperly interpret the mirror in the first room as a door or window into the second room, the wearable system may tag the reflected objects in the mirror as if they were physical objects in the second room, which may corrupt the 3D map of the second room. Accordingly, the presence of a mirror in an environment, if unrecognized by the HMD, may lead to artifacts (e.g., the reflected room, the reflected objects that appear to be in the reflected room, etc.) in the 3D map.

To address this challenge of dealing with mirrors in the environment, the HMD may use mirror detection techniques to detect the presence of the mirror in the environment. Once detected, the HMD may generate a 3D map that properly accounts for the mirror (and does not include artifacts such as reflected physical objects) or may update or correct an existing 3D map to remove artifacts caused by the presence of the mirror. For example, the HMD may include an object recognizer that is configured to recognize the presence of the mirror in images acquired by the HMD. Based on information about the mirror (e.g., location, size, shape, etc.) and information about the environment (e.g., size and shape of the environment and placement of physical objects in the environment), the HMD may remove artifacts associated with the mirror from an existing world map or generate a new world map free of artifacts.

Examples of World Maps

Figure 22A:
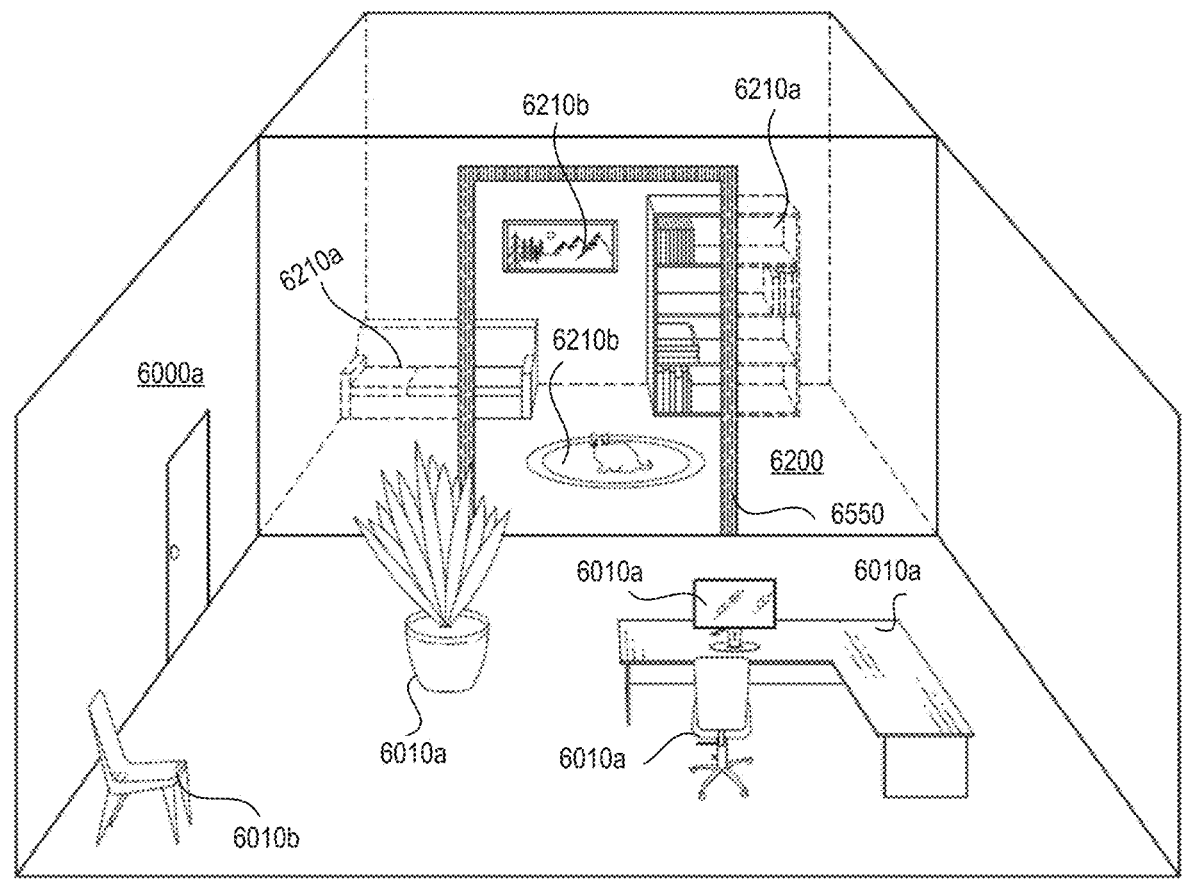
FIG. 22A illustrates an example of a three-dimensional (3D) environment including two rooms joined by a door.

FIG. 22A illustrates an example of a three-dimensional (3D) environment including two rooms joined by a door. FIG. 22A illustrates two rooms 6000*a*, 6200 connected by a doorway 6550. The room 6000*a* may include a plurality of physical objects 6010*a* and 6010*b*, such as, e.g. a chair, a plant, a roller chair, a table, or a monitor. The room 6200 may also have a plurality of objects 6210*a* and 6210*b*, such as, e.g., a sofa, a carpet with a cat, a bookshelf, or a picture.

An HMD may have an outward-facing imaging system (see e.g. outward-facing imaging system 502 shown in FIG. 5) that may image the environment of a user. The user of the HMD in the room 6000*a* may stand in front of the doorway 6550. The user may perceive objects (e.g. objects 6210 and a portion of the objects 6210*a* shown in the solid lines) in the room 6200 through the doorway 6550. The HMD may accordingly update the 3D map of the user's environment and associate the objects 6210*a* and 6210*b* with the room 6200.

In some embodiments, the world map may comprise one or more sets of key points. For example, in FIG. 22A, the key points in the room 6000*a* may include the leaf tips of the plant, the corners of the monitor screen, the top and bottom corners of the desk, etc. These key points may be combined with a dense surface representation to form the world map (e.g., using SLAM or V-SLAM techniques). In certain situations, the sets of key points identified by the HMD may be different based on the pose (such as body, head, and/or eye pose) of user wearing the HMD. For example, in FIG. 22A, the HMD may image a portion of the sofa in the room 6200 when the user stands in front of the doorway 6550 in the room 6000*a*. However, if the user stands sideways in the room 6000*a* and looks toward the bookshelf in room 6200, the HMD may not be able to acquire an image of the sofa because the sofa is not in the user's field of view. Similarly, with reference to FIG. 16, a user may observe the mirror image of a portion of the desk when the user is standing in front of the mirror 5050. The user may be able to observe a larger portion of the desk in the mirror if the user moves left toward the door in the room 5000. Advantageously, the wearable system may attach one or more directional vectors to the key points so that the key points in the world maps may be associated with the user's position and/or his direction of gaze.

Examples of Artifacts Created by a Mirror

Figure 22B:
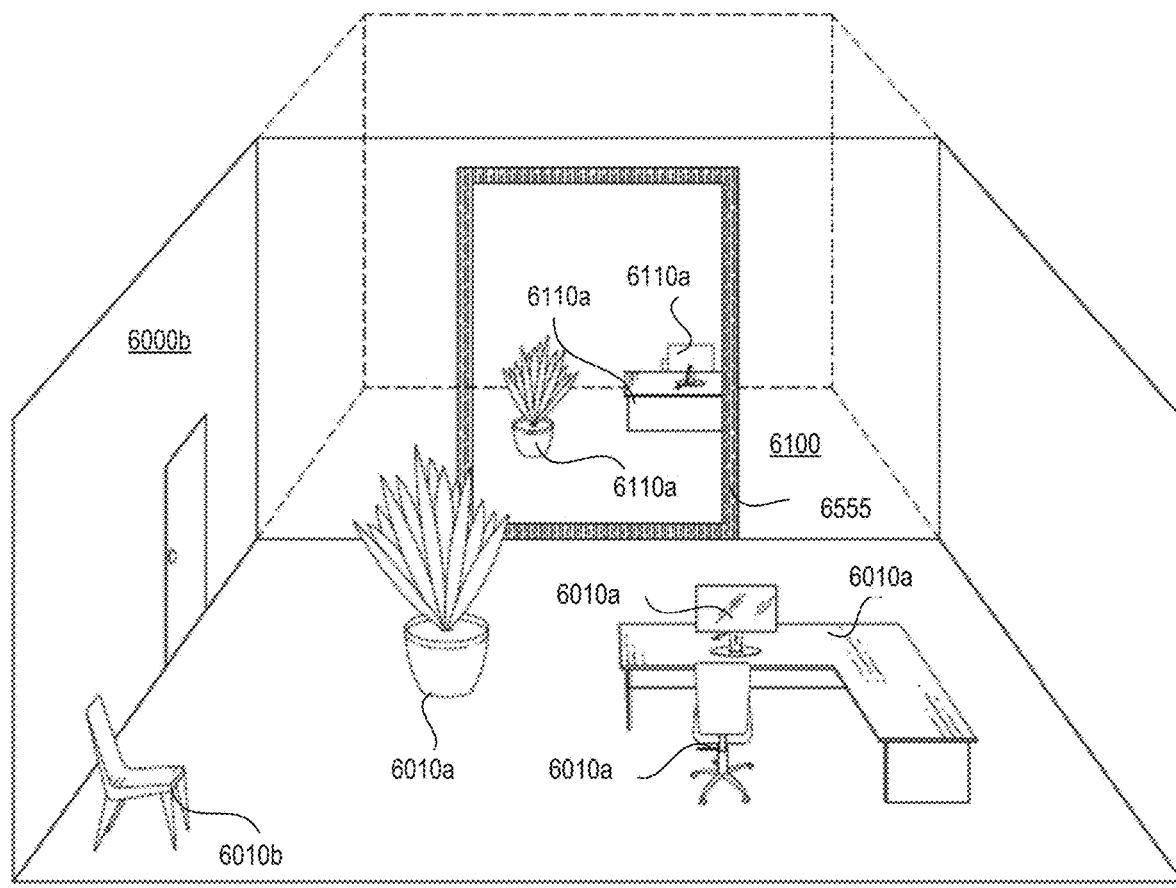
FIG. 22B illustrates an example of a single room including a mirror that reflects objects in the room.

FIG. 22B illustrates an example of a single room including a mirror that reflects objects in the room. FIG. 22B also shows in dashed lines a reflected version of the room that may appear as an artifact in a 3D map generated by an augmented reality device that does not recognize the presence of the mirror.

FIG. 22B illustrates one room 6000b with a mirror 6555 instead of the doorway 6550 shown in the room 6000a illustrated in FIG. 22A. The room 6000b is generally similar to the room 6000a shown in FIG. 22A and includes the objects 6010a and 6010b. The mirror 6555 may reflect ambient light in room 6000b. As a result, there may be reflected images 6110a of the actual physical objects 6010a in the room 6000b. For example, in FIG. 22B, the reflected images 6110a may include an image of the plant, a portion of the desk, a portion of the roller chair, or the monitor that are actually present in the room 6000b.

A user wearing an HMD may stand near the mirror 6555 in the room 6000b. The user may perceive the mirror 6555 and reflected images 6110a associated with the mirror through the HMD. The imaging system of the HMD obtains images of the environment, including images of the mirror 6555, the reflected images 6110a, as well as images of the physical objects 6010a. However, because the HMD may not know whether an object imaged by the HMD is a reflected image or a physical object, the HMD may update the 3D world map of the user's environment as if the reflected images of the objects were physical objects. As a result, as shown in FIG. 22B, the HMD may mistakenly record the mirror 6555 as a doorway to a room 6100 (which does not actually exist) and may associate the reflected images 6110a as physical objects (likewise, which do not actually exist) inside the room 6100.

In some situations, there may in fact be an actual physical space (such as a room) behind the wall supporting the mirror 6555. This physical space may have been previously mapped by the user of the HMD (or another HMD) and included in the world map. If the HMD does not detect the presence of the mirror 6555, the HMD may attempt to modify the world map as including physical objects which are in reality merely the reflected images 6110a. Accordingly, the undetected presence of a mirror in a room may lead to artifacts in the world map of other physical spaces adjacent to the room. Over time, sufficient artifacts may be incorporated into the world map so as to make the world map unusable.

Examples of World Maps Substantially Free of Artifacts

As previously described with reference to FIG. 16, the wearable system may use one or more cues to detect the presence of the mirror 5050. Accordingly, the 3D map of the room 5000 in FIG. 16 may take into account the presence of the mirror in the user's environment. In FIG. 16, the room 5000b may have a plurality of objects 5010a, 5010b, 5010c, 5010d. The room 5000 has a mirror 5050 which reflects ambient light in the room 5050 and shows a plurality of reflected images 5011a, 5011b, 5011c of the respective objects 5010a, 5010b, 5010c in the room.

In this example, the wearable system may recognize the presence of the mirror 5050 using a variety of techniques, such as, e.g. facial recognition, key-points recognition, recognition of a reflected image of the HMD in the mirror, active query from the device such as flashlight and infrared pulse, acoustic signals (e.g., ultrasound), depth discontinuity between the mirror and the wall supporting the mirror, shape of the mirror, or special features of the mirror such as an optical label (e.g., a bar code or a quick response (QR) code), etc. The wearable system may also be configured to recognize the reflected image of an object in the room 5000. Once the wearable system determines an object is actually a reflected image (e.g., because it is a mirror image of the physical object), the wearable system may use the reflected image to determine information (e.g. size, shape, location, etc.) associated with the mirror. The wearable system may be configured to include one or more object recognizers 708 (shown in FIGS. 7 and 12) which may recognize the mirror 5050 and parse information about the mirror 505. The techniques for mirror detection may be used in combination with a variety of sensors described herein, such as the outward-facing camera 502 (shown in FIG. 5), which may take images of the mirror.

The wearable system may access a world map of the room 5000 and correct the existing world map by removing some or all of the artifacts associated with the mirror 5050. For example, the wearable system may remove the room 5100 (shown in FIG. 22B) incorrectly generated due to the presence of the mirror. The wearable system may also remove the reflected images 5011a, 5011b, 5011c of the objects in the room 5000. In certain embodiments, the wearable system may attach one or more directional vectors to the artifacts. As a result, the artifacts may be associated with the user's position and/or his direction of gaze. Once a mirror is identified, the wearable system may use these directional vectors to remove artifacts associated with the user's position and/or direction of gaze, e.g., to find and remove world map entries whose point-of-view indicates that they were observed "through the mirror" via the wearable system.

In some embodiments, the wearable system may choose not to remove the reflected images 5011a, 5011 b, 5011c in the mirror. The wearable system may tag these images 5011a, 5011b, 5011c as reflected images. But the wearable system will not associate the reflected images 5011a with actual objects in a physical space behind the mirror 5050. Accordingly, the wearable system will not create artifacts based on the reflected images 5011a, 5011b, 5011c.

The wearable system may also generate a new world map free from artifacts. For example, the user wearing the HMD may continuously image the environment when the user walks around. When the user is in the vicinity of the mirror 5050, the HMD may detect the presence of the mirror using one or more object recognizers 2208 and obtain information associated with the mirror. As described with reference to FIG. 12, the HMD may communicate to other computing devices about the presence of the mirror when generating a world map 1210 for room 5000. The wearable system may tag the mirror 5050 as a reflective surface and may not add artifacts associated with the mirror 5050 to the world map of the room 5000.

In some embodiments, the wearable system may detect a reflective surface (such as e.g., a window) which may both reflect ambient light and allow the user to see through the reflective surface. For example, the wearable system may be configured to detect the presence of a window using one or more object recognizers 708. The variety of mirror detection techniques may be used to detect the presence of a window. The wearable system may also use other techniques alone or in combination with mirror detection techniques for detecting the window.

When the wearable system recognizes a window, the wearable system may determine artifacts created due to the reflective properties of the window. The wearable system may use techniques described herein to remove the artifacts from the existing world map while keeping the images of the physical space outside the window in the world map. This may reduce the likelihood of damage to the world map as a result of the wearable system mistaking the reflected images as physical objects belonging to the space outside of the window. Similarly, as described herein, the wearable system may also generate a world map free from the artifacts.

In some embodiments, the wearable system may recognize the presence of the reflective surface in the environment and, when generating the world map, avoid improperly placing rooms, objects, and so forth into the world map. Some embodiments may advantageously prevent or reduce the likelihood of the world map including artifacts caused by the presence of the reflective surface.

Example Processes of Generating and Correcting a World Map

Figure 23:
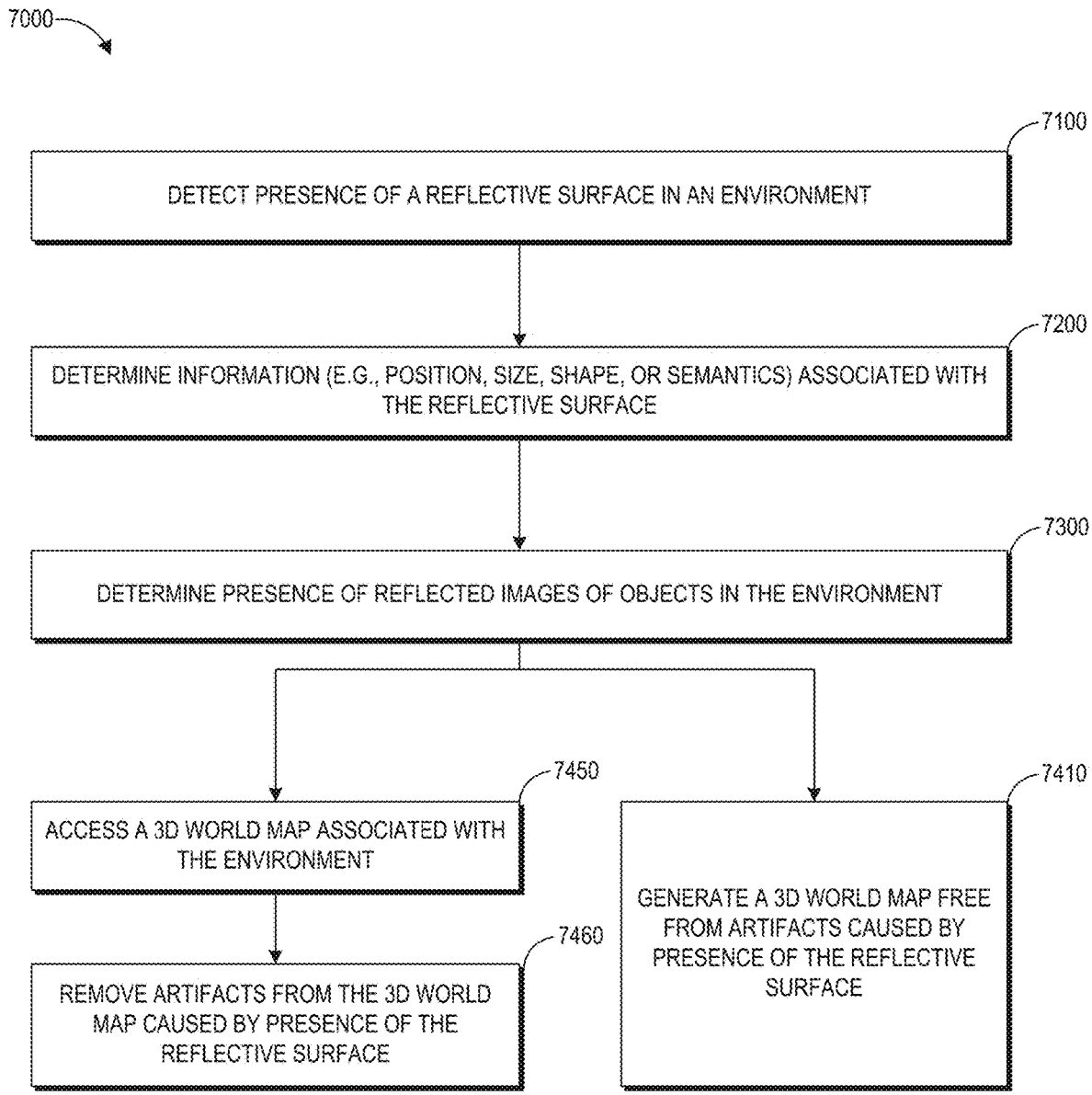
FIG. 23 is a flowchart of an example method for generating and/or correcting a 3D world map due to the presence of a reflective surface in the environment.

FIG. 23 is a flowchart of an example method 7000 for generating and/or correcting a 3D world map due to the presence of a reflective surface in the environment. This method may be performed by the wearable system described herein (e.g., the wearable display device 80 and 1000 shown in FIGS. 1B and 5). Embodiments of the method 7000 may be performed in the context of the AR environment 750 described with reference to FIG. 7. The method 7000 may also be performed using other computing systems which may obtain images of the environment and recognize the presence of the reflective surface in the environment. As described herein, the reflective surface may be a mirror, window, or other reflective surface that reflects images of objects in the environment of the reflective surface.

At block 7100, the wearable system may detect presence of a reflective surface (such as a mirror) in the environment. For example, an outward-facing imaging system 502 may obtain an image of the environment including the reflective surface. The obtained image may include images of the objects reflected by the reflective surface. The wearable system may analyze the images to determine the presence of the reflective surface and identify reflected images of the objects. For example, the wearable system may use an object recognizer 708a (e.g., an executable software module) to identify features (such as a frame and/or a shape of the mirror) that may be associated with the mirror. The wearable system may also apply deductive reasoning to further distinguish features of the mirror from features of other objects. For example, in some situations, the image of a mirror frame and the image of a picture frame may look similar. The wearable system may assume the frame is a mirror frame and use deductive reasoning (such as to look for a reflected image) and other data to verify (or falsify) this assumption. Alternatively, the wearable system may assume the frame is a picture frame and use deductive reasoning to verify or falsify this assumption. In some embodiments, the wearable system may use distance recognition techniques (e.g., a stereoscopic system or a depth camera) to determine whether an object is a mirror or a picture frame. This is possible because the image of an object in a picture frame is within the same plane as the picture frame (e.g., substantially coplanar with the picture frame) while the image of an object in a mirror typically has a depth that is behind the plane of the mirror and not coplanar with the mirror.

The wearable system may also use other methods to identify the mirror in the obtained image. The wearable system may look for parts of the image which would reveal that the image was a reflection. For example, the wearable system may identify a reversed image of a physical object (such as e.g., a reversed text) and deduce that the portion of the image may include a reflective surface. In some other cases, the wearable system may analyze one or more cues to determine that an object is a mirror (e.g., detection of movement in the mirror that is the reflection of movement in the physical environment).

At block 7200, the wearable system may determine information associated with the reflective surface. The information associated with the mirror may include physical properties of the mirror such as, e.g., the size, position, or shape of the mirror. The information may also include virtual information about the mirror, such as e.g., interaction type (e.g. interactable versus not interactable, see description below), semantics information (e.g. that the mirror has a reflective surface that may reflect images of objects in the room, that it is hanging on a vertical wall, that it has a frame, etc.), etc.

For example, the wearable system may have the capability of initiating a call with another person (who may wear a wearable device) and connecting the two in a telepresence session in which the wearable system may display an image of the other caller. The wearable system may designate the interaction type of the reflective surface (typically a mirror) as interactable where the mirror may be used in a telepresence session. The telepresence session may be initiated upon the wearable device identifying that a mirror is present in the user's environment. During the telepresence session, the wearable device may acquire a reflected image of the user of the wearable device and transmit such image to the other person on the call, which creates a tangible sense of the user's presence. Further by identifying the reflective surface, the wearable system, during a telepresence session, will not improperly generate artifacts (e.g., reflections from the reflective surface) in the world map.

At block 7300, the wearable system may determine the presence of one or more reflected images of physical objects in the environment. For example, the wearable system may determine that all images within the boundary of the reflective surface are reflected images rather than actual physical objects. The wearable system may also use key-points recognition or other techniques and determine reflected images by matching images in the reflective surface with physical objects in the environment. For example, the wearable system may recognize that an image inside the mirror is a "mirror-image" of another object in the environment, thereby providing a cue that the image inside the mirror is a reflection rather than an actual physical object. Some key-points may have one or more particular behaviors under reflection. For example, a set of key-points may be positioned reversely in the mirror. The wearable system may use such behaviors to identify a reflective surface.

In some embodiments, the wearable system may access a world map of the environment (shown in block 7450) and correct the world map by removing artifacts caused by the presence of the reflective surface (shown in block 7460).

In some other embodiments, the wearable system may generate a world map free from artifacts (shown in block 7410). The wearable system may generate such world map as the wearable system obtains images of the environment. It should be noted that the process 7000 does not require the wearable system to both generate and correct the world map. Rather, the wearable system may use the techniques described herein to generate, correct, or update the world map, alone or in combination. For example, the wearable system may correct a previously generated world map for artifacts while also generating new content for the world map that is free from artifacts.

Mirrors as Tools for Telepresence In telecommunications, a visual image often accompanies audio communications between a first caller and a second caller. In an augmented reality (AR) telepresence session, the second caller's image may be displayed to the first caller by the first caller's wearable device such as, e.g., an augmented reality device (ARD) or a head-mounted device (HMD) over a portion of the first caller's environment. Likewise, the first caller's image may be displayed to the second caller by the second caller's wearable device over a portion of the second caller's environment. This creates, during the telepresence session, a tangible sense of the second caller's presence in the first caller's environment as well as a tangible sense of the first caller's presence in the second caller's environment.

The wearable device may contain an outward-facing imaging system that may observe the environment in front of the wearer. The wearable device may be worn on the head of the wearer so that the outward-facing imaging system may obtain images of a field of view (FOV) in front of the wearer. The outward-facing imaging system may comprise stereoscopic cameras, a depth-sensing camera, an FOV camera, or other sensors and cameras used in combination or in alternative.

Since wearable devices sometimes do not include a camera that may image the full face or body of the wearer, it may be a challenge to communicate the wearer's image to the other caller during a telepresence session. Accordingly, various wearable systems described herein utilize a mirror in the vicinity of the wearer to obtain an image of the wearer. For example, when the second caller is positioned near a mirror in the second caller's environment, the outward-facing imaging system of the second caller's wearable device may capture an image of the second caller in the mirror. The second caller's wearable device may process and send the image of the second caller to the first caller's wearable device without using a camera external to the second caller's wearable device. Likewise, when the first caller is positioned in front of a mirror in the first caller's environment, the outward-facing imaging system of the first caller's wearable device may capture an image of the first caller in the mirror. The first caller's wearable device may process and send the image of the first caller to the second caller's wearable device without using a camera external to the first caller's wearable device. The combination of the outward-facing imaging system and the mirror provides the ability to obtain images of the wearer without using an external camera in the wearer's environment or an external camera held by the wearer (e.g., on a selfie stick) or an external, wearer-facing camera mounted on an extension from the wearable device.

During a telepresence session, the first caller and the second caller may stand in front of their respective mirrors wearing their respective devices. The first caller would typically see the first caller's image reflected from the first caller's mirror, and the second caller would typically see the second caller's image reflected from the second caller's mirror. Advantageously, in some embodiments, the technology described herein permits each of the callers to see the other caller's image during the telepresence session. For example, the image of the second caller may be displayed by the first caller's wearable device over the ambient light reflected from the first caller's mirror image in the first caller's environment. Thus, rather than seeing the first caller's reflected image, the first caller sees the second caller's image projected by the first caller's wearable device. Likewise, the second caller will see the first caller's image as projected by the second caller's wearable device, rather than seeing the second caller's reflected image.

The ambient light reflected from the mirror may also be occluded in whole or in part. For example, the image of either or both of the callers may be selectively cropped by any techniques, such as computer vision based segmentation, depth based segmentation, or other techniques. In some embodiments, the image of the first caller may be sent to the second caller's wearable device, while the background relative to the second caller's mirror may or may not be altered, augmented, or blocked.

The wearable device may use image processing techniques to remove from the caller's image the presence of the HMD on the head of the caller. Thus, for example, the second caller may see an image of the first caller whose HMD is not visibly present, even though the first caller is wearing the HMD during the telepresence session. An image of a portion of the first caller's unoccluded face (e.g., the caller's face without the HMD) may be used to substitute the region of the face occluded by the HMD. The alignment and registration of this overlay may be achieved by any known methods or techniques. The movement of the occluded region of the wearer's face may be tracked and determined by an inward-facing imaging system on the HMD (e.g., a camera that faces towards the eyes or facial region of the wearer).

The initiation of a telepresence session may cause the wearer's wearable system to search for mirrors. For example, a user may initiate a telepresence session by actuating a user input device 504 (shown in FIG. 5). This may trigger the HMD's outward-facing camera 502 (shown in FIG. 5) to search for a mirror in the user's environment. The wearable system may detect the mirror using the various cues described herein.

The detection of a mirror may also trigger a telepresence session (e.g., a caller stands in front of a mirror to start the telepresence session). For example, when the wearable system detects the mirror in the user's environment, the wearable system may provide a pop-up menu asking the user whether he would like to initiate a telepresence session.

Any methods or systems for mirror detection may be used. Although the examples are described in terms of using a mirror, the present disclosure is not intended to be limited to mirrors. Any type of reflective surface, such as e.g., a window, in the environment of the wearable device may be used to obtain an image of the caller. The wearable device may reconstruct the image of the caller based on ambient reflections in any environments unless the environments are carefully created to prevent such reconstruction. Further examples and embodiments of the systems and methods for using the wearable system in telepresence applications are described below.

Examples of a Telepresence Session

As described above, since a wearable device (such as an HMD or an ARD) may not have a camera that may image the full face or body of the wearer of the wearable device, it may be a challenge to communicate the wearer's image to the other caller during a telepresence session. Accordingly, various wearable devices described herein may utilize a mirror or other reflective surface in the vicinity of the wearer to obtain an image of the wearer. For example, when the second caller is positioned in front of a mirror in the second caller's environment, the outward-facing imaging system of the second caller's wearable device may capture an image of the second caller in the mirror. The second caller's wearable device may process and send the image of the second caller to the first caller's wearable device without using a camera external to the second caller's wearable device. Likewise, when the first caller is positioned in front of a mirror in the first caller's environment, the outward-facing imaging system of the first caller's wearable device may capture an image of the first caller in the mirror. The first caller's wearable device may process and send the image of the first caller to the second caller's wearable device without using a camera external to the first caller's wearable device. The combination of the wearable device's outward-facing imaging system and a mirror provides the ability to obtain images of the wearer without using an external camera in the wearer's environment or an external camera held by the wearer (e.g., on a selfie stick) or an external, wearer-facing camera mounted on an extension from the wearable device.

During a telepresence session, callers may use a variety of user devices 1230 such as wearable devices, web-cameras, computers, mobile devices, and other devices to acquire information on the user and the user's environment. Such information may be used to create a world map 1210 around that user. The world map 1210 may be constantly updated based on new information acquired. The world map 1200 may be passed to and shared with other users in the telepresence session via the network 1290 (shown in FIG. 15).

Examples of First Caller During a Telepresence Session

With reference back to FIG. 17A, a first caller may conduct a telepresence session in his room 1300. The example room 1300 in FIG. 17A includes physical objects such as a table 1310a, a plant 1312b, a window 1314, and a mirror 1330.

The first caller 1360a may stand in front of the mirror 1330 during a telepresence session. The first caller 1360a may be calling a second caller (or more callers) during the telepresence session. The first caller 1360a may wear an HMD 1320a configured to display AR/VR/MR content. The mirror 1330 shows a reflected image 1360b of the first caller 1360a, a reflective image 1320b of the HMD 1320a on the first caller's head, a reflected image 1310b of a portion of the table 1310a, and a reflected image 1312b of the plant 1312a.

The HMD 1320a may comprise an embodiment of the wearable system, e.g., wearable display system 80 in FIG. 1B, display system 100 in FIG. 5, etc. The HMD 1320a may contain an outward-facing camera 502 (as shown in FIG. 5) that observes the environment around the wearer 1360a. For example, the outward-facing camera 502 (as shown in FIG. 5) may observe the mirror 1330 in the room 1300, the reflected image 1360b of the wearer 1360a, and the wearer's environment.

Example Techniques of Initiating a Telepresence Session

The HMD 1320a may initiate a telepresence session by detecting the presence of the mirror 1330 in the room 1300. In some embodiments, a particular mirror or reflective surface may be recognized as triggering a telepresence session with a particular individual.

The initiation of the telepresence session may also trigger the HMD's outward-facing camera to search for a mirror. If a mirror is found, the HMD may obtain the wearer's image 1360b in the mirror (if present) and communicate the image (modified or unmodified) to another caller during the telepresence session. The HMD 1320a may use a variety of mirror detection techniques, such as, e.g., facial recognition, key-points recognition, recognition of the HMD in the mirror (e.g., recognition of the reflected image 1320b of the HMD), active query from the device such as flashlight and infrared pulse, acoustic signals (e.g., ultrasound), depth discontinuity, shape of the mirror, or special features of the mirror such as an optical label (e.g., a bar code or a quick response (QR) code). The HMD 1320a may also include one or more inward-facing cameras (see, e.g., the imaging system 500 shown in FIG. 5) that may track the wearer's eye movements, e.g., to determine if the first caller 1360a is looking toward the mirror 1330.

In some embodiments, the HMD 1320a may initiate a telepresence session by voice activation. The HMD 1320a may comprise one or more sound sensors such as, e.g., a microphone, which may acquire the wearer's voice and/or the sound in the wearer's environment. A variety of voice activation techniques may be used such as voice commands and voice recognition of the wearer 1360a of the HMD 1320a.

The HMD 1320a may also initiate the telepresence session using other techniques. For example, the HMD 1320a may initiate the telepresence session when the caller 1360a actuates a user input device (see e.g. user input device 504 shown in FIG. 5), such as, e.g., clicking on a mouse, tapping on a touch pad, swiping on a touch screen, hovering over or touching a capacitive button, pressing a key on a keyboard or a game controller (e.g., a 5-way d-pad) or the HMD 1320a itself, pointing a joystick, wand, or totem toward an object (e.g. the mirror), pressing a button on a remote control, or other interactions with a user input device, etc. The HMD 1320a may also observe the caller's body pose or hand gestures and establish the telepresence session through various user interactions with a physical or a virtual user interface. For example, the caller may touch one or more virtual buttons on a virtual user interface to initiate a telepresence session. Similarly, the HMD 1320a may initiate the telepresence session by observing the caller's 1360a interactions with the mirror such as, e.g., touching the mirror, gesturing (e.g., waving) at the mirror, gazing at the mirror for an extended period of time, etc. The caller 1360a may start the telepresence session or join the telepresence session using a variety of techniques described herein, alone or in combination.

Examples of Bidirectional Communications During a Telepresence Session

Figure 24:
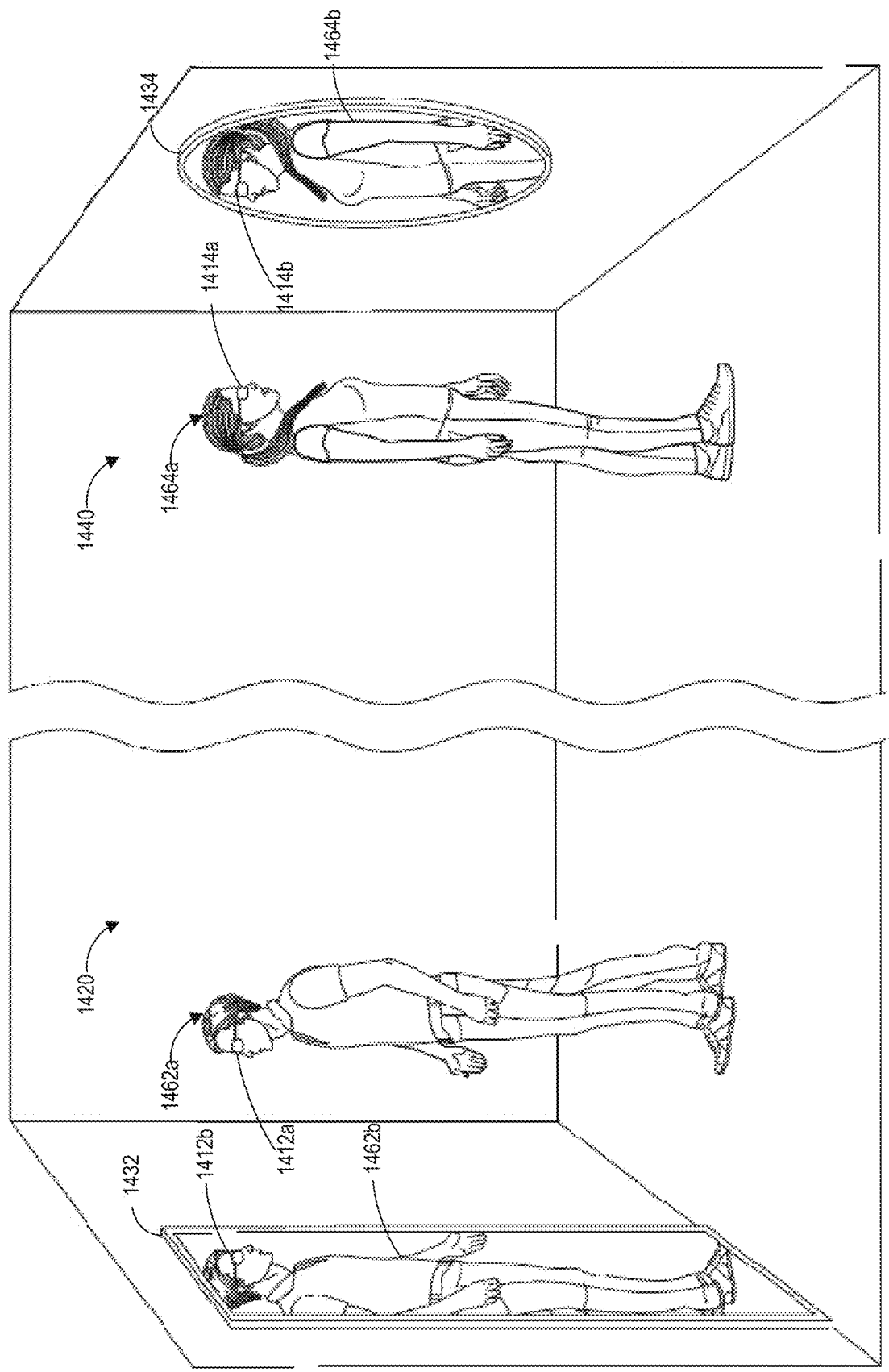
FIG. 24 illustrates an example of a first caller and a second caller conducting a telepresence session.

FIG. 24 illustrates an example of a first caller 1462a and a second caller 1464a conducting a telepresence session. In this example, the first caller 1462a is a man and the second caller 1464a is a woman. In the telepresence session, the first caller 1462a is wearing the HMD 1412a and standing in front of the mirror 1432 in his room 1420. The first caller 1462a may be the same caller 1360a as shown in FIG. 16. The mirror 1432 shows a reflected image 1462b of him and a reflected image 1412b of his HMD. Similarly, the second caller 1464a is wearing the HMD 1414a and standing in front of the mirror 1434 in her room 1440. The HMDs 1412a and 1414a may be examples of the HMD 1320a described in FIG. 16 or may comprise the wearable display system 80, display system 1000 described in FIGS. 1B and 5 respectively. The mirror 1434 shows a reflected image 1464b of her and a reflected image 1414b of her HMD. The mirrors 1432 and 1434 may be any shape or size.

As described with reference to FIG. 12, the HMD 1412a and the HMD 1414a may be in communication with each other and/or with other's user devices and computer systems. For example, the first caller's HMD 1412a may be in communication with the second caller's HMD 1414a, e.g., via the network 1290 (shown in FIG. 12). A first world map of the first caller 1262a (and his room 1420) may be constructed based on the information obtained by the first caller's HMD 1412a. The first world map may be passed to the second caller's HMD 1414a (e.g., via the network 1290) and thereby create a tangible sense of the first caller's presence during the telepresence session. Likewise, a second world map of the second caller 1464a (and her room 1440) may be constructed based on the information obtained by the second caller's HMD 1414a. The second world map may be passed to the first caller's HMD 1412a and thereby create a tangible sense of the second caller's presence during a telepresence session. The HMDs 1412a and 1414a may track the movements of the respective callers and the location of mirror(s) in the respective caller's field of view, and update the respective world maps as the respective caller moves around in his or her environment.

As described with reference to FIGS. 1B and 12, the second caller's HMD 1414a, the first caller's HMD 1412a, the remote computing system 1220, alone or in combination, may process the image of the second caller for presentation (by the first caller's HMD 1412a) to the first caller 1462a or may process the image of the first caller 1462a for presentation (by the second caller's HMD 1414a) to the second caller 1464a.

Although the examples only refer to two callers, the techniques described herein should not be limited to two callers. Multiple callers (e.g., two, three, four, five, six, or more) using HMDs (or other telepresence devices) may participate in a telepresence session. A caller may see the images of multiple callers using his/her HMD. In some embodiments, a caller's mirror may be virtually replicated many times in the caller's environment to created frames into which to place images of other callers in the telepresence session.

Further, despite the examples referring to callers as standing in a room, the callers are not required to stand in the room. The callers may stand, sit, or be in any position or movement relative to the mirror during a telepresence session. The callers may also be in a physical environment other than a room. The callers may be in separate environments or be in the same environment while conducting the telepresence session. Not all callers are required to wear their respective HMDs in the telepresence session. For example, the second caller 1464a may use other image acquisition and display devices such as a webcam and computer screen while the first caller 1462a wears the HMD 1412a.

Example User Experiences

Figure 25A:
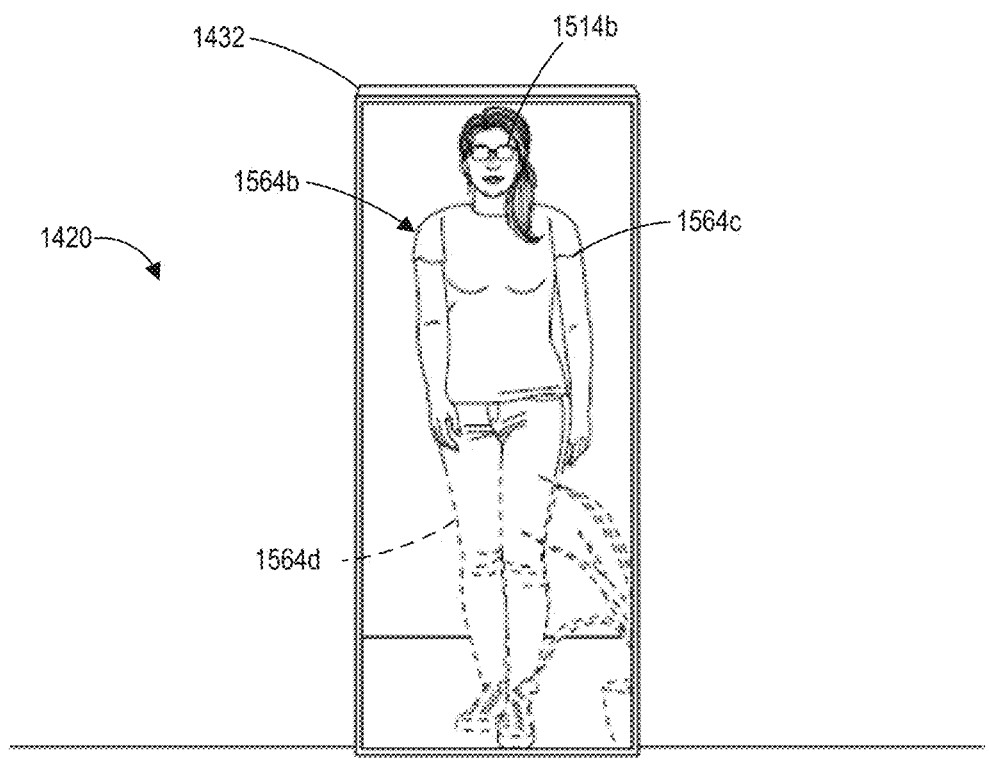
FIG. 25A is an example of the second caller's image as seen by the first caller.

FIG. 25A is an example of the second caller's image as seen by the first caller. In this example, the first caller 1462a (not shown in FIG. 25A) is wearing his HMD 1412a and stands near the mirror 1432 in his room 1420. As shown in FIG. 24, the mirror 1432 shows a reflected image 1462b of him and a reflected image 1412b of his HMD.

During the telepresence session illustrated in FIG. 25A, the first caller's HMD 1412a may project an image 1564b of the second caller (e.g., as received from the second caller's HMD 1414a) to overlay the reflected image 1462a of the first caller in the first caller's mirror 1432. Therefore, the first caller 1462a wearing the HMD 1412a may see the second caller's image 1564b in his mirror 1432, instead of seeing his own reflective image 1462b.

Additional examples of a second caller's image as seen by the first caller during a telepresence session are further described with reference to FIGS. 25B-27B. These figures illustrate non-limiting examples of the first caller's user experience during the telepresence session and will be further described below. Likewise, the second caller may have user experiences similar to those shown in FIGS. 25A-27B during the telepresence session (although with the second caller's HMD displaying the first caller's image to the second caller). User devices and computer systems such as first caller's HMD 1412a, second caller's HMD 1414a, remote computing system (see, e.g., the remote computer system 1220 in FIG. 12), alone or in combination, may use any methods to register and overlay the second caller's image 1564b over the reflected image 1462b of the first caller.

Examples of Processing a Caller's Image

In FIG. 25A, the first caller's HMD 1412a (not shown in FIG. 25A) may project to the first caller 1462a an unmodified mirror image of the second caller 1564b and her environment. In this example, the mirror 1434 (shown in FIG. 24) used by the second caller 1464a is a half-body mirror while the mirror 1432 used by the first caller 1464a is a full body mirror. The second caller's HMD 1414a may capture the portion of her reflected image 1464b shown in her mirror 1434 (illustrated in FIG. 24). The first caller's HMD 1412a may display the portion 1564c of the second caller's image and the second caller's environment as captured by the second caller's HMD 1414a. In this example, since the first caller's full-body mirror 1432 is larger than the image 1564b received from the second caller's HMD (since the second caller's mirror 1434 is a half-body mirror), the first caller's HMD may not present an image of the second caller's lower body 1564d (which is outside the reflective area of the second caller's mirror 1434).

As another example, the second caller's HMD 1414a may capture the reflected image 1464b of the second caller 1464a as well as the mirror 1434 in the second caller's room 1440. The second caller's HMD 1414a may communicate the captured image (including the reflected image 1464b and the image of the mirror 1434) to the first caller's HMD 1412a. The first caller's HMD 1412a may project the image of the second caller together with the image of the second caller's mirror over the first caller's mirror 1432. In this example, the second caller's image and the second caller's mirror may be enlarged to cover the region of the first caller's mirror 1432 (since the first caller's mirror 1432 is larger than the second caller's mirror 1434). Additionally or alternatively, the HMD 1412a of the first caller may occlude a portion of the mirror 1432 (such as the portion that is bigger than the second caller's mirror 1434) when presenting the second caller's image together with her mirror 1434.

In some other embodiments, the first caller's HMD 1412a may display a processed image of the second caller. For example, the processed image of the second caller displayed by the first caller's HMD 1412 may include the portion of the second caller's lower body 1564d and (optionally) her background that are not captured by the mirror. Such an image of the second caller's lower body 1564d may be synthesized based on information previously obtained on the second caller and on her environment.

Thus, in various embodiments, the first caller's HMD 1412a may display the image 1564b of the second caller without displaying the image of her lower body 1564d or her background or may display an image including the second caller's upper 1564c and lower body 1564d (and optionally her background). On the second caller's end, the image of the first caller (which may be a whole body image reflected from the full-body mirror 1432) may be selectively cropped so as to fit within the smaller area of the second caller's half-body mirror 1434. Therefore, the second caller's HMD 1414a may display only a portion of the first caller's image, even though the first caller's mirror captures more areas than the second caller's mirror.

Although the examples are described with reference to a full body mirror and a half body mirror, the examples should not be interpreted as limited to only full body and half body mirror. The mirrors may be in any size or shape. The callers (e.g. 1462a and 1464a) may have mirrors with the same size or shape. The callers (e.g., 1462a and 1464a) may also have mirrors that are different in size or shape. Further, in some situations, the HMD may only acquire a portion of the reflected image due to the distance between the caller and the mirror, the angle of the outward-facing imaging system, the user's preference, etc. The image processing techniques described herein may also be applied in these situations.

Figure 25B:
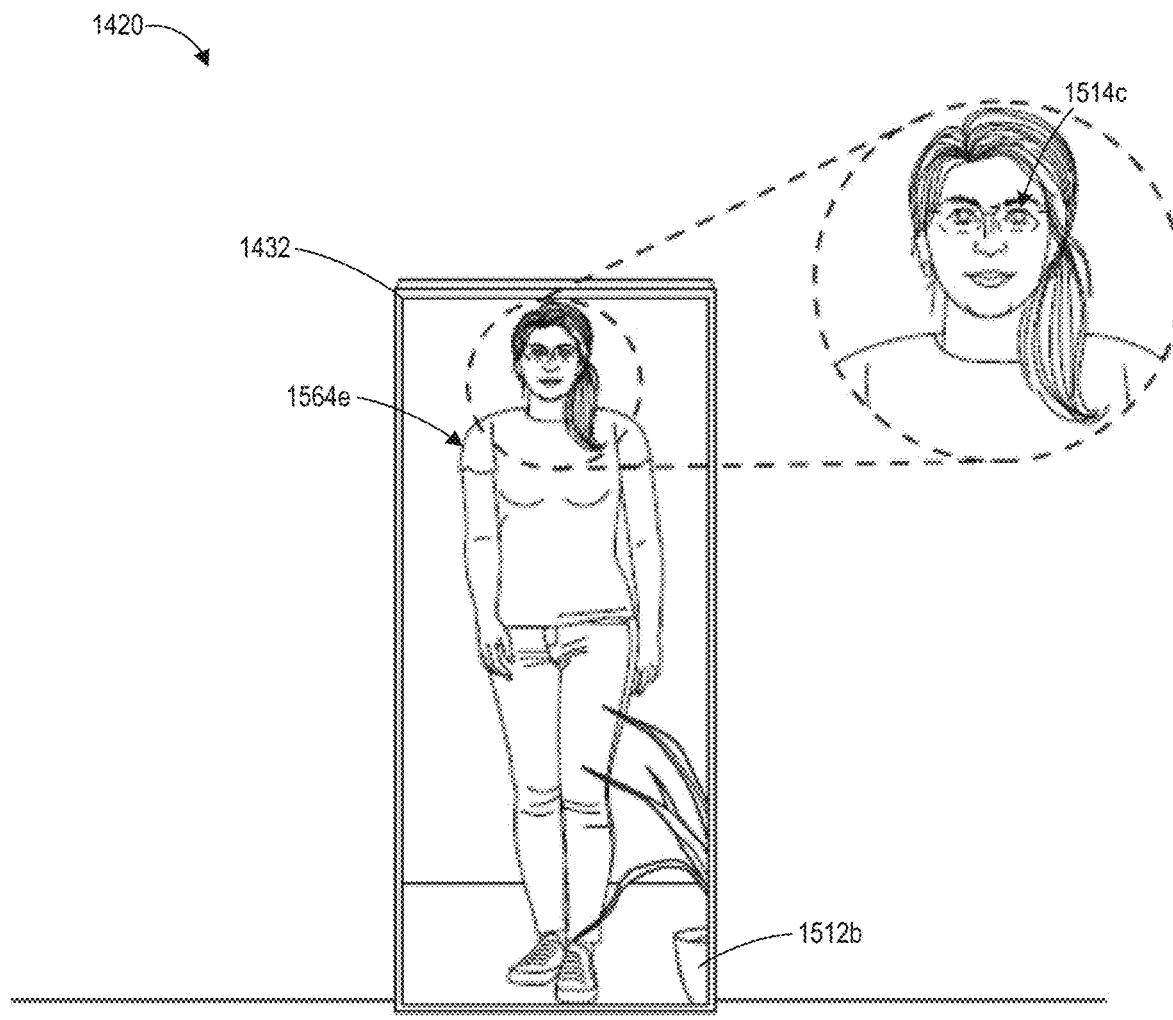
FIG. 25B illustrates an example of modifying the first caller's image during a telepresence session.

Some embodiments may be able to, in effect, "remove" the HMD from the image shown to the other caller. FIG. 25B is an example of a second caller's image as seen by the first caller, where the second caller's image does not show that she is wearing an HMD. As described with reference to FIG. 25A, the first caller's HMD 1412a may display an image 1564e of the second caller. The image 1564e may be registered over the first caller's reflected image 1462b and creates a tangible sense of the second caller's presence. For example, the image 1564e of the second caller may be overlaid on the reflected image 1462b of the first caller 1462a. In some embodiments, the first caller 1462a may still see the reflected images of the physical objects in his environment even though the second caller's image is registered over the first caller's reflected image. For example, the first user's room may have a physical plant. The mirror 1432 may show a reflected image 1512b of the physical plant. As shown in FIG. 25B, the first caller 1462a may perceive the image 1564e of the second caller as well as the reflected image 1512b of the physical plant in his mirror 1432 during the telepresence session.

In one embodiment, although the second caller 1464a is wearing the HMD 1414a in the telepresence session (as shown in FIG. 24), the region of the second caller's face as occluded by the HMD 1414a may be substituted by an unoccluded image 1514c of the second caller (illustrated in the inset shown in FIG. 25B).

With reference to FIGS. 1B and 5, the second caller 1464a may use the outward-facing imaging system 502 of the second caller's HMD 1414a, the inward-facing imaging system 500 of the second caller's HMD 1414a, or a combination to obtain the unoccluded image 1514c of the regions of the caller's face where the HMD is worn. For example, the second caller 1414a may turn the outward-facing imaging system 502 toward herself to obtain an unoccluded image of the second caller's face. As another example, the HMD 1414a may acquire images of the second caller's 1464a face while the caller 1464a is putting on the HMD. The unoccluded image of the second caller may also be acquired using other ways, such as, e.g., retrieving previous stored information, taking a picture using a camera external to the HMD 1414a, etc.

The unoccluded image may comprise multiple patches. The patches may have a variety of sizes. The patches may be obtained at different times and/or by different imaging systems. For example, the second caller 1414a may use the outward-facing imaging system 502 to obtain image patches of her face, such as e.g., forehead, eye region, cheeks, etc., before a telepresence session while use the inward-facing imaging system 500 to track movements of regions that are occluded by the HMD during the telepresence session. The inward-facing imaging system 500 may track the movements of one eye or both eyes.

During a telepresence session, a caller's images may be generated using one or more patches. Some of the patches may be generated at real time. For example, an HMD (e.g., the HMD 1412a or 1414a) may generate the image of the second caller's face using previously obtained image patches of her face. The second caller's HMD 1414a may also obtain the live images patches of movements of either one eye or both eyes of the second caller. Images of such movements may be used to substitute the eye region 1514c occluded by the HMD 1414a so that the second caller's eye region 1514c appears more natural. The HMD (e.g., the HMD 1412a or 1414a) may also dynamically deform the images of the regions occluded by the HMD (e.g., eye region) based on the data obtained from the inward-facing imaging system 500.

In addition to or in alternative to transmitting the image of the second caller to be displayed by the first caller's HMD 1412a, the HMD 1412a or 1414a may also create animations of the second caller 1464a, based on data obtained from various sensors such as e.g., cameras, inertial measurement units (IMUs), accelerometers, etc., as described with reference to FIG. 1B. Data obtained by these sensors may be used to dynamically deform existing image patches of the second caller 1464a to create animations of the movements of the second caller 1464a. For example, the head of second caller 1464a may turn rightward during the telepresence session. The inward-facing imaging system 500 of the second caller's HMD 1414a may track the eye movements of the second caller 1464a during this change in pose. The HMD 1412a or 1414a may use the data from the inward-facing imaging system 500 of the second caller's HMD 1414a to modify an existing and unoccluded eye image of the second caller 1464a to reflect the change in eye pose, and to provide an animated image of the second caller to the first caller 1462a to be displayed by the first caller's HMD 1412a. Various methods may be used to generate the animation of the second caller 1464a. For example, a wearable system may generate a facial animation of the second caller 1464a by mapping onto a known rigged model of the second caller's face. The rigged model of the second caller may be generated automatically by the wearable system (such as, e.g., the second caller's HMD 1414a).

Other sensors of the second caller's HMD 1414a may also be used to obtain data on changes in pose of the second caller 1464a. These data may be used, alone or in combination, with the data from the inward-facing imaging system 500, to provide an unoccluded image of the second caller 1464a.

Example Backgrounds of a Caller's Image

Figure 26A:
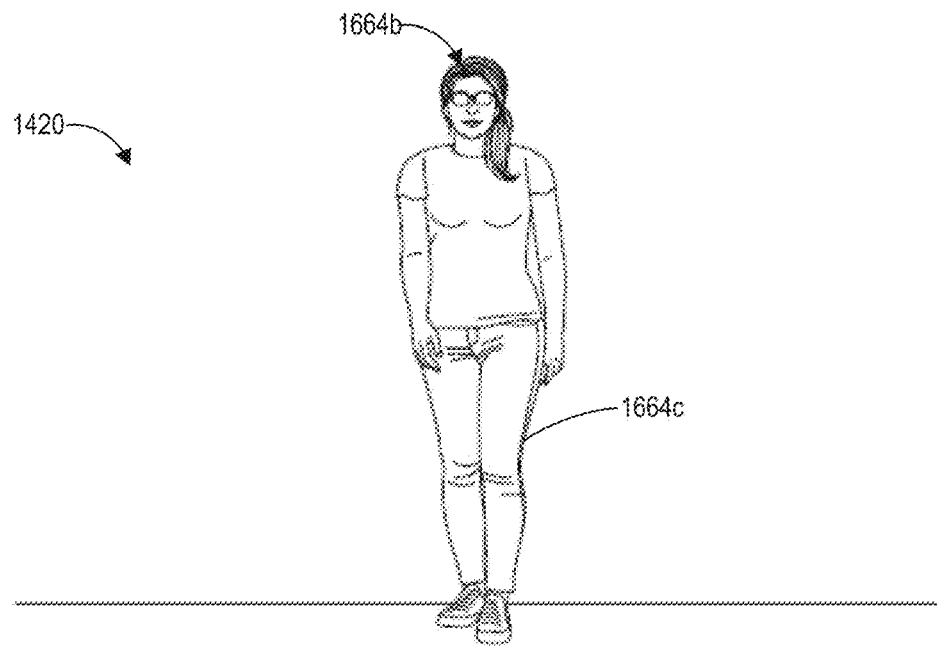
FIGS. 26A, 26B, 27A, and 27B illustrate additional user experiences in a telepresence session.
Figure 26B:
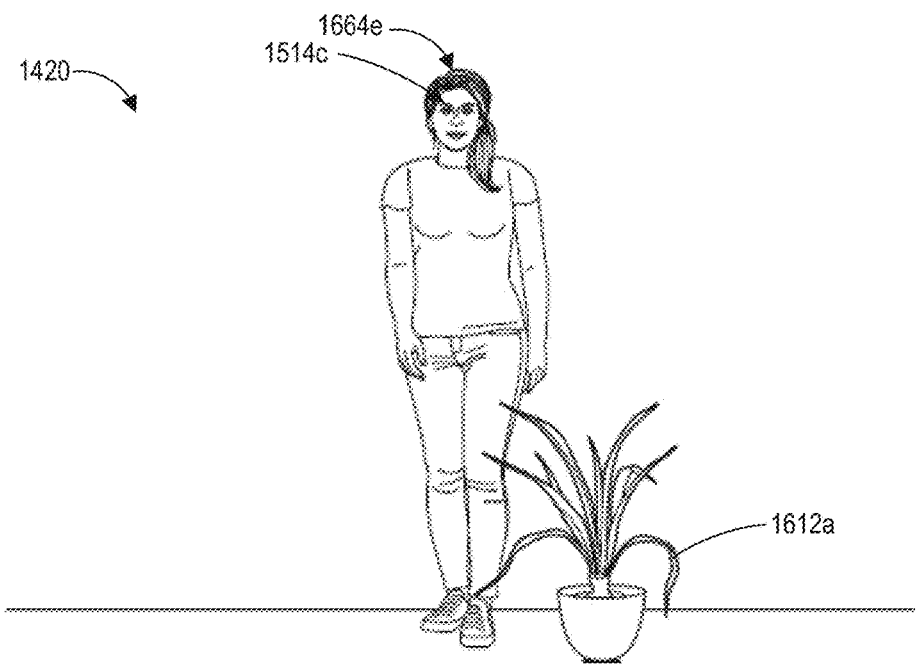

FIGS. 26A and 26B are additional examples of a second caller's image as seen by the first caller, where the mirror 1432 in the first caller's environment is occluded from the presentation to the first caller. As described with reference to FIGS. 24, 25A, and 25B, the first caller 1462a wearing his HMD 1412a is near the mirror 1432. The mirror 1432 shows a reflected image 1462b of him. The HMD 1412a may occlude a portion of the light (natural or artificial) reflected from the first caller's mirror 1432 or optionally the frame of the mirror 1432. Thus, the HMD 1412a may display an image 1664b of the second caller (without the second caller's lower body 1664c in some cases) but without showing the first caller's mirror 1432.

In some embodiments, special effects may be applied to the image presented to the first caller. The effects may comprise blending effects, feathering effects, glow effects, smoke, fog, fire effects, flowers, or other special effects (e.g., any type of imagery may be applied). As described with reference to FIG. 25A, sometimes the image of the first caller 1462a and the image of the second caller 1464a as acquired by their respective HMDs may be different in size. The special effects described herein may be applied to the images of the first caller, the second caller, or both. For example, the image of the first caller 1462a may be a full body image because the first caller's HMD 1462a captures the reflected image 1462b of the first caller as shown in his full body mirror 1432. However, because the second caller's mirror 1434 may be a half-body mirror, the HMD (1462a or 1464a) may apply a smoking effect around the first caller's image so that the second caller's HMD 1414a may display only the upper body of the first caller. Similarly, because the reflected image 1414b of the second caller may be smaller than the first caller's 1432, the HMD (1462a or 1464a) may apply a fire effect to the image of the second caller's lower body 1664c to fill the empty space in the mirror as projected to the first caller 1462a.

In various embodiments, the first caller's HMD 1412a may display the second caller's image 1664b and the second caller's environment, the second caller's image alone, or the second caller's image 1664b overlaid on the first caller's environment 1420. The position of the second caller's image 1664b relative to first caller's mirror 1432 as seen by the first caller 1462a may reflect actual relative positions between the second caller's location and the second caller's mirror 1432. For example, the second caller may be located (virtually) relative to the first caller's mirror 1432, as if the first caller's mirror 1432 is a window or portal and the second caller 1464a is standing on the other side of that portal. The relative position between the image 1664b of the second caller and the back side of the portal may be the same as or proportional to the one that the second caller 1464a has to her own mirror 1434.

The first caller's HMD 1412a may modify a portion of the image of the first caller's environment when displaying images to the first caller 1464a. For example, the HMD 1412a may selectively alter, augment, or block images of the first caller's environment relative to the first caller's mirror 1432. For example, in contrast to FIG. 26B, the HMD 1412a (not shown) in FIG. 26A may block the plant 1612a in the first caller's room 1420 when projecting the image 1664b of the second caller to the first caller 1462a. The HMD may block an object by selectively darkening a portion of the 3D display. Such darkening may be performed by the image injection devices described with reference to FIGS. 1B and 5. The darkening may be over the entire optic (e.g., over the entire stackable waveguide assembly 178), or selectively over a portion of an object and/or of the first caller's environment.

As described with reference to FIG. 25B, in FIG. 26B the HMD 1412a may display the second caller's image 1664e where the reflected image of the second caller's HMD is removed from the image presented to the first caller. The region of the second caller's image that is occluded by the second caller's HMD 1414a may be replaced with an unoccluded image 1514c of the same region.

Example Themes of a Caller's Image

Figure 27A:
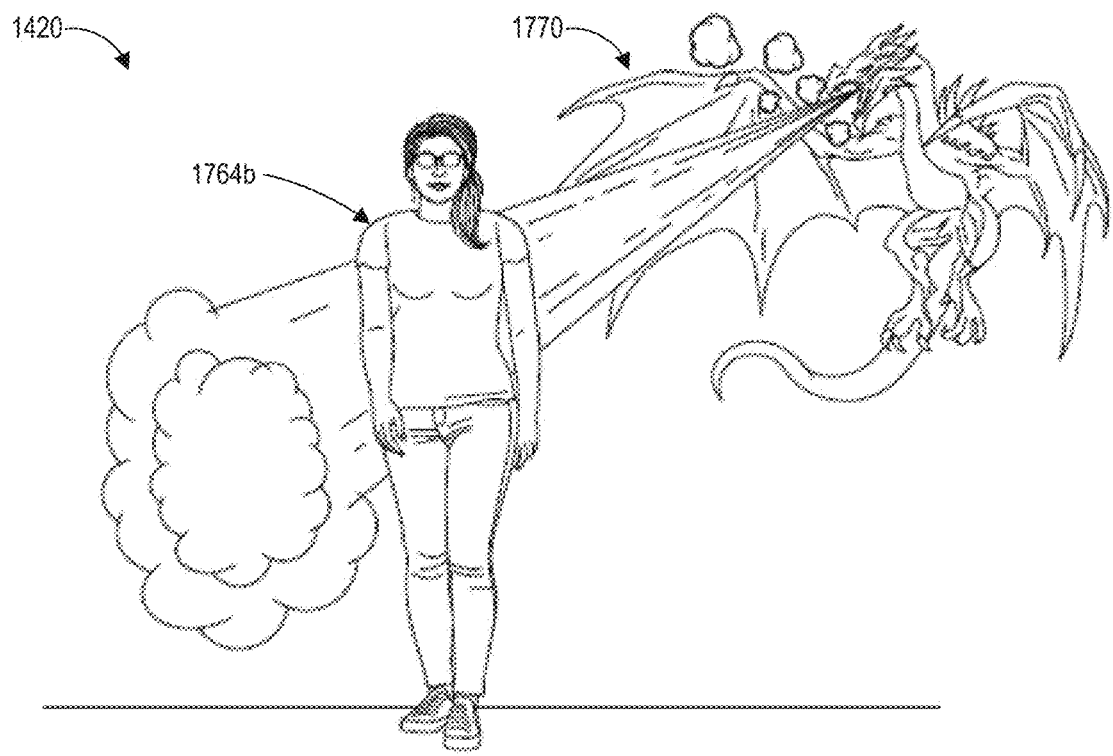
Figure 27B:
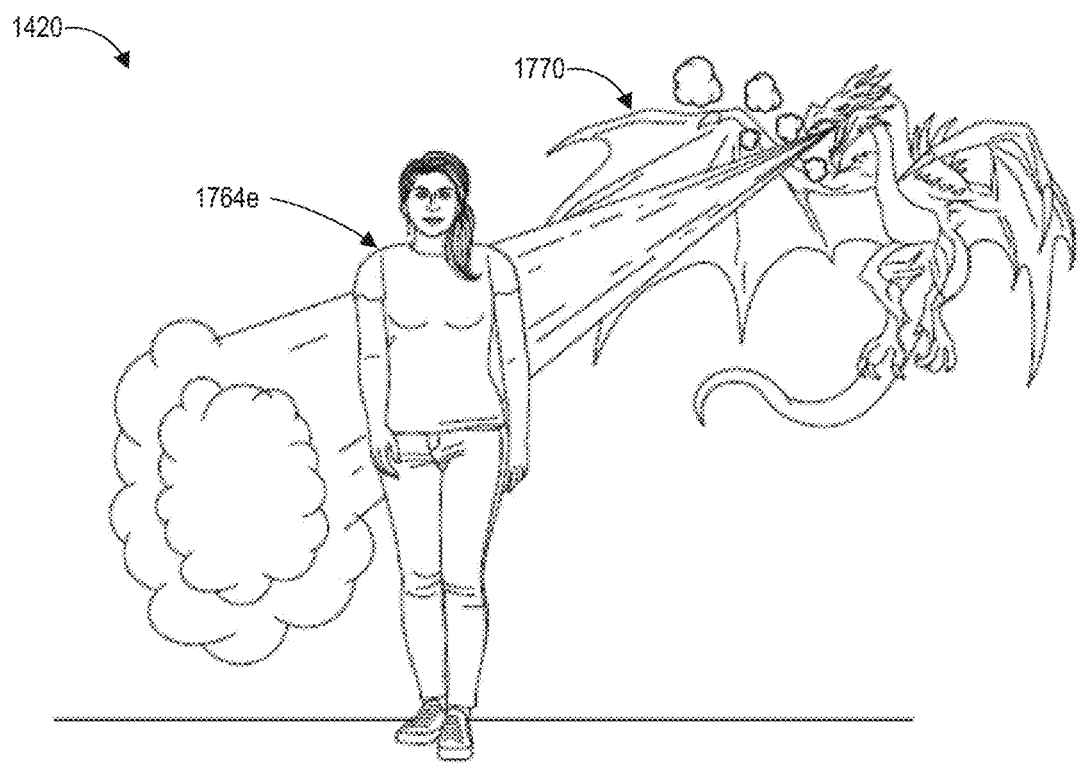

In some embodiments, the HMD may present to the wearer a static or dynamically changing user experience during the telepresence session. FIGS. 27A and 27B are examples of a second caller's image as seen by the first caller, where a background 1770 may be added to the second caller's image (1764b or 1764e) by either caller's HMD. In this example, the background 1770 has a fantasy theme that comprises a fire breathing dragon. The first caller's HMD 1412a may display an image of the second caller and additionally display the background 1770. The background 1770 may be added to the second caller's mirror image 1464b, so that some or all of the background 1770 appears behind, around, or in front of the second caller. The background 1770 may also be registered on top of the first caller's environment.

The background may contain elements or characters associated with games, movies, books, art, music, existing physical elements, or virtual objects. For example, the first caller's HMD 1412a may display a background which comprises, in whole or in part, virtual objects in the environment of the first caller 1412a. The background 1770 may be a picture or animation and may be associated with a theme (e.g., a fantasy theme as shown in FIGS. 27A, 27B). The theme may relate to entertainment, education, science, technology, art, architecture, animals or plants, religion, politics, nature, and so forth. The theme may be a branded theme associated with a third party's brand, advertising, or marketing (e.g., the theme may include characters owned by Disney®). The background 1770 may also change during a telepresence session (e.g., the dragon in FIGS. 27A, 27B may move, blow flames from its mouth, fly away, etc.). In some cases, the wearable system (e.g., wearable display system 80) may permit the caller to personalize the theme or to use branded themes that have been licensed from a third party.

As described with reference to FIGS. 25A, 25B and 26A, 26B, the image of the second wearer's HMD may be substituted by an unoccluded image of the wearer's facial region (see image 1764e of the second caller in FIG. 27B).

Example of Taking a Self-Portrait Using the HMD

The various methods for processing a caller's image may also be used to in conjunction with the wearable system to generate a self-portrait of the caller. For example, the first caller 1462a wearing an HMD 1412a may use the outward-facing imaging system 502 of the HMD 1412a to take a reflected image 1462b of himself. As described with reference to FIG. 25B, the wearable system may "remove" the reflected image 1412b of the first caller's HMD and generate an unoccluded image of the first caller 1462a. The wearable system may add backgrounds (see e.g. as referenced in FIGS. 27A and 27B) to the first caller's image. The wearable system may also remove features of the first caller's environment from the first caller's image. For example, the wearable system may remove the mirror 1432 from the first caller's image using any known image processing techniques.

Example Processes of a Telepresence Session

Figure 28:
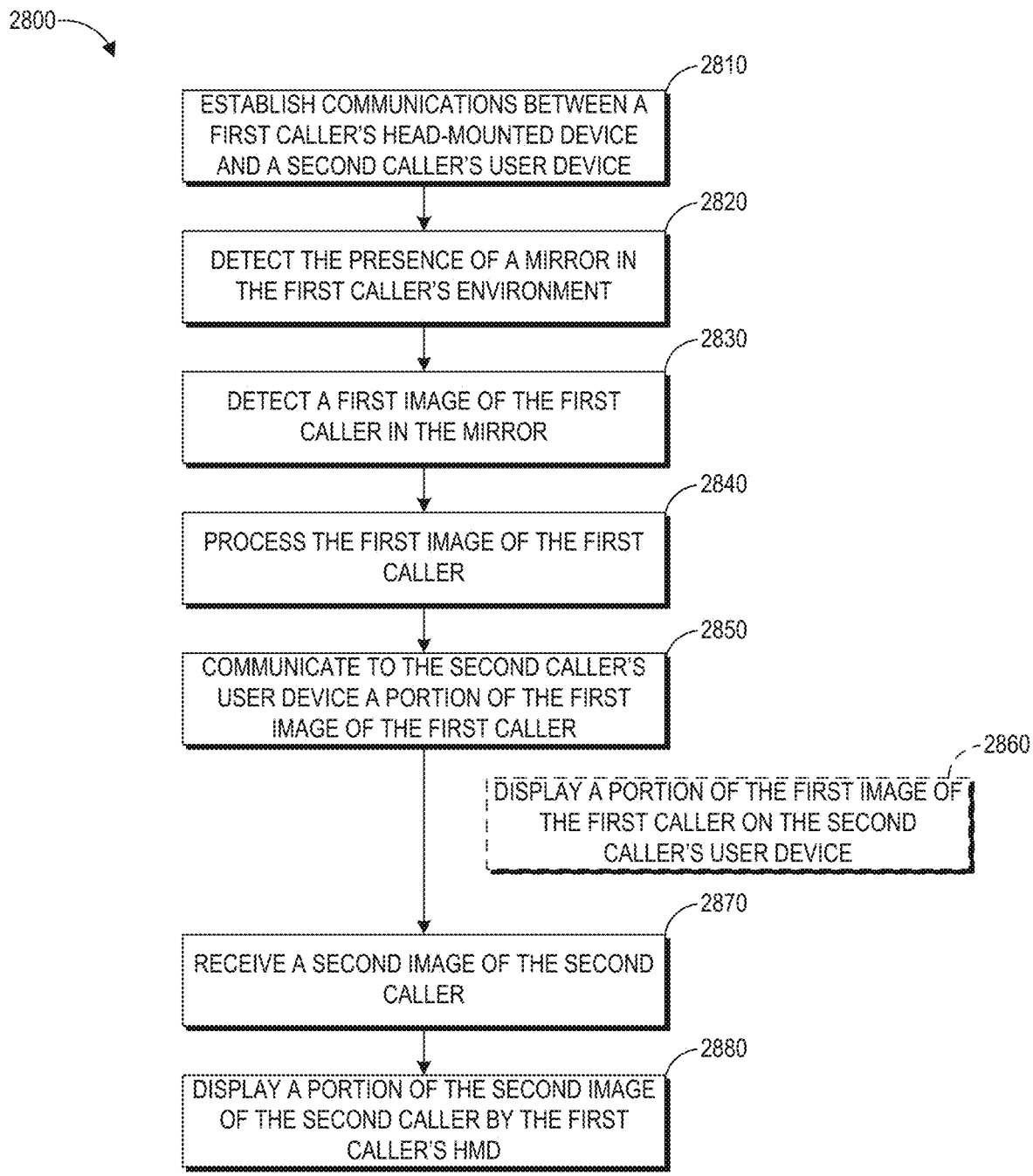
FIG. 28 is a process flow diagram of an example of conducting a telepresence session.

FIG. 28 is a process flow diagram of an example of conducting a telepresence session. The process 2800 may be performed by the wearable system described with reference to FIGS. 1B and 4. For example, the process 2800 may be performed by the HMD of a first caller.

At block 2810, the first caller's HMD establishes communications with the second caller's user device. The second caller's user device may or may not be an HMD (see e.g. user devices 1230a, 1230b, 1230c shown in FIG. 12). A variety of techniques may be used to initiate the communications, such as, e.g., voice activation and receiving inputs from a user input device (see e.g. user input device 504 in FIG. 5) which indicate a caller's intent to initiate a telepresence session. The communications may be via the network 1290 (as shown in FIG. 12).

As shown in block 2820, the first caller's HMD may search for a mirror in the first caller's environment after the communications are established between the first caller and the second caller. As described with reference to FIG. 16, various mirror detection techniques may be used. For example, the outward-facing camera of the first caller's HMD may search for a mirror in the first caller's environment. The HMD may detect a mirror by e.g., facial recognition, key-points recognition, recognition of the HMD in the mirror, active query from the device such as flashlight and infrared pulse, depth discontinuity, shape of the mirror, or special features of the mirror such as an optical label (e.g., a bar code or a quick response (QR) code).

In some embodiments, the first caller's HMD may search for a mirror in the first caller's environment before the communications are established between the first caller and the second caller. The detection of a mirror in the first caller's environment may trigger the first caller's HMD to establish communications with the second caller's user device.

The first caller's HMD may detect a reflected image of the first caller and the first caller's environment as shown in block 2830. As described with reference to FIGS. 24 and 25A, the reflected image of the first caller may contain only a portion of the first caller's body. The first caller's HMD may process the first caller's image before the second caller sees the first caller's image. The first caller's HMD may be in communication with one or more remote computers (see e.g., the remote computing system 1220 in FIG. 12) to process the first caller's image. As described with reference to FIG. 12, the first caller's image may be processed by the first caller's HMD, the remote computing system 1220, and/or other user devices (see e.g. user devices 1230*a*, 1230*b*, 1230*c* in FIG. 12).

The reflected image of the first caller acquired by the HMD may be processed in a variety of ways. For example, the image of the first caller (which may be a whole body image reflected from the full-body mirror) may be selectively cropped so as to fit within the smaller area of the second caller's half-body mirror. When the first caller's mirror is not a whole body mirror, the image may be processed to include the portion of the first caller's lower body and (optionally) his background that are not captured by the mirror. In some embodiments, the image of the first caller's HMD may be "removed" from the image of the first caller. The region of the first caller's image which is occluded by the first caller's HMD may be replaced with an unoccluded image of the same region.

Besides the image of the first caller, the background of the first caller's image may also be processed and modified in a variety of fashions. For example, as shown in FIGS. 27A and 27B, a background may be added to the first caller's mirror image, so that some or all of the background appears behind, around, or in front of the first caller. The background may contain elements or characters associated with games, movies, books, art, or music, existing physical elements, or virtual objects. The background may be a picture or animation and may be associated with a theme (e.g., a fantasy theme as shown in FIGS. 27A, 27B). The theme may relate to entertainment, education, science, technology, art, architecture, animals or plants, religion, politics, nature, and so forth.

At block 2850, the first caller's HMD may communicate a portion of the first caller's image to the second caller's user device via the network 1290 (shown in FIG. 12). The first caller's image may be a processed image or an unmodified reflected image as captured by the first caller's HMD. The unmodified reflective image of the first caller may be sent first to one or more remote computer systems (see e.g. the remote computing system 1220 in FIG. 12) for processing before being sent to the second caller's user device.

On the second caller's end, after receiving the image of the first caller, the second caller may display the received image to the second caller as shown in optional block 2860. The second caller's user device may also process the first caller's image and display the processed image to the second caller.

At block 2870, the first caller's HMD may receive an image of the second caller. The HMD may process the image of the second caller and/or the background associated with the second caller's image as described herein. For example, a background (see e.g. a fantasy background in FIGS. 27A and 27B) may be registered on top of the first caller's environment. In some embodiments, the mirror in the first caller's environment is occluded from the presentation to the first caller. The HMD may occlude a portion of the light (natural or artificial) reflected from the first caller's mirror or optionally the frame of the mirror. Thus, the HMD may project an image of the second caller without showing the first caller's mirror. Special effects may be applied to the image presented to the first caller's mirror. The effects may comprise blending effects, feathering effects, glow effects, and other special effects.

The first caller's HMD may display an image of the second caller as shown in block 2880. In various embodiments, the first caller's HMD may display the second caller's image and the second caller's environment, the second caller's image alone, or the second caller's image overlaid on the first caller's environment. The image of the second caller may be a processed or an unprocessed image of the second caller.

Example Health Analyses

It will be appreciated that the ability to image reflections of the user facilitates various health analyses that rely on observations of the user. In some embodiments, the user may be instructed to assume various positions and/or perform various movements, which are captured by an outward-facing camera. In some other embodiments, another individual may assist the user and/or otherwise interact with the user, e.g., to apply a stimulus. In yet other embodiments, the display system may simply capture images of reflections of the user without specifically instructing the user on a particular movement. For example, some health analyses may involve simply evaluating the posture or gait of the user as seen in a reflection.

The images captured by the camera may be analyzed, e.g., by a clinician and/or by the display system. In some embodiments, the clinician may be remote from the user and images may be transmitted electronically to the clinician. In some embodiments, the clinician may also be a user of an augmented reality display system as disclosed herein. Optionally, the data obtained by the user's display system may be passed to the clinician's display system so that the clinician may experience the health analysis as experienced by the user.

Many of the analyses disclosed herein involve a determination of the degree of deviation of movements of the user from a norm, or reference. In some embodiments, the norm or reference may be displayed to the user as augmented reality content and the user's deviation from that norm or reference may be seen by the user and evaluated. In some embodiments, the norm or reference may be the user's previously captured images showing, e.g., particular movements. In all of the health analyses and therapies disclosed herein, the various content shown to the user and overlaid a reflection may be performed as part of block 710 (FIG. 12).

In some embodiments, the captured images of the user may be displayed to show a view of the user, at block 710 (FIG. 12), not normally visible to the user. For example, the display system may include one or more outward-facing cameras oriented to capture views at the sides and/or back of the user's head; that is, one or more of the outward-facing cameras are directed in a direction different from the direction that the user is facing. As a result, the cameras may be configured to image a reflection that shows a view of the user not normally seen by the user, e.g., the back or side of the user. The display system may be configured to display this image to the user. For example, a view of the back of the user may be utilized to aid the user in performing a particular activity (e.g., straightening hair in the back of the user's head, zippering a dress having a zipper along the user's back, etc.). As another example, the display system may be configured to provide a side view of the user by imaging a reflection of a side view of the user, and displaying that imaged side view reflection to the user.

In some embodiments, side view reflections may be utilized to monitor the user's form when performing various sports-related activities. For example, it will be appreciated that form/posture is important in various activities such as weightlifting, where injuries may occur if an activity is performed incorrectly. For example, when performing squats, the user's knees should not extend beyond their toes. However, it may be difficult for the user to determine where their knees are relative to their toes, especially while lifting a heavy weight and while keeping their head facing forward. Moreover, even training in front of a mirror is insufficient, since the user will only see a front view of their form. While looking into a mirror that is directly in front of the user, the mirror will clearly show alignment in the x and y directions (left and right, and up and down, respectively), but not in the z direction (back and forth relative to the mirror), which is the relevant axis for knee/toe alignment. As a result, in some embodiments, the display system may include an outward facing camera directed sideways and the user may face 90 degrees away from the mirror so that the mirror and camera has a profile/side view of the user. In addition, the display system may be configured to display the captured side view of the user and/or an avatar based on the user at block 710 (FIG. 12), and the captured side view may be displayed in real time to provide the user with real time alignment assistance. In some embodiments, the captured views may be displayed and stored for review by the user or third parties at a later time.

As disclosed herein, it will be appreciated that the outward-facing camera may continuously capture images (including video) of the ambient environment in these images may include reflections of the viewer. As also disclosed herein, the images may be stored in a data repository. Advantageously, the storage of images may allow historical analyses of the health of the viewer, and may allow an opportunity to detect and/or confirm health conditions retrospectively. For example, some conditions may not be apparent for months or years. The retention of images by the data repository allows the display system and/or a clinician to conduct various observational health analyses days, weeks, months, or years after those images are captured, and possibly only after a later health condition has prompted a desire to conduct a particular historical health analysis. For example, reviewing past images may aid in determining the onset and progression of a condition that only became apparent sometime after those images were captured. This may be facilitated by the accommodation-vergence matching provided by the display system, which allows long-term wear of that display system. As a result, a large quantity of images may be captured as the user goes about his/her regular routine without specifically capturing those images for the purpose of performing a health analysis. This large quantity of images may subsequently be utilized for multiple purposes, including a retrospective health analyses as described herein.

Examples of various health analyses will now be described below. It will be appreciated that any of these analyses may include a historical analysis, as described herein, in which data obtained at two different times are compared. In addition, for any of these analyses, test results may be stored to allow for historical comparisons of these test results.

Neurological Examinations, Including Cranial Nerve Examinations

In some embodiments, the display system may be configured to conduct a health analysis to evaluate the cranial nerves of the user. Cranial Nerves (CN) are part of the peripheral nervous system (PNS) and emerge directly from the brain. There are twelve different CNs each serving a different function but all relaying information between the body, mainly regions of the neck and head, and the brain. Some abnormalities associated with the position and/or movement of the user's body may be indicative of defects or injuries to one or more cranial nerves or areas other nervous system or areas of the brain. In some embodiments, the display system may be configured to detect damage or abnormalities in various cranial nerves.

a. CN VII—Facial Nerve

CN VII is involved with control over facial muscles and abnormalities with this cranial nerve may be detected based upon abnormalities in the action of facial muscles as observed in reflections of the user's face. In some embodiments, the display system may be configured to image the face of the user in a reflection to detect asymmetries and/or deviations and how they perform various requested actions. For example, the display system may be configured to determine the presence of asymmetries in facial shape and/or asymmetries in the depth of furrows such as the nasolabial fold. Also, the display system may be configured to look for asymmetries in spontaneous facial expressions and/or blinking. Alternatively or in addition, the user may be prompted to perform various movements including raising both eyebrows, frowning, clenching their eyes tight, showing both upper and lower teeth, smiling, puffing out their cheeks, wrinkling their brow, and so on.

Asymmetries and/or observed weaknesses in performing the requested actions may be indicative of various conditions as noted below. It will be appreciated that facial weakness may be detected based on an inability of the user to perform particular action and/or by comparison of the degree of movement observed relative to the degree of movement in a reference. In some embodiments, the reference may be prior images of the user performing a particular action. To provide the user with an indication of the level of deviation from the baseline, the reference may be provided as augmented reality content that is overlaid a reflection of the user at block 710 (FIG. 12) as they are attempting to perform an action. In some other embodiments, the reference may be the response of an average user.

Deviations from the reference may be interpreted to be facial weakness, which may be caused by lesions of upper motor neurons in the contralateral motor cortex or in the descending central nervous system pathways, lower motor neurons in the ipsilateral facial nerve nucleus (CN VII) or exiting nerve fibers, the neuromuscular junction, or the face muscles. In some instances, facial weakness may be indicative of Bell's Palsy and Ramsay Hunt Syndrome.

The display system may be configured to interpret various types of responses to prompted user actions as follows. An inability to control facial muscles and/or facial paralysis may be interpreted to be caused by motor disorders such as Bell's Palsy or Pseudobulbar Palsy; memory disorders such as Vascular Dementia; and/or injuries such as stroke. Signs of a flat, drooping, or expressionless face (including the whole face or one side of the face) may be interpreted to be caused by motor disorders such as Bell's Palsy or Pseudobulbar Palsy; and/or injuries such as stroke. Signs of widened palpebral fissure/an inability of the light close may be interpreted to be caused by motor disorders such as Bell's Palsy. Signs of lip smacking may be interpreted to be caused by nervous system disorders such as Epilepsy; or motor disorders such as Dystonia. Signs of facial movement difficulties may be interpreted to be caused by nervous system disorders such as Guillain-Barre Syndrome; motor disorders such as Kennedy's Disease; or memory disorders such as Cortical Basal Degeneration.

b. CN VIII—Vestibulocochlear Nerve

CN VIII is involved with the functioning of the vestibular system and abnormalities in CN VIII may be detected based on abnormalities in the user's hearing and/or sense of balance. An example of a hearing test is a Weber test in which a tuning fork is placed on the vertex of the skull in the midline, and the user is subsequently asked to indicate the side where the tone sounds louder. It will be appreciated that the tuning fork may be placed on the user's skull by a third party or the user. The user may indicate the side where the tone sounds louder by selecting a virtual menu item, by raising their left or right hand (such that the display system recognizes the raised hand in the reflection of the viewer), by verbally noting the side that is louder, etc. In addition, the display system may be configured to monitor the head pose of the user to determine which side of the user perceives a louder sound. For example, the user may turn away from the louder side and the display system may be configured to interpret this turning away as indicating that the sound is perceived to be louder on that side.

In some embodiments, the display system may emit sound in place of the tuning fork, e.g., the display system may be configured to emit sound of the same level through both left and right speakers 66 (FIG. 2). In some embodiments, rather than emitting a tone, the display system may be configured to direct questions or instructions to the user, and to monitor the user's response to the instructions to, e.g., determine which side of the user hears the instructions.

The display system may be configured to determine whether the user has hearing loss based on the response. Assuming that the display system knows which ear is normal and which is affected by a hearing problem, if the user indicates that the tone is louder on the normal side, then the user may be determined to suffer from sensorineural hearing loss in the affected ear. If the user indicates that the tone is louder on the affected side, then the user may be determined to suffer from conductive hearing loss.

It will be appreciated that hearing loss may be caused by lesions in the acoustic and mechanical elements of the ear, the neural elements of the cochlea, or the acoustic nerve (CN VIII). In addition, signs of hearing loss may be caused by nervous system disorders such as Clinically Isolated Syndrome, or Schilder's Disease; developmental disorders such as Fetal Alcohol Spectrum Disorder; or injuries such as a Brain Tumor.

In addition, other hearing related conditions may also be detected. For example, the hearing test may determine that the user suffers from hyperacusis, which may be caused by motor disorders such as Bell's Palsy. In some embodiments, the hearing test may determine that the user for suffers from an overactive acoustic startle response, which may be caused by motor disorders such as Primary Lateral Sclerosis.

In some embodiments, the display system may be configured to conduct vestibular testing of the user. An example of such testing includes Barany or Hall-Pike positional testing, which may be utilized to distinguish peripheral from central causes of vertigo. In such tests, the user may be prompted to sit on the bed or examining table, and a third party may support the user's head as they lay back with one ear down, and with the head extending over the edge of the table. In some embodiments, the test may be conducted without the aid of a third party. Rather, the user may be positioned in front of a mirror and the display system may project augmented reality content that shows the user how to position themselves. In either case, the user is asked to keep their eyes open and report any sensations of vertigo, while an inwardly-facing camera examines the user's eyes for signs of nystagmus.

The display system may be configured to receive an input from the user regarding whether they are experiencing vertigo and nystagmus. Based upon the input provided by the user, the display system may be configured to draw various conclusions. For example, a delay of a few seconds before the onset of nystagmus and vertigo after the user lays down may be interpreted by the display system as indicative of a peripheral lesion in the cranial nerve. The nystagmus may be horizontal or rotatory and does not change directions. The user's nystagmus and vertigo symptoms then fade away within about a minute, and the user may provide an input to the display system to indicate that these symptoms have faded.

The immediate onset of nystagmus and vertigo symptoms after the user lays down may be interpreted by the display system to be indicative of central lesions in the cranial nerve. Horizontal or rotatory nystagmus may also be present with central lesions. However, central lesions may also exhibit symptoms not seen with peripheral lesions. Such symptoms unique to central lesions include vertical nystagmus, nystagmus that changes directions, or prominent nystagmus in the absence of vertigo.

In general, the display system may be configured to conclude that abnormalities in the response of the user to vestibular testing are associated with lesions in the vestibular apparatus of the inner ear, the vestibular portion of CN VIII, the vestibular nuclei in the brainstem, the cerebellum, or pathways in the brainstem.

In some embodiments, the display system may be configured to image the user as they move during the day. For example, the display system may be configured to determine whether reflections of the user exhibit signs of a lack of balance (e.g., due to the user not walking straight, or not standing straight). In some embodiments, a lack of balance may be determined using motion sensors such as accelerometers or inertial measurement units (IMU's) to track the movement and orientation of the body.

In some other embodiments, the display system may be configured to display augmented reality content that the user interacts with in order to detect impairments in their balance. For example, the user maybe asked to dodge virtual objects displayed by the display system and coming to the user through multiple depth planes. A lack of steadiness in these dodging movements by the user may be indicative of impaired balance.

The display system may also be configured to conclude that difficulty with balance may be caused by motor disorders such as Ataxia or Parkinson's Disease. In particular, the display system may be configured to determine that signs of hypoactive rotational and caloric-induced vestibular responses may be caused by motor disorders such as Parkinson's Disease.

In some embodiments, the display system may be configured to provide augmented reality content to improve the balance of the user. For example, the system may be configured to provide visual stimuli such as a horizontal line that the user may focus on to maintain their balance. In some other embodiments, the display system may include an electrode (e.g., on the frame of the display) that is in direct physical contact with the user. The electrode may be utilized to provide galvanic vestibular stimulation to a nerve in the ear, to help the user maintain their balance.

c. CN XI—Accessory Nerve

CN XI controls the sternocleidomastoid or trapezius muscles, which are involved with head turning and shoulder elevation. The display system may be configured to test for abnormalities in CN XI by conducting range of motion and strength testing. For example, the display system may be configured to prompt the user to shrug their shoulders, turn their head in both directions, and raise their head from a surface on which they are laying, flexing forward against the force of their hands. Decreases in the range of motion from an earlier-established reference baseline may be interpreted by the display system as weakness in the sternocleidomastoid or trapezius muscles. In some embodiments, the system may be configured to display the expected baseline range of motion to help determine the level of inability of the user. In turn, the display system may be configured to interpret the weakness as being caused by lesions in the muscles, neuromuscular junction, and/or lower motor neurons of the accessory spinal nerve (CN XI). In some embodiments, the range of motion of the user may correspond to contralateral weakness of the trapezius, with relative normal sternocleidomastoid strength. This may be interpreted by the display system as being caused by unilateral upper motor neuron lesions in the cortex or in descending pathways.

Various other user responses to the requested motions may include the following. Head dropping or bobbing may be interpreted by the display system as being caused by nervous system disorders such as epilepsy. Head muscle contractions may also be interpreted as being caused by nervous system disorders such as epilepsy. Involuntary twisting, turning, pulling of the head may be interpreted as being caused by motor disorders such as Cervical Dystonia.

In some embodiments, the display system may be configured to conduct physical or occupational therapy of the user by displaying augment reality content that shows the user the appropriate movements to engage in for the physical therapy, as disclosed herein.

d. CN XII—Hypoglossal Nerve

CN XII controls the tongue and abnormalities with this cranial nerve may be detected based upon abnormalities with the movement of the tongue. For example, the display system may be configured to detect atrophy or fasciculations of the tongue, as seen in a reflection, while it is resting on the floor of the mouth. It will be appreciated that fasciculations are spontaneous quivering movements of the tongue, which, without being limited by theory, may be caused by the firing of muscle motor units.

The display system may be configured to ask the user to stick their tongue straight out and to image the reflection of the tongue to determine whether the tongue curves to one side or the other. The display system may also be configured to ask the user to move their tongue from side to side and to push it forcefully against the inside of each cheek. In some embodiments, testing may show weakness on the ipsilateral side and protrusion of the tongue toward the side of an injury.

The display system may be configured to interpret various observations regarding reflections of the user's tongue as follows. Fasciculations and atrophy may be interpreted to be signs of lower motor neuron lesions. Tongue weakness may be interpreted to result from lesions of the tongue muscles, the neuromuscular junction, the lower motor neurons of the hypoglossal nerve (CN XII), or the upper motor neurons originating in the motor cortex. As an example of tongue weakness, unilateral tongue weakness may cause the tongue to deviate toward the weak side. Contralateral tongue weakness may be interpreted as lesions of the motor cortex. Distortion of the mouth and tongue may be interpreted to be caused by a motor disorder such as Oromandibular Dystonia. Weak facial and tongue movements may be interpreted to be caused by a motor disorder, such as Progressive Bulbar Palsy, Pseudobulbar Palsy, and Kennedy's Disease. Tongue protrusion may be caused by motor disorders, such as Tourette Syndrome.

Motor Examinations

In some embodiments, motor examinations may be utilized to detect deficits in the motor system, thereby allowing various nervous system disorders to be identified. Preferably, these motor examinations are observational; an outwardly-facing camera of the display system may be configured to image reflections of the user to detect, e.g., abnormal movements. In some embodiments, the display system may be configured to recognize abnormal movements including twitches, tremors, involuntary movements, unusual paucity of movements, posture, and combinations thereof. These movements may simply be observed in reflections as the user is carrying out their daily activities and/or as the user is making gestures or otherwise providing inputs to the display system. It will be appreciated that involuntary movements may result in menu items being unintentionally selected, or may be determined when the user notifies the display system that an action is involuntary. In addition, involuntary movements may be detected using motion sensors such as accelerometers or inertial measurement units (IMU's), or by detecting the user's head pose (for example, by identifying shifts in the user's perspective and/or line of sight using an outward facing camera of the display system).

In some embodiments, abnormal movements made by a first user may be detected by a second user's display system in reflections of the first user observed by that second user. As disclosed herein, the display systems of the first and second users may be configured to share information, and this information may include sharing data regarding the observed abnormal movements of the other user, as observed in a reflection.

The display system may be configured to conclude that various types of abnormal movement may be caused by various conditions, as follows. For example, involuntary movements and tremors may be caused by lesions of the basal ganglia or cerebellum. Tremors may be caused by peripheral nerve lesions. Tremors or shaking of the user's hands may be interpreted by the display system as being caused by nervous system disorders such as Epilepsy and/or Multiple Sclerosis; motor disorders such as Cerebral Palsy, Spinal Muscular Atrophy type I/III, and/or Parkinson's Disease; and/or memory disorder caused by Lewy Body Dementia, Frontotemporal Dementia, Progressive Supranuclear Palsy.

In another example, muscle spasms, motor tics, or twitches may be interpreted by the display system as being caused by nervous system disorders such as Balo's Disease, Epilepsy, Multiple Sclerosis, and/or Neuromyelitis Optica; motor disorders such as Dystonia, Huntington's Disease, Motor Neuron Disease, Amyotrophic Lateral Sclerosis, and/or Tourette Syndrome; and/or memory disorders such as Creutzfeldt-Jakob Disease and/or Frontotemporal Dementia.

Athetosis (abnormal muscle contractions that cause involuntary writhing movements) and dystonia (involuntary muscle contractions that cause repetitive or twisting movements) may be interpreted by the display system as being caused by various optic neuropathies such as Mitochondrial Optic Neuropathy (Hereditary); motor disorders such as Cerebral Palsy and/or Huntington's Disease; and/or memory disorders such as Cortical Basal Degeneration.

Involuntary movements/loss of muscle control may be interpreted by the display system as being caused by nervous system disorders such as Epilepsy; motor disorders such as Cerebral Palsy; memory disorders such as Creutzfeldt-Jakob Disease; and/or brain injuries such as a Brain Tumor.

Chorea (jerky involuntary movements affecting especially the shoulders, hips, and face) may be interpreted by the display system as being caused by motor disorders such as Huntington's Disease.

Myoclonus (sudden, jerky movements, which may be due to spasmodic jerky contraction of groups of muscles) may be interpreted by the display system as being caused by memory disorders such as Creutzfeldt-Jakob Disease and/or Posterior Cortical Atrophy.

Symptoms of Parkinson's Disease or Parkinsonism may be interpreted by the display system as being caused by memory disorders such as Dementia, Cortical Basal Degeneration, and/or Lewy Body Dementia. Examples of Parkinson's disease or Parkinsonism symptoms that may be observed in a reflection include tremors, slow movement, rigidity, and postural instability by the user.

Observable Body Abnormalities

In some embodiments, various observable body abnormalities may be detected by the display system in reflections of the user. Such body abnormalities may include, e.g., bodily asymmetries detectable by analyzing images captured of the user.

For example, scoliosis, or a sideways curvature of the spine, may be observed by imaging reflections of the user as they are standing or sitting. Preferably, the reflection is of the back of the user. In some embodiments, the display system may analyze captured images of the user to determine whether the spine has a sideways curvature. In some embodiments, a confirmation of the existence of the curvature and/or a determination of the degree of curvature may be made by overlying augmented reality content that shows the orientation of a normal spine. Deviations from this normal orientation may be measured by the user by displaying a virtual scale. If scoliosis is observed, the display system may be configured to interpret the scoliosis as being caused by motor disorders such as Spinal Muscular Atrophy type I/III and/or Congenital Spinal Muscular Atrophywith arthrogryposis.

In some other embodiments, curvature of the spine may also be determined by analyzing the user's body for asymmetry. It will be appreciated that a normal user's spine extends along the centerline of the user's body and that curvature of the spine, which causes the spine to deviate from the centerline, is expected to cause asymmetries in the user's body and/or posture. As a result, asymmetries in the user's body and/or posture, as captured in images of the reflection of the user, may be interpreted by the display system to be a curvature of the user's spine.

In some embodiments, the display system may be configured to aid in physical therapy to treat the user's scoliosis. For example, the user may be displayed examples of movements to follow for the physical therapy. In some embodiments, the display system may be configured to display augmented reality content that shows normal movements overlaid the user's actual movements seen in the reflection and/or augmented reality content may include both the normal movements and recorded images of the user's movements to provide a visual comparison for the user. As disclosed herein, these images of the user's movements may be obtained using one or more outward-facing cameras. These cameras may capture reflections of the user as seen by the user looking straight ahead. In some embodiments, these cameras may face outwards to the side or rear of the user, to provide views of the user that is not only normally seen by the user. These views may be useful for providing comparisons or guidance using views of the user that may be particularly useful for emphasizing these comparisons or guidance. In addition, the display system may be configured to display "tips," e.g., in the form of text and/or animations, to aid the user in performing the instructed physical therapy movements.

As another example, the display system may be configured to analyze the alignment of the user's knees in images of the reflection of those knees. It will be appreciated that the orientation and alignment of the user's legs and feet may be readily observed and categorized as *Varus*, Valgus or normal. In some embodiments, the display system may be configured to make this categorization based on observing the alignment of the feet and knees and hips of the user. An alignment in which these three features generally fall along straight lines, extending downward from the user's hips, may be determined by the display system to be normal. An alignment in which the knees fall outside the straight lines may be determined by the display system to be Varus, and an alignment in which the knees are inside the straight lines may be determined by the display system to be Valgus.

In some embodiments, the display system may be configured to monitor the reflection of the user to detect the occurrence of various automatic movements, such as blinking, smiling, and swinging arms as the user walks. This monitoring may be continuous (e.g., throughout the time that the user is wearing the display device, or may be for a preset duration). In some embodiments, the display system may be configured to monitor the frequency of the automatic movements. In some embodiments, the lack of automatic movements may be interpreted by the display system as being caused by motor disorders such as Parkinson's Disease.

In some embodiments, the display system may be configured to monitor reflections of the user to determine the occurrence of weight gain or loss by the user. Weight gain or loss may be determined by, e.g., monitoring the outline of the user over time and performing comparisons with previously imaged outlines to identify whether the outline has increased or decreased in size, which would be interpreted as being an increase or decrease, respectively, in the weight of the user. The size increase or decrease may also be shown to the user by overlaying augmented reality content that includes a previous image or outline of the user. To allow for accurate comparisons, it will be appreciated that the image or outline may be scaled based upon the distance of the user to the reflective surface, and upon the distance of the user to the reflective surface in the previously captured image. For example, the stored image of the user may include data regarding the distance of the user to the reflective surface, and the display system may also be configured to determine the distance of the user to a current reflective surface before displaying the stored image. The stored image may be scaled such that it corresponds to the current distance of the user to the reflective surface. As disclosed herein, it will be appreciated that the distance of the user to the reflective surface may be determined using various methods, including measurements of optical reflections, acoustical reflections, and/or analyses of the reflected image itself.

In some embodiments, the display system may be configured to interpret weight gain that exceeds a predetermined threshold amount (e.g. an increase in the size of the user's outline that exceeds a predetermined amount) as being caused by memory disorders such as Frontotemporal Dementia, or behavioral disorders such as Depression or Stress. It will be appreciated that historical analysis of the user's weight may be performed by storing images of the user and making comparisons of the outlines of the user in different images of the viewer taken at different times. The images being compared may be taken with the user at different distances to a reflective surface. As result, the images may be scaled to correspond to a common distance and thereby providing accurate comparisons between the two images. In addition to determining whether a predetermined value (e.g., regarding the sizes of various parts of the user) has been exceeded, the display system may be configured to also determine the rate of change over time using the stored historical data. As result, a determination regarding whether a change was sudden or gradual may be made and used to refine a diagnosis made by the display system.

In some embodiments, virtual food may be displayed by the display system for virtual consumption by the user, in order to fulfill the user's craving for food. In some embodiments, the display system may be configured to interpret weight loss that exceeds a predetermined threshold amount (e.g. a decrease in the size of the user's outline that exceeds a predetermined amount) as being caused by optic neuropathies such as Ischemic Optic Neuropathy; motor disorders such as Motor Neuron Disease; and/or behavioral disorders such as Depression, Eating Disorders, Anorexia, Bulimia Nervosa, and/or Stress. As disclosed herein, in some embodiments, the display system may be configured to validate a particular conclusion by evaluating multiple pieces of data. For example, a determination of the presence of stress due to weight loss may be validated based on analysis of images of the user's reflection to determine whether the user exhibits body language that corresponds to stress. It will be appreciated that excessive weight loss may be undesirable and the display system may be configured to display historical comparisons of the user's body weight and/or images of the user to alert the user to this undesirable weight loss. For example, the display system may be configured to display such comparisons if the amount of weight loss and/or the rate of weight loss that exceeds a predetermined threshold In some embodiments, the display system may be configured to monitor reflections of the user to determine the presence of abnormal facial features. Such features may be, e.g., determined to be abnormal based upon averages for a population. For example, it will be appreciated that multiple display systems may be configured to monitor reflections of their users and to share data. In addition, the display systems may have demographic information regarding the user which may be useful for placing the user in various subpopulations. Given the number reflections captured by the display system and the ability to define subpopulations of users, the display system may be configured to provide averages for various facial features. For example, the averages may be determined based upon the population as a whole, or may be more focused to encompass subpopulations defined by various demographic parameters (e.g. age, gender, ancestral country of origin, etc.). Based upon these averages, deviations in the user from various norms may be determined. The display system may be configured to determine the presence and degree of these deviations, some of which may be categorized as abnormal facial features. In some embodiments, the display system may be configured to interpret the abnormal facial features as being caused by developmental disorders such as Down's Syndrome or Fetal Alcohol Spectrum Disorder.

In some embodiments, the display system may be configured to analyze reflections of the user for various dermatology related analyses. For example, the display system may be configured to detect dermatological abnormalities (e.g., deviations from norms for a population) or changes (e.g., changes in the user over time) in various parameters related to the appearance of the skin of the user. Such parameters may include the color and texture of the skin, and the size and shape of features on the skin, including raised bumps. In some embodiments, the display system may include one or more outwardly facing cameras configured to image the reflection using infrared (IR) or visible light. The display system may be configured to utilize pattern recognition and image processing or machine vision/learning to scan a patient's skin and identify anomalies for further investigation. For example, cameras using visible light to image the skin may scan areas of the skin for known characteristics of pathologies using pattern recognition and image processing. Simultaneously, an outwardly facing camera (which may be the same or different camera than the visible light camera) that detects IR may "see through" the top layers of the skin to detect different reflective/refractive characteristics in tissue or layers of skin underlying the surface of the skin. The display system may be configured to analyze images of these areas for parameters of known pathologies. For example, Hyper-Spectral Differential Reflectometry may be used to differentiate areas of interest that have unique characteristics, such as water content. As another example, pre-emergent lesions may have different moisture characteristics than typical tissue and may be differentiated by imaging the reflection using IR-sensitive cameras.

Inspection of Muscle Tone and Bulk

In some embodiments, the display system may be configured to monitor reflections of the user to determine the presence of atrophy (muscle wasting), hypertrophy, or fasciculations (spontaneous quivering movements caused by firing of muscle motor units). It will be appreciated that muscle atrophy or hypertrophy may be determined using historical comparisons of images of the user. For example, a present-day image may be compared to an earlier image to determine changes in, e.g., muscle size and/or definition. In some embodiments, earlier images of the user's muscles may be displayed to the user so that they may be made aware of these changes.

In some embodiments, the size of observable muscles may be measured, as described herein. In some embodiments, the muscles (e.g., muscles with strong muscle tone) may be visible through the skin and may be analyzed through analysis of images of the muscles. In some other embodiments, the display system may be configured to project electromagnetic radiation or sound waves, e.g. infrared light or ultrasonic sound waves, towards a reflective surface, such that the reflective surface reflects the radiation or sound waves towards the user's body. It will be appreciated that some of the radiation or sound waves may be reflected back towards the user and may be detected by the display system, and some of the radiation or sound waves may be absorbed or scattered. Based on the amount that is absorbed (as determined by the amount of reflected radiation or sound that is detected by the display system), different tissues may be distinguished, since different tissues have different attenuation and absorption values. Consequently, the presence and quantity of different tissues such as muscle may be measured in a process similar to temperature mapping. Changes in parameters, which characterized the user's muscles, derived from the measurement techniques noted above may be analyzed over time to detect changes in muscle tone and/or size.

It will be appreciated that various abnormalities in the nervous system may cause specific symptoms that may be detected based upon observations of the user. For example, lower motor neuron lesions may cause muscle weakness, atrophy, fasciculations, hyporeflexia (reduced reflexes), and decreased tone. As another example, upper motor neuron lesions may cause muscle weakness, hyperreflexia (increased reflexes), increased tone, and mild atrophy may develop due to disuse. In addition, acute upper motor neuron lesions may cause flaccid muscle paralysis with decreased tone and decreased reflexes. Such a cute upper motor neuron lesions may cause, within a relatively short span of time of hours to weeks, increased muscle tone and hyperreflexia. As yet another example, corticospinal lesions may cause hyperreflexia and increased tone. In addition, basal ganglia dysfunction may cause increased tone. It will be appreciated that the presence any of these symptoms may be interpreted by the display system as an indication that one of the above-noted abnormalities is present in the nervous system.

The display system may be configured to provide various candidates for the causes of various muscle conditions. Examples of muscle conditions and candidate causes are as follows. Fasciculation/spontaneous contractions may be interpreted by the display system to be caused by motor disorders such as Motor Neuron Disease, Amyotrophic Lateral Sclerosis, Progressive Bulbar Palsy, Progressive Muscular Atrophy, Spinal Muscular Atrophy type I, and/or Kennedy's Disease. In some embodiments, a measurement of the degree of user movement or a stable/previous movement position of the user may be overlaid the user's reflection to determine the level of abnormality or change in the user's muscle.

In some embodiments, muscle stiffness may be interpreted to be caused by nervous system disorders such as Epilepsy; motor disorders such as Spastic Cerebral Palsy, Motor Neuron Disease, Primary Lateral Sclerosis, and/or Parkinson's Disease; and memory disorders such as Creutzfeldt-Jakob Disease, Lewy Body Dementia, and/or Progressive Supranuclear Palsy. Muscle rigidity (stiff muscles with normal reflexes) may be interpreted to be caused by motor disorders such as Huntington's Disease and Parkinson's Disease; and/or memory disorders such as Cortical Basal Degeneration, Lewy Body Dementia, and/or Frontotemporal Dementia. Hypotonia/low muscle tone may be interpreted to be caused by motor disorders such as Ataxia, Dyspraxia, and/or Spinal Muscular Atrophy type I; and/or injuries such as hydrocephalus. Observed variations in muscle tone may be interpreted to be caused by motor disorders such as Cerebral Palsy. Muscle cramping may be interpreted to be caused by motor disorders such as Focal Hand Dystonia, Motor Neuron Disease, Amyotrophic Lateral Sclerosis, and/or Progressive Muscular Atrophy. Muscle wasting may be interpreted to be caused by motor disorders such as Motor Neuron Disease, Amyotrophic Lateral Sclerosis, Progressive Muscular Atrophy, Spinal Muscular Atrophy, and/or Kennedy's Disease; and/or behavioral disorders such as Eating Disorders, Anorexia, and/or Bulimia Nervosa. In will be appreciated that muscle wasting may be determined based upon a comparison of the user's muscle size at an earlier time with the user's muscle size at a later time.

Functional Testing of Muscles

In some embodiments, functional testing of the user's muscles may be performed in front of a reflective surface. The user may be instructed (e.g., by the display system) to perform various fine movements and/or to hold various positions. In some embodiments, these movements may be performed in the context of a game in which correcting performing a movement increases the user's game score. For example, the display system may be configured to instruct the user to perform rapid hand or foot movements, e.g., including touching virtual buttons as quickly as possible, and also to generate a score based on these movements. The display system may be configured to image the user (e.g., using an outwardly-facing camera) to determine whether the instructed movements and positions were accurately performed or to determine to what degree the user deviated from the instructed movements or positions.

Examples of functional tests include drift, in which the user is instructed to hold up both arms or both legs and to close their eyes, and then shake their head back and forth "saying no." If a positive result is observed for this test (that is, if the test is not performed correctly), the display system may be configured to conclude that the user suffers from spasticity or inability to maintain position.

Another example of a test is rapid hand or foot movements in which the user is instructed to engage in rapid finger tapping, rapid hand pronation-supination (in a motion similar to screwing in a light bulb), rapid hand tapping, and/or rapid foot tapping against the floor or other object. Such a test may be used to detect subtle muscle weakness, as evidenced by an inability to perform the rapid finger tapping or hand pronation-supination.

The display system may be configured to interpret the user's performance of the instructed movements as follows. Slow or awkward fine finger movements or toe tapping in the absence of weakness may be interpreted as being caused by a subtle abnormality of the corticospinal pathways or lesions of the cerebellum or basal ganglia. An inability to follow motor commands such as "pretend to brush your teeth" may be interpreted as being caused by apraxia. A loss of motor function/voluntary muscle control may be interpreted as being caused by nervous system disorders such as Neuromyelitis Optica; and/or motor disorders such as Motor Neuron Disease and/or Primary Lateral Sclerosis. Bradykinesia/slow movement may be interpreted as being caused by nervous system disorders such as Schilder's Disease; motor disorders such as Huntington's Disease, Primary Lateral Sclerosis, and/or Parkinson's Disease; and/or memory disorders such as Lewy Body Dementia. Involuntary muscle contractions (which may be "task specific") may be interpreted as being caused by motor disorders such as Focal Hand Dystonia. A favoring of one side of the body (as evidenced by more developed muscles on one side of the user's body and/or a favoring of one side when performing a instructed task) may be interpreted as being caused by motor disorders such as Cerebral Palsy. In some embodiments, a detected favoring of one side of the user's body may be treated by displaying content that encourages involvement of the disfavored side of the user's body. For example, a user suffering from hemispatial neglect may only use one side of their body, e.g., only shave half of their face or reach across their body to use a favored arm. In some embodiments, the display system may be configured to show the user that it would be easier to reach using the neglected hand by showing a virtual neglected hand doing the task, thereby encouraging the user to use that neglected hand. In some embodiments, the display system may be configured to display virtual content that lures the user to the neglected side.

Shifting Objects from Neglected Areas to Non-Neglected Areas

It will be appreciated that the location of neglected areas or sides in the user's field of view may be known by the display system. For example, the locations of these areas may be stored in the display system and/or otherwise accessible to the display system. In some embodiments, the display system may be configured to address and draw attention to objects in these neglected areas by shifting the locations of these objects in the user's field of view. For example, as the user is viewing a reflection, the display system's forward facing camera may be configured to capture an image of the reflection, and the display system may be configured to determine whether an object of interest is in a neglected area. If the object is in the neglected area, the display system may be configured to shift the location of that object by presenting an image of the object in a different location, preferably in a non-neglected area of the user's field of view. As a result, the user may advantageously perceive and react to this object. In some embodiments, the entire image captured by the display system may be shifted so that a desired object is located in a non-neglected area.

Once the user realizes that there is content, or visual input, in the neglected shifted area, the display system may be configured to remove the shift. For example, the display system may be configured to prompt the user to indicate whether they perceive the object and to receive a response to this prompting, or to monitor their gaze using an inward facing camera to determine if the user's gaze matches or is directed to objects in the shifted area. In some embodiments, detection of an affirmative response from the user may cause the display system to decrease the amount of shift gradually, in incremental amounts, over time. For example, the display system may be configure do determine, after every incremental change, whether the user perceives the object and, after making an affirmative conclusion, to make another incremental change, until the shift is removed.

In some embodiments, in addition to the shift, the display system may be configured to function as a "true mirror" in which a virtual reflection of the user is shown as not reversing features of that user, as would occur in a typical mirror. For example, the display system may be configured to image a user's reflection and to reverse that reflection before displaying the image of the reflection to the user. The reversed image of the user's reflection will be seen by the user as a non-reversed image, or virtual true mirror reflection. In some embodiments, the virtual true mirror reflection may overlay and replace the actual reflection.

Tests of the Strength of Individual Muscle Groups

In some embodiments, the strength of individual muscle groups of the user may be tested in front of a reflective surface. The user may be instructed (e.g., by the display system) to perform movements that are designed to be focused on a particular muscle group. The display system may be configured to image the user (e.g., using an outwardly-facing camera) to determine whether the instructed movements and positions were accurately performed or to determine to what degree the user deviated from the instructed movements or positions. In some embodiments, the distance that the user is able to move against a known resistance (e.g., a weight) may be measured as a gauge of strength. Alternatively or in addition, the magnitude of the resistance (e.g., the mass of the weight) may be varied to determine the user's ability to move against difference resistances and thereby measure the strength of the user.

In some embodiments, muscle groups may be successively tested in pairs; that is, after testing a particular muscle group, a contralateral counterpart of that muscle group may be tested to enhance detection of asymmetries in muscle strength or function. It will be appreciated that muscle strength may be rated on a scale 5 point scale, with 0 indicating no contraction and 5 indicating normal strength. In some embodiments, the display system may be configured to note whether any observed muscle weakness is a proximal or distal muscle weakness. It will be appreciated that proximal muscles are those closest to the body's midline, and distal muscles are those on the body's limbs. In some embodiments, a comparison of proximal versus distal weakness may be used to determine whether the user suffers from muscle or nerve disease, respectively.

Examples of tests of muscle strength include the following. Upper extremity strength tests include an elbow extension test, which utilizes and provides diagnostic information regarding tricep muscles, the radial nerve, and nerve roots C6, C7, and C8. Lower extremity strength tests include a knee extension test, which utilizes and provides diagnostic information regarding quadricep muscles, the femoral nerve, and nerve roots L2, L3, and L4. The strength of muscles controlling the foot may be determined using a foot eversion and/or inversion test in which the user is asked to perform an eversion and/or inversion of their foot. It will be appreciated that the display system may be configured to perform multiple muscle strength tests and to determine patterns of weakness based upon the results of these tests. The patterns of weakness may aid in localizing a particular cortical or white matter region, spinal cord level, nerve root, peripheral nerve, or muscle abnormality.

The display system may be configured to interpret the user's performance on the muscle tests as follows. Muscle weakness or fatigue may be interpreted to be caused by nervous system disorders such as Acute Disseminated Encephalomyelitis, Clinically Isolated Syndrome, Guillain-Barre Syndrome, Multiple Sclerosis, Neuromyelitis Optica, Schilder's Disease, Transverse Myelitis, and/or Peripheral Neuropathy; optic neuropathies such as Acute Demyelinating Optic Neuritis, and/or Mitochondrial Optic Neuropathy (Hereditary); motor disorders such as Ataxia, Motor Neuron Disease, Amyotrophic Lateral Sclerosis, Primary Lateral Sclerosis, Progressive Muscular Atrophy, Spinal Muscular Atrophy, and/or Kennedy's Disease; memory disorders such as Frontotemporal Dementia; and/or injuries such as Hydrocephalus, Stroke, and/or Traumatic Brain Injuries. Paralysis may be interpreted by the display system as being caused by nervous system disorders such as Balo's Disease, Guillain-Barre Syndrome, Multiple Sclerosis, and/or Neuromyelitis Optica; memory disorders such as Vascular Dementia; and/or injuries such as Stroke.

Reflex Testing

In some embodiments, testing of the user's reflexes may be utilized to identify nervous system abnormalities such as damaged neurons, and to identify and isolate injured parts of the user's brain based on the reflex test results for various parts of the user's body. Various reflex tests are described below. The tests may be conducted in front of a reflective surface and the results of the tests may be determined by capturing images of the user's reflection.

In some embodiments, the normal reflex movements expected from a particular test may be projected as augmented reality content so that the user or the system or a third party may determine if the user's reflex aligns with the normal movement and may also determine the degree of abnormality. The degree of abnormality may be determined qualitatively and/or quantitatively (e.g., through quantitative measurements of the range of motion exhibited by the user). For example, quantitative measurements may be obtained by analyzing images of the user in calculating various parameters regarding the user's movement based on known constants (e.g., the height of the user, the size of the user's body parts, the distance of the user from the reflective surface on which the image of the user was captured, etc.). In some embodiments, the user's movement may be compared to the augmented normal movement and shown in a visual historical comparison. In some embodiments, augmented reality content showing the user's movement may be color-coded. For example, if the user does not have any movement, the projected body part having the lack of movement would be red, or if the user's movement is normal, then the projected body part having normal movement would be green. In some embodiments, the display system may be configured to measure the time and distance of a reflex movement, to determine the speed of that movement. For example, the distance of the user from the reflective surface may be determined using a depth sensor to allow determinations of the sizes of various features by allowing mathematical determinations regarding how to scale the observed image.

a. Deep Tendon Reflexes

A third party or the user may apply a reflex hammer to the user's limbs to create impulses to stretch a muscle and tendon of the user. Preferably, the user's limbs are in a relaxed and symmetric position, as these factors may influence reflex amplitude. In some embodiments, to detect asymmetries on the left/right sides of the user, for each reflex tested on one side of the user, a contralateral counterpart of the muscle/tendon may be subjected to a similar reflex test.

the display system may be configured to conclude that certain user reactions to the reflex test are indicative of various conditions, as follows. For example, abnormally increased reflexes (hyperreflexia) may be interpreted by the display system as being caused by upper motor neuron lesions. Clonus may be interpreted by the display system as being caused by motor disorders such as Huntington's Disease. It will be appreciated that the display system may be configured to diagnose the presence of clonus by detecting repetitive vibratory contractions of a muscle that occur when the muscle and corresponding tendon are stretched. In some cases, clonus may also be interpreted by the display system as hyperreflexia. In addition to clonus, other signs of hyperreflexia that may be observed by the display system include spreading of reflexes to other muscles that are not directly tested and crossed adduction of the opposite leg when the user or a third party taps the medial aspect of the knee.

In some embodiments, the display system may be configured to test for deep tendon reflexes by observing the reaction of the user to an applied force on the user's tendons. The test may be performed periodically to allow comparisons of current results with past results, and/or the test results may be compared with expected average results. A diminishment of deep tendon reflexes may be interpreted as being caused by abnormalities in muscles, sensory neurons, lower motor neurons, and/or the neuromuscular junction; acute upper motor neuron lesions; and/or mechanical factors such as joint disease.

In some embodiments, the absence of deep tendon reflexes may be interpreted by the display system as being caused by nervous system disorders such as Neuromyelitis Optica and/or Spinal Muscular Atrophy type I. In some embodiments, exaggerated deep tendon reflexes may be interpreted by the display system as being caused by nervous system disorders such as Neuromyelitis Optica.

b. Plantar Response

In some embodiments, the plantar response of the user may be tested by scraping an object across the sole of the user's foot, with the object being moved from the heel, forward toward the small toe, and then arcing medially toward the big toe. A downward contraction of the toes is the expected normal response to this test.

Various abnormal responses may be imaged by the display system. Babinski's sign is an abnormal response typically characterized by an upward movement of the big toe and a fanning outward of the other toes. In some cases, the toes may be "silent" (moving neither up nor down). Where the toes contract downwardly on one side (one foot), but are silent on the other (the other foot), the silent side is considered abnormal. These responses are always considered abnormal in adults, although they are not abnormal in infants up to the age of about 1 year. In some embodiments, these abnormal responses, including extensor plantar responses may be interpreted to be caused by motor disorders such as Huntington's Disease.

The presence of Babinski's sign may be interpreted by the display system to indicate the presence of upper motor neuron lesions anywhere along the corticospinal tract. It will be appreciated, however, that Babinski's sign may not be elicited if there is severe weakness of the toe extensors. The presence of Babinski's sign may be interpreted by the display system to be caused by motor disorders such as Amyotrophic Lateral Sclerosis in some embodiments.

c. Figure Flexor Reflexes

In some embodiments, tests of figure flexor reflexes may help determine the presence of hyperreflexia (overactive reflexes) in the upper extremities of the user. Finger flexors may be tested by having the palm tapped gently with a reflex hammer. Alternatively, the presence of heightened reflexes in the upper extremities of the user may be determined by testing for Hoffmann's sign, by having the user's middle finger held loosely and flicking the fingernail of the finger downward, which causes the finger to rebound slightly into extension. Hoffmann's sign is present if the thumb is observed to flex and adducts in response.

Hoffmann's sign, or heightened finger flexor reflexes, may be interpreted by the display system to indicate the presence of upper motor neuron lesion affecting the hands.

For the various reflex tests above, in some embodiments, the absence of reflexes may be interpreted by the display system to be caused by nervous system disorders such as Guillain-Barre Syndrome. In addition, the presence of hyperreflexia may be interpreted by the display system to be caused by nervous system disorders such as Multiple Sclerosis. Also, spasticity (stiff muscles with exaggerated reflexes) may be interpreted by the display system to be caused by motor disorders such as Cerebral Palsy, Huntington's Disease, and/or Amyotrophic Lateral Sclerosis.

Coordination Testing

In some embodiments, testing of the user's coordination may be utilized to identify nervous system abnormalities. For example, coordination tests may be used to identify and isolate injured parts of the user's brain based on the coordination test results for various parts of the body. Various coordination tests are described below. As with other tests disclosed herein, the coordination tests may be conducted in front of a reflective surface and the results of the tests may be determined by capturing images of the user's reflection.

In some embodiments, normally coordinated movements expected from a particular test may be projected as augmented reality content so that the user or the system or a third party may determine if the user's movements align with the normal movements and may also determine the degree of abnormality. The degree of abnormality may be determined qualitatively and/or quantitatively (e.g., through quantitative measurements of the range of motion exhibited by the user). For example, quantitative measurements may be obtained by analyzing images of the user in calculating various parameters regarding the user's movement based on known constants (e.g., the height of the user, the size of the user's body parts, the distance of the user from the reflective surface on which the image of the user was captured, etc.). In some embodiments, the user's movement may be compared to the augmented normal movement and shown in a visual historical comparison. In some embodiments, augmented reality content showing the user's movement may be color-coded. For example, if the user does not have any movement, the projected body part having the lack of movement would be red, or if the user's movement is normal, then the projected body part having normal movement would be green. In some embodiments, the display system may be configured to measure the time and distance of a movement, to determine the speed of that movement. For example, the distance of the user from the reflective surface may be determined using a depth sensor to allow determinations of the sizes of various features by allowing mathematical determinations regarding how to scale the observed image.

In some embodiments, Appendicular Coordination tests may be performed to determine whether a user suffers from a cerebellar disorder, which may disrupt coordination or gait while leaving other motor functions relatively intact.

a. Rapid Alternating Movements

In some embodiments, the user may be instructed to perform rapid alternating movements. An example of such movements includes wiping the palm of one hand alternately with the palm and dorsum of the other hand. As another example, the display system may be configured to display augmented reality content, such as virtual buttons, and a user may be instructed to interact with the content, e.g. tapped the virtual buttons. If slowing rapid repeating movements are detected, the display system may be configured to interpret such results as being caused by nervous system disorders such as Multiple Sclerosis.

b. Precision Finger Tap

In some embodiments, the user may be instructed to perform a Precision Finger Tap test in which fine movements of the hands and feet are made by the user's fingers. Such movements include repeatedly tapping part of the user's thumb with their pointer finger and/or interacting with augmented reality content such as one or more virtual buttons.

Difficulty in controlling movements/making precise movements may be interpreted by the display system as being caused by motor disorders such as Dyskinetic Cerebral Palsy and/or Progressive Muscular Atrophy. Fine motor incoordination/lack of fine motor skills may be interpreted by the display system as being caused by motor disorders such as Dyspraxia, Amyotrophic Lateral Sclerosis, and/or Primary Lateral Sclerosis; learning disorders such as Dysgraphia and/or Non-Verbal Learning Disabilities; behavioral disorders such as Intoxication (Addiction/Alcoholism); and/or developmental disorders such as Fetal Alcohol Spectrum Disorder.

c. Heel-Shin Test

In some embodiments, the user may be instructed to perform a Heel-Shin test in which they are instructed to touch the heel of one foot to the opposite knee, or augmented reality content such as a virtual line, and then to drag the heel in a straight line down the front of their shin and back up again.

Difficulties in performing the heel-shin test may be interpreted by the display system as being caused by nervous system disorders such as Multiple Sclerosis. Gross motor incoordination/inability to sequence movements of the may be interpreted by the display system as being caused by motor disorders such as Dyspraxia and/or Amyotrophic Lateral Sclerosis; memory disorders such as Posterior Cortical Atrophy; and/or injuries such as Stroke, and/or Traumatic Brain Injuries.

It will be appreciated that, like the other tests disclosed herein, the heel shin test may be performed periodically over a period of time, to allow for historical comparisons of test results. Changes in coordination may be interpreted by the display system as being caused by developmental disorders such as Down's Syndrome.

Akinetic-rigid syndrome/slow initiation of movement may be interpreted by the display system as being caused by motor disorders such as Huntington's Disease. It will be appreciated that the slow initiation of movement may be determined by measuring the speed of movement of the user as seen in a reflection of the user.

d. Finger-Nose-Finger Test

In some embodiments, the display system may conduct a Finger-Nose-Finger test in which the user is asked to alternately touch their nose and a clinician's finger as quickly as possible. Preferably, the clinician's finger may be a virtual finger displayed as augmented reality content to the user.

In some embodiments, the Finger-Nose-Finger test may be conducted to determine whether the user suffers from Ataxia. Detecting for Ataxia may include providing the examiner's finger (which may be real or virtual) at the extreme of the patient's reach, and also occasionally moving the finger suddenly to a different location while instructing the user to touch that finger. Difficulties with successfully completing the movements required for the test may be interpreted by the display system as being indicative of Ataxia.

e. Overshoot Test

In some embodiments, the display system may conduct an overshoot test, in which the user is instructed to raise both arms suddenly from their lap up to a particular target level. It will be appreciated that the particular target level may be indicated by a virtual marker displayed as augmented reality content to the user. In some embodiments, the display device may display interactive instructions to the user, to select the appropriate target level for the user to raise their arms before conducting the Overshoot test.

In some other embodiments, the clinician may help to conduct the test. The clinician may be utilized to provide physical contact with the user. For example, the clinician may apply pressure to the user's outstretched arms and then suddenly release it. In some embodiments, the clinician may draw a target line on the crease of the patient's thumb and then ask the patient to touch the target line repeatedly with the tip of their forefinger.

A possible result of the test is that the user will overshoot the target level or target line. The display system may be configured to interpret such an overshoot as an indication that the user suffers from ataxia; such an overshoot is commonly understood to be part of ataxic movements and may be referred to as past-pointing in the context of target-oriented movements.

f. Romberg Test

In some embodiments, the display system may conduct a Romberg Test, in which the user is instructed to stand with their feet together and touching one another, and then to close their eyes. It will be appreciated that when the user's eyes are open, the user may maintain truncal stability using three sensory systems to provide inputs to the cerebellum: vision, proprioception, and vestibular systems. If a mild lesion is present in the vestibular or proprioception systems, the user may be able to compensate with their eyes open. When the user's eyes are closed, however, inputs from visual system are removed and the user's body may exhibit instability. A more severe proprioceptive or vestibular lesion, or a midline cerebellar lesion, may make the user unable to maintain their position and stability even with their eyes open. In addition, lesions in other parts of the nervous system (including the upper or lower motor neurons or the basal ganglia) may also cause instability in the position of the user. In some embodiments, the display system may be configured to provide a warning (e.g., an audible warning) if the user is unstable and there may be a risk of the user falling. The stability of the user may be determined by imaging the user's reflection in the reflective surface and determining the amount of movement of the user. In addition, IMU's and/or accelerometers, and/or head pose determinations may be used to detect the user's movement and/or orientation to confirm a preliminary conclusion of user instability.

Instability of the user may be interpreted by the display system as being indicative of various conditions. For example, abnormal movements in performing tasks requiring coordination, and medium-to-large-amplitude involuntary movements with an irregular oscillatory quality that is superimposed on and interferes with a normal smooth movement may be interpreted by the display system that being indicative of Ataxia. Appendicular ataxia affects movements of the extremities and may be interpreted by the display system as being caused by lesions of the cerebellar hemispheres and associated pathways. Truncal ataxia affects the proximal musculature (particularly musculature associated with gait stability), and may be interpreted by the display system as being caused by midline damage to the cerebellar vermis and associated pathways. Dysdiadochokinesia (abnormal alternating movements) may be interpreted by the display system as being caused by nervous system disorders such as Multiple Sclerosis; and/or motor disorders such as Ataxia. Ataxia may itself be interpreted by the display system as being caused by nervous system disorders such as Multiple Sclerosis; Optic neuropathies such as Acute Demyelinating Optic Neuritis, Mitochondrial Optic Neuropathy (Hereditary); Motor disorders such as Cerebral Palsy; and/or Memory disorders such as Creutzfeldt-Jakob Disease. Signs of dysmetria or incoordination may be interpreted by the display system as being caused by nervous system disorders such as Multiple Sclerosis; motor disorders such as Ataxia, Ataxic Cerebral Palsy, Dyspraxia, Huntington's Disease, and/or Motor Neuron Disease; memory disorders such as Frontotemporal Dementia; and/or injuries such as Hydrocephalus. Clumsiness may be interpreted by the display system as being caused by motor disorders such as Dyspraxia; learning disorders such as Non-Verbal Learning Disabilities; and/or developmental disorders such as Fetal Alcohol Spectrum Disorder.

g. Treatments n some embodiments, once a deficiency has been detected, the display system may be configured to assist the user with aligning their movements and improving their motor skills by providing visual targets. For example, the display system may be configured to train fine motor skills, e.g., playing a real or virtual piano, by displaying augmented reality content that guides the movement of the user's fingers. In cases where the user has difficulty with fine motor skills, the display system may be configured to increase the sizes of virtual buttons to facilitate the user's use of those buttons. In some embodiments, the display system may be configured to display augmented reality content (e.g. piano keys) on a surface while imaging a reflection of the user's movements in a reflective surface. For example, the display system may be configured to allow a pianist to practice on a virtual keyboard, while also capturing a view of the pianist, in a reflection, as a member of an audience would view them.

Gait

In some embodiments, testing of the user's gait may be utilized to identify nervous system abnormalities. For example, damage to certain areas of the brain may present itself as gait asymmetry or instability. By evaluating the posture, balance, and gait of the user, the area of the brain that is damaged may be determined.

In some embodiments, the display system may be configured to display interactive instructions to the user to move in front of a reflective surface as required for various test, as discussed further below. The display system may also be configured to image the reflection of the viewer to analyze their gait. An augmented normal gait may be overlaid the user's reflection to aid the user in understanding the desired motion and/or to allow the user to observe the level of abnormality or change in their gait. In some embodiments, the user may be asked to walk towards a virtual object, which then appears to come closer and closer to the user by being displayed on depth planes which are closer and closer to the user. In addition, in some embodiments, the conclusion of abnormal gait may be validated using other sensors. For example, IMU's and/or accelerometers, and/or head pose determinations may be used to confirm the abnormal gait. For example, it will be appreciated that when a person walks with a normal gait, their head and height moves or "bobs" in a sinusoidal wave, and this bobbing may be detected with IMU's, accelerometers, and/or head pose sensors. An abnormal wave (e.g., a non-sinusoidal wave) may be indicative of an abnormal gait. Consequently, the display system may be configured to interpret the abnormal wave as confirmation of the preliminary conclusion of abnormal gait determined based upon analyses of images of the user's gait.

In some embodiments, normal gait expected in a particular test may be projected as augmented reality content so that the user or the system or a third party may determine if the user's gait aligns with the normal gait and may also determine the degree of abnormality. The degree of abnormality may be determined qualitatively and/or quantitatively (e.g., through quantitative measurements of the range of motion exhibited by the user). For example, quantitative measurements may be obtained by analyzing images of the user in calculating various parameters regarding the user's movement based on known constants (e.g., the height of the user, the size of the user's body parts, the distance of the user from the reflective surface on which the image of the user was captured, etc.). In some embodiments, the user's gait may be compared to the augmented normal gait and shown in a visual historical comparison. In some embodiments, augmented reality content showing the user's gait may be color-coded. For example, if the user does not have any movement or an abnormal gait, the projected image of the user's gait may be red, or if the user's movement is normal, then the projected image showing normal movement would be green. In some embodiments, the display system may be configured to measure the time and distance of a movement, to determine the speed of that movement (e.g., the speed of the user's feet). For example, the distance of the user from the reflective surface may be determined using a depth sensor to allow determinations of the sizes of various features by allowing mathematical determinations regarding how to scale the observed image.

a. Tandem Gait

In some embodiments, the user may be instructed to walk in a straight line while touching the heel of one foot to the toe of the other foot with each step. Users with various nervous system abnormalities may have difficulties with this task. For example, users with truncal ataxia caused by damage to the cerebellar vermis or associated pathways may find this task challenging, since they typically have an unsteady, wide-based gait. Keeping their feet close together, as required by the tandem gait test, may cause these users to become unsteady.

The display system may be configured to interpret the user's performance on the tandem gait test as follows. Ataxia (unsteady walk) may be interpreted by the display system as being caused by nervous system disorders such as Acute Disseminated Encephalomyelitis, Guillain-Barre Syndrome, Multiple Sclerosis, and/or Spinal Muscular Atrophy type II; and/or memory disorders such as Cortical Basal Degeneration and/or Vascular Dementia. Poor balance/falling may be interpreted by the display system as being caused by nervous system disorders such as Epilepsy and/or Multiple Sclerosis; motor disorders such as Ataxic Cerebral Palsy, Dyspraxia, Primary Lateral Sclerosis, and/or Parkinson's Disease; memory disorders such as Cortical Basal Degeneration, Lewy Body Dementia, and/or Progressive Supranuclear Palsy; behavioral disorders such as Intoxication (Addiction/Alcoholism); and/or injuries such as Stroke. Posture instability may be interpreted by the display system as being caused by motor disorders such as Ataxia, Dystonia, and/or Huntington's Disease. Rigid posture may be interpreted by the display system as caused by memory disorders such as Creutzfeldt-Jakob Disease. An abnormal posture may be interpreted by the display system as being caused by motor disorders such as Congenital Spinal Muscular Atrophy with arthrogryposis, and/or Parkinson's Disease; and/or memory disorders such as Lewy Body Dementia.

b. Forced Gait

In some embodiments, the user may be instructed to walk on their heels, their toes, or the insides or outsides of their feet, to stand or hop on one leg, or to walk up a flight of stairs. Such a forced gait test may be utilized to determine the presence of subtle gait abnormalities or asymmetries.

The display system may be configured to interpret the user's performance on the forced gait test as follows. Where the user is able to normally carry out all of the movements required for gait when they are lying down, but is unable to walk in the standing position, the display system may be configured to determine that the user suffers from gait apraxia. The display system may also be configured to interpret the presence of the gait apraxia as being indicative of frontal disorders or normal pressure hydrocephalus in the user. In addition, difficulty in walking by the user may be interpreted by the display system as being caused by motor disorders such as Cerebral Palsy, and/or Motor Neuron Disease; memory disorders such as Frontotemporal Dementia, and/or Vascular Dementia; developmental disorders such as Fetal Alcohol Spectrum Disorder; and/or injuries such as Brain Tumor. Abnormal gait (such as walking on toes, a crouched gait, a scissor-like gait, and/or a shuffled gait) may be interpreted by the display system as being caused by motor disorders such as Cerebral Palsy, Spinal Muscular Atrophy type III, and/or Parkinson's Disease; memory disorders such as Lewy Body Dementia, and/or Progressive Supranuclear Palsy; and/or injuries such as hydrocephalus. Changes in gait may be interpreted by the display system as being caused by memory disorders such as Creutzfeldt-Jakob Disease; and/or developmental disorders such as Down's Syndrome. A freezing of the user's gait may be interpreted by the display system as being caused by motor disorders such as Parkinson's Disease.

In some embodiments, a visual cue such as a blinking light may be displayed by the display system to help the user reinitiate their gait. Such a blinking light may be utilized to help conduct the test and/or as a therapeutic aid to help the user walk.

c. Treatments

In some embodiments, once a user has been determined to have an abnormal gait, the display system may be configured to provide aids for assisting the user with moving with a more normal gait. For example, the display system may be configured to provide augmented reality content (e.g., as part of interactive games or as a walking aid) in the form of a horizontal line and/or display a focus point ahead of the user, to encourage the user to move along a straight line. In some embodiments, the display system may be configured to display virtual targets (e.g., a virtual circle) corresponding to the desired locations of the user steps, to encourage the user to take strides of normal lengths. Optionally, the display system may be configured to display the virtual targets only in the reflection, to discourage users from looking down at their feet. In some embodiments, the gaze direction of the user may be determined using inwardly facing cameras of the display system and the display system may be configured to stop displaying content or to alter content when it detects that the user's gaze is downward, towards their feet. In some embodiments, the orientation of the user's head, including the direction that the user's head is pointed, may be determined using accelerometers and the display system may be configured to stop displaying content or to alter content when it detects that the user's head is pointed downward. It will be appreciated that some conditions, such as Parkinson's disease, may result in users taking short steps and that providing targets for stride lengths may help these users walk with a more normal gait.

Motion Analysis/Simulation

In some embodiments, the display system may be configured to conduct motion analysis and/or motion simulation. For example, as disclosed herein, the display system may be configured to monitor and measure the user's gait, and range of motion. In addition, because measurements regarding the user's height and/or various parts of the user may be known by the display system, and because the display system may be configured to measure a distance between the user and a reflective surface, quantitative measurements regarding the user's gait and/or range of motion may be determined based upon an analysis of captured images of the user.

In some embodiments, the display system may be configured to analyze body position in reflections of the user and to infer movements of the body based upon this position. For example, the display system may be configured to image a user swinging a golf club in front of the mirror. Based upon the position of the user's body, the display system may be configured to determine the expected path of the golf club, to provide an analysis of the efficiency of the user's swing and/or any misalignments with the desired path of the golf club.

In some embodiments, the display system may be configured to provide therapy to the user in the form of interactive games. For example, the display system may be configured to provide augmented reality content in the form of interactive game content to users recovering from a stroke. For example, the interactive game may be a boxing game to encourage movement of the user's limbs. Advantageously, by creating an interactive game, the user is more likely to be successful in regaining range of motion since they may be more engaged in therapy involving a game. For example, the game may include opportunities for the user to score points and/or compete with other users, both of which may encourage more gameplay. In addition, the display system may be configured to display goals and the user's progress towards those goals, to encourage further engagement with the game. For example, the display system may be configured to image the user's movement and thereby track their range of motion and provide an indication to the user of how close they are to a target range of motion.

In some embodiments, the display system may be configured to display a virtual limb, such as an arm. The virtual limb may be shown reaching a desired target even where the user's actual limb may not reach the target. Without being limited by theory is believed that, by seeing that the virtual arm hit the target, a greater success rate in reactivating neural firings and increasing range of motion may occur.

In some embodiments, where the limb may be limited by physical limitations of the limb or associated structures, for example, the display system may be provided with an EEG sensor (e.g., an electrode which may be brought into contact with the user). Brain waves may be detected by the EEG sensor and interpreted by the display system as indicative of a particular movement. As a result, control over the virtual limb may be provided by the brain waves detected by the EEG sensor. Thus, even where the user's actual limb may have limited motion, the virtual limb has a full range of motion, which corresponds with the expectations of the user's brain.

Dyslexia

Users with dyslexia may have difficulty differentiating between an object and the mirror-image of that object. Without being limited by theory, it is believed that this difficulty may be caused by problems with inhibiting or activating mirror neurons, which causes difficulty in differentiating between chiral images.

It will be appreciated that neurons are controlled by neurotransmitters that inhibit or activate the firing of neurons. "Mirror neurons" couple or fire to affect other neurons and may mimic these other neurons. An example of the effect of mirror neurons is phantom limb pain, where visual stimuli is linked to somatosomatic input such that even when a visual input is not present, the mirror neurons are still linked and pain is experienced.

Mirror neurons may also play a role in differentiating between chiral objects. Examples of chiral objects include a person's left and right hands. The mirror neurons allow an individual to understand that these chiral objects are the same object, but just mirror images of each other. For example, if a user were to look at a photograph of him/herself and then a reflection of him/her self in a mirror, the two images would be mirror images of each other. Normally, the user's mirror neurons would be able to take the visual input from the mirror and from the photograph, and decipher that they were both the user since they are learned to be linked together as the same user through perception/action coupling. However, the user would also be able to differentiate the images and understand that the images are not identical. Users with dyslexia, however, may not be able to make this differentiation; that is, the users may understand the images to be of the same object but not be able to understand that the images themselves at different.

In some embodiments, the display system may be configured to diagnose and/or treat dyslexia. Advantageously, as described herein, the display system may be configured to display virtual object and a reflected image of that object. The display system may be configured to then prompt the user to indicate whether the reflected image and a true image of the same or different. A user response that images are the same may be interpreted by the display system as an indication that the user is dyslexic. The display system may then be configured to provide this diagnostic conclusion to the user and/or to a third-party, such as a clinician.

In some embodiments, the display system may be configured to treat dyslexia. For example, the display system may be configured to display both true images and mirror images of objects with identifying information to teach the user the difference between the images. In some embodiments, both true and reversed views of virtual content may be shown as three-dimensional objects, and may be rotated to teach the user the differences between the different views of the objects.

Somatoparaphrenia

Somatoparaphrenia is a condition in which a patient denies ownership of a part of their body (the "affected part" of their body), such as a limb or a side of their body. One treatment for somatoparaphrenia is mirror therapy, in which the patient sees themselves in the mirror. The patient observes that the affected part is part of their body, thereby establishing ownership of that affected part.

In some embodiments, block 710 (FIG. 12) includes displaying augmented reality content to reinforce ownership of the affected part. For example, the display system may be provided with knowledge of the affected part, e.g., as part of a database accessible by the display system, and may be configured to search the database to determine whether the user has an affected part. Upon determining that the affected part is present, the display system may be configured to analyze captured images of the reflection to determine the presence and location of the affected part and to subsequently highlight or otherwise identify the affected part. Such highlighting may include, e.g., changing a color or other visible property of the affected part by overlaying content of that color on the affected part or displaying other images overlaid the reflection of the affected part. In some embodiments, in addition to, or as an alternative to displaying content to highlight the affected part, the user may be instructed to perform various motions with the affected part. For example, the display system may be configured to instruct the user, by displaying instructions and/or by providing audible instructions (e.g., via the speakers 66), to perform the various motions.

In some embodiments, the display system may be configured to function as a "true mirror" in which a virtual reflection of the user is not reversed, as would occur in a typical mirror. For example, the display system may be configured to image a user's reflection and to reverse that reflection before displaying the reversed image to the user. Notably, the reversed image of the user's reflection will be seen by the user as a non-reversed image, or virtual true mirror reflection. In some embodiments, the virtual true mirror reflection may overlay and replace the actual reflection. In some other embodiments, the virtual true mirror reflection is displayed adjacent to, but not blocking, the actual reflection. Thus, the user may have two views of themselves, which may provide advantages for further reinforcing the user's ownership of an affected part.

It will be appreciated that, while advantageously applied to treat Somatoparaphrenia, the display system may be configured to display the virtual true mirror reflection in other contexts. Indeed, in addition or as an alternative to reversing the user's reflection, the display system may be configured to modify the user's appearance and/or the appearance of other objections in a reflection by rotating, flipping/mirroring, cropping, changing shape, and/or changing the size of reflected features.

As discussed above, many tests may involve providing instructions to the user to perform particular tasks or movements. In some embodiments, any of these instructions may be displayed by the display system as augmented reality content to the user and/or conveyed audibly. Advantageously, unless the test seeks to determine the user's understanding of audible or text-based instructions, the instructions to the user may include demonstrations of the desired task or movements to facilitate correctly performing the test.

It will be appreciated that many of the tests disclosed herein utilize images of the user as an input for conducting an analysis. Many of these analyses rely on images of the user performing a particular action, assuming a particular position, simply providing a view of a particular part of their body, etc. It will also be appreciated, that as the user goes about their day, they may perform an action, assume a position, or provide a view of their body that allows an analysis to be performed if an appropriate image were available. Advantageously, the display system may be configured to passively collect image information from reflections of the user in order to perform various analyses unobtrusively, without prompting the user to perform actions, assume positions, provide desired views of their body, or engage in other test-specific actions. This image information may take the form of e.g., still images, video, or combinations thereof. In addition, the still images or video may also include or include links to environmental data (e.g., date, temperature, ambient noise, lighting conditions, distance from the mirror, etc.), which may be useful for providing a context for the still images or video.

In some embodiments, the image information may be stored on a continual basis and then subsequently analyzed. For example, image information from outward facing cameras of the display system may be continually collected and a determination of whether a reflection has been captured may be performed after collection of this image information. In some other embodiments, the determination of whether a reflection is present is performed before collecting image information. In either case, however, the display system may be configured to perform an analysis of the image information as that information is collected, to determine whether the collected image provides data relevant to one or more of the analyses, e.g. user health analyses, disclosed herein. If it is determined that appropriate data is present in an image, the display system may be configured to then perform the associated analysis. In some other embodiments, the analysis and/or determination of whether appropriate data is present may be conducted at a later time (e.g., at preset intervals, such as at night or other times when the display system may not be used by the user, and/or in response to a particular input from the user to perform one or more analyses). Preferably, the collection of the image information is continuous while the user is wearing the display system, while the analysis and/or determination of whether appropriate data is present is performed intermittently, or sporadically, e.g., in accordance with a preset schedule and/or an input by the user or other party.

Advantageously, these analyses may be performed continuously over time, e.g., particular analyses may be performed multiple times over the span of hours, days, weeks, months, or even years. As a result, a large data set may be obtained and analyzed before making a conclusion regarding a particular analysis. Such a large data set may improve the reliability and level confidence in the conclusions drawn from the analyses, relative to a single analysis of data obtain at only a single point in time.

In addition, long-term trends may also be obtained by historical analysis of collected images. As a result, both contemporary conditions and trends regarding these conditions may be determined, which may provide data for determining future trends more specifically tailored to a particular user. For example, it is possible that certain conditions may not become apparent until particular thresholds of symptoms are reached, and it is traditionally is difficult to analyze the state of the user before a condition is found since prior data sets relevant to the condition would not normally be obtained by a clinician, since the relevance of those data sets was not previously understood. The passive collection and storage of image information advantageously provides the display system with an ability to reach back in time to conduct analyses of the user at earlier points in time. As a result, a more accurate understanding of the progression of a condition may be determined. In addition, rather than extrapolating from norms for a general population, the rate of change of a condition for a user may be determined, thereby providing information for more accurately projecting the progression of a condition.

It will be appreciated that any of the tests disclosed herein may advantageously use the passively collected image information. Various nonlimiting examples of uses of passively collected image information are noted below.

The display system may be configured to analyze images of reflections of the user's face to detect the presence of asymmetries in the face, including facial expressions and voluntary movements of facial muscles.

The image information may include ambient noises such as speech. In some embodiments, the display system may be configured to recognize speech directed to the user and determine whether the user made a response in view of that speech. A failure to respond may be interpreted to indicate a possible abnormality in CN VIII.

Where the image information includes an image of a reflection of the user in bed and where nystagmus is detected, the display system may be configured to alert the user to conduct additional vestibular testing.

The display system may be configured to track the user's range of movement for similar tasks. For example, the display system may be configured to track the user's ability to move various muscles, as evidenced by various motions such as shrugging their shoulders, turning their heads, performing various actions in particular sports, etc. Deviations from historical norms for the user may be interpreted by the display system to be indicative of abnormalities in nerves that control muscles involved with the various motions. For instance, many sports utilize rapid alternating movements and the slowing of these movements may be indicative of nervous system disorders such as Multiple Sclerosis. Once these possible abnormalities are detected, the display system may be configured to prompt the user or another entity to conduct additional analyses.

Images in which the user sticks their tongue (e.g., in response to a joke, while licking an ice cream cone, etc.) out may be analyzed for CN XII abnormalities, as disclosed herein.

Nonuniform/non-symmetrical muscle development on different sides of the user's body may be interpreted by the display system to be a favoring of one side of the user's body. The display system may be configured to further interpret such a favoring of one side as an indication of a motor or nervous system disorder, and then prompt the user or another entity to conduct additional analyses.

Some images of reflections may show repeated tapping of the user's thumb, which may provide data similar to performing a precision finger tap test as part of coordination testing, as disclosed herein.

Some images of reflections may show a sudden raising of the user's arms from their lap, which may provide data similar to performing and overshoot test.

Images showing reflections of the user walking may be analyzed for gait testing.

As disclosed herein, the display system preferably provides proper accommodation-vergence matching and may display content over a plurality of depth planes, which may facilitate long-term comfort while wearing the display system. As a result, the user may wear the display system for extended durations even where a particular test or analysis is not specifically being performed. This long-term wear advantageously allows the display system to continually gather large sets of images of the user's ambient environment, including reflections of the user.

In many analyses disclosed herein, a comparison is made between a more recent image of the user and an earlier image of the user. For all such analyses, the display system may be configured to display the earlier image to the user, to provide the user with a basis for comparison. Such earlier images may provide a basis for the user to understand the amount of change (whether an improvement or a worsening of a condition) in the user over time. In some other embodiments, for any of these analyses, the display system's processor may be configured to simply make the comparison based upon earlier images or data and later images or data, without displaying any earlier images to the user.

In the analyses disclosed herein, the display system may be configured to collect data regarding the user by imaging the user's reflection (e.g., using an outwardly-facing camera). For example, the display system may be configured to image the user's reflection as they are performing a particular task or movement in response to instructions provided for conducting a particular test. It will be appreciated that for all of the analyses disclosed herein, the display system may be configured to make a preliminary conclusion regarding the results of the analysis. This preliminary conclusion may include a determination that one or more possible conditions are present, and may provide probabilities that the user has the one or more possible conditions. The preliminary conclusion and/or any related probabilities may be provided to the viewer as augmented reality content and/or as audible announcements. The display system may also be configured to provide suggestions for follow-up by the user and/or to automatically initiated a follow-up by forwarding information to a clinician. In some other embodiments, the display system be configured to not make any determination and to simply transmit images to a clinician and/or another computer system for further analysis and the determination of conclusions. In yet other embodiments, the display system may be configured to both make a preliminary conclusion and transmit images of the user to a clinician and/or other computer system for further analysis.

Some analyses may require the user to provide an input, e.g., regarding whether they perceive a stimuli, experience a condition, etc. For any of the analyses disclosed herein, the input may take the form of a movement of the user (e.g., raising one or both hands), the selection of a virtual menu item, a spoken word or phrase, etc.

In various embodiments described above, the display system may be configured to make determinations regarding whether the user exhibits certain physical symptoms, as seen in a reflection. For example, the system may be configured to determine whether the user exhibits tremors, slow movement, rigidity, and postural instability. As described herein, such determinations may be made by analyzing images of the user's reflection captured by an outward facing camera of the display system. In some embodiments, such image-based determinations regarding user movement may be validated using other sensors. For example, an accelerometer or IMI may be utilized to confirm the occurrence of user movements (e.g., tremors, slow movement, rigidity, and/or postural instability). In some embodiments, analysis of the reflection, and an initial determination of a particular type of body movement (e.g., abnormal movements), may initiate a protocol in which data from additional sensors is analyzed to validate the initial determination. In some other embodiments, data from the other sensors are analyzed first to determine whether particular types of body movement are exhibited by the user, and then images of a reflection of the user may be analyzed to determine whether the body movements are observable and thereby validate the initial conclusion provided by the other sensors. In some embodiments, the display system may be configured to prompt the user to proceed to a reflective surface based upon an initial conclusion by the other sensors that particular types of movement are occurring. The display system may then be configured to capture images of the user's reflection and to analyze the images to determine whether those types of movements are indeed occurring and thereby validate whether the initial conclusion is correct. In addition, it will be appreciated that determinations of the occurrence of movements based upon captured images may be made by detecting the movements of parts of the user's body and/or by detecting movements of objects in contact with the user's body (e.g., objects such as hair brushes or toothbrushes held by the user). For example, tremors in the movement of air brushes may be interpreted by the display system to indicate tremors in the user's hands.

In various embodiments disclosed herein, the display system may be configured to make determinations regarding whether the appearance and/or movements of the user or third parties may be considered abnormal. For example, the display system may be configured to determine whether movements, facial features, and/or other body features are abnormal. In some embodiments, all such comparisons may be made between an imaged reflection of the user or third party, and an established reference or norm. It will be appreciated that these norms may correspond to averages or other metrics derived from data for a population. In some embodiments, the norm may be determined based upon shared data between a plurality of display systems configured to share information, including data regarding reflections of their users. In addition, in some embodiments, the display systems may have demographic information regarding the users, which may allow the users to be further organized into various subpopulations, each with their own norms or averages. Thus, given the number reflections captured by the plurality of display systems, the display system may be configured to provide averages for various parameters regarding the user movements and body features. The averages may be determined based upon the population as a whole, or averages may be determined for a subpopulation defined by various demographic parameters (e.g. age, gender, ancestral country of origin, etc.). As a result, a user's deviation from various norms may be determined based on comparison with these averages.

For any of the analysis herein in which images of the user is utilized, it will be appreciated that the images may be obtained using an outward-facing camera on the user's display system. In some other embodiments, images of a first user may be detected by a second user's display system in reflections of the first user observed by an outward-facing camera of that second user's display system. As discussed herein, the first and second users' display systems may be configured to share information, such as images obtained of the other user.

It will be appreciated that for all of the analyses disclosed herein, the display system may be configured to make a preliminary conclusion regarding the results of the analysis. This preliminary conclusion may include a determination that one or more possible conditions are present, and may provide probabilities that the user has the one or more possible conditions. In some other embodiments, the display system be configured to not make any determination and to simply transmit images to a clinician and/or another computer system for further analysis and the determination of conclusions. In yet other embodiments, the display system may be configured to both make a preliminary conclusion and transmit images of the user to a clinician and/or other computer system for further analysis.

It will also be appreciated that the display system may be configured to capture images of reflections by capturing electromagnetic radiation of one or more wavelengths. Preferably, this electromagnetic radiation includes visible light. Other nonlimiting examples of electromagnetic radiation include infrared light and ultraviolet light. In some embodiments, multiple types of electromagnetic radiation (e.g., two or more of visible, infrared, or ultraviolet light) may be captured by the display system (e.g. using the outward facing camera 65 of FIG. 1B) to image a reflection. The display system may be configured to evaluate images formed by different types of electromagnetic radiation for different types of analyses. For example, visible light images may be analyzed to detect surface abnormalities on a user's face, while infrared light images may be utilized to detect abnormalities underlying the surface of the skin.

Computer Vision to Detect Reflections and Objects in Ambient Environment

As discussed above, the display system may be configured to detect reflections and/or objects in the environment surrounding the user. The detection may be accomplished using a variety of techniques, including various environmental sensors (e.g., cameras and/or audio sensors), as discussed herein.

In some embodiments, the stimulus present in the environment may be detected using computer vision techniques. For example, as disclosed herein, the display system's forward-facing camera may be configured to image the ambient environment and the display system may be configured to perform image analysis on the images to determine the presence of various features, such as reflections, in the ambient environment. The display system may analyze the images acquired by the outward-facing imaging system to perform scene reconstruction, event detection, video tracking, object recognition, object pose estimation, learning, indexing, motion estimation, or image restoration, etc. As other examples, the display system may be configured to perform face and/or eye recognition to determine the presence and location of faces and/or human eyes in the user's field of view. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

One or more of these computer vision techniques may also be used together with data acquired from other environmental sensors (such as, e.g., microphone) to detect and determine various properties of the objects and/or reflections detected by the sensors.

As discussed herein, the reflections or objects in the ambient environment may be detected based on one or more criteria. When the display system detects the presence or absence of the criteria in the ambient environment using a computer vision algorithm or using data received from one or more sensor assemblies (which may or may not be part of the display system), the display system may then signal the presence of the reflection and/or object.

Additionally or alternatively, the display system may learn to identify the presence of the reflection and/or object in the environment based on the user's behaviors (or behaviors of a group of users). For example, the display system may learn to identify the presence of the reflection and/or object in the environment by associating certain actions or behaviors of the user or a group of users to certain objects that are present in the ambient environment and use this association to predict whether the reflection and/or object is present.

Machine Learning

A variety of machine learning algorithms may be used to learn to identify the presence of reflections and/or objects. Once trained, the machine learning algorithms may be stored by the display system. Some examples of machine learning algorithms may include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models may be customized for individual data sets. For example, the wearable device may generate or store a base model. The base model may be used as a starting point to generate additional models specific to a data type (e.g., a particular user), a data set (e.g., a set of additional images obtained), conditional situations, or other variations. In some embodiments, the display system may be configured to utilize a plurality of techniques to generate models for analysis of the aggregated data. Other techniques may include using pre-defined thresholds or data values.

The criteria for detecting a reflection and/or object may include one or more threshold conditions. If the analysis of the data acquired by the environmental sensor indicates that a threshold condition is passed, the display system may provide a signal indicating the detection the presence of the reflection and/or object in the ambient environment. The threshold condition may involve a quantitative and/or qualitative measure. For example, the threshold condition may include a score or a percentage associated with the likelihood of the reflection and/or object being present in the environment. The display system may compare the score calculated from the environmental sensor's data with the threshold score. If the score is higher than the threshold level, the display system may detect the presence of the reflection and/or object. In some other embodiments, the display system may signal the presence of the reflection and/or object in the environment if the score is lower than the threshold. In some embodiments, the threshold condition may be determined based on the user's emotional state and/or the user's interactions with the ambient environment.

In some embodiments, the threshold conditions, the machine learning algorithms, or the computer vision algorithms may be specialized for a specific context. For example, in a retail context, the computer vision algorithm may be specialized to detect certain responses to the reflections and/or objects. As another example, the display system may execute facial recognition algorithms and/or event tracing algorithms to sense the user's reaction to a reflection and/or object.

Other Considerations

As noted herein, each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (70), the remote processing module (72), and remote data repository (74). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

It will also be understood that various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention.

For example, while advantageously utilized with AR displays that provide images across multiple depth planes, the augmented reality content disclosed herein may also be displayed by systems that provide images on a single depth plane.

It will also be appreciated that the various alerts disclosed herein may include one or more of text, audible signals, flashing boxes, and haptic feedback.

In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the user. In other words, the "providing" act merely requires the user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element-irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method for detecting a mirror in an environment, the method comprising:
    under control of an augmented reality device (ARD) comprising computer hardware, the ARD comprising an outward-facing camera configured to image an environment around a user and an inertial measurement unit (IMU), the ARD configured to determine movements of a physical object in the environment,
    collecting first movement data associated with the physical object, the first movement data being based on captured images of the physical object;
    collecting second movement data associated with the user;
    comparing the first movement data with the second movement data to identify information indicative of a presence of a mirror; and
    confirming presence of the mirror based at least in part on the identified information.

2. The method of claim 1, wherein the physical object is at least a portion of a body of the user, and wherein the images comprise reflections of the portion of the body of the user.

3. The method of claim 2, wherein the second movement data associated with the user comprises movement data associated with a same portion of the user's body.

4. The method of claim 3, wherein the portion of the body comprises a head or a hand.

5. The method of claim 1, wherein collecting the first movement data and collecting the second movement data are performed by the outward-facing camera.

6. The method of claim 5, wherein the first movement data comprises images indicating position changes of the physical object over a period of time and wherein the second movement data comprises images indicating position changes associated with the user over the same period of time.

7. The method of claim 1, wherein collecting the first movement data is performed by the outward-facing camera and collecting the second movement data is performed by the IMU.

8. The method of claim 7, wherein the first movement data comprises images indicating position changes of the physical object over a period of time and wherein the second movement data comprises position changes associated with the user over the period of time.

9. The method of claim 1, wherein comparing the first movement data with the second movement data to identify the information comprises:

generating a first trajectory associated with the physical object, the first trajectory based at least partly on the first movement data;

generating a second trajectory associated with the user, the second trajectory based at least partly on the second movement data; and calculating the information indicative of a presence of a mirror, the information comprising a covariance of the first trajectory and the second trajectory.

10. The method of claim 9, wherein confirming presence of the mirror is based on the covariance being less than a threshold.

11. The method of claim 9, wherein the physical object comprises a portion of a body, and wherein the second trajectory associated with the user comprises a trajectory associated with a same portion of the user's body.

12. A method for detecting a reflective surface in an environment, the method comprising:

under control of an augmented reality device (ARD) comprising computer hardware, the ARD comprising an outward-facing camera configured to image an environment around a user and an inertial measurement unit (IMU), the ARD configured to track movements of a physical object in the environment, collecting first movement data associated with the physical object;

collecting second movement data associated with the user; and comparing the first movement data with the second movement data to identify information indicative of a presence of a mirror.

13. The method of claim 12, wherein the physical object comprises at least a portion of a body of the user, wherein the first movement data is based on images of the physical object, and wherein the images of the physical object comprise reflections of the portion of the body of the user.

14. The method of claim 13, wherein the physical object comprises a head or a hand of the user, and wherein the second movement data associated with the user comprises movement data associated with the head or the hand of the user.

15. The method of claim 12, wherein collecting the first movement data is performed by the outward-facing camera and collecting the second movement data is performed by the IMU.

16. The method of claim 12, wherein collecting the first movement data and collecting the second movement data comprise:

obtaining images, by the outward-facing camera, over a period of time;

identifying respective positions of the physical object in the images;

calculating a first trajectory based on the identified respective positions of the physical object;

identifying respective positions associated with the user over the period of time; and calculating a second trajectory based on the identified respective positions associated with the user.

17. The method of claim 16, wherein identifying the information indicative of a presence of a mirror comprises:

calculating a covariance between the first movement data and the second movement data.

18. The method of claim 17, wherein the mirror is identified based on the covariance being less than a threshold.

19. The method of claim 16, wherein the physical object comprises a portion of a body, and wherein the positions associated with the user comprise positions associated with a same portion of the user's body.

20. An augmented reality (AR) system for detecting a reflective surface in an environment, the AR system comprising:

one or more outwardly-facing cameras configured to image an environment around a user;

an inertial measurement unit configured to measure the movement of a portion of the user;

hardware processors; and non-transitory computer storage media storing instructions that when executed by the one or more hardware processors, cause the one or more processors to perform operations comprising:

collecting first movement data associated with a physical object in the environment, the first movement data being based on images of the physical object;

collecting second movement data associated with the user;

comparing the first movement data with the second movement data to identify information indicative of a presence of a mirror; and confirming presence of the mirror based at least in part on the identified information.

21. The AR system of claim 20, wherein the physical object is at least a portion of a body of the user, and wherein the images comprise reflections of the portion of the body of the user.

22. The AR system of claim 21, wherein second movement data associated with the user comprises movement data associated with a portion of the user's body corresponding to the portion of the body in the reflections.

23. The AR system of claim 20, wherein collecting the first movement data and collecting the second movement data are performed by the one or more outwardly-facing cameras.

24. The AR system of claim 23, wherein the first movement data comprises images indicating position changes of the physical object over a period of time, and wherein the second movement data comprises images indicating position changes associated with the user over the period of time.

25. The AR system of claim 20, wherein collecting the first movement data is performed by the outwardly-facing camera and collecting the second movement data is performed by the inertial measurement unit.

26. The AR system of claim 25, wherein the first movement data comprises images indicating position changes of the physical object over a period of time and wherein the second movement data comprises position changes associated with the user over the same period of time.

27. The AR system of claim 20, wherein comparing the first movement data with the second movement data to identify the information comprises:

generating a first trajectory associated with the physical object, the first trajectory based at least partly on the first movement data;

generating a second trajectory associated with the user, the second trajectory based at least partly on the second movement data; and calculating the information indicative of a presence of a mirror, the information comprising a covariance of the first trajectory and the second trajectory.

28. The AR system of claim 27, wherein confirming presence of the mirror is based on the covariance being less than a threshold.

* * * * *